(12) United States Patent
Forster et al.

(10) Patent No.: US 12,056,325 B2
(45) Date of Patent: Aug. 6, 2024

(54) DEVICE, METHOD, AND GRAPHICAL USER INTERFACE FOR MANIPULATING APPLICATION WINDOWS OF VIRTUAL DESKTOPS

(71) Applicant: Apple Inc., Cupertino, CA (US)

(72) Inventors: Kristin Marie Forster, Los Altos Hills, CA (US); Raymond S. Sepulveda, Campbell, CA (US); Eric Lance Wilson, San Jose, CA (US); John O. Louch, Santa Barbara, CA (US)

(73) Assignee: APPLE INC., Cupertino, CA (US)

( * ) Notice: Subject to any disclaimer, the term of this patent is extended or adjusted under 35 U.S.C. 154(b) by 1382 days.

(21) Appl. No.: 15/171,192

(22) Filed: Jun. 2, 2016

(65) Prior Publication Data

US 2016/0357358 A1 Dec. 8, 2016

Related U.S. Application Data

(60) Provisional application No. 62/172,160, filed on Jun. 7, 2015.

(51) Int. Cl.
*G06F 3/0481* (2022.01)
*G06F 3/01* (2006.01)
*G06F 3/04845* (2022.01)

(52) U.S. Cl.
CPC ............ *G06F 3/0481* (2013.01); *G06F 3/016* (2013.01); *G06F 3/04845* (2013.01); *G06F 2203/04105* (2013.01); *G06F 2203/04803* (2013.01)

(58) Field of Classification Search
CPC .. G06F 3/0481; G06F 3/04845; G06F 3/0416; G06F 3/0414; G06F 3/016;
(Continued)

(56) References Cited

U.S. PATENT DOCUMENTS 5,712,995 A 1/1998 Cohn
6,057,836 A 5/2000 Kavalam et al.
(Continued)

OTHER PUBLICATIONS

Rizzo, John, Moving to Microsoft Windows Vista, Feb. 27, 2007, Peachpit Press, pp. 1-11.*
(Continued)

*Primary Examiner* — Jeanette J Parker
(74) *Attorney, Agent, or Firm* — Fernando & Partners, LLP

(57) ABSTRACT

Many electronic devices have graphical user interfaces that use applications windows. Because a user may use one or more instances of a particular application or multiple applications at once, application windows are useful tools for organizing items stored in electronic devices and using features provided by various applications. A user may need to manipulate, organize, configure and/or resize application windows. Some methods for manipulating, organizing, configuring and/or resizing application windows require a sequence of user inputs that navigate in a menu system. For example, with these methods, a user may need to select a user interface object in display a menu and/or perform one or more actions on the selected user interface object associated with one or more application windows. The various methods disclosed herein streamline manipulating, organizing, configuring and/or resizing application windows.

61 Claims, 83 Drawing Sheets

(58) Field of Classification Search
CPC . G06F 2203/04803; G06F 2203/04105; G06F 3/048
See application file for complete search history.

(56) References Cited

U.S. PATENT DOCUMENTS

| | | | |
|---|---|---|---|
| 6,195,094 B1 | 2/2001 | Celebiler | |
| 6,550,054 B1* | 4/2003 | Stefaniak | G06F 8/74 717/104 |
| 2001/0035881 A1* | 11/2001 | Stoakley | G06F 3/0481 715/772 |
| 2003/0189597 A1* | 10/2003 | Anderson | G06F 3/0481 715/778 |
| 2009/0083655 A1* | 3/2009 | Beharie | G06F 3/0481 715/781 |
| 2012/0011467 A1* | 1/2012 | Sung | G06F 3/0481 715/788 |
| 2012/0131485 A1 | 5/2012 | Svendsen et al. | |
| 2012/0246596 A1* | 9/2012 | Ording | G06F 9/451 715/799 |
| 2013/0254719 A1* | 9/2013 | Hanazaki | G06F 3/04817 715/846 |
| 2013/0268895 A1* | 10/2013 | Yamaki | G06F 3/04817 715/835 |
| 2014/0063541 A1* | 3/2014 | Yamazaki | G06F 3/1285 358/1.15 |
| 2014/0068505 A1 | 3/2014 | Hayes et al. | |
| 2014/0229888 A1* | 8/2014 | Ko | G06F 3/04842 715/783 |
| 2014/0310646 A1 | 10/2014 | Vranjes et al. | |
| 2014/0359525 A1* | 12/2014 | Weiner | G06F 3/04815 715/782 |
| 2015/0207833 A1* | 7/2015 | Tsubotani | G06F 3/04842 715/753 |
| 2016/0048284 A1* | 2/2016 | Kim | G06F 3/0488 715/770 |
| 2016/0065648 A1* | 3/2016 | Kim | G06F 15/0266 715/748 |
| 2016/0085388 A1* | 3/2016 | Fang | G06F 9/4445 715/778 |

OTHER PUBLICATIONS

International Search Report and Written Opinion for PCT/US2016/035429 dated Oct. 25, 2016.
Examination Report European Patent Office for EP16729725.8-1221 dated Dec. 18, 2018.

* cited by examiner

800

```
┌─────────────────────────────────────────────────────────────────────┐
│ At a device with a display, one or more input devices, one or more  │──802
│ processors and a non-transitory memory:                             │
│                                                                     │
│    Display a first representation of a multi-pane window of an      │
│ application, where the first representation of the multi-pane window│
│ includes a first pane adjacent to a first edge of the multi-pane    │
│ window and a second pane adjacent to the first pane                 │
│                                                                     │
│  ┌───────────────────────────────────────────────────────────────┐  │
│  │ Display a first pane display toggle affordance in the first   │──804
│  │ and third representations of the multi-pane window; and       │  │
│  │                                                               │  │
│  │ In response to detecting selection of the first pane display  │  │
│  │ toggle affordance while displaying either the first or the    │  │
│  │ third representations of the multi-pane window:               │  │
│  │                                                               │  │
│  │    Include display of the first pane in the first and third   │  │
│  │ representations of the multi-pane window; and                 │  │
│  │                                                               │  │
│  │ In response to detecting another selection of the first pane  │  │
│  │ display toggle affordance while displaying either the first   │  │
│  │ or the third representations of the multi-pane window:        │  │
│  │                                                               │  │
│  │    Remove display of the first pane in the first and third    │  │
│  │ representations of the multi-pane window                      │  │
│  └───────────────────────────────────────────────────────────────┘  │
│                                                                     │
│  ┌───────────────────────────────────────────────────────────────┐  │
│  │ Display a sizing toggle affordance in the first and third     │──806
│  │ representations of the multi-pane window; and                 │  │
│  │                                                               │  │
│  │ In response to detecting selection of the sizing toggle       │  │
│  │ affordance while displaying either the first or the third     │  │
│  │ representations of the multi-pane window:                     │  │
│  │                                                               │  │
│  │    Resize display of the first and second panes as a function │  │
│  │ of predefined proportions                                     │  │
│  │                                                               │  │
│  │  ┌─────────────────────────────────────────────────────────┐  │  │
│  │  │  The predefined proportions include at least one of     │──808
│  │  │  percentage based relative widths of the first and      │  │  │
│  │  │  second panes, respective lower bounds of pixels for    │  │  │
│  │  │  the corresponding widths of the first and second       │  │  │
│  │  │  panes, and respective lower bounds of display points   │  │  │
│  │  │  for the corresponding widths of the first and second   │  │  │
│  │  │  panes                                                  │  │  │
│  │  └─────────────────────────────────────────────────────────┘  │  │
│  └───────────────────────────────────────────────────────────────┘  │
│                                                                     │
│                              (A)                                    │
└─────────────────────────────────────────────────────────────────────┘
```

In response to detecting an interaction input associated with the first edge of the second representation of the multi-pane window: ⎯818

Display the first pane as an overlay adjacent to the first edge and covering at least a portion of the second pane within the second representation of the multi-pane window > The interaction input associated with the first edge includes detecting positioning of a focus selector within a trigger area including the first edge ⎯820

> The first pane includes an arrangement of one or more display items, and ⎯822
>
> The overlay having sufficient width to display the arrangement of the one or more display items without display of any of the one or more display items being truncated by an edge of the overlay > Remove display of the overlay from within the second representation of the multi-pane window in response to detecting that a focus selector moves away from the first edge ⎯824

> Rremove display of the overlay from within the second representation of the multi-pane window in response to detecting that an icon has been placed over a drop target included in the overlay ⎯826

> Displaying first pane as the overlay within the second representation of the multi-pane window comprises: ⎯828
>
> Introducing the overlay as slidingly emerging from the first edge of the second representation of the multi-pane window
>
>> The first pane slidingly emerges in response to detecting directed movement of an icon towards the first edge ⎯830

```
┌─────────────────────────────────────────────────────────────────┐
│ In response to an increase of the width of the second representation of the    ├── 838
│ multi-pane window above a second threshold width:                              │
│                                                                                 │
│   Reintroduce display of the first pane in order to display a third            │
│ representation of the multi-pane window, the third representation of the multi-│
│ pane window including the first pane between the first edge and the second     │
│ pane                                                                            │
│                                                                                 │
│   ┌─────────────────────────────────────────────────────────────────┐          │
│   │ The first and second threshold widths are each a function of at least one ├── 840
│   │ of a threshold number of pixels, a number of display points, a distance   │
│   │ value, and a relative display area associated with a representation of    │
│   │ the multi-pane window and a total available display area                  │
│   └─────────────────────────────────────────────────────────────────┘          │
│                                                                                 │
│   ┌─────────────────────────────────────────────────────────────────┐          │
│   │ Size the respective widths of the first and second panes in the third    ├── 842
│   │ representation of the multi-pane window to match proportions of the      │
│   │ corresponding widths of the first and second panes within the first      │
│   │ representation of the multi-pane window                                   │
│   └─────────────────────────────────────────────────────────────────┘          │
│                                                                                 │
│   ┌─────────────────────────────────────────────────────────────────┐          │
│   │   Reintroduction of display of the first pane occurs when the            ├── 844
│   │ increase of the width of the second representation of the multi-pane     │
│   │ window above the second threshold width occurs within a threshold        │
│   │ time duration, and                                                        │
│   │                                                                           │
│   │   Reintroduction of display of the first pane does not occur when the    │
│   │ increase of the width of the second representation of the multi-pane     │
│   │ window above the second threshold width occurs after the threshold       │
│   │ time duration                                                             │
│   └─────────────────────────────────────────────────────────────────┘          │
└─────────────────────────────────────────────────────────────────┘
```

Figure 8E

In accordance with a determination that the interaction input satisfies a first interaction threshold in relation to the first edge: ⎯912

Display a first representation of the virtual desktop configuration region along the first edge of the first virtual desktop, the first representation of the virtual desktop configuration region having a first height (A)

While displaying the text based representations of virtual desktops in the virtual desktop configuration region, wherein the number of virtual desktops does not exceed a text-representation display limit, detect the addition of an additional virtual desktop to the virtual desktop configuration region; and ⎯916

In response to detecting the addition of the additional virtual desktop to the virtual desktop configuration region, and in accordance with a determination that the total number of the one or more virtual desktops created exceeds a predefined limit:

Convert the display of the text based indicators of the one or more virtual desktops in the virtual desktop configuration region to graphical representations of each of the one or more virtual desktops in the virtual desktop configuration region In response to detecting the addition of the additional virtual desktop to the virtual desktop configuration region, and in accordance with a determination that the total number of the one or more virtual desktops created does not exceed the text-representation display limit: ⎯918

Add a text based representation of the additional virtual desktop to the virtual desktop configuration region without converting the display of the text based indicators of the one or more virtual desktops in the virtual desktop configuration region to graphical representations of the one or more virtual desktops in the virtual desktop configuration region

Figure 9B

- 904: The virtual desktop configuration region is arranged in association with a first edge of the first virtual desktop responsive to an interaction input

- 920: While displaying the first representation of the virtual desktop configuration region, in accordance with a determination that the interaction input satisfies a second interaction threshold in relation to the first edge:

Replace the first representation of the virtual desktop configuration region with a second representation of the virtual desktop configuration region along the first edge of the first virtual desktop, the second representation of the virtual desktop configuration region having a second height greater than the first height, and wherein the second representation of the virtual desktop configuration region includes one or more previously created virtual desktops

- 922: In response to detecting the interaction input and in accordance with a determination that the interaction input satisfies a proximity threshold in relation to the first edge:

Display an indicator of the virtual desktop configuration region along the first edge of the first virtual desktop, wherein the indicator does not include representations of any of the previously created virtual desktops

- 924: The display of the indicator of the virtual desktop configuration region includes a symbol provided to indicate that further interaction with the indicator of the virtual desktop configuration is available

- 926: In response to detecting the interaction input and in accordance with a determination that the interaction input with the first edge is complete, the method further comprises:

Cease to display any representation or indicator of the virtual desktop configuration region

Figure 9C

In accordance with a determination that the window movement input includes selection of the window tiling affordance, tile the window on the display, wherein tiling the window on the display includes resizing the window to fill a predefined portion of the display ⟵1006

In accordance with a determination that selection of the window tiling affordance is a first type of selection: ⟵1008

Tiling the window on the display includes displaying a corresponding full-screen tiled window that occupies all of a window display area on the display; and In accordance with a determination that selection of the window tiling affordance is a second type of selection:

Tiling the window on the display includes displaying a corresponding partial-screen tiled window that occupies a portion of the window display area on the display (A)

In accordance with a determination that the window movement input includes movement less than a movement threshold: ⟵1012

Determine that selection of the window tiling affordance is the first type of selection; and In accordance with a determination that the window movement input includes movement greater than the movement threshold:

Determine that selection of the window tiling affordance is the second type of selection Tiling the window proceeds in response to a determination that the window movement input is complete ⟵1014

```
┌─────────────────────────────────────────────────────────────────────┐
│  In accordance with a determination that the window movement input     │──1006
│  includes selection of the window tiling affordance, tile the window   │
│  on the display, wherein tiling the window on the display includes     │
│  resizing the window to fill a predefined portion of the display       │
│                               (B)                                      │
│  ┌───────────────────────────────────────────────────────────────┐    │
│  │ In accordance with the determination that the window movement │────1016
│  │ input includes selection of the window tiling affordance:     │    │
│  │    Display a selection overlay within a first portion of the  │    │
│  │ display that indicates where the corresponding tiled window   │    │
│  │ will be displayed when the window movement input is completed │    │
│  │  ┌─────────────────────────────────────────────────────────┐  │    │
│  │  │ In accordance with determining that the window movement │──┼──1018
│  │  │ input effects movement of the window in a respective    │  │    │
│  │  │ direction:                                              │  │    │
│  │  │    Move display of the selection overlay to a second    │  │    │
│  │  │ portion of the display, wherein the second portion of   │  │    │
│  │  │ the display is located in a direction away from the     │  │    │
│  │  │ first portion of the display corresponding to the       │  │    │
│  │  │ respective direction of the movement of the window      │  │    │
│  │  └─────────────────────────────────────────────────────────┘  │    │
│  │  ┌─────────────────────────────────────────────────────────┐  │    │
│  │  │ In accordance with determining that the window movement │──┼──1020
│  │  │ input repositioned a majority area of the window within │  │    │
│  │  │ a second portion of the display:                        │  │    │
│  │  │    Move display of the selection overlay to the second  │  │    │
│  │  │ portion of the display                                  │  │    │
│  │  └─────────────────────────────────────────────────────────┘  │    │
│  └───────────────────────────────────────────────────────────────┘    │
│  ┌───────────────────────────────────────────────────────────────┐    │
│  │ Display representations of one or more other application      │────1022
│  │ windows in a different predefined portion of the display      │    │
│  │  ┌─────────────────────────────────────────────────────────┐  │    │
│  │  │ Display the representations of the one or more other    │──┼──1024
│  │  │ application windows at reduced scale as compared to     │  │    │
│  │  │ respective display sizes of the one or more other       │  │    │
│  │  │ applications prior to tiling of the window to produce   │  │    │
│  │  │ the first partial-screen tiled window                   │  │    │
│  │  └─────────────────────────────────────────────────────────┘  │    │
│  │                          (C)                                  │    │
│  └───────────────────────────────────────────────────────────────┘    │
└─────────────────────────────────────────────────────────────────────┘
```

Figure 10C

```
┌─────────────────────────────────────────────────────────────────┐
│ In accordance with a determination that the window movement input includes  ⟵1006
│ selection of the window tiling affordance, tile the window on the display,
│ wherein tiling the window on the display includes resizing the window to fill a
│ predefined portion of the display
│  ┌───────────────────────────────────────────────────────────┐
│  │ Display representations of one or more other application windows in a  ⟵1022
│  │ different predefined portion of the display
│  │
│  │                          (D)
│  │
│  │  ┌─────────────────────────────────────────────────────┐
│  │  │ In accordance with a determination that at least one of the one or  ⟵1032
│  │  │ more other application windows cannot be tiled in the first desktop
│  │  │ space in combination with the window:
│  │  │
│  │  │     Display the representation corresponding to the at least one
│  │  │ of the one or more other application windows separately from any
│  │  │ remaining representations of the one or more other application
│  │  │ windows; and
│  │  │
│  │  │     Display a graphical indication concurrently with the
│  │  │ representations of the one or more other application windows, the
│  │  │ graphical indication indicating that the one or more other
│  │  │ application windows are not available for selection
│  │  │
│  │  │  ┌───────────────────────────────────────────────┐
│  │  │  │ Display a glyph over (or proximate to) the representation  ⟵1034
│  │  │  │ corresponding to the at least one of the one or more other
│  │  │  │ application windows in order to indicate that the one or more
│  │  │  │ affordances have been disabled
│  │  │  └───────────────────────────────────────────────┘
│  │  └─────────────────────────────────────────────────────┘
│  └───────────────────────────────────────────────────────────┘
└─────────────────────────────────────────────────────────────────┘
┌─────────────────────────────────────────────────────────────────┐
│ At least one dimension of a tiled window is a function of a dimension of  ⟵1036
│ the display
└─────────────────────────────────────────────────────────────────┘
┌─────────────────────────────────────────────────────────────────┐
│ In accordance with a determination that the window input movement  ⟵1038
│ includes both selection of the window tiling affordance and movement of
│ the window into a predefined portion of the display corresponding to an
│ abort tiling affordance:
│
│     Reposition the window without tiling the window on the display;
│ and
│
│     Terminate responsiveness to the window input movement
└─────────────────────────────────────────────────────────────────┘

In accordance with a determination that the window movement input includes selection of the window tiling affordance, tile the window on the display, wherein tiling the window on the display includes resizing the window to fill a predefined portion of the display ⟵ 1006

(E)

In accordance with a determination that the window input movement includes both selection of the window tiling affordance and a subsequent termination input: ⟵ 1040
    Terminate responsiveness to the window input movement In accordance with a determination that a subsequent window input movement includes selection of the window tiling affordance: ⟵ 1042
    Reduce the full-screen tiled window to a first partial-screen tiled window In accordance with a determination that the window movement input includes selection of a portion of the window chrome that does not include the window tiling affordance, adjust a position of at least a portion of the window without tiling the window on the display ⟵ 1044

In accordance with a determination that the window movement input is associated with the top of the chrome, adjusting the position of at least a portion of the window without tiling the window on the display comprises moving the entire window on the display ⟵ 1046

In accordance with a determination that the window movement input is associated with a side or bottom portion of the chrome (or, optionally, an edge of the window), adjusting the position of at least a portion of the window without tiling the window on the display comprises resizing the window ⟵ 1048

Figure 10F

DEVICE, METHOD, AND GRAPHICAL USER INTERFACE FOR MANIPULATING APPLICATION WINDOWS OF VIRTUAL DESKTOPS

CROSS-REFERENCE TO RELATED APPLICATIONS

This application claims priority to U.S. Provisional Patent App. No. 62/172,160, filed on Jun. 7, 2015.

TECHNICAL FIELD

This relates generally to electronic devices with one or more input devices, including but not limited to electronic devices with one or more input devices that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, California), an image management application (e.g., Aperture or iPhoto from Apple Inc. of Cupertino, California), a digital content (e.g., videos and music) management application (e.g., iTunes from Apple Inc. of Cupertino, California), a drawing application, a presentation application (e.g., Keynote from Apple Inc. of Cupertino, California), a word processing application (e.g., Pages from Apple Inc. of Cupertino, California), a website creation application (e.g., iWeb from Apple Inc. of Cupertino, California), a disk authoring application (e.g., iDVD from Apple Inc. of Cupertino, California), or a spreadsheet application (e.g., Numbers from Apple Inc. of Cupertino, California).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with one or more input devices are reduced or eliminated by the disclosed devices. In some embodiments, the device is a desktop computer. In some embodiments, the device is portable (e.g., a laptop, notebook computer, tablet computer, or handheld device). In some embodiments, the device has a touchpad. In some embodiments, the device has a touch-sensitive display (also referred to herein as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface (e.g., a touch pad separate from the display or a touch screen). In some embodiments, the user interacts with the GUI primarily through one or more input devices such as a mouse, stylus, motion sensing input device, speech command processing device, and/or the like. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display, one or more input devices, one or more processors, and a non-transitory memory. The method includes displaying a first representation of a multi-pane window of an application, where the first representation of the multi-pane window includes a first pane (e.g., a sidebar) adjacent to a first edge of the multi-pane window and a second pane adjacent to the first pane. In response to a reduction of the width of the first representation of the multi-pane window below a first threshold, the method includes collapsing (e.g., removing) display of the first pane in order to display a second representation of the multi-pane window that continues to include display of the second pane and the first edge. In response to detecting an interaction input associated with the first edge of the second representation of the multi-pane window, the method includes displaying the first pane as an overlay adjacent to the first edge and covering at least a portion of the second pane within the second representation of the multi-pane window.

In accordance with some embodiments, a method is performed at an electronic device with a display, one or more input devices, one or more processors, and a non-transitory memory. The method includes concurrently displaying, on the display: a first virtual desktop including a first window of an application; and a virtual desktop configuration region (sometimes also referred to as a "spaces bar"). While concurrently displaying the first virtual desktop and the virtual desktop configuration region, the method includes receiving, with the one or more input devices, an input corresponding to a request to place a representation of the first window at a respective location in the virtual desktop configuration region. In response to receiving the input and in accordance with a determination that the respective location is a first location that is associated with creating tiled virtual desktops, the method includes creating a new tiled virtual desktop in which the first window is tiled in a structured arrangement. In response to receiving the input and in accordance with a determination that the respective location is a second location that is associated with creating non-tiled virtual desktops, the method creating a new non-tiled virtual desktop that includes the first window.

In accordance with some embodiments, a method is performed at an electronic device with a display, one or more input devices, one or more processors, and a non-transitory memory. The method includes displaying, on the display, a first desktop space including a window of an application, wherein the window includes a window tiling affordance displayed within a chrome of the window. The method includes receiving, from the one or more input devices, a window movement input. In response to receiving the window movement input and in accordance with a determination that the window movement input includes selection of the window tiling affordance, the method includes tiling the window on the display, wherein tiling the window on the display includes resizing the window to fill a predefined portion of the display. In response to receiving the window movement input and in accordance with a determination that the window movement input includes selection of a portion of the window chrome that does not include the window tiling affordance, the method includes adjusting a position of at least a portion of the window without tiling the window on the display.

In accordance with some embodiments, an electronic device includes a display unit configured to display a user interface, one or more input units configured to receive user inputs, and a processing unit coupled to the display unit and the one or more input units. The processing unit is configured to enable display of a first representation of a multi-pane window of an application, where the first representation of the multi-pane window includes a first pane adjacent to a first edge of the multi-pane window and a second pane adjacent to the first pane. In response to a reduction of the width of the first representation of the multi-pane window below a first threshold, the processing unit is configured to collapse display of the first pane in order to display a second representation of the multi-pane window that continues to include display of the second pane and the first edge. In response to detecting an interaction input associated with the first edge of the second representation of the multi-pane window, the processing unit is configured to enable display of the first pane as an overlay adjacent to the first edge and covering at least a portion of the second pane within the second representation of the multi-pane window.

In accordance with some embodiments, an electronic device includes a display unit configured to display a user interface, one or more input units configured to receive user inputs, and a processing unit coupled to the display unit and the one or more input units. The processing unit is configured to enable concurrent display of, on the display unit: a first virtual desktop including a first window of an application; and a virtual desktop configuration region. While concurrently displaying the first virtual desktop and the virtual desktop configuration region, the processing unit is configured to received, with the one or more input units, an input corresponding to a request to place a representation of the first window at a respective location in the virtual desktop configuration region. In response to receiving the input and in accordance with a determination that the respective location is a first location that is associated with creating tiled virtual desktops, the processing unit is configured to create a new tiled virtual desktop in which the first window is tiled in a structured arrangement. In response to receiving the input and in accordance with a determination that the respective location is a second location that is associated with creating non-tiled virtual desktops, the processing unit is configured to create a new non-tiled virtual desktop that includes the first window.

In accordance with some embodiments, an electronic device includes a display unit configured to display a user interface, one or more input units configured to receive user inputs, and a processing unit coupled to the display unit and the one or more input units. The processing unit is configured to enable display of, on the display unit, a first desktop space including a window of an application, where the window includes a window tiling affordance displayed within a chrome of the window. The processing unit is configured to receive, via the one or more input units, a window movement input. In response to receiving the window movement input and in accordance with a determination that the window movement input includes selection of the window tiling affordance, the processing unit is configured to tile the window on the display unit, where tiling the window on the display unit includes resizing the window to fill a predefined portion of the display unit. In response to receiving the window movement input and in accordance with a determination that the window movement input includes selection of a portion of the window chrome that does not include the window tiling affordance, the processing unit is configured to adjust a position of at least a portion of the window without tiling the window on the display unit.

In accordance with some embodiments, an electronic device includes a display, one or more input devices, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some embodiments, a non-transitory computer readable storage medium has stored therein instructions which when executed by an electronic device with a display and one or more input devices, cause the device to perform or cause performance of any of the methods described herein. In accordance with some embodiments, an electronic device includes: a display, one or more input devices, and means for performing or causing performance of any of the methods described herein. In accordance with some embodiments, a graphical user interface on an electronic device with a display, one or more input devices, a non-transitory memory, and one or more processors to execute one or more programs stored in the non-transitory memory includes one or more of the elements displayed in any of the methods described herein, which are updated in response to inputs, as described in any of the methods described herein. In accordance with some embodiments, an information processing apparatus, for use in an electronic device with a display and one or more input devices, includes means for performing or causing performance of any of the methods described herein.

Thus, electronic devices with displays and one or more input devices are provided with faster, more efficient methods and interfaces for manipulating user interface objects, thereby increasing the effectiveness, efficiency, and user satisfaction with such devices. Such methods and interfaces may complement or replace conventional methods for manipulating user interface objects.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8E are flow diagrams illustrating a method of manipulating windows in accordance with some embodiments.

FIGS. 9A-9F are flow diagrams illustrating a method of interacting with a virtual desktop configuration region in accordance with some embodiments.

FIGS. 10A-10F are flow diagrams illustrating a method of tiling and manipulating tiled windows in accordance with some embodiments.

DESCRIPTION OF EMBODIMENTS

Figure 1A:
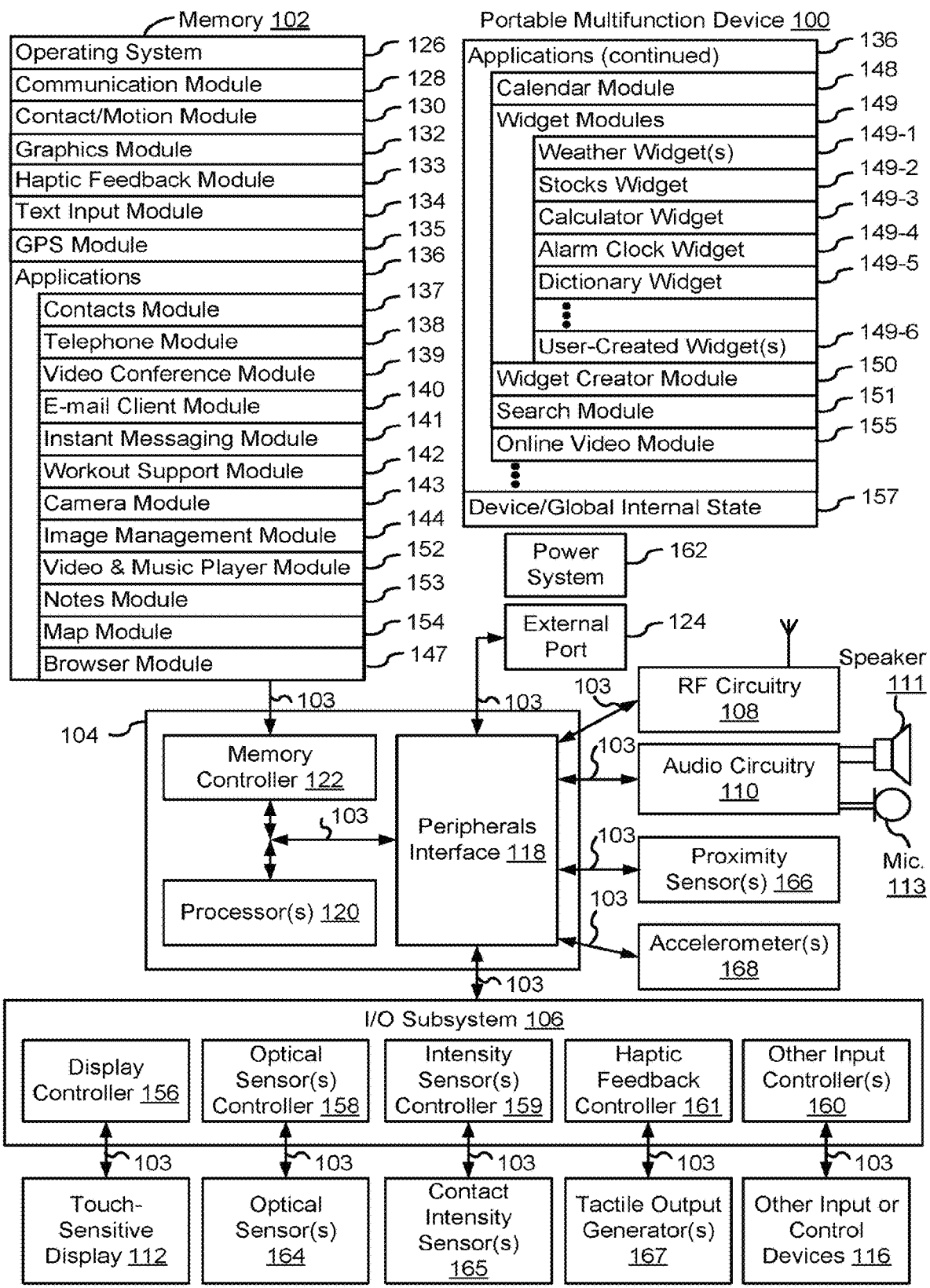
FIG. 1A is a block diagram illustrating a portable multifunction device with a touch-sensitive display in accordance with some embodiments.

Many electronic devices have graphical user interfaces that use applications windows. Because a user may use one or more instances of a particular application or multiple applications at once, application windows are useful tools for organizing items stored in electronic devices and using features provided by various applications. A user may need to manipulate, organize, configure and/or resize application windows. Some methods for manipulating, organizing, configuring and/or resizing application windows require a sequence of user inputs that navigate in a menu system. For example, with these methods, a user may need to select a user interface object in display a menu and/or perform one or more actions on the selected user interface object associated with one or more application windows. The various methods disclosed herein streamline manipulating, organizing, configuring and/or resizing application windows.

Below, FIGS. 1A-1B, 2, and 3 provide a description of exemplary devices. FIGS. 4A-4B, 5A-5Q, 6A-6AA, and 7A-7M illustrate exemplary user interfaces for manipulating user interfaces. FIGS. 8A-8E are flow diagrams illustrating a method of manipulating windows. The user interfaces in FIGS. 5A-5Q are used to illustrate the method in FIGS. 8A-8E. FIGS. 9A-9F are flow diagrams illustrating a method of interacting with a virtual desktop configuration region. The user interfaces in FIGS. 6A-6AA are used to illustrate the method in FIGS. 9A-9F. FIGS. 10A-10F are flow diagrams illustrating a method of tiling and manipulating tiled windows. The user interfaces in FIGS. 7A-7M are used to illustrate the method in FIGS. 10A-10F.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPHONE, and iPAD devices from Apple Inc. of Cupertino, California Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU(s)) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts, for example, on touch-sensitive display 112 of device 100. Device 100 optionally includes one or more tactile output generators 167 for generating tactile output(s), for example, on touch-sensitive display 112 of device 100 or touchpad 355 of device 300. These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down-click" or "up-click" of a physical actuator button. In some cases, a user will feel a tactile sensation such as an "down-click" or "up-click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up-click," a "down-click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, for example, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. CPU(s) 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, which are sometimes also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN), a metropolitan area network (MAN), and/or a wide area network (WAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), space division multiple access (SDMA), Bluetooth or Bluetooth low energy, Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., jack 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display 112 and other input or control devices 116, to peripherals interface 118. I/O subsystem 106 optionally includes display controller 156, optical sensor(s) controller 158, intensity sensor(s) controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, one or more other input controllers 160 are, optionally, coupled to any (or none) of the following: a keyboard, infrared port, USB port, and a pointer device such as a mouse. The one or more buttons (e.g., button 208, FIG. 2) optionally include an up/down button for volume control of speaker 111 and/or microphone 113. The one or more buttons optionally include a push button (e.g., button 206, FIG. 2).

Touch-sensitive display 112 provides an input interface and an output interface between device 100 and a user. Display controller 156 receives and/or sends electrical signals from/to touch-sensitive display 112. Touch-sensitive display 112 displays visual output to the user. The visual output optionally includes graphics, text, icons, video, and any combination thereof (collectively termed "graphics"). In some embodiments, some or all of the visual output corresponds to user interface objects or elements.

Touch-sensitive display 112 has a sensor or set of sensors that accept input from the user based on detected user contacts. Touch-sensitive display 112 and display controller 156 (along with any associated modules and/or sets of instructions in memory 102) detect contact (and any movement or breaking of the contact) on touch-sensitive display 112 and convert the detected contact into interaction with user interface objects (e.g., one or more soft keys, icons, web pages or images) that are displayed on touch-sensitive display 112. In an exemplary embodiment, a point of contact between touch-sensitive display 112 and the user corresponds to a finger of the user.

Touch-sensitive display 112 optionally uses LCD (liquid crystal display) technology, LPD (light emitting polymer display) technology, or LED (light emitting diode) technology, although other display technologies are used in other embodiments. Touch-sensitive display 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display 112. In an exemplary embodiment, projected mutual capacitance sensing technology is used, such as that found in the iPHONE and iPAD from Apple Inc. of Cupertino, California.

Touch-sensitive display 112 optionally has a video resolution in excess of 200 pixels-per-inch (PPI). In some embodiments, the touch screen has a video resolution of approximately 300 PPI. The user optionally makes contact with touch-sensitive display 112 using any suitable object or digit, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch-sensitive display 112, device 100 optionally includes a touchpad (not shown) for activating or deactivating particular functions. In some embodiments, the touchpad is a touch-sensitive area of the device that, unlike touch-sensitive display 112, does not display visual output. The touchpad is, optionally, a touch-sensitive surface that is separate from touch-sensitive display 112 or an extension of the touch-sensitive surface formed by touch-sensitive display 112.

Device 100 also includes power system 162 for powering the various components. Power system 162 optionally includes a power management system, one or more power sources (e.g., a battery), a recharging system, a power failure detection circuit, a power converter or inverter, a power status indicator (e.g., a light-emitting diode (LED)), and any other components associated with the generation, management and distribution of power in portable devices.

Device 100 optionally also includes one or more optical sensors 164, which, in some embodiments, are coupled to optical sensor(s) controller 158 in I/O subsystem 106. One or more optical sensors 164 optionally include charge-coupled device (CCD) or complementary metal-oxide semiconductor (CMOS) phototransistors. One or more optical sensors 164 receive light from the environment, projected through one or more lens, and converts the light to data representing an image. In conjunction with imaging module 143 (also called a camera module), one or more optical sensors sensor 164 optionally capture still images or video. In some embodiments, an optical sensor is located on the back of device 100, opposite touch-sensitive display 112 on the front of device 100, so that the touch screen display is enabled for use as a viewfinder for still and/or video image acquisition. In some embodiments, another optical sensor is located on the front of device 100 so that the user's image is, optionally, obtained for videoconferencing while the user views the other video conference participants on touch-sensitive display 112.

Device 100 optionally also includes one or more contact intensity sensors 165, which, in some embodiments, are coupled to intensity sensor(s) controller 159 in I/O subsystem 106. One or more contact intensity sensors 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). One or more contact intensity sensors 165 receive contact intensity information (e.g., pressure information or a proxy for pressure information) from the environment. In some embodiments, at least one of the one or more contact intensity sensors 165 is collocated with, or proximate to, a touch-sensitive surface (e.g., touch-sensitive display 112 or a touchpad). In some embodiments, at least one contact intensity sensor is located on the back of device 100, opposite touch-sensitive display 112 which is located on the front of device 100.

Device 100 optionally also includes one or more proximity sensors 166, which, in some embodiments, are coupled to peripherals interface 118. Alternately, one or more proximity sensors 166 are coupled to one or more other input controllers 160 in I/O subsystem 106. In some embodiments, one or more proximity sensors 166 turn off and disable touch-sensitive display 112 when the multifunction device is placed near the user's ear (e.g., when the user is making a phone call).

Device 100 optionally also includes one or more tactile output generators 167, which, in some embodiments, are coupled to haptic feedback controller 161 in I/O subsystem 106. One or more tactile output generators 167 optionally include one or more electroacoustic devices, such as speakers or other audio components, and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). One or more contact tactile output generators 167 receive tactile feedback generation instructions from haptic feedback module 133 and generate tactile outputs on device 100 that are capable of being sensed by a user of device 100. In some embodiments, at least one of the one or more tactile output generators 167 is collocated with, or proximate to, a touch-sensitive surface (e.g., touch-sensitive display 112 or a touchpad) and, optionally, generates a tactile output by moving the touch-sensitive surface vertically (e.g., in/out of a surface of device 100) or laterally (e.g., back and forth in the same plane as a surface of device 100). In some embodiments, at least one of the one or more tactile output generators 167 is located on the back of device 100, opposite touch-sensitive display 112 which is located on the front of device 100.

Device 100 optionally also includes one or more accelerometers 168, which, in some embodiments, are coupled to peripherals interface 118. Alternately, one or more accelerometers 168 are, optionally, coupled to one or more other input controllers 160 in I/O subsystem 106. In some embodiments, information is displayed on touch-sensitive display 112 in a portrait view or a landscape view based on an analysis of data received from the one or more accelerometers. Device 100 optionally includes, in addition to accelerometer(s) 168, a magnetometer (not shown) and a Global Positioning System (GPS) (or GLONASS or other global navigation system) receiver (not shown) for obtaining information concerning the location and orientation (e.g., portrait or landscape) of device 100.

Figure 3:
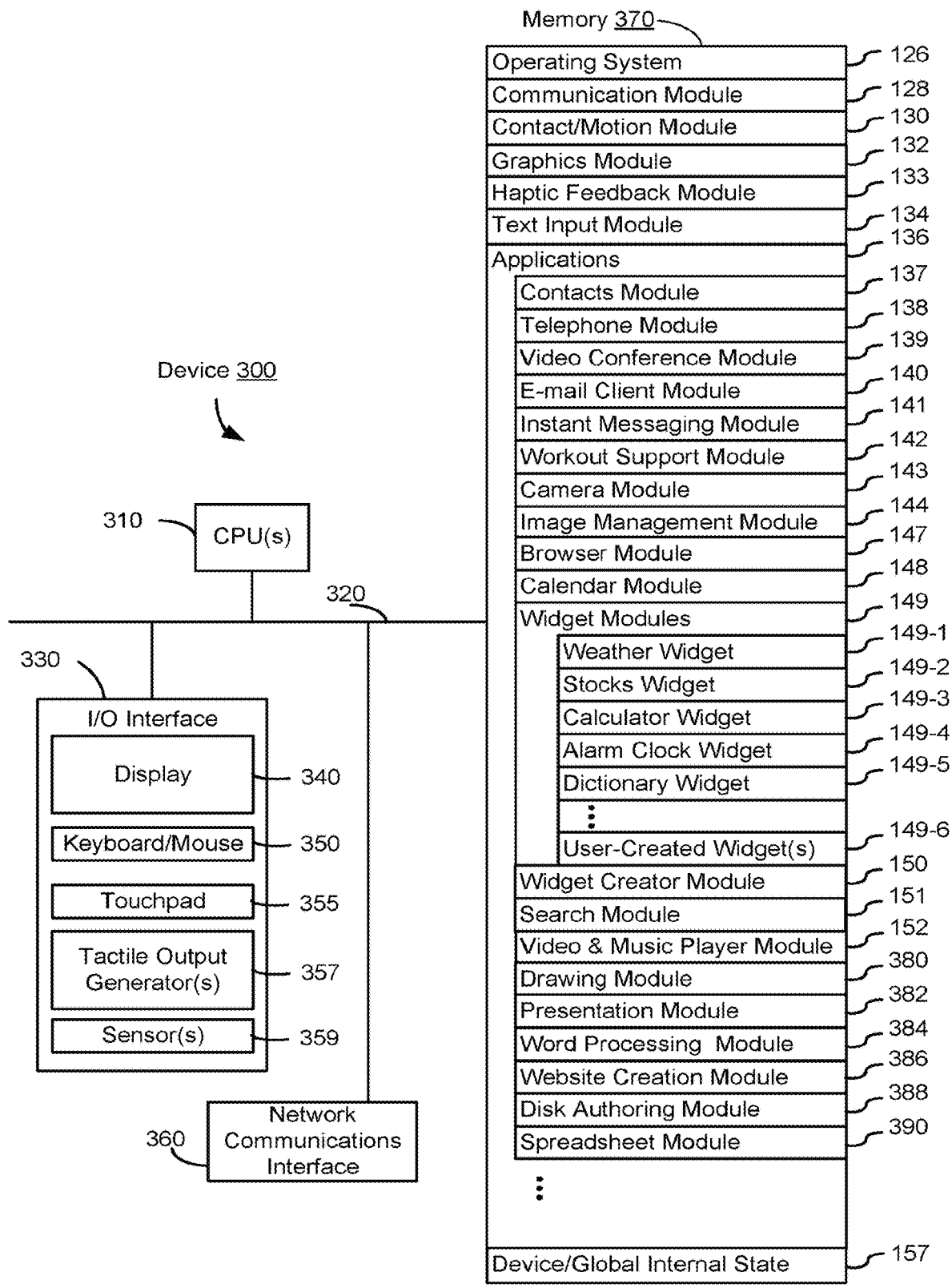
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, GPS module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display 112; sensor state, including information obtained from the device's various sensors and other input or control devices 116; and location information concerning the device's location and/or attitude.

Operating system 126 (e.g., LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, LIGHTNING, etc.) is adapted for coupling directly to other devices or indirectly over a network (e.g., the Internet, wireless LAN, etc.).

Contact/motion module 130 optionally detects contact with touch-sensitive surface(s) of device 100 such as touch-sensitive display 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface(s) (e.g., detecting one or more finger-dragging events), and determining if the contact has ceased (e.g., detecting a finger-up event or a break in contact).

Contact/motion module 130 receives contact data from the touch-sensitive surface(s) (e.g., touch-sensitive display 112 and/or a touchpad). Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch" or multiple finger contacts).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a touchpad or touch screen can be set to any of a large range of predefined thresholds values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface(s) (e.g., touch-sensitive display 112 or a touchpad) have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch-sensitive display 112 or other display(s), including components for changing the visual impact (e.g., brightness, transparency, saturation, contrast or other visual property) of graphics that are displayed. As used herein, the term "graphics" includes any object that can be displayed to a user, including without limitation text, web pages, icons (such as user interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by one or more tactile output generators 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list) for managing an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth;

telephone module 138 for entering a sequence of characters corresponding to a telephone number, accessing one or more telephone numbers in address book 137, modifying a telephone number that has been entered, dial a respective telephone number, conducting a conversation, and/or disconnecting or hanging up when the conversation is completed using any of a plurality of communications standards, protocols and technologies;

video conferencing module 139 for initiating, conducting, and/or terminating a video conference between a user and one or more other participants in accordance with user instructions;

e-mail client module 140 for creating, sending, receiving, and/or managing e-mail in response to user instructions, which in some circumstances include still or video images taken with camera module 143;

instant messaging (IM) module 141 for entering a sequence of characters corresponding to an instant message, modifying previously entered characters, transmitting a respective instant message (e.g., using a Short Message Service (SMS) or Multimedia Message Service (MMS) protocol for telephony-based instant messages or using XMPP, SIMPLE, or IMPS for Internet-based instant messages), receiving instant messages, and/or viewing received instant messages;

workout support module 142 for creating workouts (e.g., with time, distance, and/or calorie burning goals), communicating with workout sensors (sports devices), receive workout sensor data, calibrating sensors used to monitor a workout, selecting and playing music for a workout, and/or displaying, storing, and transmitting workout data;

camera module 143 for capturing still images or video (including a video stream) and storing them into memory 102, modifying characteristics of a still image or video, and/or deleting a still image or video from memory;

image management module 144 for arranging, modifying (e.g., editing), or otherwise manipulating, labeling, deleting, presenting (e.g., in a digital slide show or album), and/or storing still and/or video images;

browser module 147 for browsing the Internet in accordance with user instructions, including searching, linking to, receiving, and displaying web pages or portions thereof, as well as attachments and other files linked to web pages;

calendar module 148 for creating, displaying, modifying, and storing calendars and data associated with calendars (e.g., calendar entries, to do lists, etc.) in accordance with user instructions;

widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151 for searching for text, music, sound, image, video, and/or other files in memory 102 that match one or more search criteria (e.g., one or more user-specified search terms) in accordance with user instructions;

video and music player module 152 for downloading and playing back recorded music and other sound files stored in one or more file formats, such as MP3 or AAC files, and for displaying, presenting, or otherwise playing back videos on touch-sensitive display 112 or on an external, connected display via external port 124);

notes module 153 for creating and managing notes, to do lists, and the like in accordance with user instructions;

map module 154 for receiving, displaying, modifying, and storing maps and data associated with maps (e.g., driving directions; data on stores and other points of interest at or near a particular location; and other location-based data) in accordance with user instructions; and/or online video module 155 for enabling the user of device 100 to access, browse, receive (e.g., by streaming and/or download), play back (e.g., on sensitive display 112 or on an external, connected display via external port 124), send an e-mail with a link to a particular online video, and otherwise manage online videos in one or more file formats, such as H.264.

Examples of other applications 136 that are, optionally, stored in memory 102 include other word processing applications, other image editing applications, drawing applications, presentation applications, JAVA-enabled applications, encryption, digital rights management, voice recognition, and voice replication.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the "menu button" is a physical push button or other physical input control device instead of a touchpad.

Figure 1B:
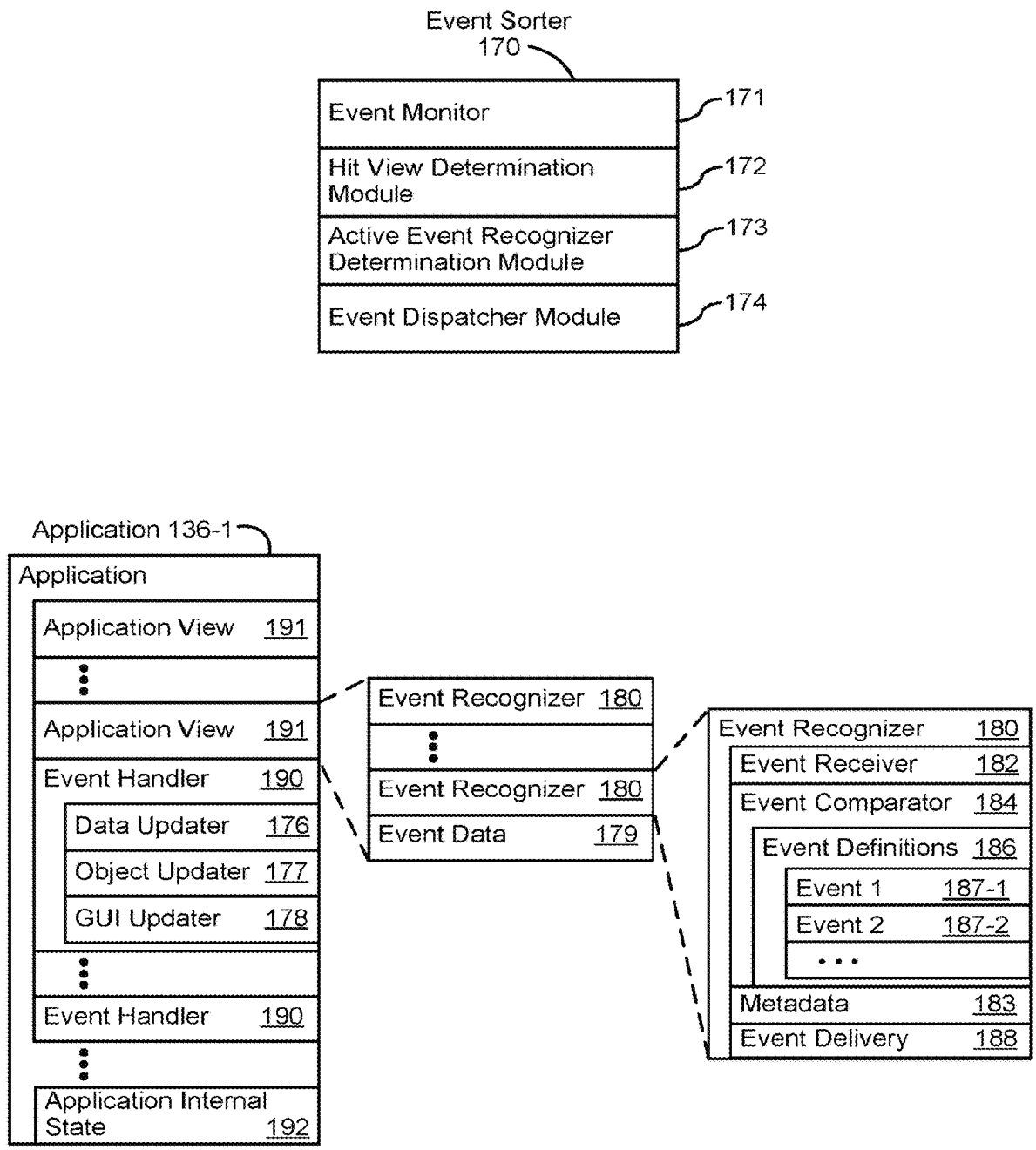
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136 or 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or sensor(s) such as one or more proximity sensors 166, one or more accelerometers 168, and/or microphone 113 (through audio circuitry 110). Information that peripherals interface 118 receives from I/O subsystem 106 includes information from touch-sensitive display 112 or another touch-sensitive surface such as a touchpad.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user interface object. In some embodiments, event comparator 184 performs a hit test to determine which user interface object is associated with a sub-event. For example, in an application view in which three user interface objects are displayed on touch-sensitive display 112, when a touch is detected on touch-sensitive display 112, event comparator 184 performs a hit test to determine which of the three user interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user interface object or updates the position of a user interface object. GUI updater 178 updates the GUI. For example, GUI updater 178 prepares display information and sends it to graphics module 132 for display on a touch-sensitive display 112.

In some embodiments, event handler(s) 190 include or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive surfaces also applies to other forms of user inputs to operate portable multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touchpads; pen stylus inputs; movement of the device; oral instructions; detected eye movements; biometric inputs; and/or any combination thereof are optionally utilized as inputs corresponding to sub-events which define an event to be recognized.

Figure 2:
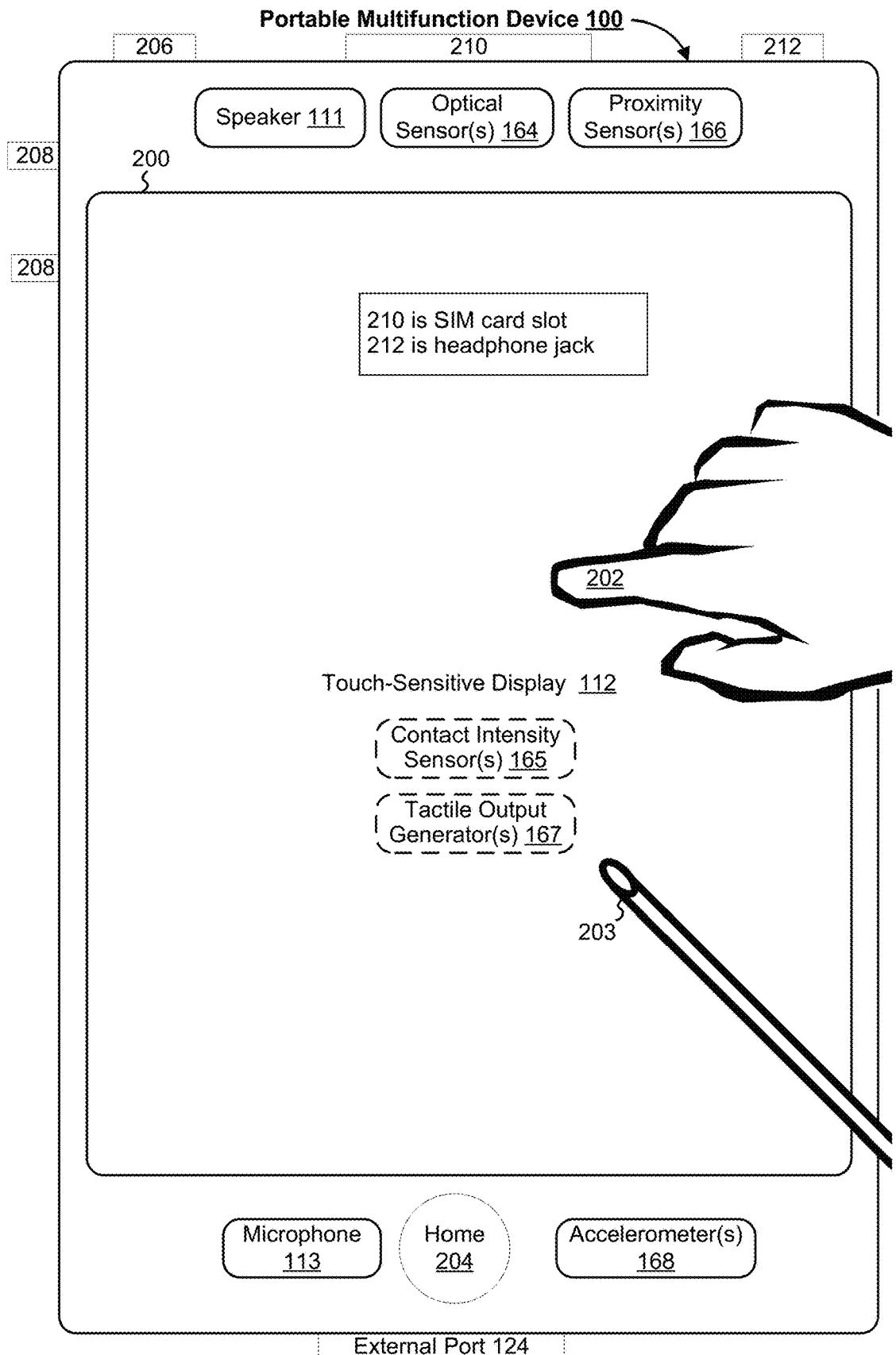
FIG. 2 illustrates a portable multifunction device having a touch screen in accordance with some embodiments.

FIG. 2 illustrates a portable multifunction device 100 having a touch-sensitive display 112 (sometimes also herein called a "touch screen") in accordance with some embodiments. Touch-sensitive display 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application in a set of applications 136 (FIG. 1) that are, optionally, executed on device 100. Alternatively, in some embodiments, the menu button is implemented as a soft key in a GUI displayed on touch-sensitive display 112.

In one embodiment, device 100 includes touch-sensitive display 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch-sensitive display 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a wearable device, a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU(s)) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen. I/O interface 330 also optionally includes a keyboard and/or mouse (or other pointing device) 350 and touchpad 355, tactile output generator 357 for generating tactile outputs on device 300 (e.g., similar to one or more tactile output generators 167 described above with reference to FIG. 1A), and sensors 359 (e.g., optical, acceleration, proximity, touch-sensitive, and/or contact intensity sensor(s) similar to the ones described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while, in some embodiments, memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
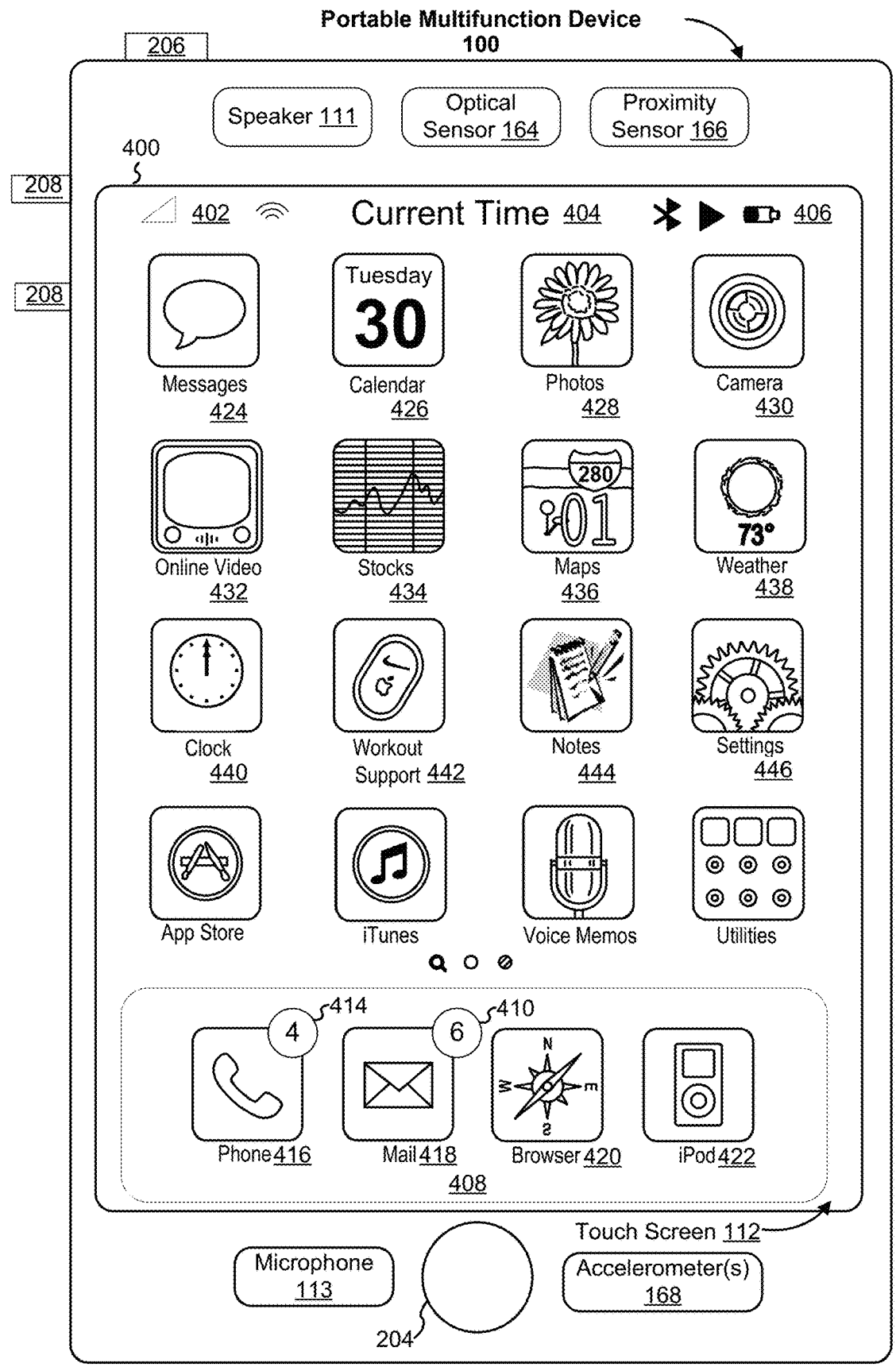
FIG. 4A illustrates an exemplary user interface for a menu of applications on a portable multifunction device in accordance with some embodiments.
Figure 5A:
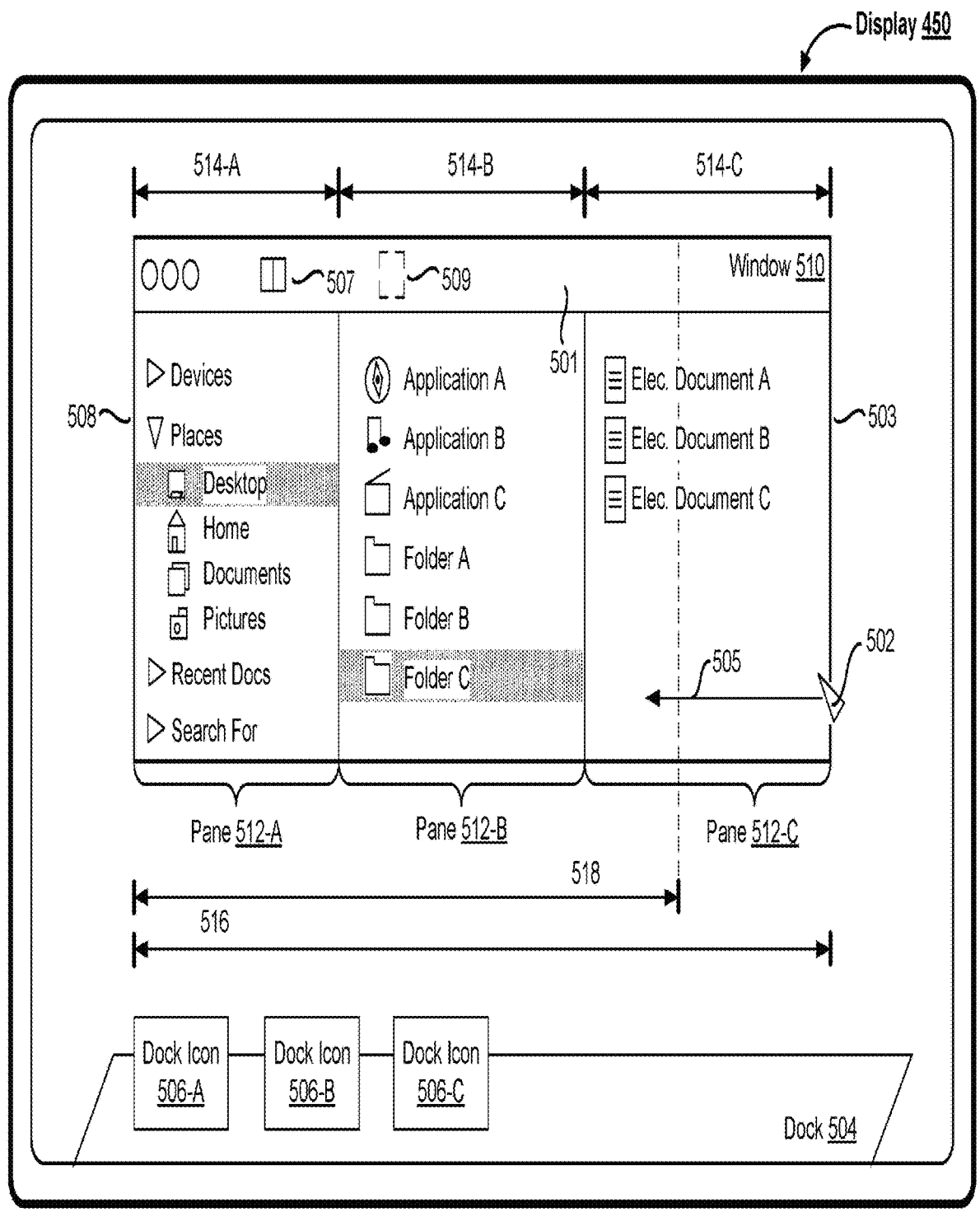
FIGS. 5A-5Q illustrate exemplary user interfaces for manipulating windows in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:
  Signal strength indicator(s) 402 for wireless communication(s), such as cellular and Wi-Fi signals;
  Time 404;
  Bluetooth indicator 405;
  Battery status indicator 406;
  Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser"; and
    Icon 422 for video and music player module 152, also referred to as iPOD module 152, labeled "iPod"; and
  Icons for other applications, such as:
    Icon 424 for IM module 141, labeled "Text";
    Icon 426 for calendar module 148, labeled "Calendar";
    Icon 428 for image management module 144, labeled "Photos";
    Icon 430 for camera module 143, labeled "Camera";
    Icon 432 for online video module 155, labeled "Online Video";
    Icon 434 for stocks widget 149-2, labeled "Stocks";
    Icon 436 for map module 154, labeled "Map";
    Icon 438 for weather widget 149-1, labeled "Weather";
    Icon 440 for alarm clock widget 149-4, labeled "Clock";
    Icon 442 for workout support module 142, labeled "Workout Support";
    Icon 444 for notes module 153, labeled "Notes"; and
    Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
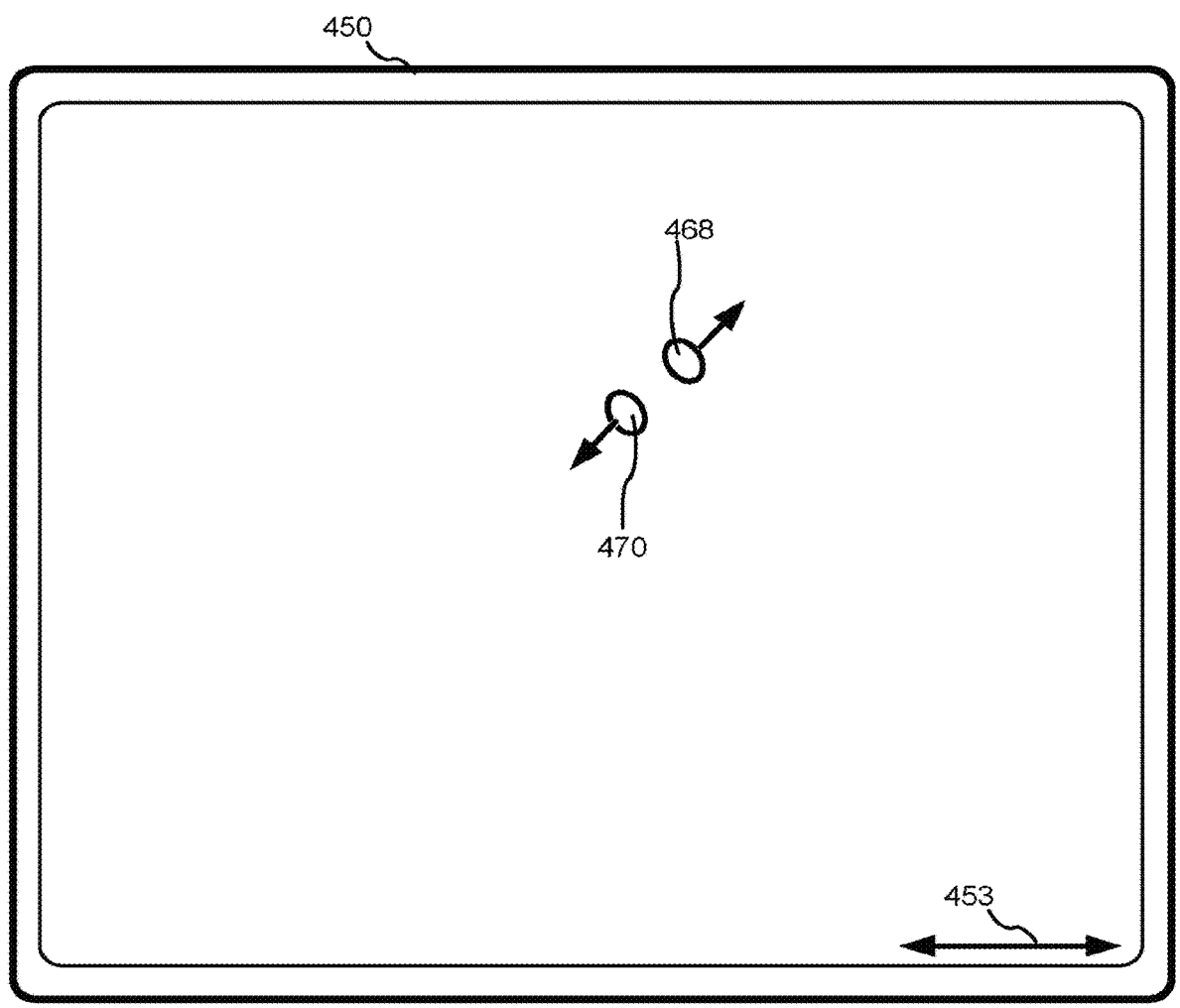
FIG. 4B illustrates an exemplary user interface for a multifunction device with a touch-sensitive surface that is separate from the display in accordance with some embodiments.
Figure 4B:
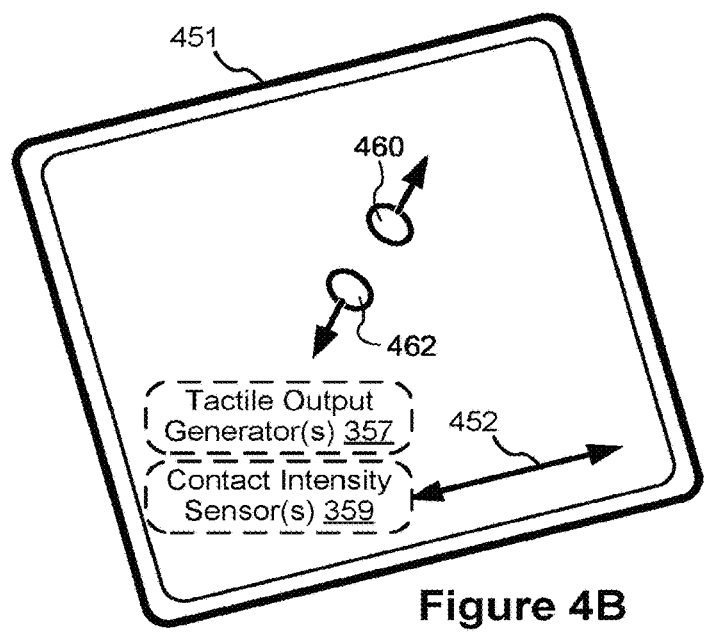

FIG. 4B illustrates an exemplary user interface on a device (e.g., device 300, FIG. 3) with a touch-sensitive surface 451 (e.g., a touchpad) that is separate from the display 450. Device 300 also, optionally, includes one or more tactile output generators 357 for generating tactile output(s) and/or one or more contact intensity sensors (e.g., one or more of sensors 359, FIG. 3) for detecting intensity of contacts on touch-sensitive surface 451.

Some of the examples which follow will be given with reference to inputs on an input device, such as a mouse or a touch-sensitive surface (e.g., a touch pad), that is separate from the display 450 (e.g., as shown in FIG. 4B). Alternatively, in some embodiments, the device detects inputs on a touch-sensitive display 112 (sometimes also herein called a "touch screen"), where the touch-sensitive surface and the display are combined. In some embodiments the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to inputs from an input device (e.g., mouse, touchpad, or stylus-based inputs with a focus selector such as a cursor), it should be understood that, in some embodiments, the inputs are replaced with finger inputs (e.g., finger contacts, finger tap gestures, finger swipe gestures, and the like). For example, a mouse click is, optionally, replaced with a swipe gesture (e.g., instead of a contact) followed by movement of the contact the contact along the path of the cursor (e.g., instead of movement of the cursor). As another example, a mouse click is, optionally, replaced with a tap gesture where detection of the contact over the location is followed by ceasing to detect the contact (e.g., instead of detection of up-click or down-click while the cursor is located over the location).

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen (e.g., touch-sensitive display 112 in FIGS. 1A and 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input.

In some implementations, focus is moved from one region of a user interface to another region of the user interface without corresponding movement of a cursor or movement of a contact on a touch-screen display (e.g., by using a tab key or arrow keys to move focus from one button to another button). In these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device (e.g., such as device 300 in FIG. 3 or portable multifunction device 100 in FIGS. 1A and 2) with one or more processors, non-transitory memory, a display, and at least one input device such as a mouse, stylus, motion sensing input device, speech command processing device, touchpad, or the like.

FIGS. 5A-5Q illustrate exemplary user interfaces for manipulating windows in accordance with some embodiments. The user interfaces in these figures are used to illustrate the processes described below, including the method in FIGS. 8A-8E.

As shown in FIG. 5A-5Q, a device (e.g., device 300, FIG. 3) displays a user interface with a plurality of user-interface elements and a focus selector 502 on display 450. In some embodiments, focus selector 502 (sometimes also referred to as a "cursor") is controlled by an input device that is separate from display 450 such as a mouse, stylus, motion sensing input device, speech command processing device, touchpad, or the like. In some embodiments, the user interface includes a dock 504 with a plurality of dock icons 506-A, 506-B, and 506-C.

Figure 5B:
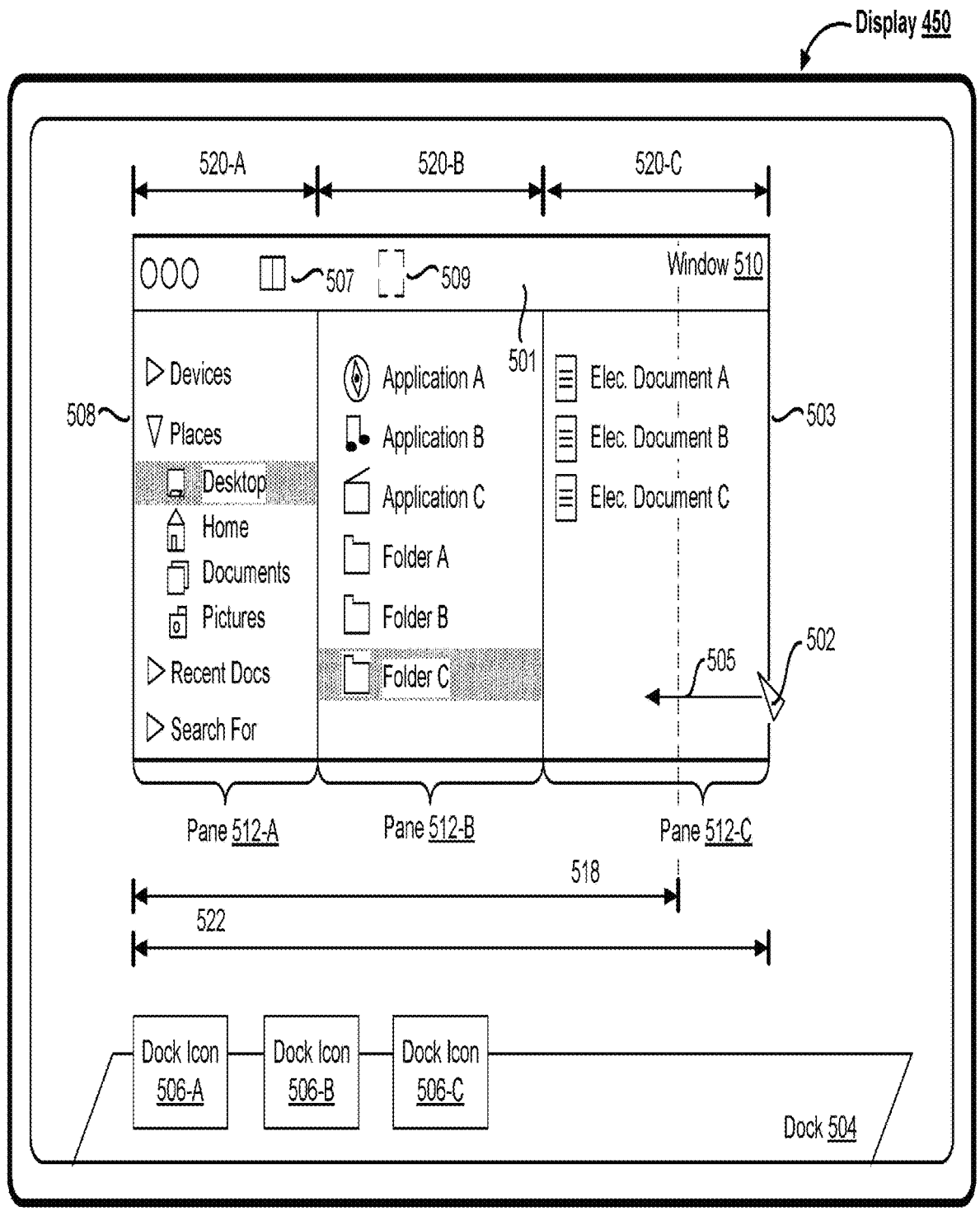

In FIGS. 5A-5B, the user interface includes a first representation of window 510 with a first edge 508 and a second edge 503. For example, window 510 is associated with a file management application. In accordance with some embodiments, the first representation of window 510 includes a first pane 512-A, a second pane 512-B, and a third pane 512-C. In other embodiments, the first representation of window 510 includes first pane 512-A and second pane 512-B. As shown in FIG. 5A, each of the panes 512 within window 510 includes a plurality of user interface elements (e.g., folders, files, or directories). As shown in FIG. 5A, first pane 512-A includes a plurality of directory locations (e.g., Desktop, Home, Documents, Pictures, etc.). For example, the "Desktop" directory location is currently selected within first pane 512-B. As shown in FIG. 5A, second pane 512-B includes a plurality of applications and folders associated with the currently selected "Desktop" directory location. For example, "Folder C" is currently selected within second pane 512-C. Furthermore, as shown in FIG. 5A, third pane 512-C includes a plurality of electronic documents associated with "Folder C."

Figure 5C:
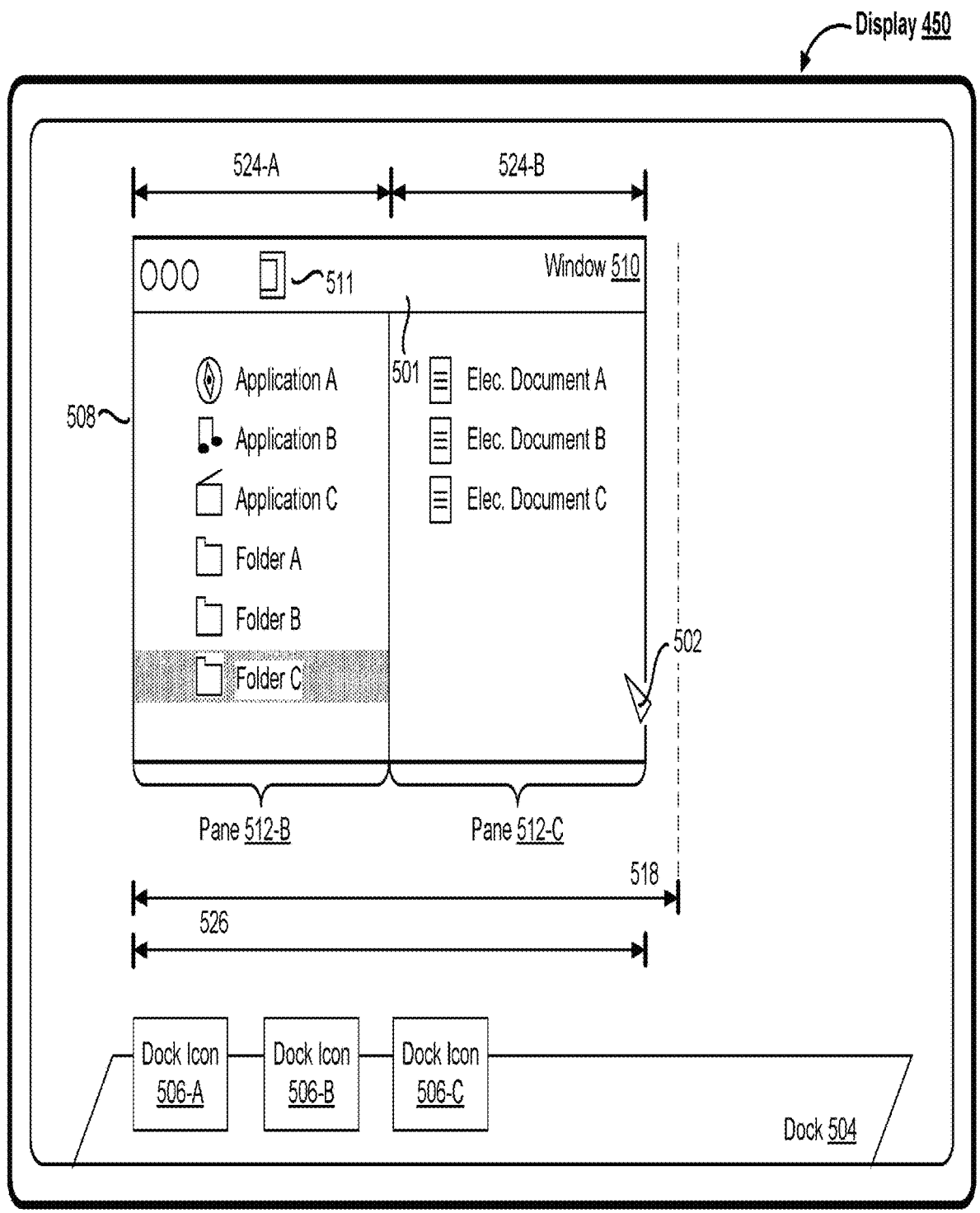

FIGS. 5A-5C illustrate a sequence in which the first representation of a window is changed to a second representation in response to a reduction of the width of the first representation below a first threshold (e.g., first threshold width 518 in FIGS. 5A-5C). In some embodiments, window 510 includes a chrome area 501 by which window 510 may be dragged. In some embodiments, chrome area 501 includes a set of controls, toggles, and/or affordances As shown in FIGS. 5A-5B, chrome area 501 of window 510 includes a first pane display toggle affordance 507, which, when activated (e.g., with a single or double click), causes first pane 512-A to be removed if it is currently displayed or causes first pane 512-A to be displayed if it is not currently displayed. For example, first pane display toggle affordance 507 is activated in FIGS. 5I-5J. As shown in FIGS. 5A-5B, chrome area 501 of window 510 also includes sizing toggle affordance 509, which, when activated (e.g., with a single or double click), causes first pane 512-A and second pane 512-B (and optionally third pane 512-C) to be resized according to predefined proportions. For example, sizing toggle affordance 509 is activated in FIGS. 5P-5Q.

FIGS. 5A-5C also illustrate a dragging gesture with focus selector 502, whereby second edge 503 of window 510 is dragged toward first edge 508 according to movement vector 505. As a result of the dragging gesture, window 510 is decreased from total width 516 in FIG. 5A to total width 526 in FIG. 5C. As shown in FIG. 5A, window 510 corresponds to total width 516, and first pane 512-A, second pane 512-B, and third pane 512-C correspond to widths 514-A, 514-B, and 514-C, respectively. As shown in FIG. 5B, window 510 corresponds to total width 522, which is less than total width 516 in FIG. 5A but greater than first threshold width 518. Also, in accordance with some embodiments, the widths of first pane 512-A, second pane 512-B, and third pane 512-C are proportionally decreased to widths 520-A, 520-B, and 520-C, respectively, in FIG. 5B.

As shown in FIG. 5C, window 510 corresponds to total width 526, which is less than total width 522 in FIG. 5B and also less than first threshold width 518. In FIG. 5C, the user interface includes a second representation of window 510 because total width 526 is less than first threshold width 518. In accordance with some embodiments, the second representation of window 510 includes second pane 512-B and third pane 512-C with widths 524-A and 524-B, respectively. In other embodiments, the second representation of window 510 includes second pane 512-B.

As shown in FIG. 5C, chrome area 501 of window 510 includes an overlay toggle affordance 511, which, when activated (e.g., with a single or double click), causes overlay 530 to be displayed if it is not currently displayed. For example, overlay toggle affordance 51 is activated in FIGS. 5J-5K.

Figure 5D:
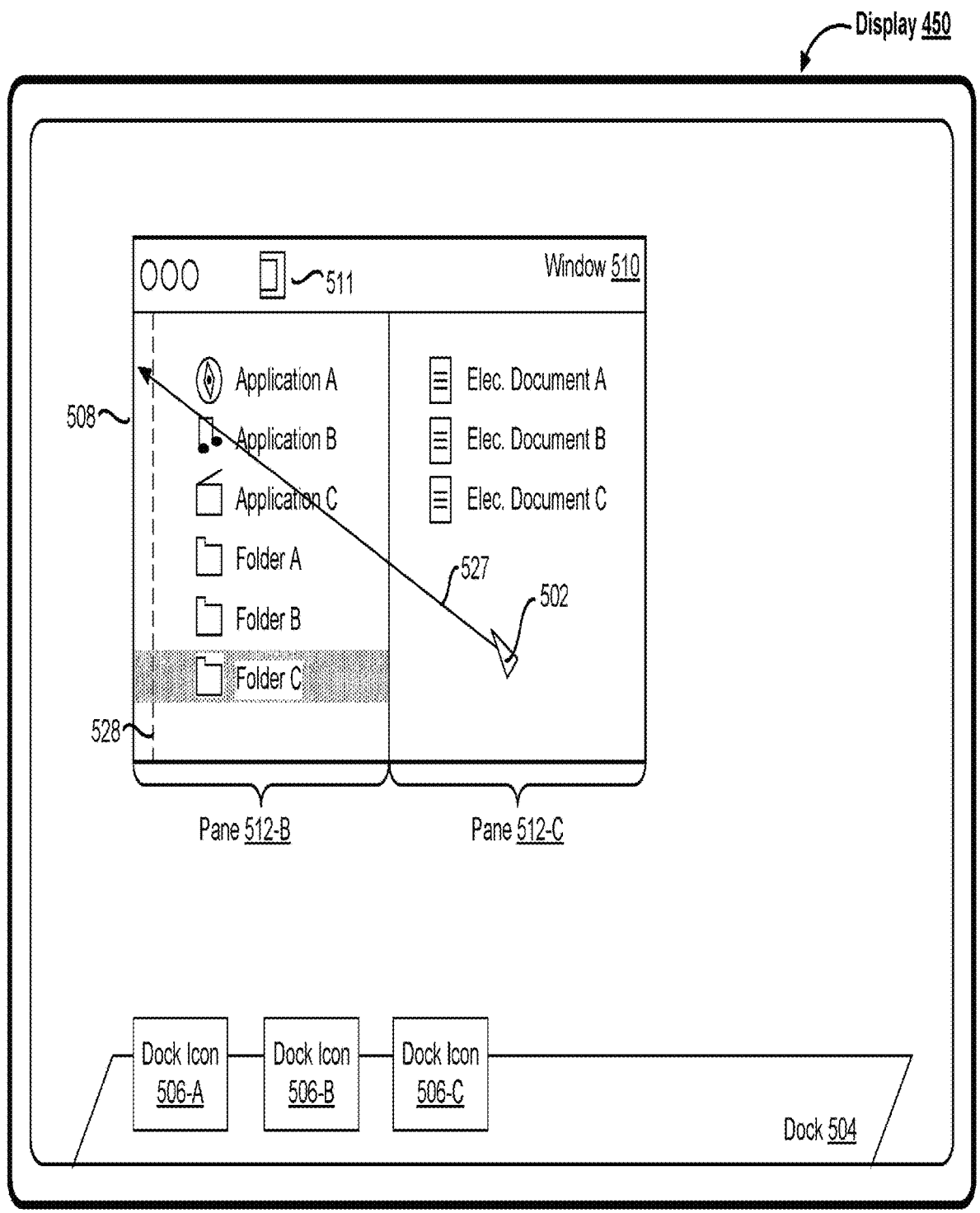
Figure 5E:
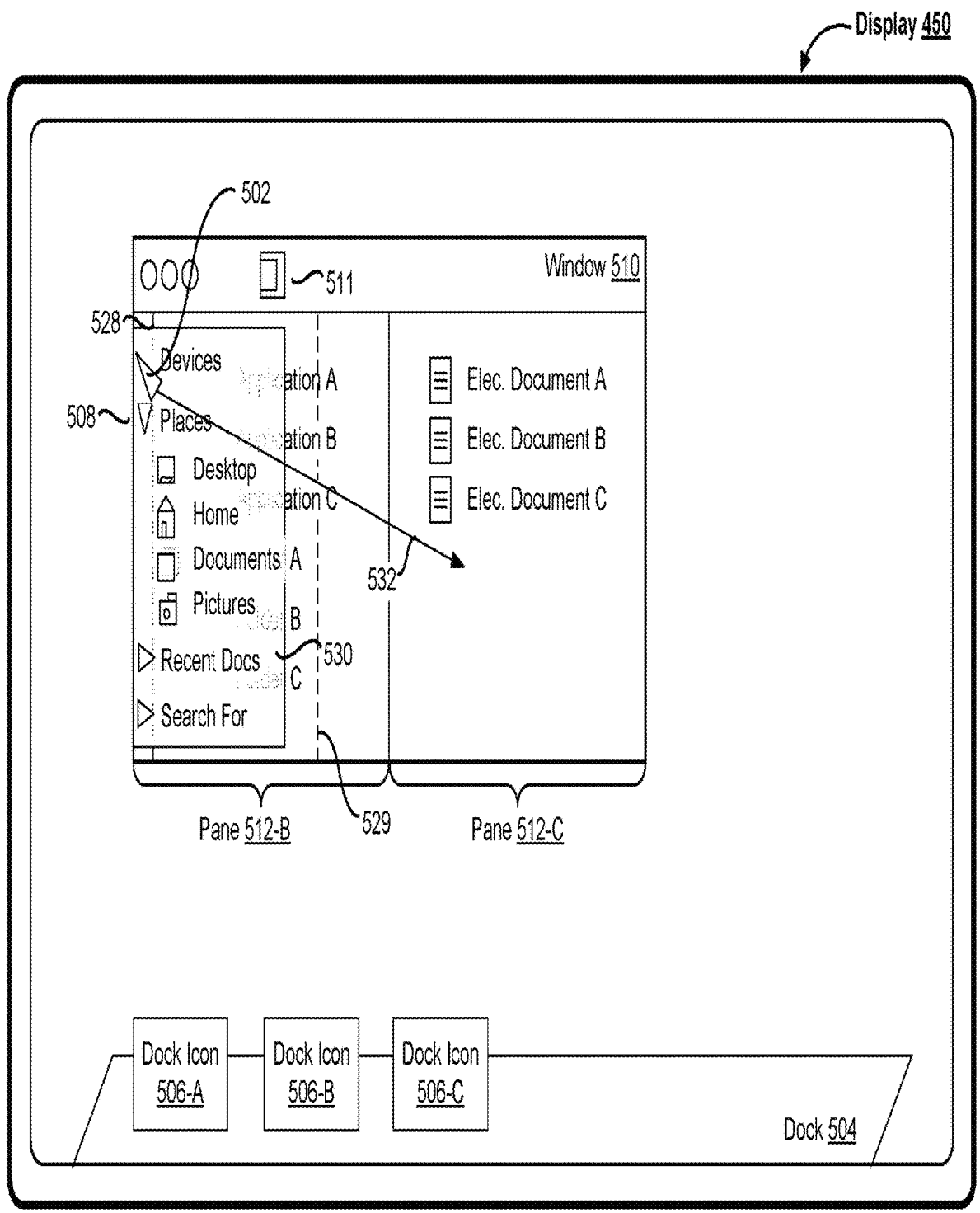
Figure 5F:
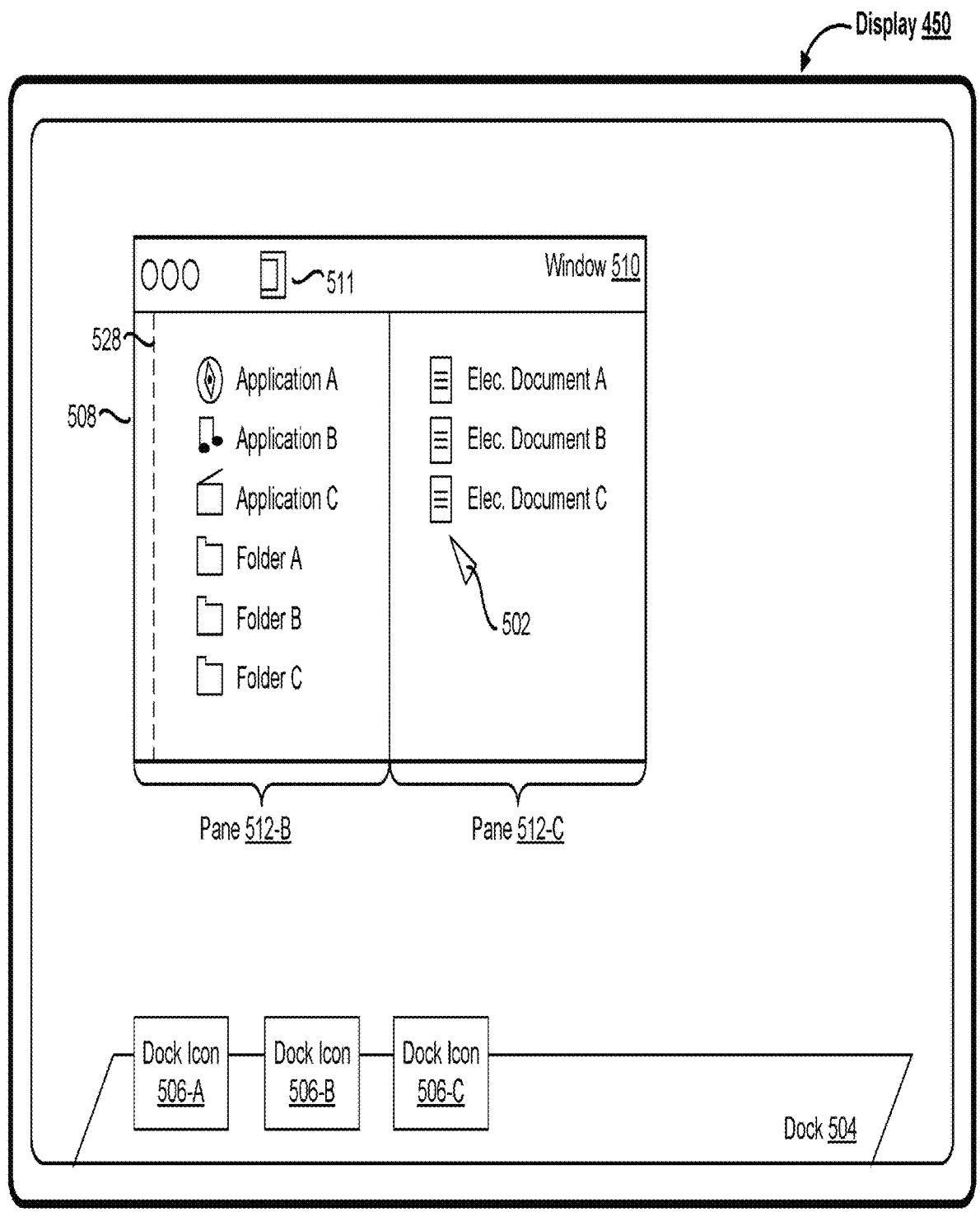

FIGS. 5D-5F illustrate a sequence in which an overlay is displayed adjacent to the first edge of the second representation of the window and subsequently removed. In some embodiments, at least a portion of first pane 512-B is displayed as an overlay adjacent to first edge 508 when focus selector 502 breaches a trigger area bounded by interaction threshold 528 and first edge 508 of window 510. In some embodiments, the overlay is removed or ceases to be displayed when focus selector 502 is moved out of the trigger area bounded by interaction threshold 528 and first edge 508 of window 510.

FIGS. 5D-5E illustrate movement of focus selector 502 from within third pane 512-C towards first edge 508 according to movement vector 527. As shown in FIG. 5E, overlay 530 is displayed adjacent to first edge 508 within the second representation of window 510 in response to focus selector 502 breaching the trigger area. In accordance with some embodiments, overlay 530 corresponds to at least a portion of first pane 512-A shown in FIGS. 5A-5B. In accordance with some embodiments, overlay 530 covers at least a portion of second pane 512-B. In accordance with some embodiments, overlay 530 is at least partially transparent or translucent.

FIGS. 5E-5F illustrate movement of focus selector from within the trigger area to third pane 512-C according to movement vector 532. As shown in FIG. 5F, overlay 530 is removed from the second representation of window 510 in response to focus selector 502 moving out of the trigger area.

Figure 5G:
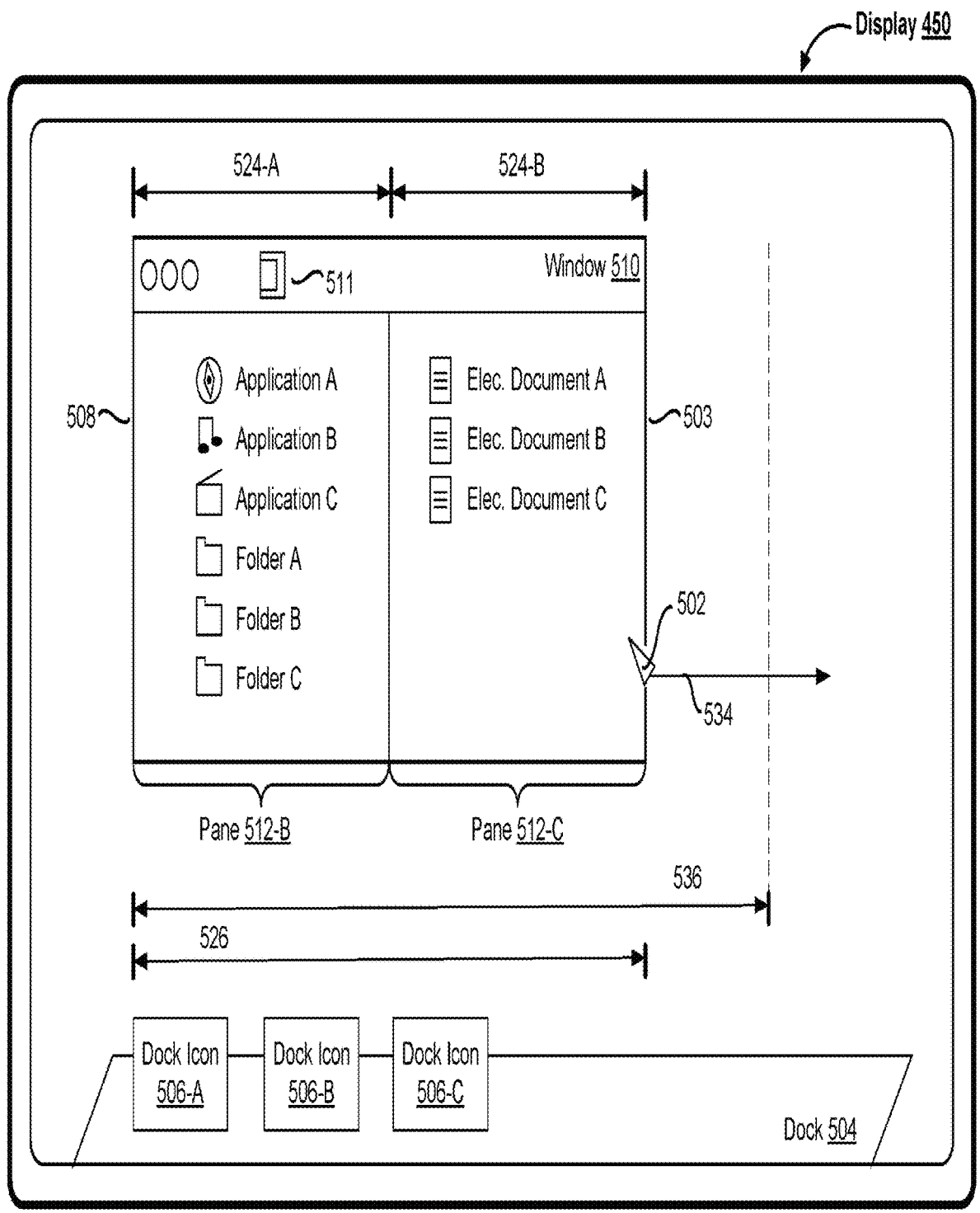
Figure 5H:
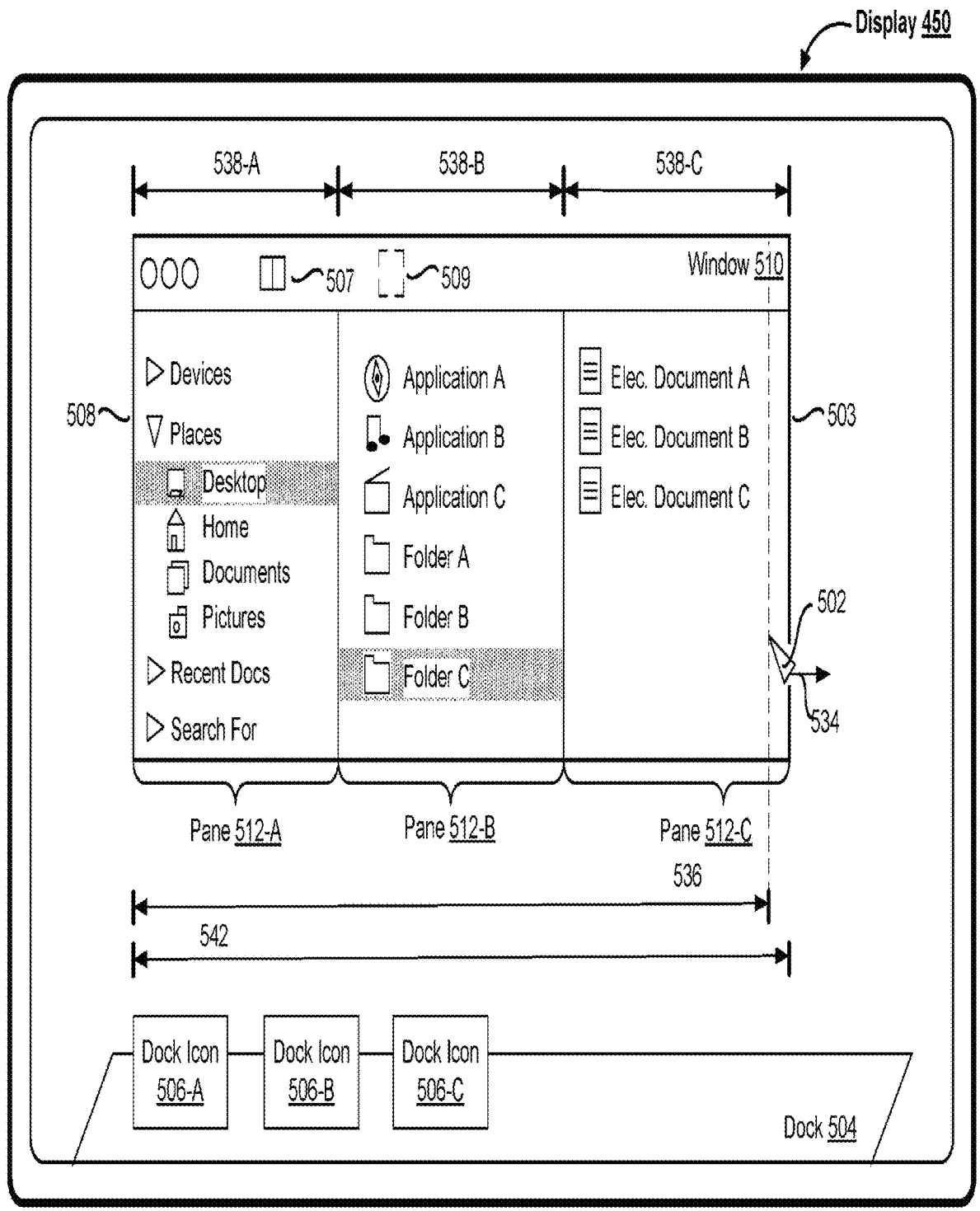
Figure 5I:
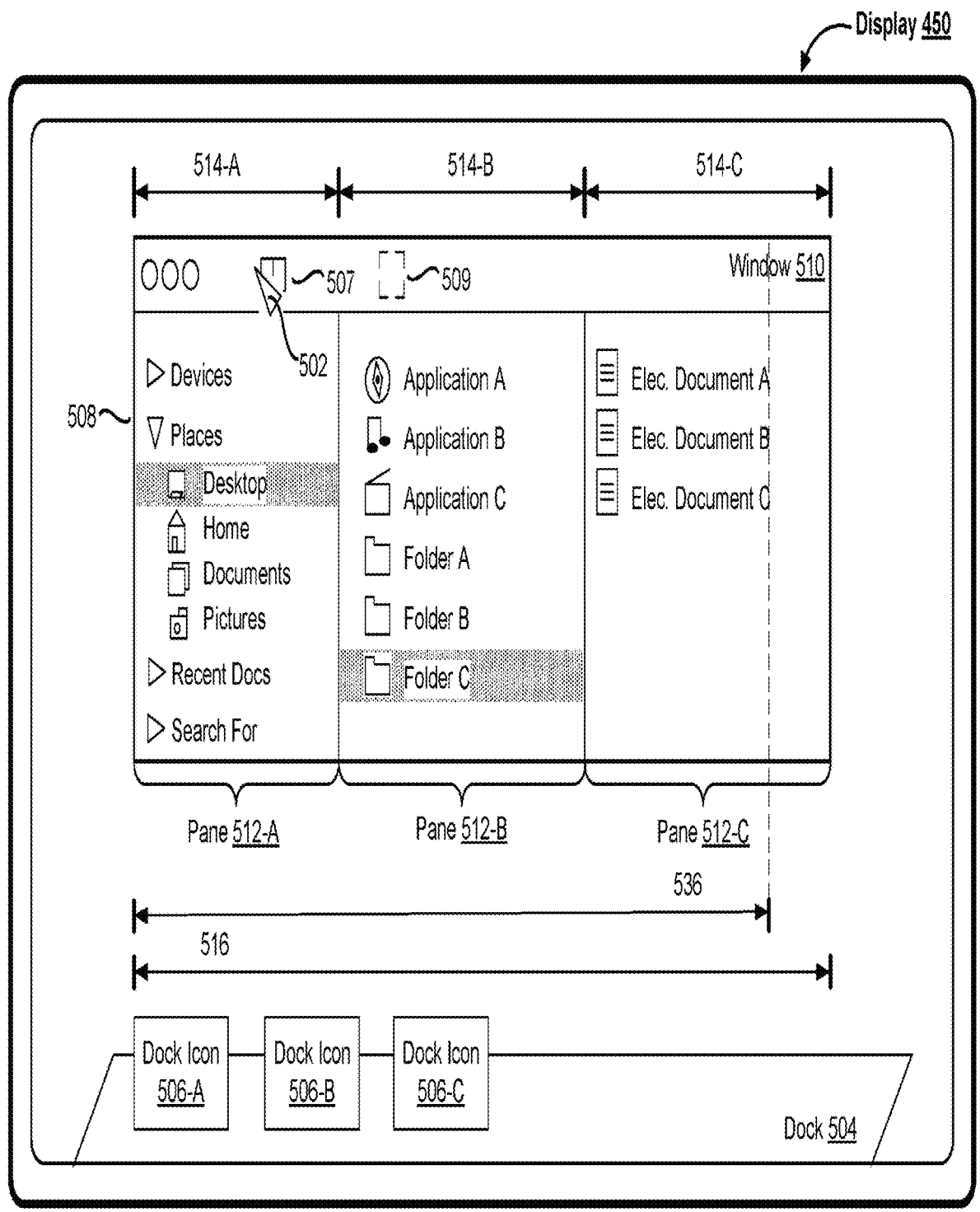

FIGS. 5G-5I illustrate a sequence in which the second representation of the window is changed to a third representation in response to an increase of the width of the second representation above a second threshold (e.g., second threshold width 536 in FIGS. 5G-5H). In some embodiments, the first and third representations of the window have the same dimensions. In some embodiments, the first and third representations of the window have the same panes. In FIG. 5G, the user interface includes a second representation of window 510 with a first edge 508 and a second edge 503.

In accordance with some embodiments, the second representation of window 510 10 includes a second pane 512-B and a third pane 512-C. In other embodiments, the second representation of window 510 includes second pane 512-B.

FIGS. 5G-5I illustrate a dragging gesture with focus selector 502, whereby second edge 503 of window 510 is dragged away from first edge 508 according to movement vector 534. As a result of the dragging gesture, the window 510 is increased from total width 526 in FIG. 5G to total width 516 in FIG. 5I. As shown in FIG. 5G, window 510 corresponds to total width 526, and second pane 512-B and third pane 512-C correspond to widths 524-A and 524-B, respectively. As shown in FIG. 5H, window 510 corresponds to total width 542, which is greater than total width 526 in FIG. 5G and also greater than second threshold width 536. In FIG. 5H, the user interface includes a third representation of window 510 because total width 542 is greater than second threshold width 536. In accordance with some embodiments, the third representation of window 510 includes first pane 512-A, second pane 512-B, and third pane 512-C with widths 538-A, 538-B, and 538-C, respectively. In other embodiments, the third representation of window 510 includes first pane 512-A and second pane 512-B. As shown in FIG. 5I, window 510 corresponds to total width 516, which is greater than total width 542 in FIG. 5H. Also, in accordance with some embodiments, the widths of first pane 512-A, second pane 512-B, and third pane 512-C are proportionally increased to widths 514-A, 514-B, and 514-C, respectively, in FIG. 5I.

Figure 5J:
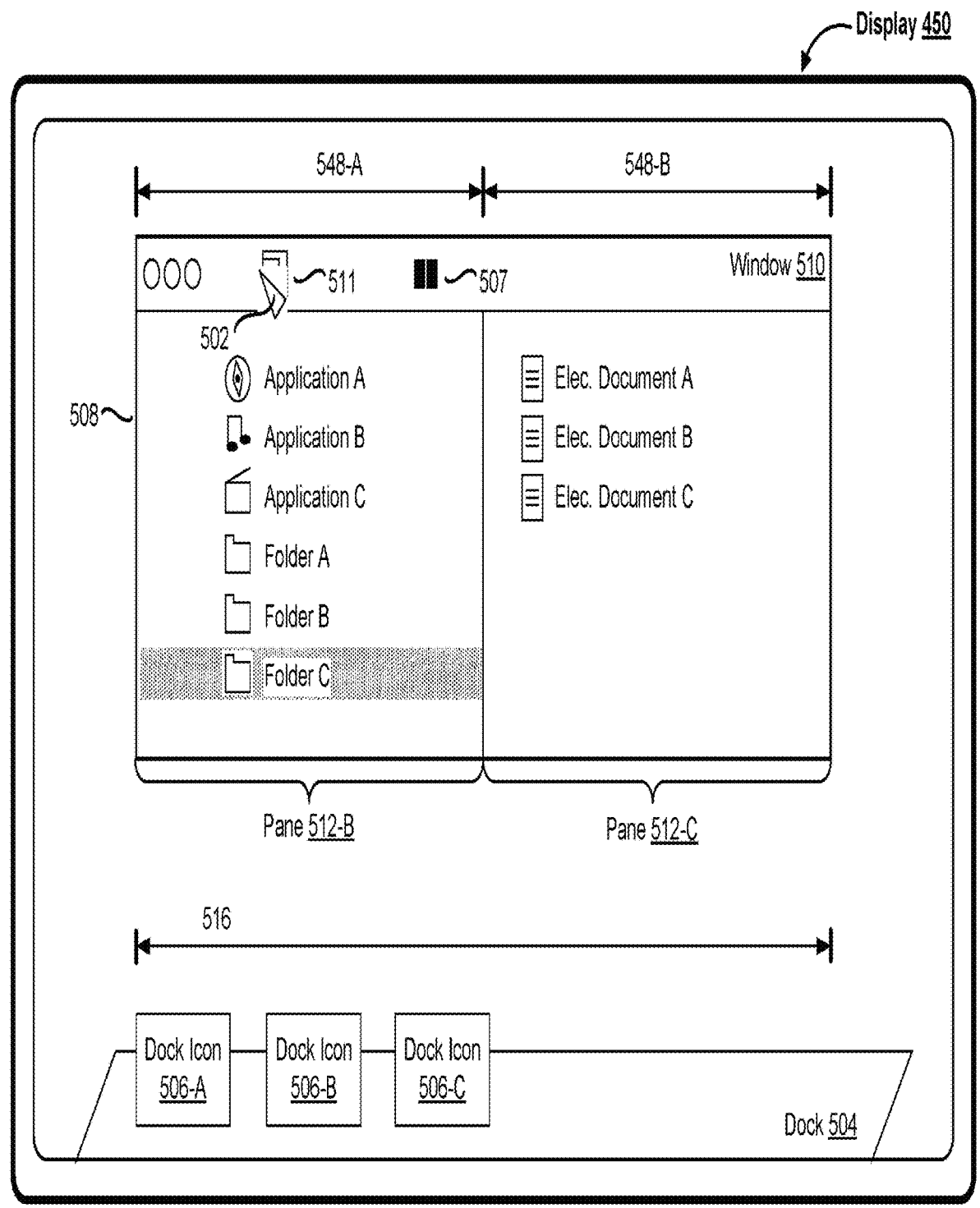

FIGS. 5I-5J illustrate a sequence in which a first pane display toggle affordance within a third representation of the window is activated. FIG. 5I illustrates focus selector 502 at a location corresponding to first pane display toggle affordance 507 within the third representation of window 510. For example, a user of the device (e.g., device 300, FIG. 3) selects first pane display toggle affordance 507 by performing a single or double click while focus selector 502 is located over first pane display toggle affordance 507. In response to detecting activation of first pane display toggle affordance 507 (e.g., with a single or double click), first pane 512-A is removed from window 510 as shown in FIG. 5J.

As shown in FIG. 5J, the user interface includes a second representation of window 510 with a total width 516 in response to activation of first pane display toggle affordance 507 in FIG. 5I. In accordance with some embodiments, the second representation of window 510 includes second pane 512-B and third pane 512-A with widths 548-A and 548-B, respectively. In other embodiments, the second representation of window 510 includes second pane 512-B.

Figure 5K:
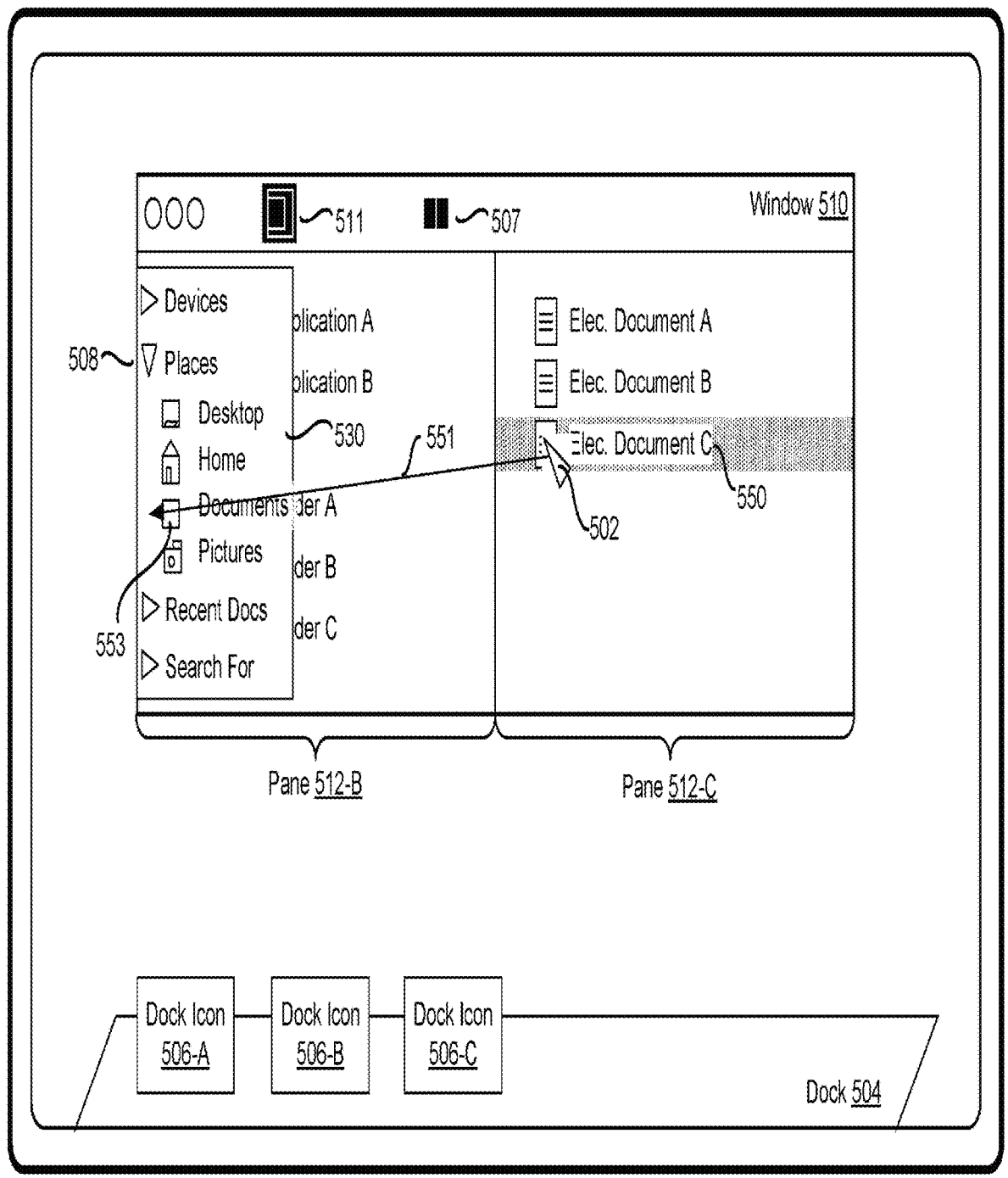

FIGS. 5J-5K illustrate a sequence in which an overlay toggle affordance within a second representation of the window is activated. FIG. 5J illustrates focus selector 502 at a location corresponding to overlay toggle affordance 511 within the second representation of window 510. For example, a user of the device (e.g., device 300, FIG. 3) selects overlay toggle affordance 511 by performing a single or double click while focus selector 502 is located over overlay toggle affordance 511. In response to detecting activation of overlay toggle affordance 511 (e.g., with a single or double click), overlay 530 is displayed adjacent to first edge 508 within the second representation of window 510 as shown in FIG. 5K. As shown in FIG. 5K, overlay 530 corresponds to at least a portion of first pane 512-A shown in FIGS. 5H-5I. In accordance with some embodiments, overlay 530 covers at least a portion of second pane 512-B. In accordance with some embodiments, overlay 530 is opaque.

Figure 5L:
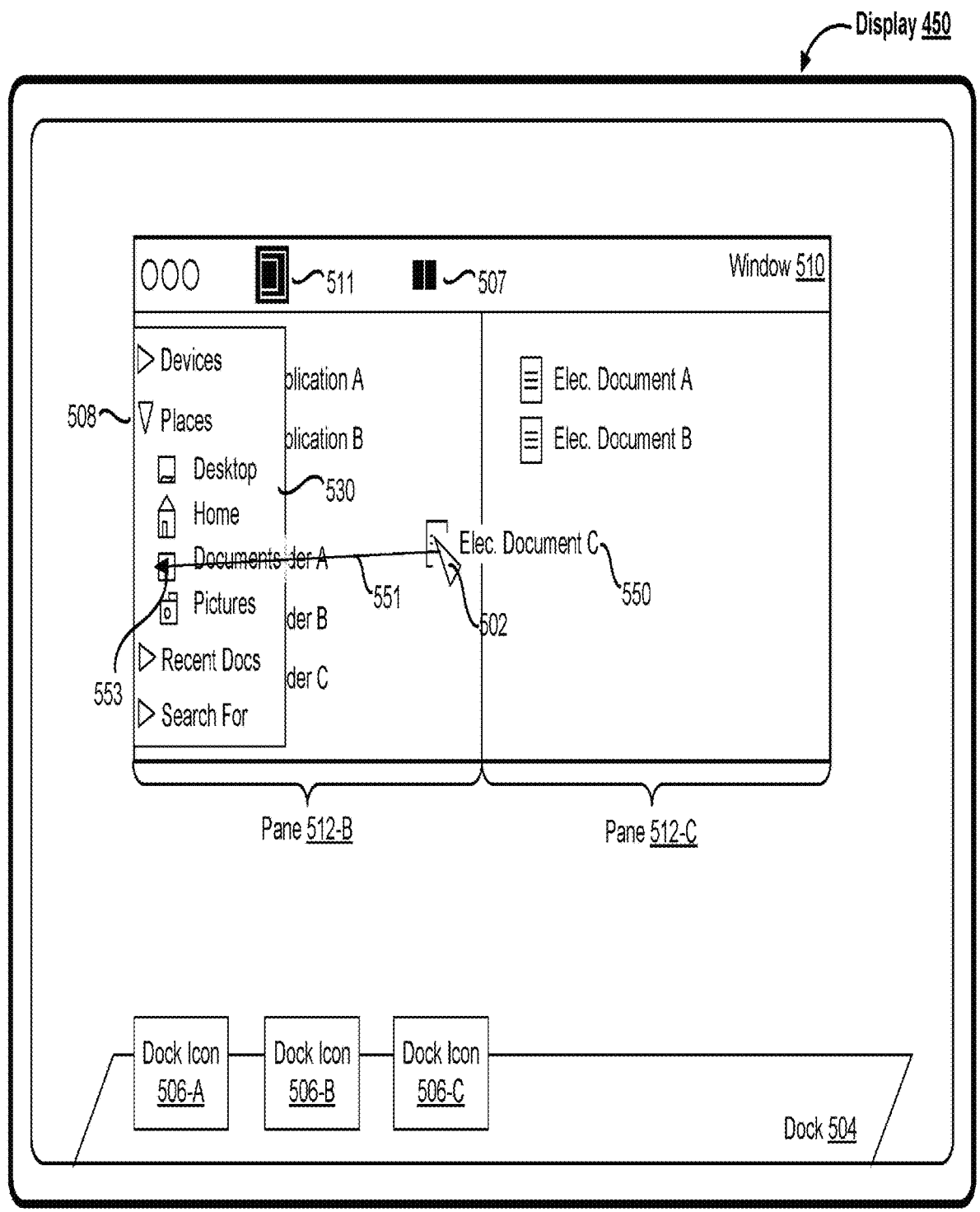
Figure 5M:
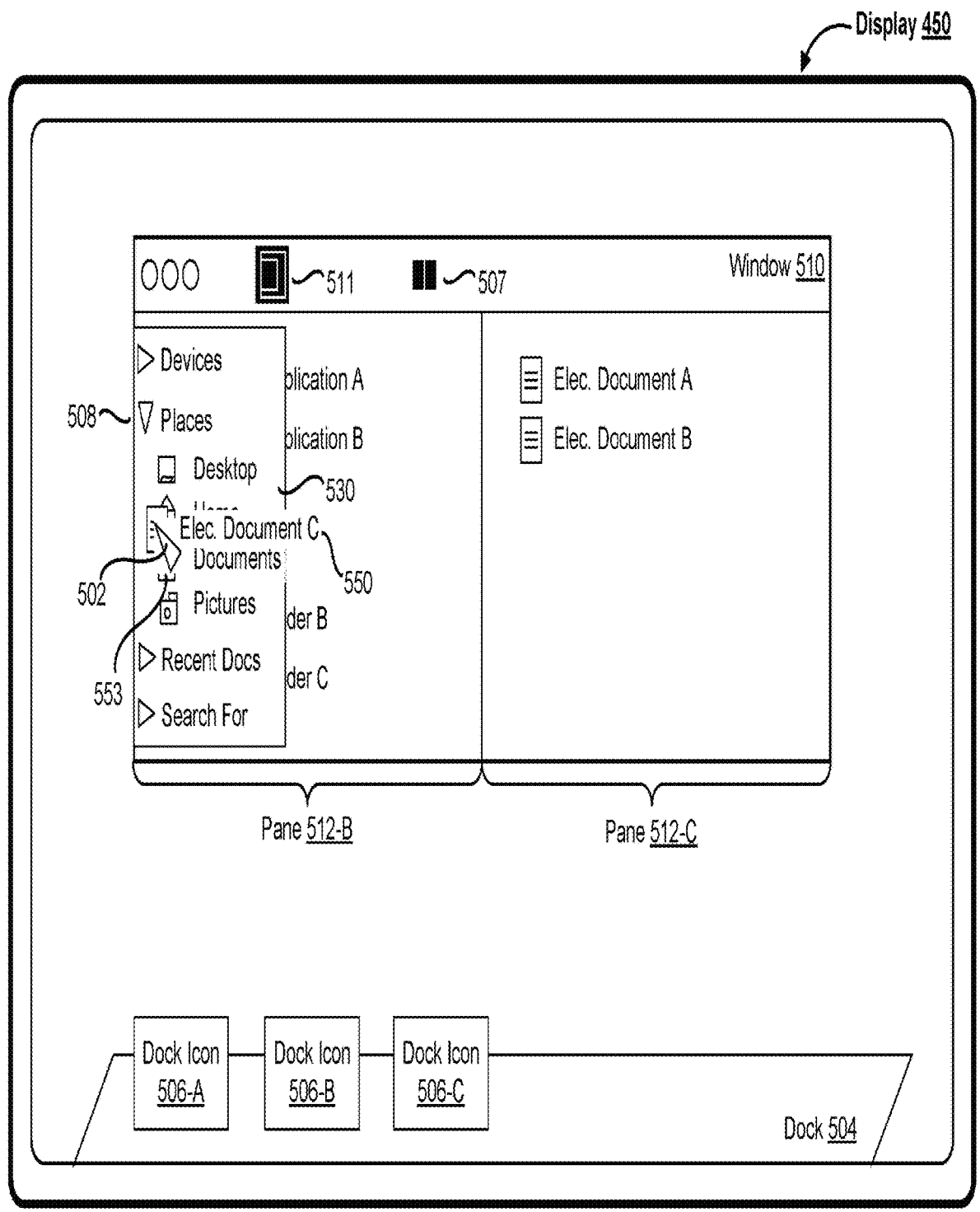
Figure 5N:
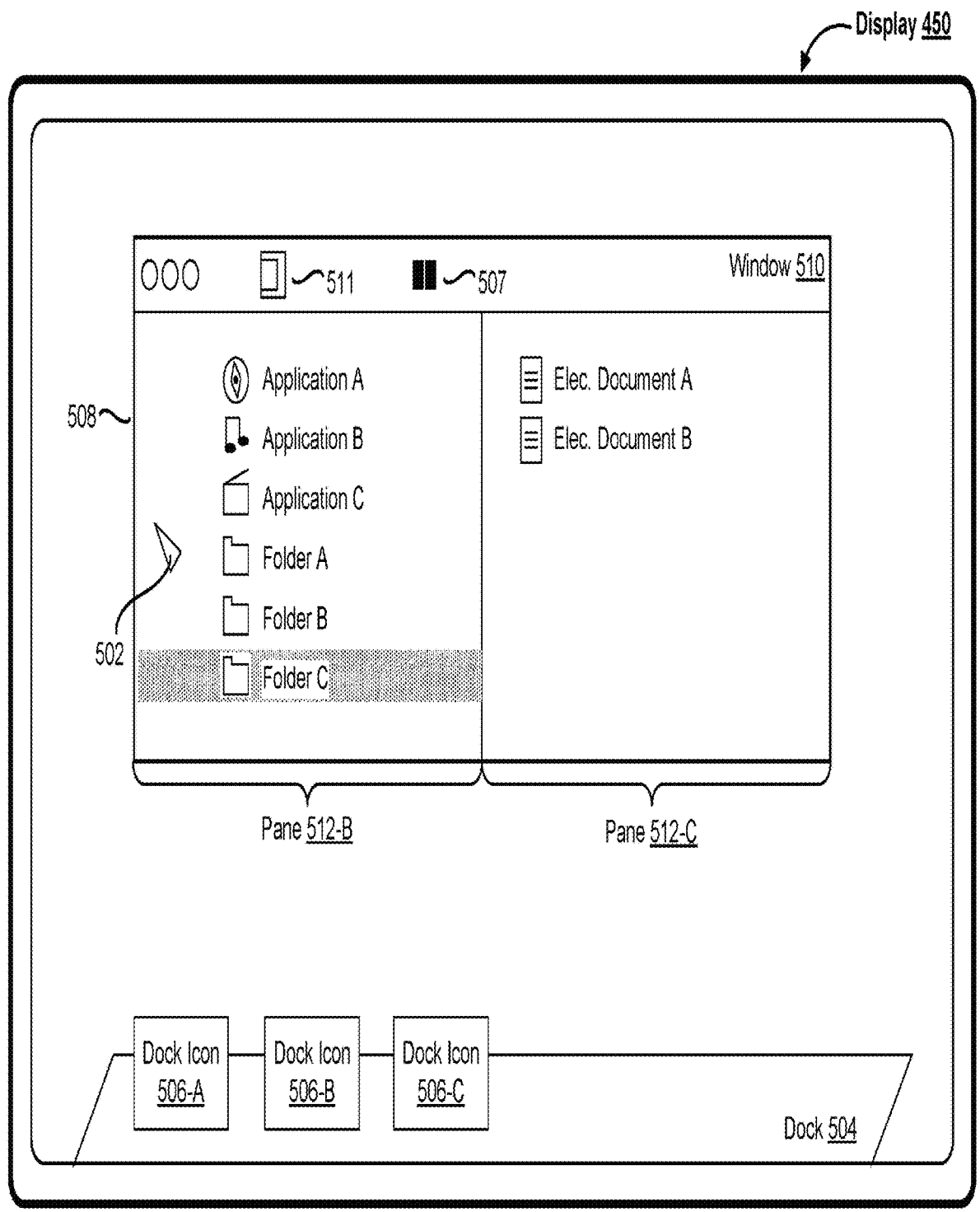

FIGS. 5K-5N illustrate a sequence in which the overlay is removed in response to dragging an icon over a drop target in the overlay. FIGS. 5K-5M illustrate a dragging gesture with focus selector 502, whereby icon 550 corresponding to "Electronic Document C" within third pane 512-C is dragged toward a drop target 553 within overlay 530 according to movement vector 551. For example, in FIGS. 5K-5M, drop target 553 corresponds to the "Documents" directory location within overlay 530. In response to completion of the dragging gesture (e.g., up-click or release of icon 550) while icon 550 is over the drop target 553 in overlay 530, overlay 530 is removed from the second representation of window 510 as shown in FIG. 5N.

Figure 5O:
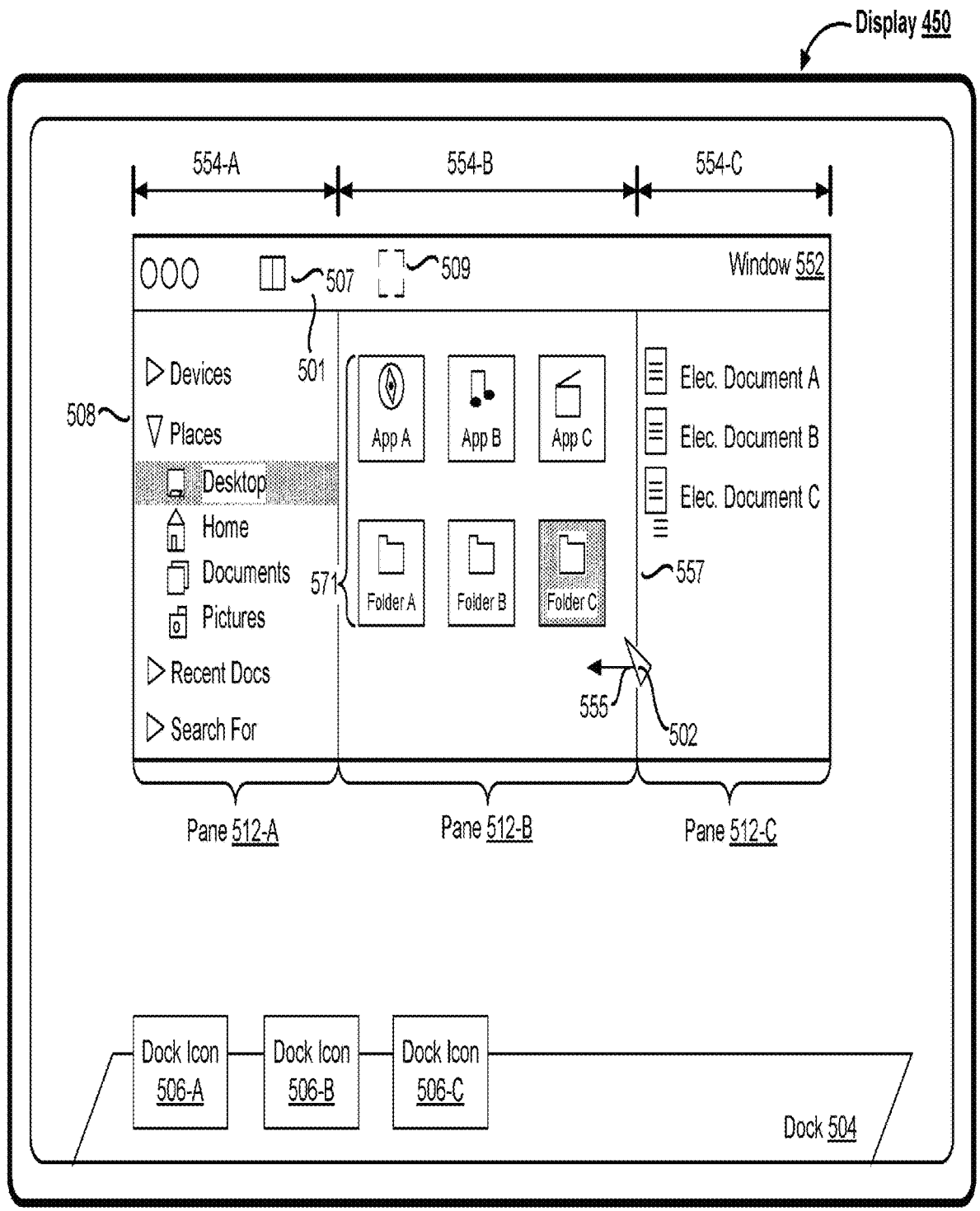
Figure 5P:
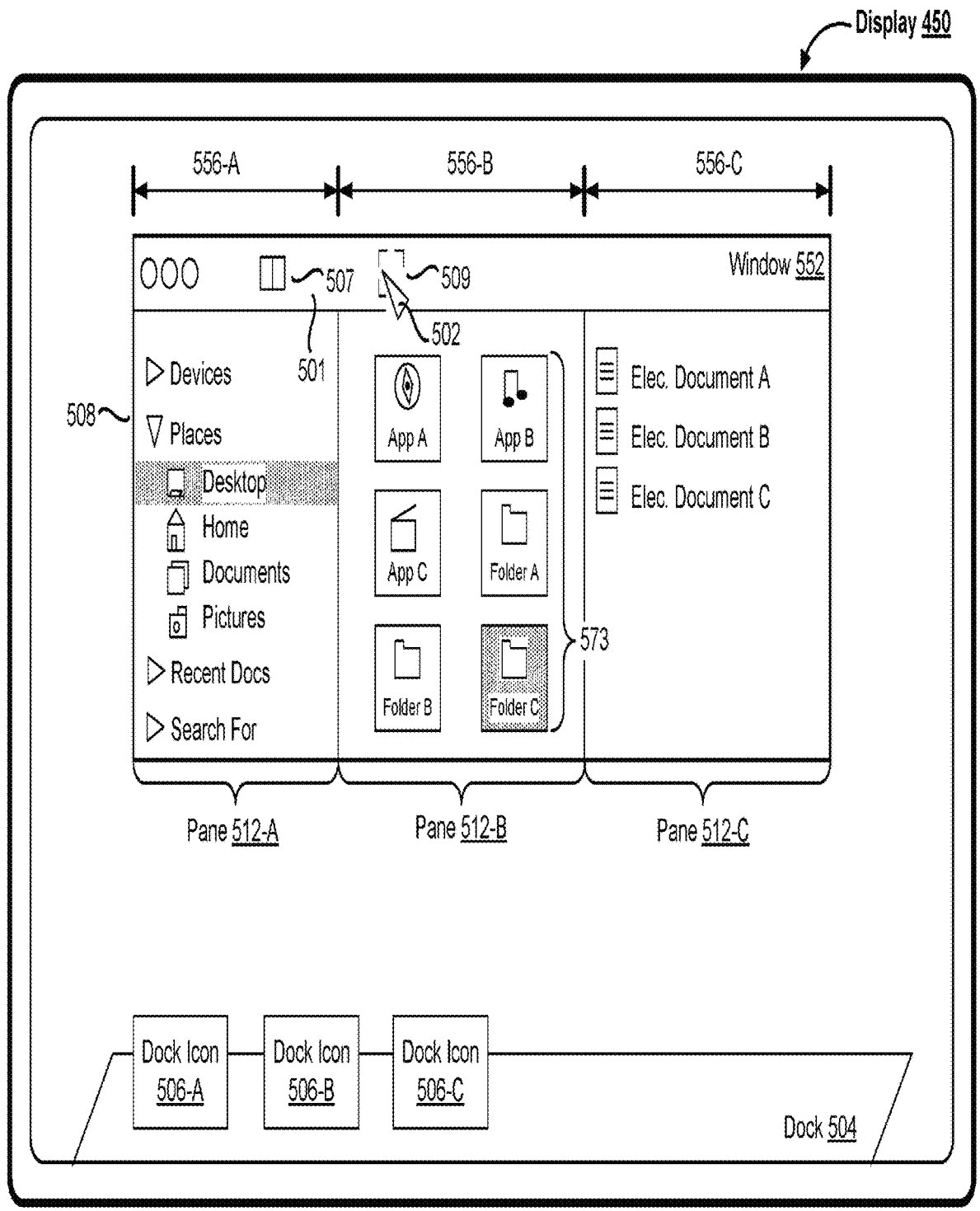
Figure 5Q:
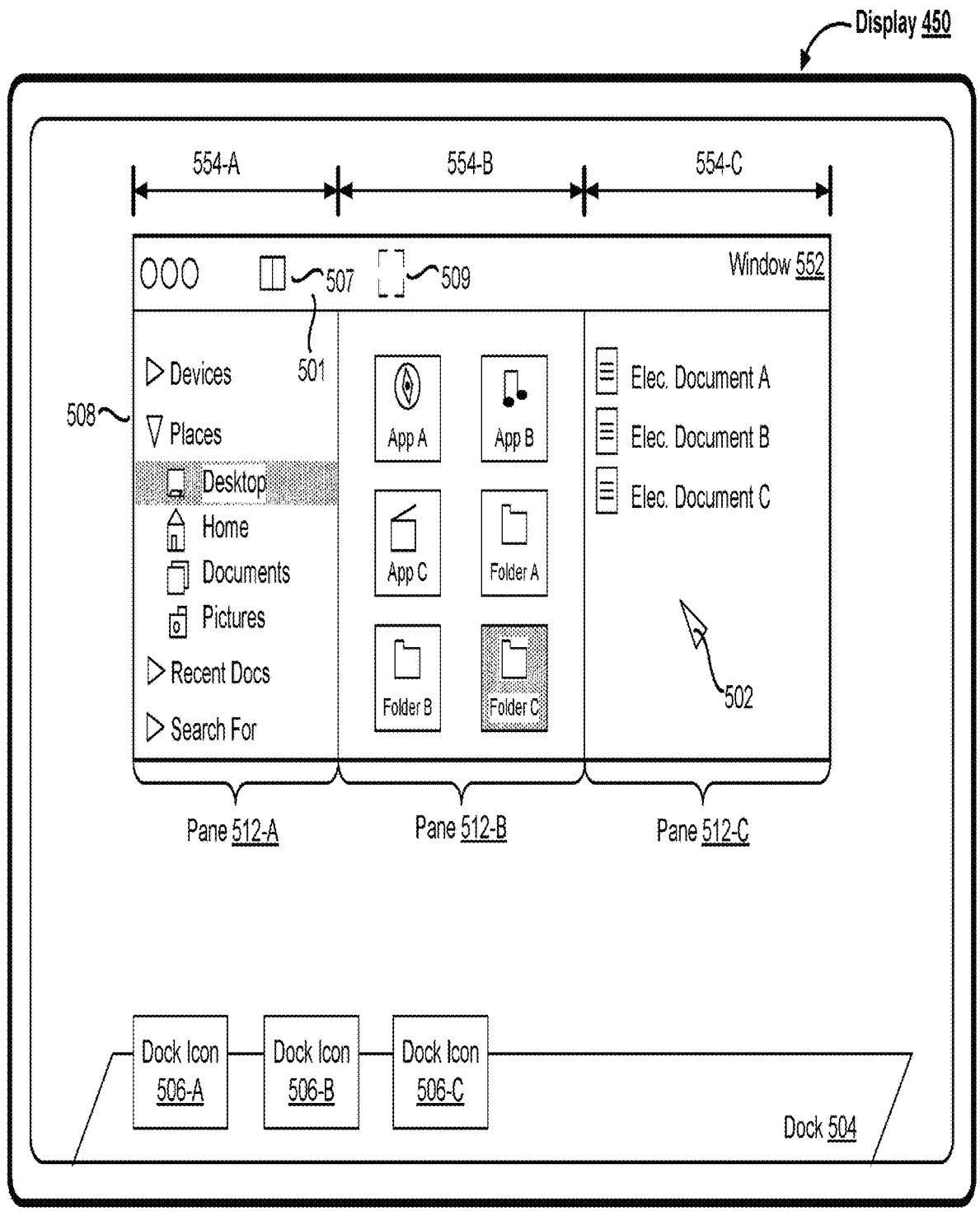

In FIGS. 5O-5Q, the user interface includes a first representation of window 552 with a first edge 508. For example, window 552 is associated with a file management application. In accordance with some embodiments, the first representation of window 552 includes a first pane 512-A, a second pane 512-B, and a third pane 512-C. In other embodiments, the first representation of window 552 includes first pane 512-A and second pane 512-B. As shown in FIG. 5O, each of the panes 512 within window 552 includes a plurality of user interface elements (e.g., folders, files, or directories). In some embodiments, window 552 includes a chrome area 501 by which window 552 may be dragged. In some embodiments, chrome area 501 includes a set of controls, toggles, and/or affordances As shown in FIGS. 5O-5Q, chrome area 501 of window 552 includes a first pane display toggle affordance 507, which, when activated (e.g., with a single or double click), causes first pane 512-A to be removed if it is currently displayed or causes the first pane 512-A to be displayed if it is not currently displayed. For example, first pane display toggle affordance 507 is activated in FIGS. 5I-5J. As shown in FIGS. 5O-5Q, chrome area 501 of window 552 also includes sizing toggle affordance 509, which, when activated (e.g., with a single or double click), causes first pane 512-A and second pane 512-B (and optionally third pane 512-C) to be resized according to predefined proportions. For example, sizing toggle affordance 509 is activated in FIGS. 5P-5Q.

FIGS. 5O-5P illustrate a sequence in which a matrix of display elements within a second pane is changed in response to reduction in the width of the second pane. FIGS. 5O-5P also illustrate a dragging gesture with focus selector 502, whereby a shared edge 557 between second pane 512-B and third pane 512-C is dragged toward the first edge 508 according to movement vector 555. As a result of the dragging gesture, the width of second pane 512-B is decreased from width 554-B in FIG. 5O to width 556-B in FIG. 5P. Similarly, the width of third pane 512-C is increased from width 554-C in FIG. 5O to width 556-C in FIG. 5P. Furthermore, as a result of the dragging gesture, the 2×3 matrix 571 of display elements within second pane 512-B in FIG. 5O is changed to a 3×2 matrix 573 of display elements within second pane 512-B in FIG. 5P.

FIGS. 5P-5Q illustrate a sequence in which a sizing toggle affordance within a second representation of a window is activated. FIG. 5P illustrates focus selector 502 at a location corresponding to sizing toggle affordance 509 within the first representation of window 552. For example, a user of the device (e.g., device 300, FIG. 3) selects sizing toggle affordance 509 by performing a single or double click while focus selector 502 is located over sizing toggle affordance 509. In response to detecting activation of sizing toggle affordance 509 (e.g., with a single or double click), first pane 512-A, second pane 512-B, and third pane 512-C are resized as a function of predefined portions as shown in FIG. 5Q. For example, the panes 512 are changed from widths 556 in FIG. 5P back to their widths in FIG. 5O. As a result of the activation of sizing toggle affordance 509, the width of second pane 512-B is increased from width 556-B in FIG. 5P to width 554-B in FIG. 5Q. Similarly, the width of third pane 512-C is decreased from width 556-C in FIG. 5P to width 554-C in FIG. 5Q.

Figure 6A:
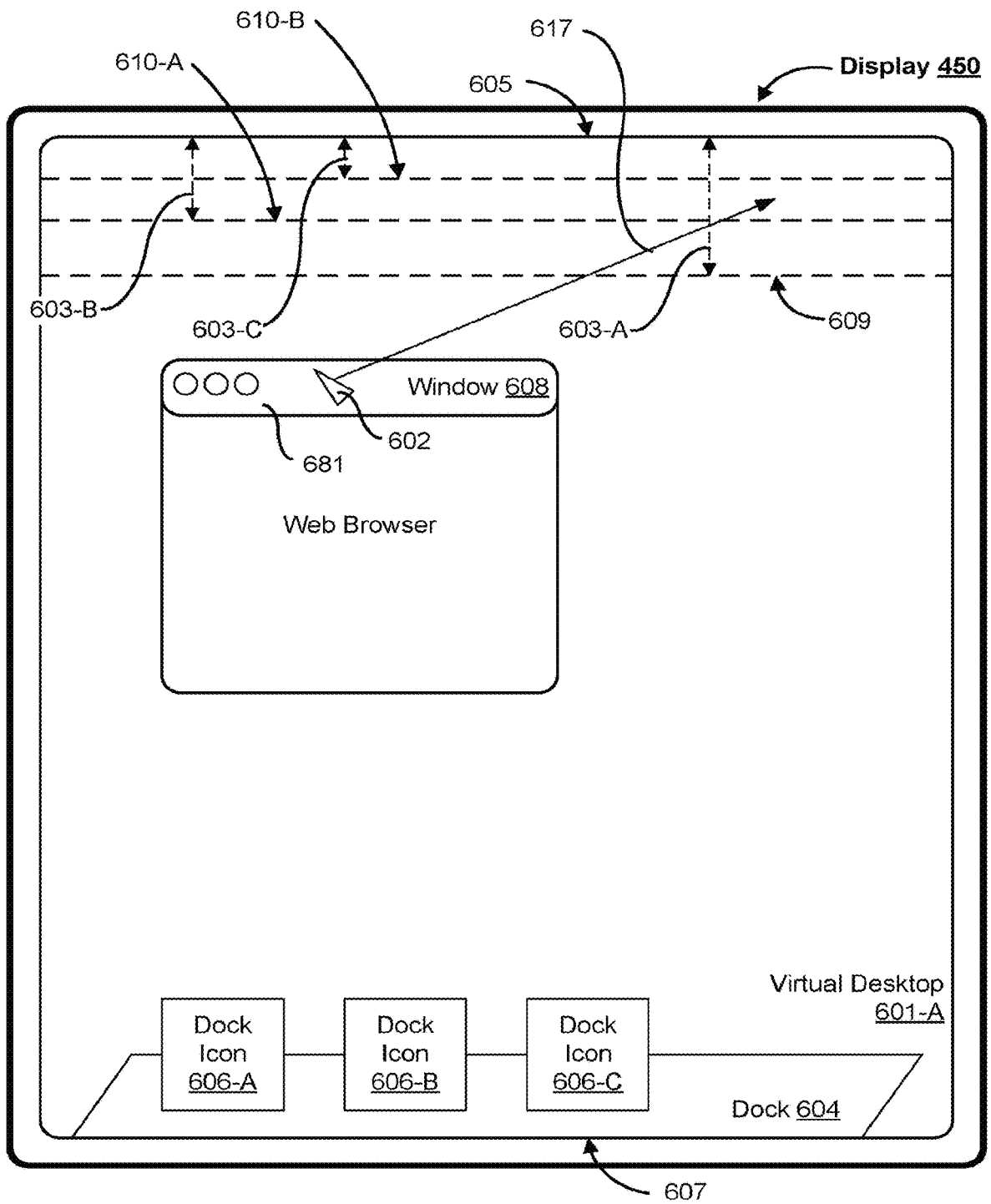
FIGS. 6A-6AA illustrate exemplary user interfaces for interacting with a virtual desktop configuration region in accordance with some embodiments.

FIGS. 6A-6AA illustrate exemplary user interfaces for interacting with a virtual desktop configuration region in accordance with some embodiments. The user interfaces in these figures are used to illustrate the processes described below, including the method in FIGS. 9A-9F.

As shown in FIG. 6A-6AA, a device (e.g., device 300, FIG. 3) displays a user interface with a plurality of user-interface elements and a focus selector 602 on display 450. In some embodiments, focus selector 602 (sometimes also referred to as a "cursor") is controlled by an input device that is separate from display 450 such as a mouse, stylus, motion sensing input device, speech command processing device, touchpad, or the like. In some embodiments, the user interface at least includes a dock 604 with a plurality of dock icons 606-A, 606-B, and 606-C adjacent to a second edge 605 of display 450 (e.g., the bottom edge).

FIGS. 6A-6E illustrate a sequence in which a representation of a window is placed at a location within a virtual desktop configuration region that is associated with creating a tiled virtual desktop. As shown in FIGS. 6A-6F, the user interface is associated with a virtual desktop 601-A. In accordance with some embodiments, a proximity threshold 609 is located a distance 603-A from a first edge 605 of display 450 (e.g., the top edge). According to some embodiments, a first interaction threshold 610-A is located a distance 603-B from first edge 605 of display 450 (e.g., the top edge). In some embodiments, the distance 603-B is less than the distance 603-A. Similarly, according to some embodiments, a second interaction threshold 610-B is located a distance 603-C from first edge 605 of display 450 (e.g., the top edge). In some embodiments, the distance 603-C is less than the distance 603-B.

Figure 6B:
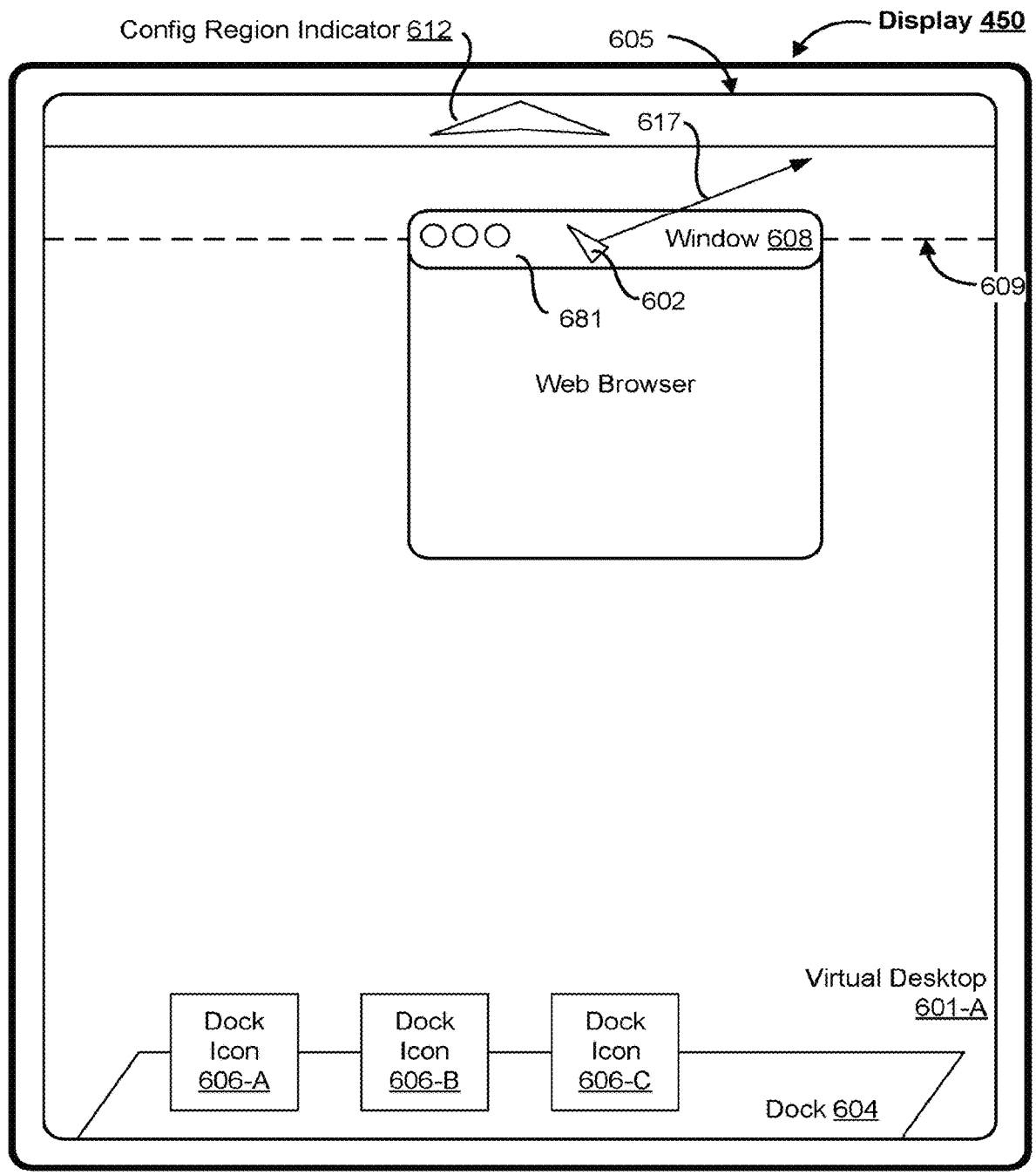

FIGS. 6A-6D illustrate a dragging gesture with focus selector 602, whereby window 608 is dragged toward the first edge 605 according to movement vector 617. For example, window 608, which is associated with a web browser application, includes a chrome area 681 by which window 608 may be dragged. In some embodiments, chrome area 681 includes a set of controls, toggles, and/or affordances. As shown in FIG. 6B, a virtual desktop configuration region indicator 612 is displayed adjacent to first edge 605 of display 450 in response to window 608 breaching proximity threshold 609. In some embodiments, virtual desktop configuration region indicator 612 indicates the existence of a virtual desktop configuration region to the user of the device.

Figure 6C:
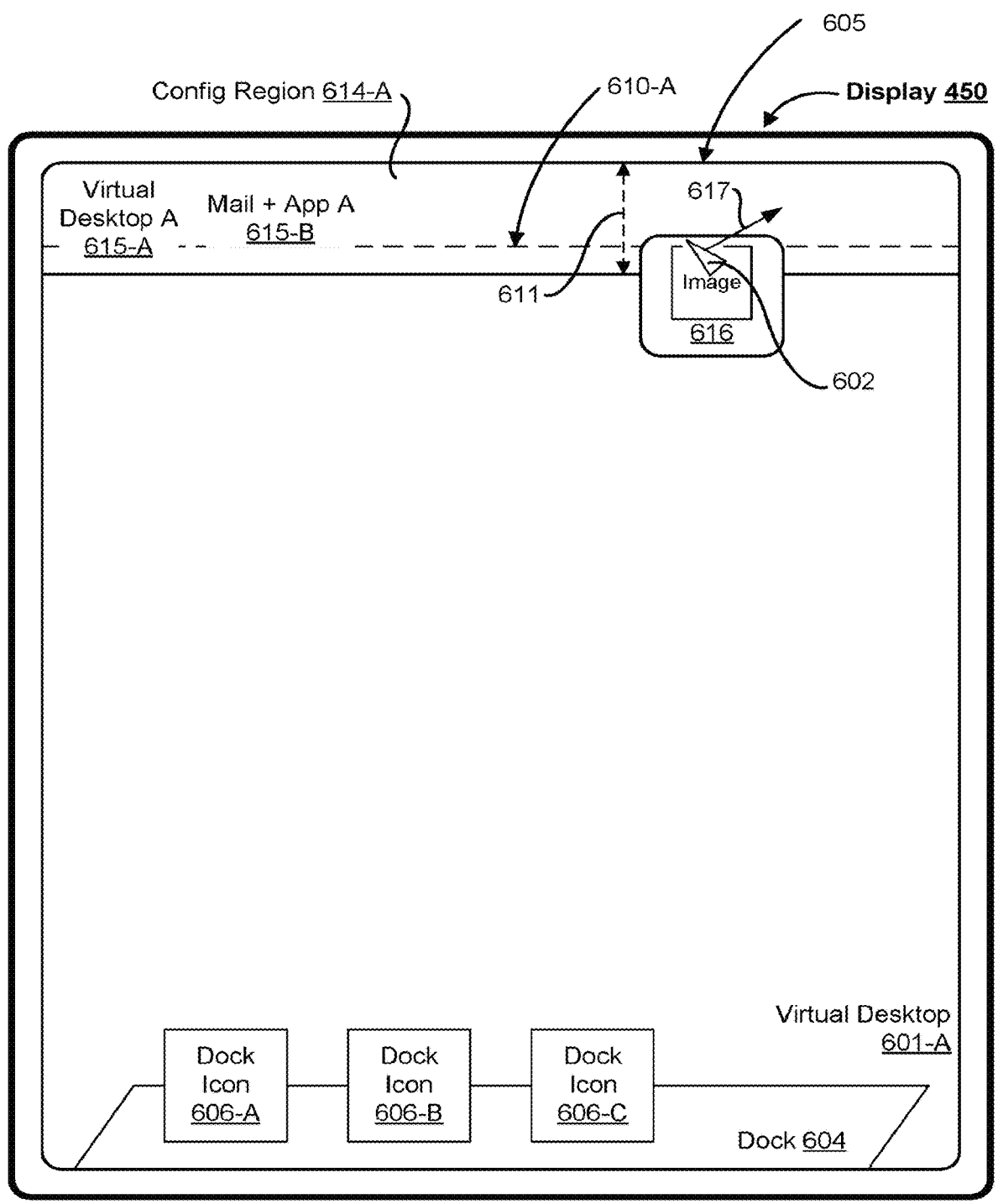

As shown in FIG. 6C, window 608 is converted to a thumbnail representation 616 in response to window 608 breaching first interaction threshold 610-A (e.g., an image of window 608). Furthermore, as shown in FIG. 6C, a first representation 614-A of a virtual desktop configuration region is displayed adjacent to the first edge 605 of display 450 in response to window 608 breaching first interaction threshold 610-A. In FIG. 6C, the first representation 614-A of the virtual desktop configuration region has a first height 611 relative to first edge 605. According to some embodiments, as shown in FIG. 6C, first representation 614-A of the virtual desktop configuration region includes text-based indicators 615-A and 615-B corresponding to existing virtual desktops 601-A and 601-B, respectively.

As shown in FIG. 6C, text-based indicator 615-A is associated with the text label "Virtual Desktop A," which indicates that corresponding virtual desktop 601-A (e.g., shown in FIG. 6C) is a non-tiled virtual desktop. Similarly, text-based indicator 615-B is associated with the text label "Mail+App A," which indicates that corresponding virtual desktop 601-B is a tiled virtual desktop with two tiles. In some embodiments, the text label "Mail+App A" for text-based indicator 615-B indicates the order or positioning of the tiles in corresponding virtual desktop 601-B. For example, a first tile associated with a Mail application occupies the left portion of the display space and second tile associated with Application A occupies the right portion of the display space.

Figure 6D:
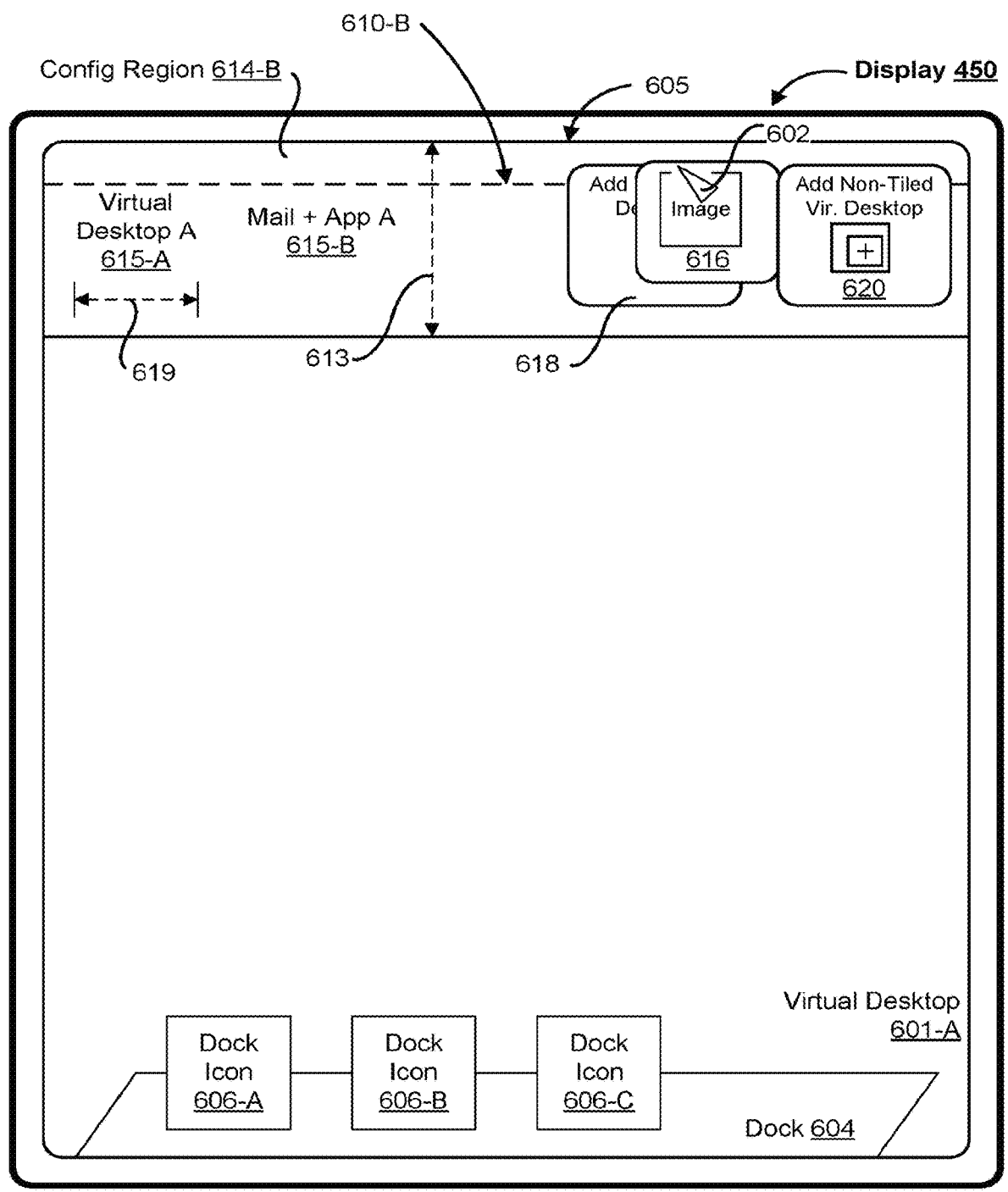

As shown in FIG. 6D, a second representation 614-B of the virtual desktop configuration region is displayed adjacent to the first edge 605 of display 450 in response to thumbnail representation 616 breaching second interaction threshold 610-B. In FIG. 6D, the second representation 614-B of the virtual desktop configuration region has a second height 613 relative to first edge 605. In some embodiments, second height 613 is greater than first height 611 in FIG. 6C. According to some embodiments, as shown in FIG. 6D, second representation 614-B of the virtual desktop configuration region includes a first drop target 618 associated with creating a new tiled virtual desktop and a second drop target 620 associated with creating a new non-tiled virtual desktop. In some embodiments, the icon within first drop target 618 and second drop target 620 includes the wallpaper for the virtual desktop to be created. According to some embodiments, as shown in FIG. 6D, second representation 614-B of the virtual desktop configuration region also includes text-based indicators 615-A and 615-B corresponding to existing virtual desktops 601-A and 601-B, respectively.

Figure 6E:
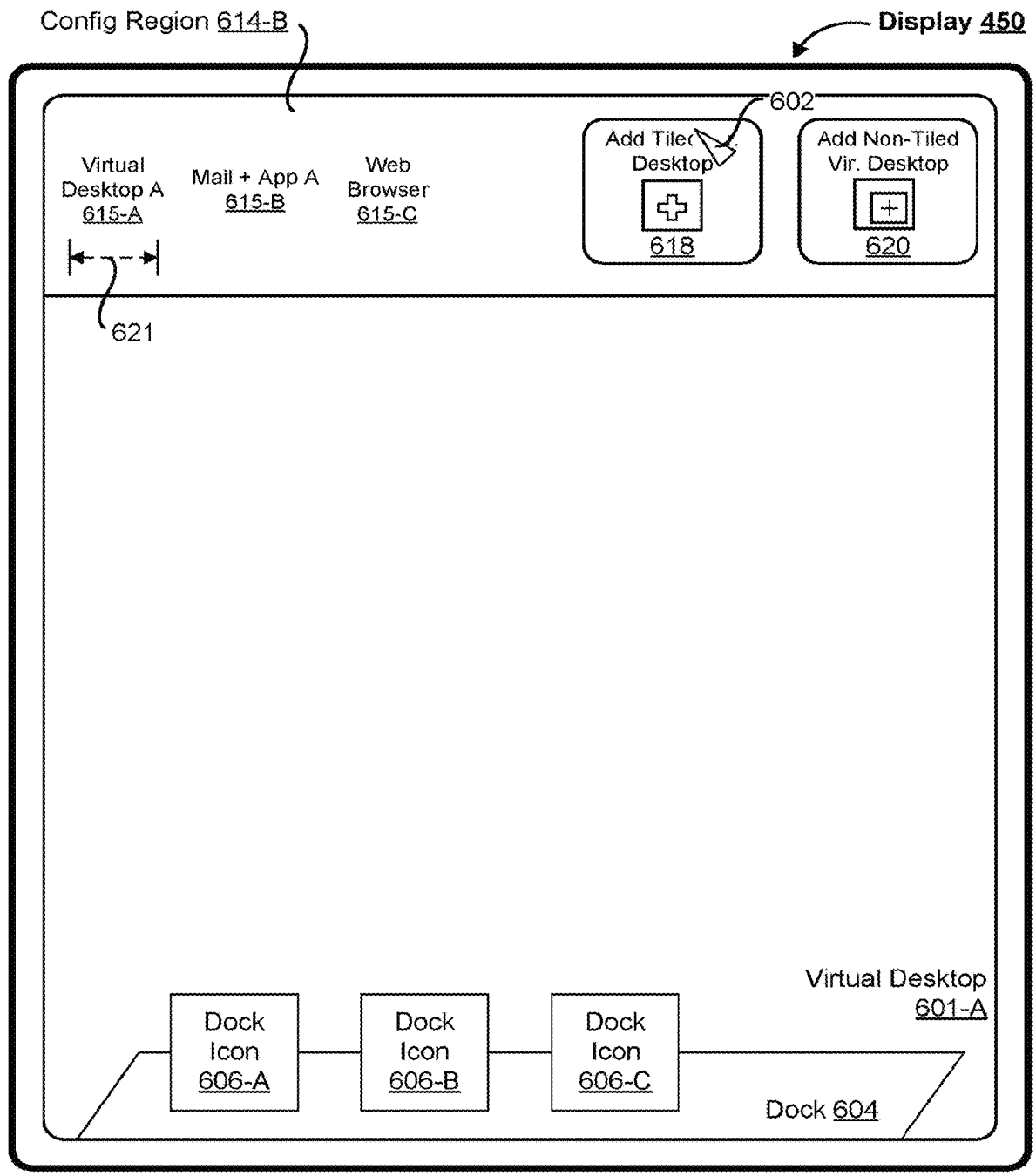

In response to completion of the dragging gesture (e.g., up-click or release of thumbnail representation 616) while thumbnail representation 616 is over first drop target 618, a tiled virtual desktop 601-C including window 608 is created. As shown in FIG. 6E, second representation 614-B of the virtual desktop configuration region includes a text-based indicator 615-C corresponding to newly created virtual desktop 601-C. Text-based indicator 615-C is associated with the text label "Web Browser," which indicates that corresponding virtual desktop 601-C is a tiled virtual desktop with one tile associated with window 608. Furthermore, the size of text-based indicators 615-A and 615-B corresponding to existing virtual desktops 601-A and 601-B is scaled down from size 619 in FIG. 6D to size 621 in FIG. 6E in response to the addition of text-based indicator 615-C corresponding to virtual desktop 601-C to second representation 614-B of the virtual desktop configuration region.

Figure 6F:
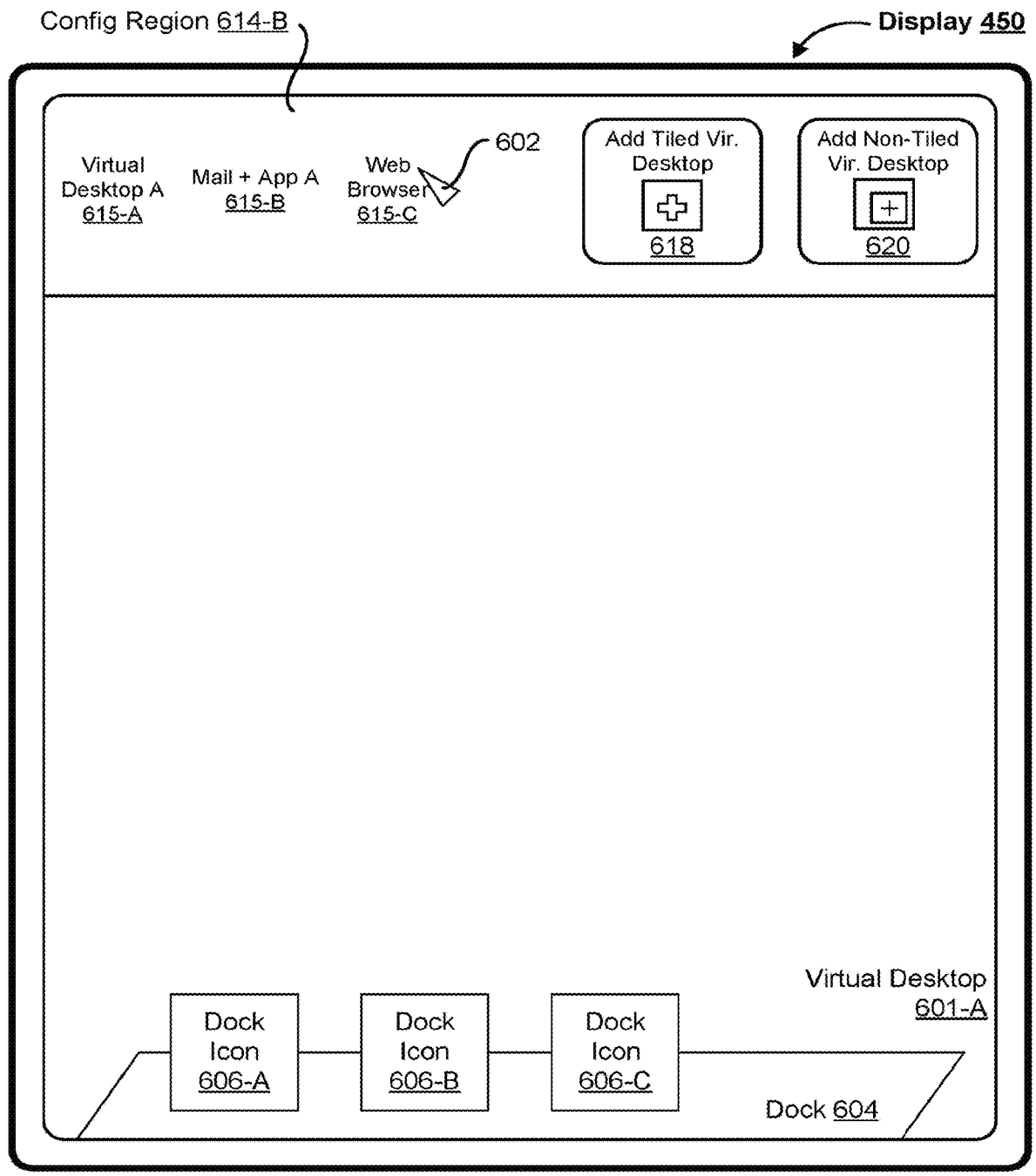
Figure 6G:
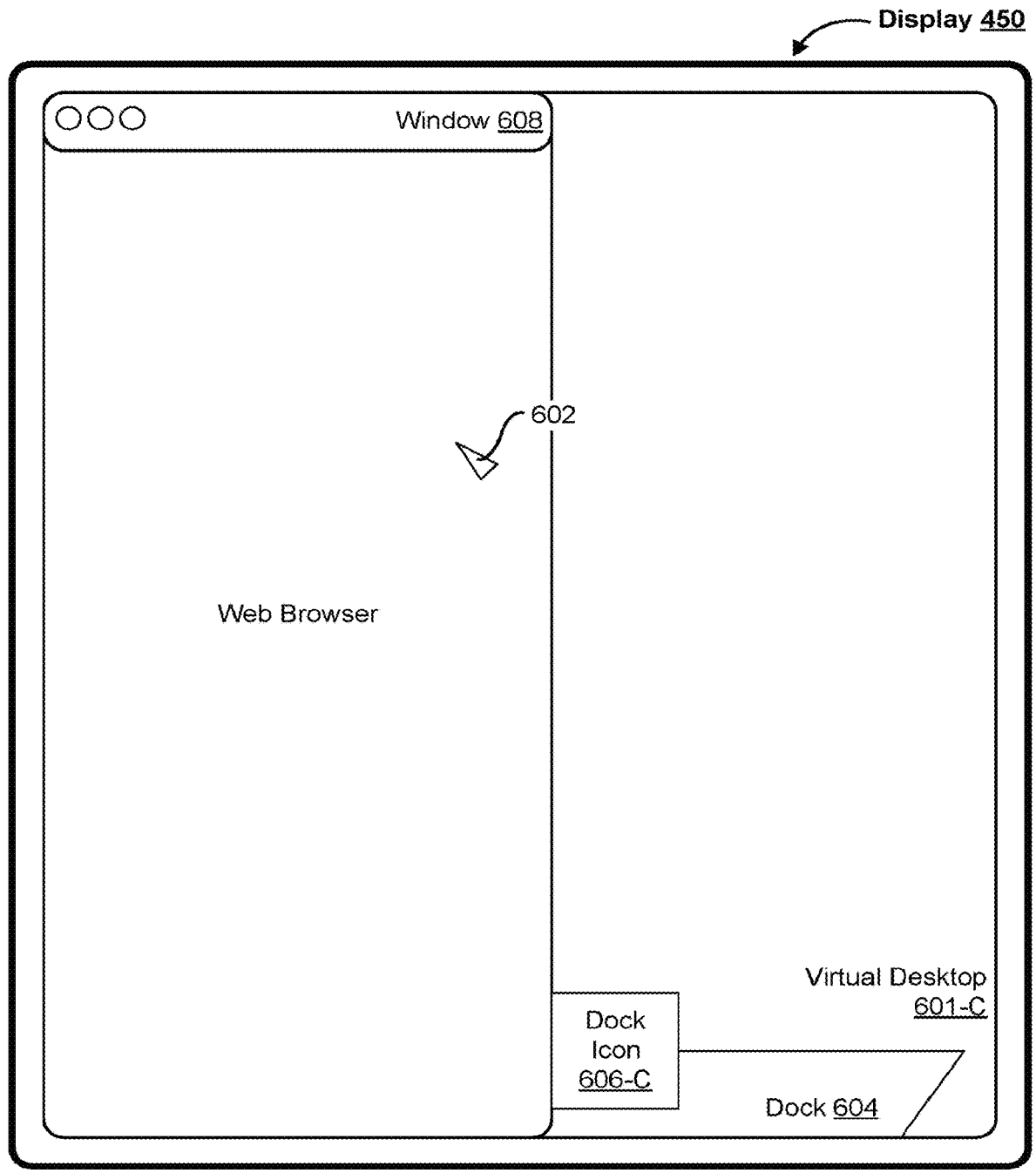
Figure 6H:
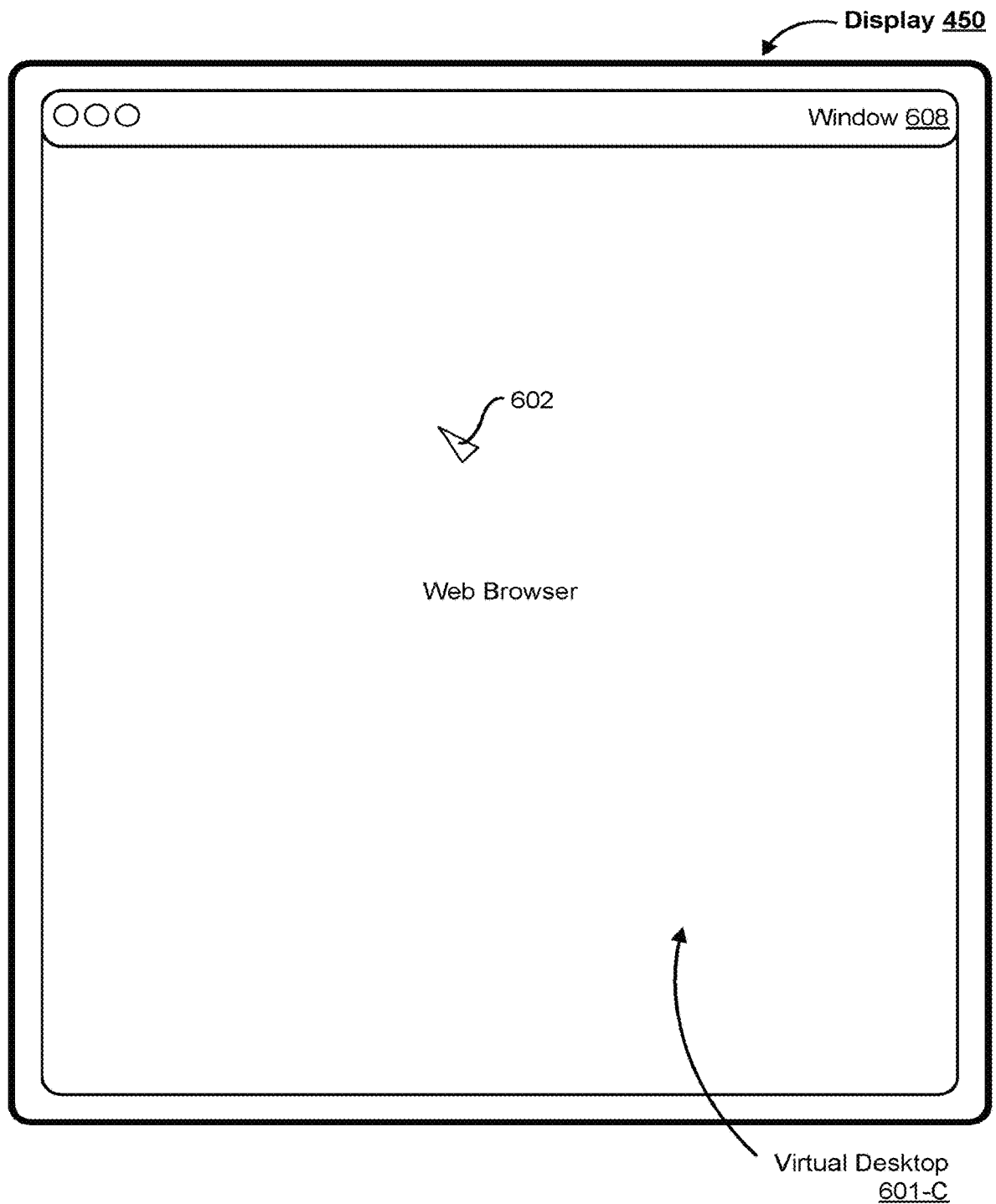

FIGS. 6F-6H illustrate a sequence in which the tiled virtual desktop created in FIGS. 6A-6E is displayed. FIG. 6F illustrates focus selector 602 at a location corresponding to text-based indicator 615-C for virtual desktop 601-C within second representation 614-B of the virtual desktop configuration region. For example, a user of the device (e.g., device 300, FIG. 3) selects text-based indicator 615-C for virtual desktop 601-C by performing a single or double click while focus selector 602 is located over text-based indicator 615-C for virtual desktop 601-C. In some embodiments, in response to selection of text-based indicator 615-C for virtual desktop 601-C (e.g., with a single or double click) in FIG. 6F, window 608 is shown as a partial-screen (e.g., half-screen) tile within tiled virtual desktop 601-C as shown in FIG. 6G. In some embodiments, in response to selection of the text-based indicator 615-C for virtual desktop 601-C in FIG. 6F, window 608 is shown as a full-screen tile within tiled virtual desktop 601-C as shown in FIG. 6H.

Figure 6I:
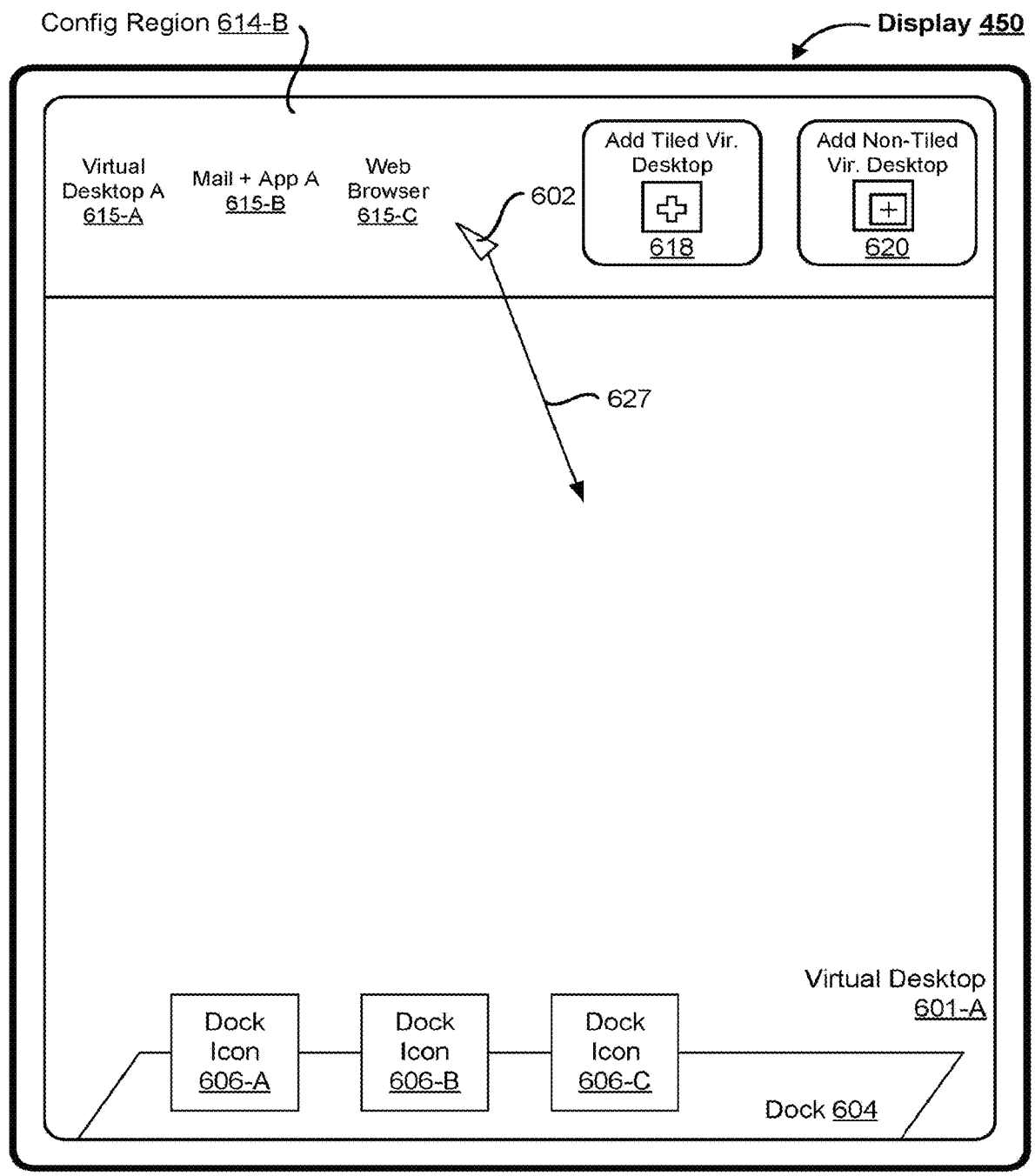
Figure 6J:
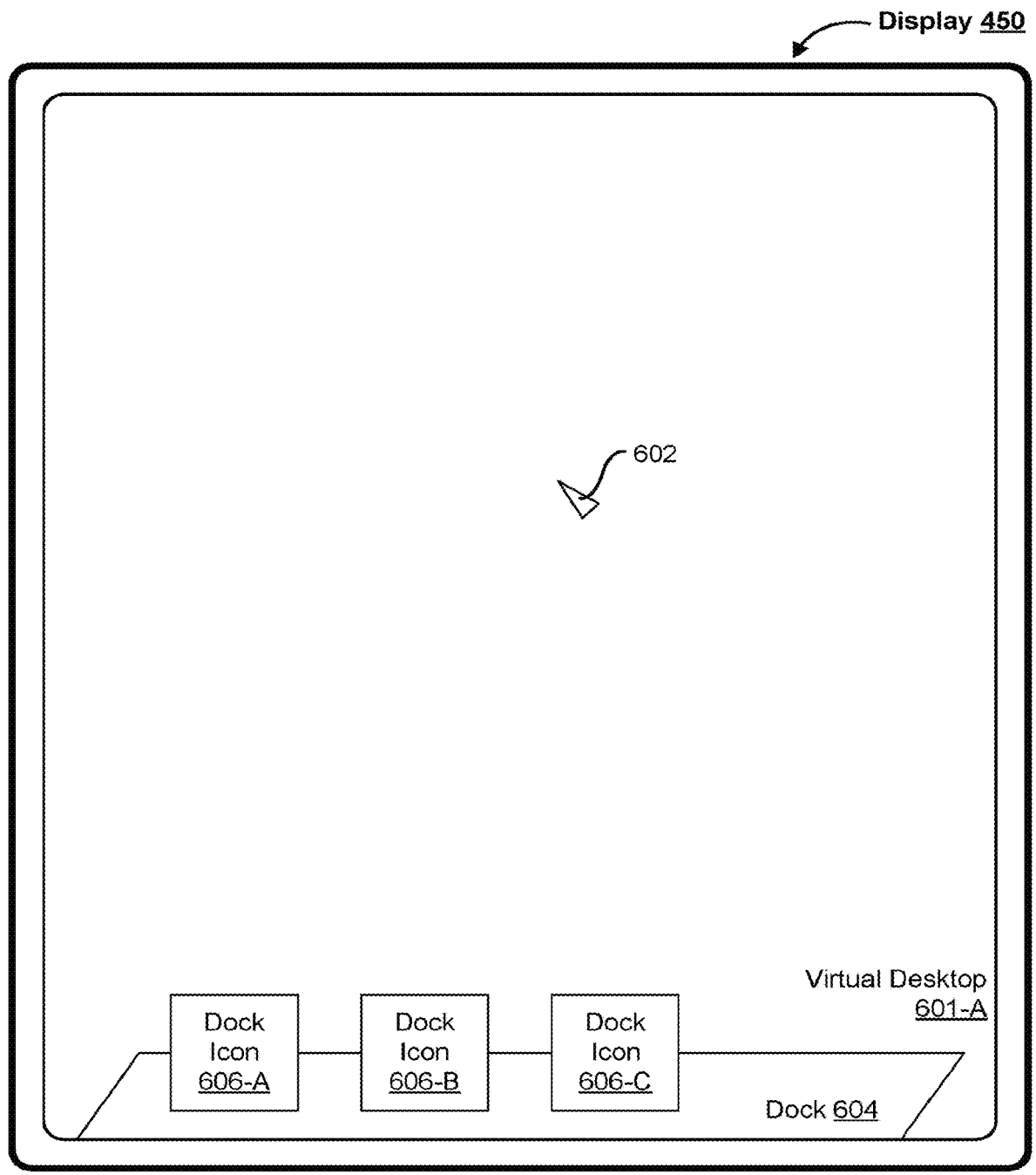

FIGS. 6I-6J illustrate a sequence in which the virtual desktop configuration region is dismissed from the user interface. FIGS. 6I-6J illustrate focus selector 602 moving out of second representation 614-B of the virtual desktop configuration region according to movement vector 627. As a result, second representation 614-B of the virtual desktop configuration region removed from display 450 as shown in FIG. 6J.

FIGS. 6K-6O illustrate a sequence in which a representation of a window is placed at a location within a virtual desktop configuration region that is associated with an existing non-tiled virtual desktop. As shown in FIGS. 6K-6N, the user interface is associated with a virtual desktop 631-A. In accordance with some embodiments, a first interaction threshold 610-A is located a distance 633-A from first edge 605 of display 450 (e.g., the top edge). According to some embodiments, a second interaction threshold 610-B is located a distance 633-B from first edge 605 of display 450 (e.g., the top edge). In some embodiments, the distance 633-B is less than the distance 633-A.

Figure 6K:
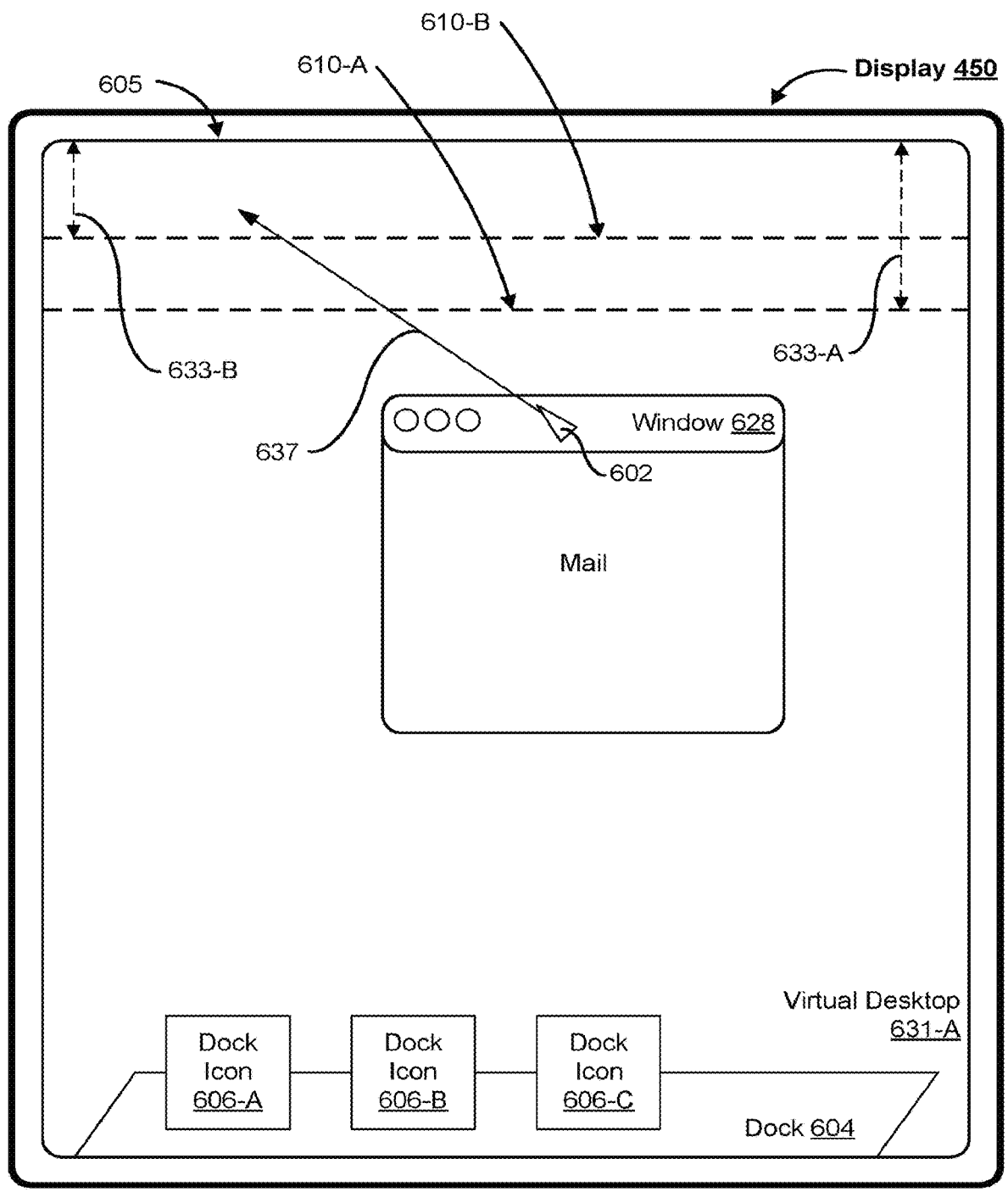
Figure 6L:
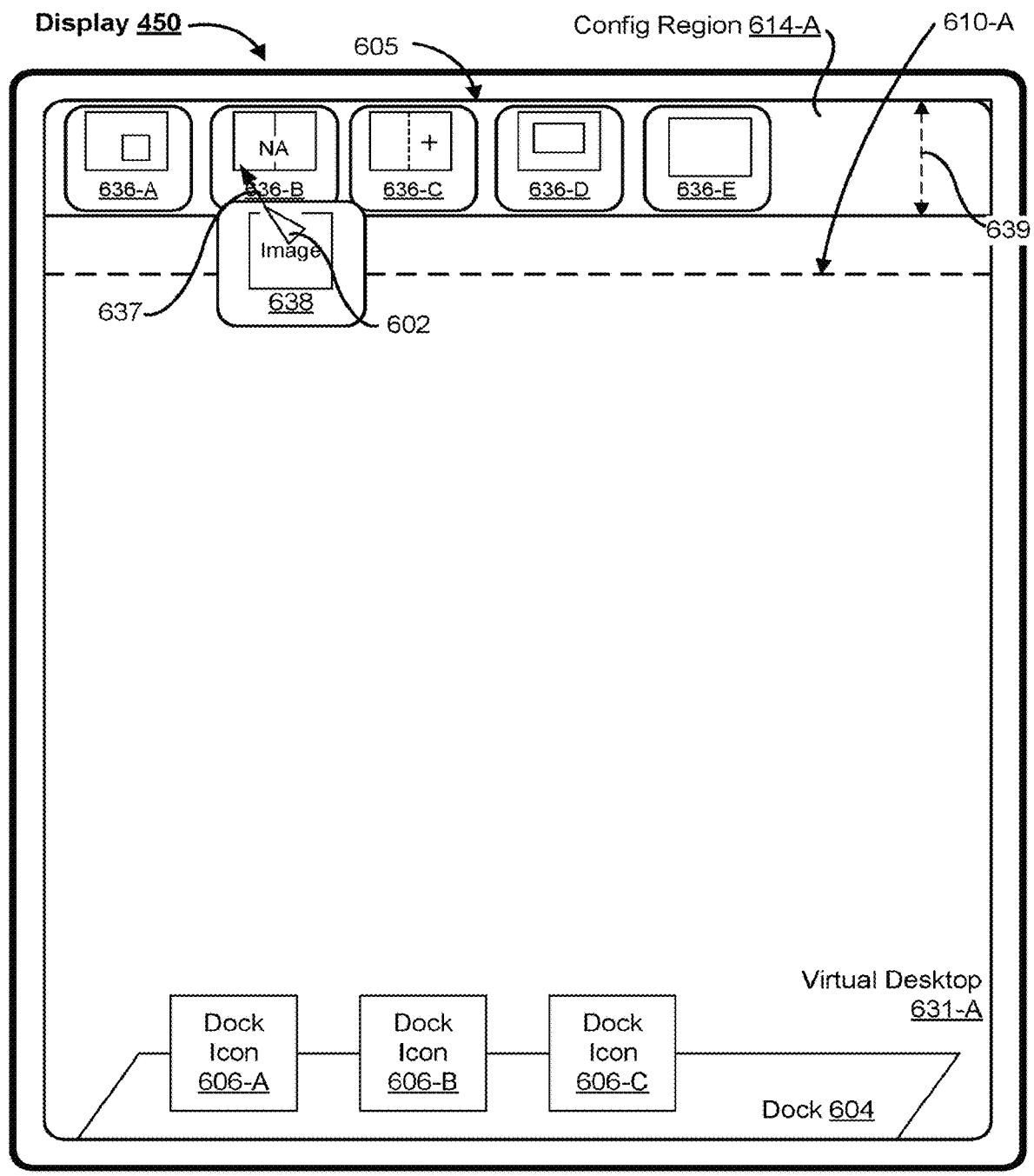
Figure 6M:
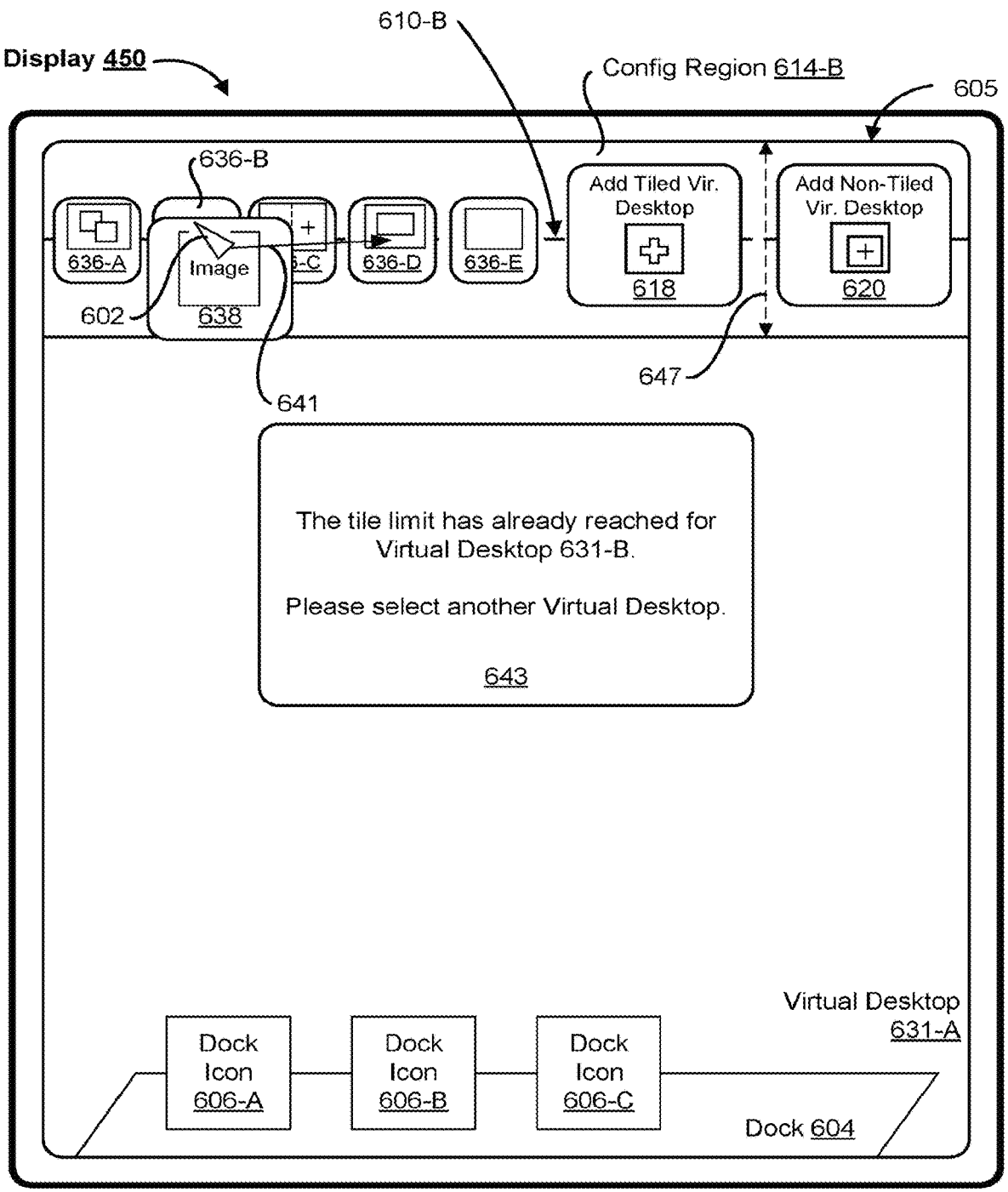

FIGS. 6K-6M illustrate a dragging gesture with focus selector 602, whereby window 628, which is associated with a mail application, is dragged toward first edge 605 according to movement vector 637. As shown in FIG. 6L, window 628 is converted to a thumbnail representation 638 (e.g., an image of window 628) in response to window 628 breaching first interaction threshold 610-A. Furthermore, as shown in FIG. 6L, a first representation 614-A of the virtual desktop configuration region is displayed adjacent to the first edge 605 of display 450 in response to window 628 breaching first interaction threshold 610-A. In FIG. 6L, the first representation 614-A of the virtual desktop configuration region has a first height 639 relative to first edge 605. According to some embodiments, as shown in FIG. 6L, first representation 614-A of the virtual desktop configuration region includes a plurality of graphical representations 636-A, 636-B, 636-C, 636-D, and 636-E corresponding to existing virtual desktops 631-A, 631-B, 631-C, 631-D, and 631-E, respectively. For example, the graphical representations 636 are thumbnail images of the virtual desktops including the associated wallpaper along with any existing windows or tiles and their relative sizes and/or positions. In some embodiments, graphical representations for existing tiled virtual desktops also indicate where an added window will be added to the existing tiled virtual desktop.

To that end, graphical representation 636-A indicates that existing virtual desktop 631-A is a non-tiled virtual desktop with one window. Graphical representation 636-B indicates that existing virtual desktop 631-B is a tiled virtual desktop with two half-screen tiles. As shown in FIG. 6L, graphical representation 636-B further indicates that existing virtual desktop 631-B has reached a tile limit (e.g., 2 tiles). According to some embodiments, graphical representation 636-C indicates that existing virtual desktop 631-C is a tiled virtual desktop with one full-screen tile. In some embodiments, as shown in FIG. 6L, graphical representation 636-C further indicates that the addition of a window to existing virtual desktop 631-C will cause the existing full-screen tile to be converted to a half-screen tile adjacent to the left-side of the display space and the added window to be added to existing virtual desktop 631-C as a half-screen tile adjacent to the right-side of the display space (e.g., in the position of the "+"

sign). Graphical representation 636-D indicates that existing virtual desktop 631-D is a non-tiled virtual desktop with one window. Graphical representation 636-E indicates that existing virtual desktop 631-E is a tiled virtual desktop with one full-screen tile (or optionally one partial-screen tile).

As shown in FIG. 6M, a second representation 614-B of the virtual desktop configuration region is displayed adjacent to the first edge 605 of display 450 in response to thumbnail representation 638 breaching second interaction threshold 610-B. In FIG. 6M, the second representation 614-B of the virtual desktop configuration region has a second height 647 relative to first edge 605. In some embodiments, second height 647 is greater than first height 639 in FIG. 6L. According to some embodiments, as shown in FIG. 6M, second representation 614-B of the virtual desktop configuration region includes a first drop target 618 associated with creating a new tiled virtual desktop and a second drop target 620 associated with creating a new non-tiled virtual desktop. According to some embodiments, as shown in FIG. 6M, second representation 614-B of the virtual desktop configuration region also includes the plurality of graphical representations 636-A, 636-B, 636-C, 636-D, and 636-E corresponding to existing virtual desktops 631-A, 631-B, 631-C, 631-D, and 631-E, respectively.

In response to completion of the dragging gesture (e.g., up-click or release of thumbnail representation 638) while thumbnail representation 638 is over graphical representation 636-B as shown in FIG. 6M, the device attempts to place window 628 into existing virtual desktop 631-B corresponding to graphical representation 636-B. However, in some embodiments, if a threshold limit of windows or tiles (e.g., 2 tiles or 4 tiles) are already present in existing virtual desktop 631-B, a full virtual desktop message 643 is displayed as shown in FIG. 6M.

Figure 6N:
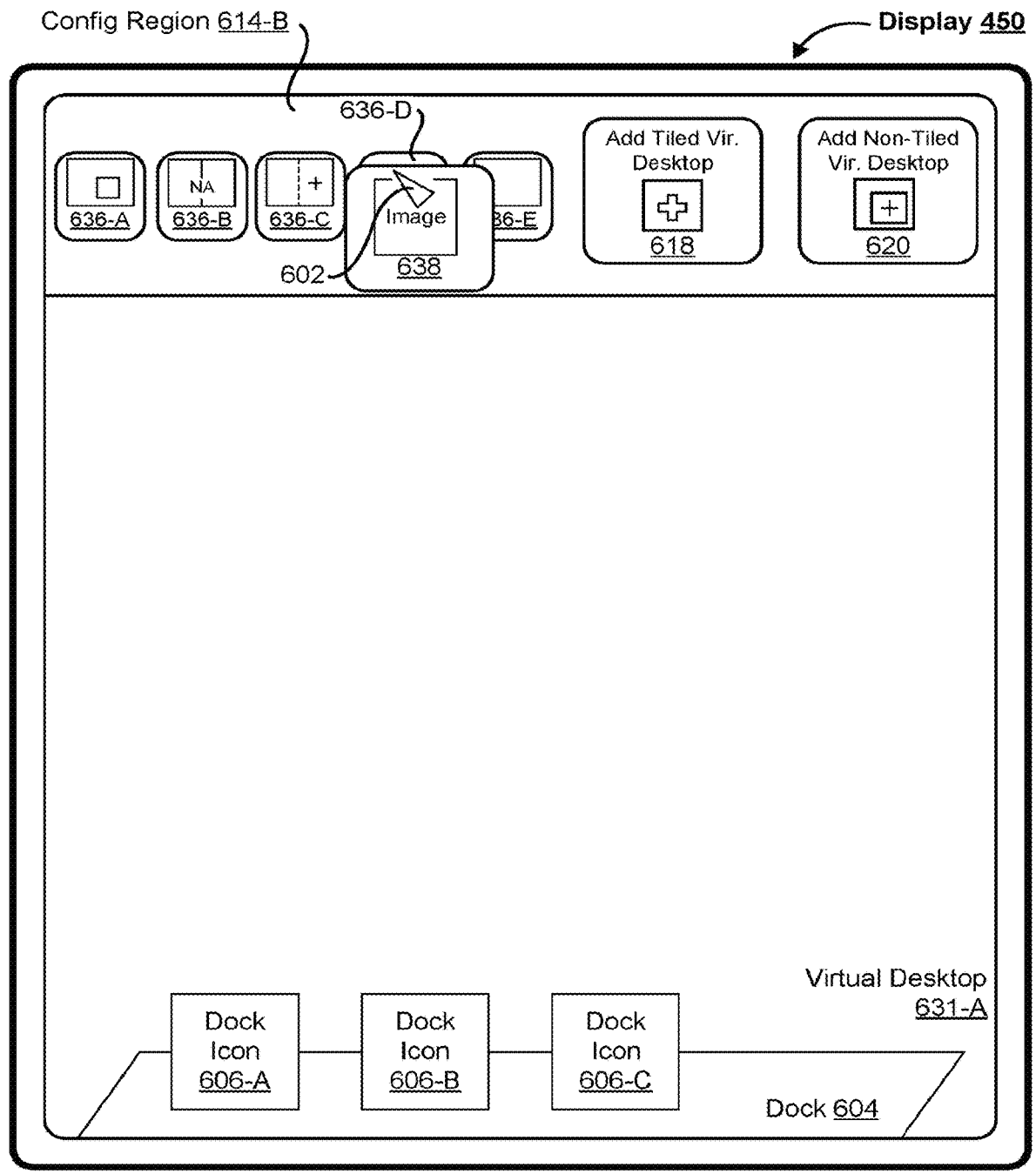
Figure 6O:
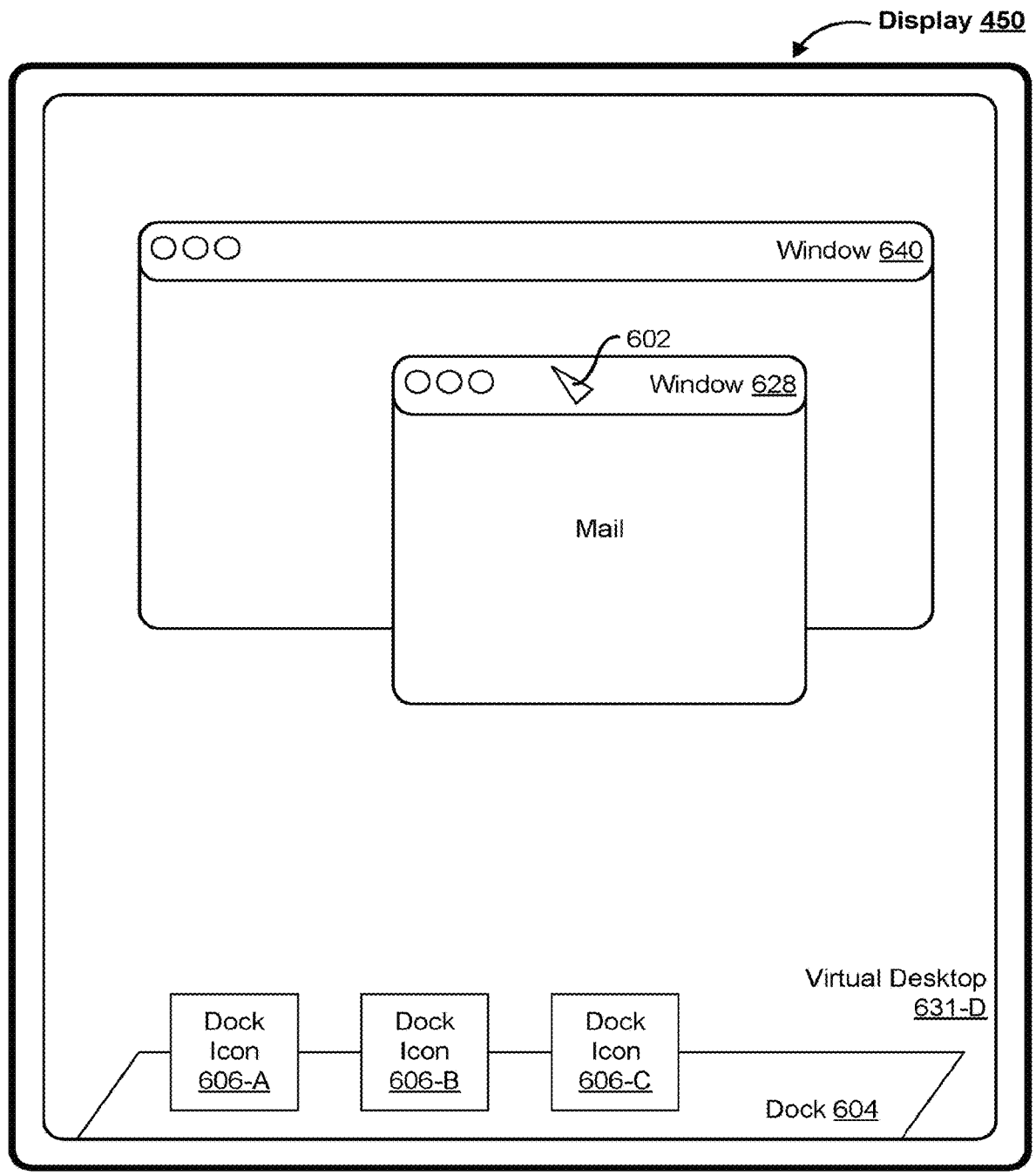

FIGS. 6M-6N illustrate a dragging gesture with focus selector 602, whereby thumbnail representation 638 is dragged toward graphical representation 636-D according to movement vector 641. As shown in FIG. 6N, existing virtual desktop 631-B has reached the time limit as indicated by the letters "NA" (e.g., not available) overlaid on graphical representation 636-B. In response to completion of the dragging gesture (e.g., up-click or release of thumbnail representation 638) while thumbnail representation 638 is over graphical representation 636-D as shown in FIG. 6N, window 628 is added to existing virtual desktop 631-D. Furthermore, in accordance some embodiments, in response to completion of the dragging gesture, existing virtual desktop 631-D is displayed as shown in FIG. 6O. As shown in FIG. 6O, virtual desktop 631-D is a non-tiled virtual desktop including newly added window 628 and previously added window 640.

Figure 6P:
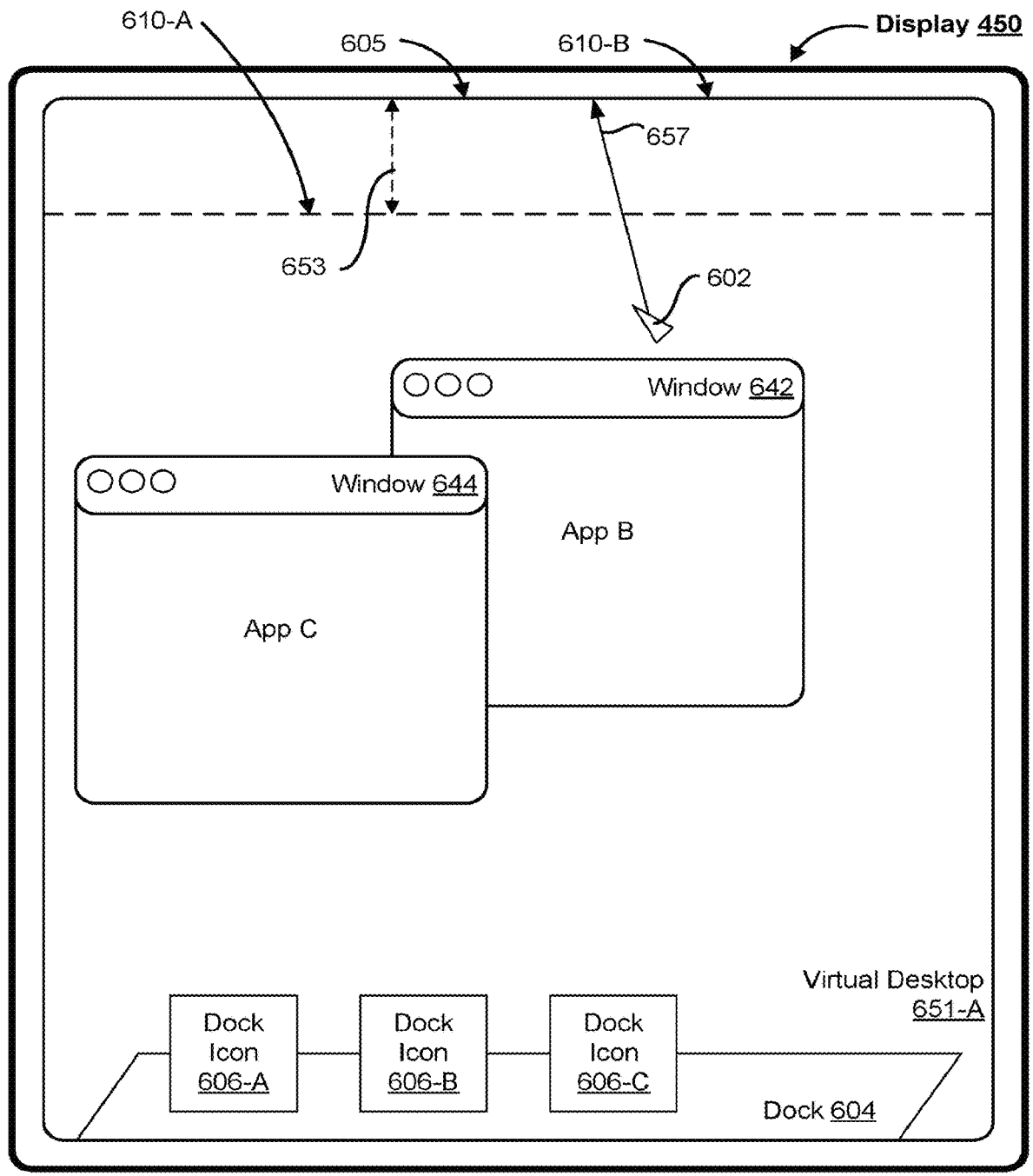

FIGS. 6P-6U illustrate a sequence in which a representation of a window is placed at a location within a virtual desktop configuration region that is associated with creating a non-tiled virtual desktop. As shown in FIGS. 6P-6U, the user interface is associated with a virtual desktop 651-A. In FIG. 6P, virtual desktop 651-A includes window 642 associated with Application B and window 644 associated with Application C. According to some embodiments, a first interaction threshold 610-A is located a distance 653 from first edge 605 of display 450 (e.g., the top edge). In some embodiments, a second interaction threshold 610-B is associated with first edge 605 of display 450 (e.g., the top edge).

Figure 6Q:
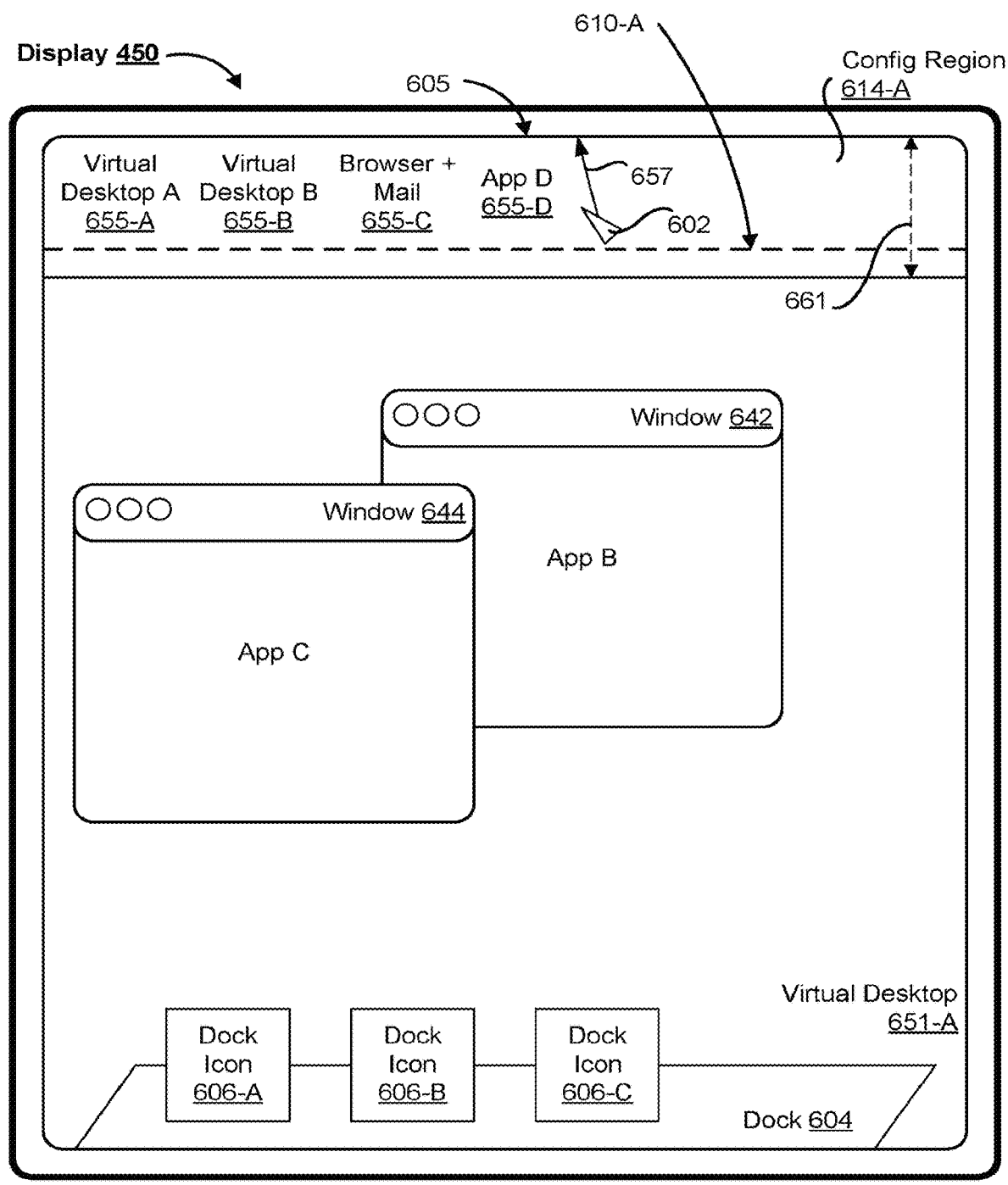
Figure 6R:
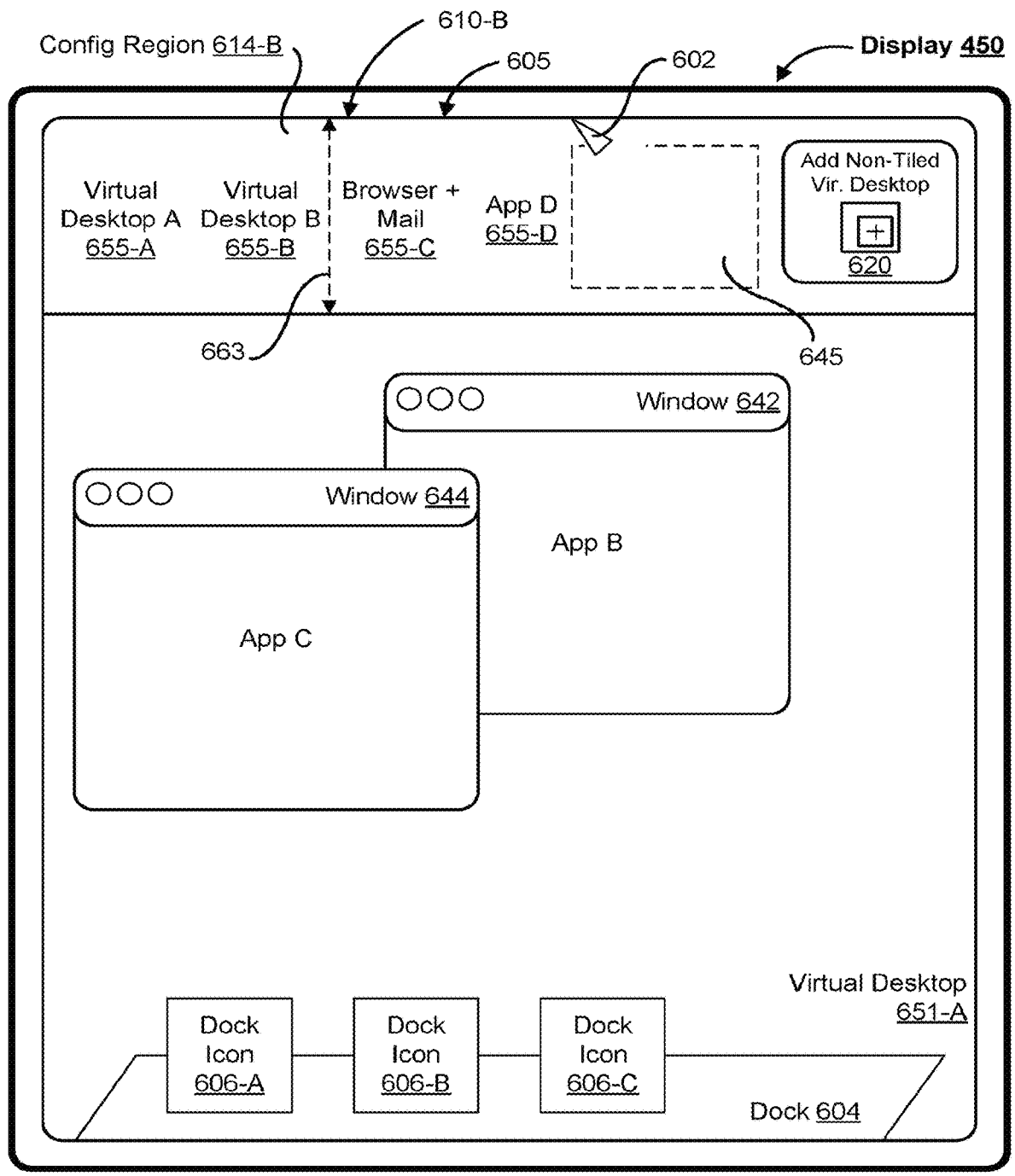

FIGS. 6P-6R illustrate movement of focus selector 602 toward first edge 605 according to movement vector 657. As shown in FIG. 6Q, a first representation 614-A of the virtual desktop configuration region is displayed adjacent to the first edge 605 of display 450 in response to focus selector 602 breaching first interaction threshold 610-A. In FIG. 6Q, the first representation 614-A of the virtual desktop configuration region has a first height 661 relative to first edge 605. According to some embodiments, as shown in FIG. 6Q, first representation 614-A of the virtual desktop configuration region includes text-based indicators 655-A, 655-B, 655-C, and 655-D corresponding to existing virtual desktops 651-A, 651-B, 651-C, and 651-D, respectively.

As shown in FIG. 6Q, text-based indicator 655-A is associated with the text label "Virtual Desktop A," which indicates that corresponding virtual desktop 651-A (e.g., shown in FIG. 6Q) is a non-tiled virtual desktop. Similarly, text-based indicator 655-B is associated with the text label "Virtual Desktop B," which indicates that corresponding virtual desktop 651-B is a non-tiled virtual desktop. Text-based indicator 655-C is associated with the text label "Browser+Mail," which indicates that corresponding virtual desktop 651-C is a tiled virtual desktop with two tiles. In some embodiments, the text label "Browser+Mail" for text-based indicator 655-C indicates the order or positioning of the tiles in corresponding virtual desktop 651-C. For example, a first tile associated with a Browser application occupies the left portion of the display space and second tile associated with Mail application occupies the right portion of the display space. Text-based indicator 655-D is associated with the text label "App D," which indicates that corresponding virtual desktop 651-D is a tiled virtual desktop with one tile (e.g., a full-screen or half-screen tile).

As shown in FIG. 6R, a second representation 614-B of the virtual desktop configuration region is displayed adjacent to the first edge 605 of display 450 in response to focus selector 602 contacting second interaction threshold 610-B associated with first edge 605. In FIG. 6R, the second representation 614-B of the virtual desktop configuration region has a second height 663 relative to first edge 605. In some embodiments, second height 663 is greater than first height 661 in FIG. 6Q. In some embodiments, second representation 614-B of the virtual desktop configuration region includes text-based indicators 655-A, 655-B, 655-C, and 655-D corresponding to existing virtual desktops 651-A, 651-B, 651-C, and 651-D, respectively. According to some embodiments, as shown in FIG. 6R, second representation 614-B of the virtual desktop configuration region also includes a hidden first drop target 645 associated with creating a new tiled virtual desktop and a second drop target 620 associated with creating a new non-tiled virtual desktop. As shown in FIG. 6R, hidden first drop target 645 occupies the space between the text-based indicator 655-D corresponding to existing virtual desktop 651-D and second drop target 620.

Figure 6S:
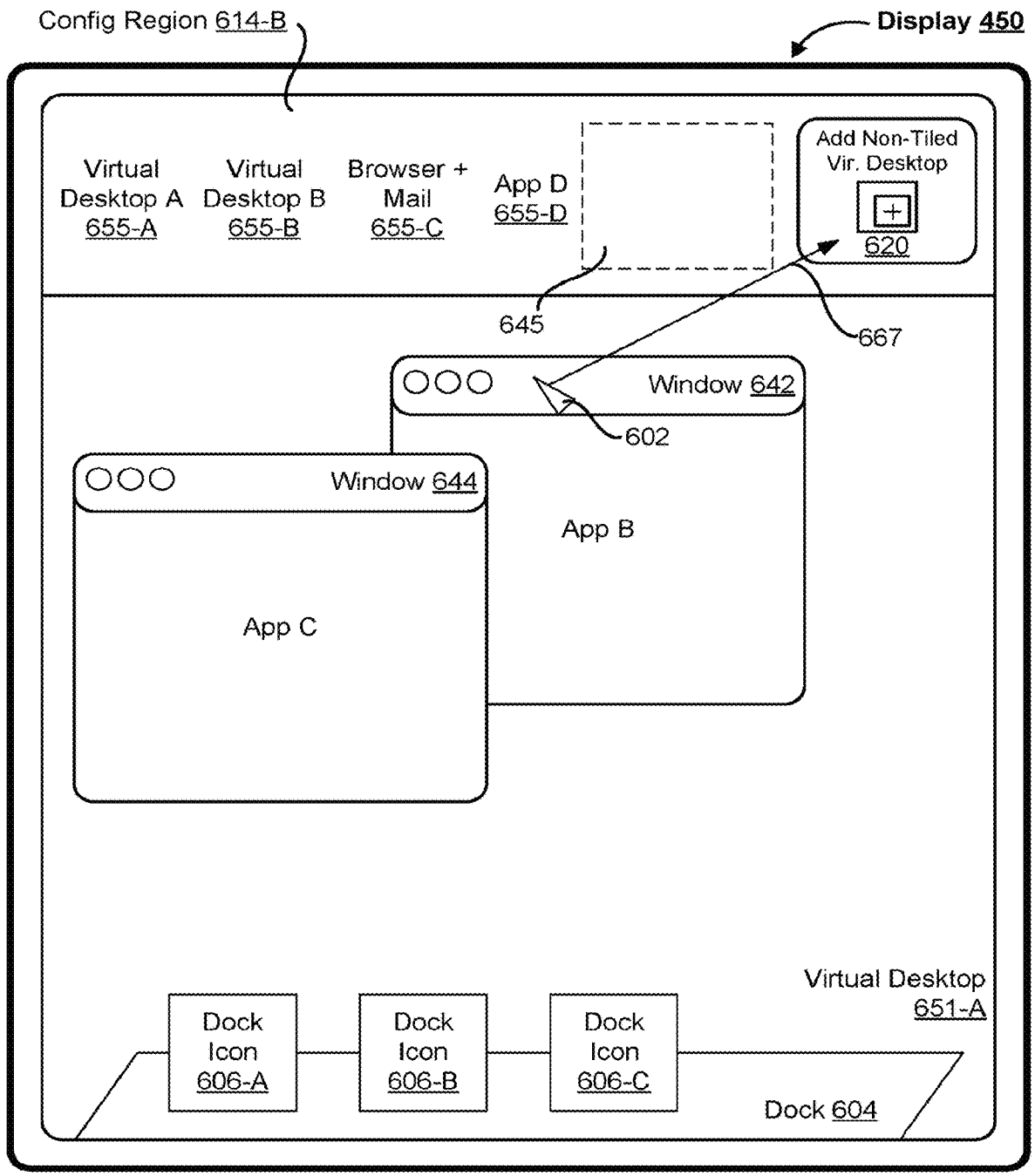
Figure 6T:
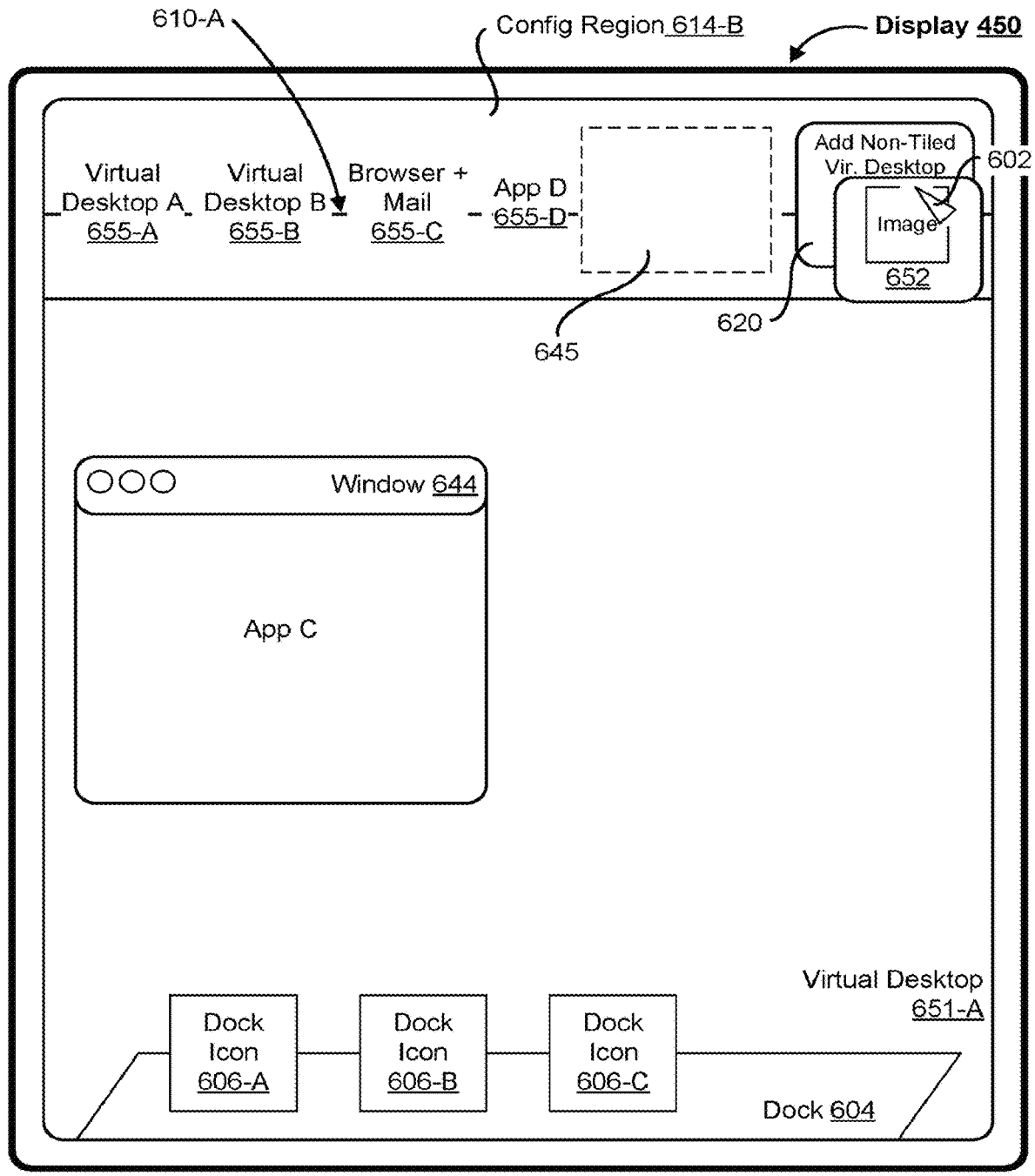

FIGS. 6S-6T illustrate a dragging gesture with focus selector 602, whereby window 642 is dragged toward second drop target 620 according to movement vector 667. As shown in FIG. 6T, window 642 is converted to a thumbnail representation 652 in response to window 642 breaching first interaction threshold 610-A.

Figure 6U:
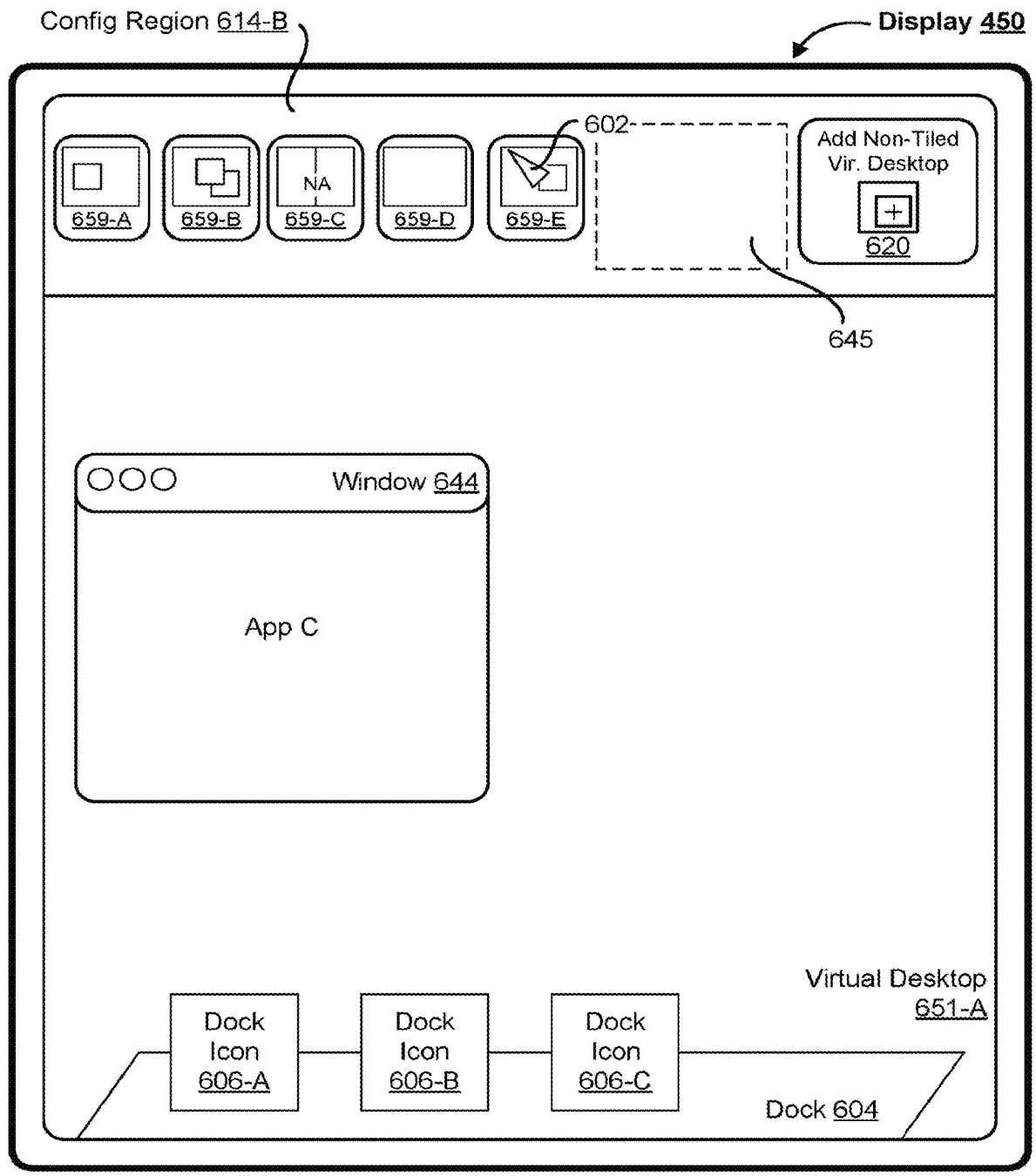

In response to completion of the dragging gesture (e.g., up-click or release of thumbnail representation 652) while thumbnail representation 652 is over second drop target 620, a non-tiled virtual desktop 651-E including window 642 is created. As shown in FIG. 6U, second representation 614-B of the virtual desktop configuration region includes a plurality of graphical representations 659-A, 659-B, 659-C, 659-D, and 659-E corresponding to existing virtual desktops 651-A, 661-B, 651-C, 651-D, and 651-E, respectively (e.g., thumbnail images of the virtual desktops). As a result of the creation of non-tiled virtual desktop 651-E, text-based indicators 655-A, 655-B, 655-C, and 655-D corresponding to existing virtual desktops 651-A, 651-B, 651-C, and 651-D are changed into graphical representations 659-A, 659-B, 659-C, and 659-D, respectively, as shown in FIG. 6U. For example, the graphical representations 659 are thumbnail images of the virtual desktops including any existing windows or tiles and their relative sizes and/or positions.

To that end, graphical representation 659-A indicates that existing virtual desktop 651-A is a non-tiled virtual desktop with one window (e.g., window 644 shown in FIG. 6U). Similarly, graphical representation 659-B indicates that existing virtual desktop 651-B is a non-tiled virtual desktop with two windows. Graphical representation 659-C indicates that existing virtual desktop 651-C is a tiled virtual desktop with two half-screen tiles. As shown in FIG. 6U, graphical representation 659-C further indicates that existing virtual desktop 659-C has reached a tile limit (e.g., 2 tiles) as shown by the letters "NA" (e.g., not available) overlaid on graphical representation 659-C. Graphical representation 659-D indicates that existing virtual desktop 651-D is a tiled virtual desktop with one full-screen tile. Graphical representation 659-E indicates that newly created virtual desktop 651-E is a non-tiled virtual desktop with one window (e.g., window 642).

Figure 6V:
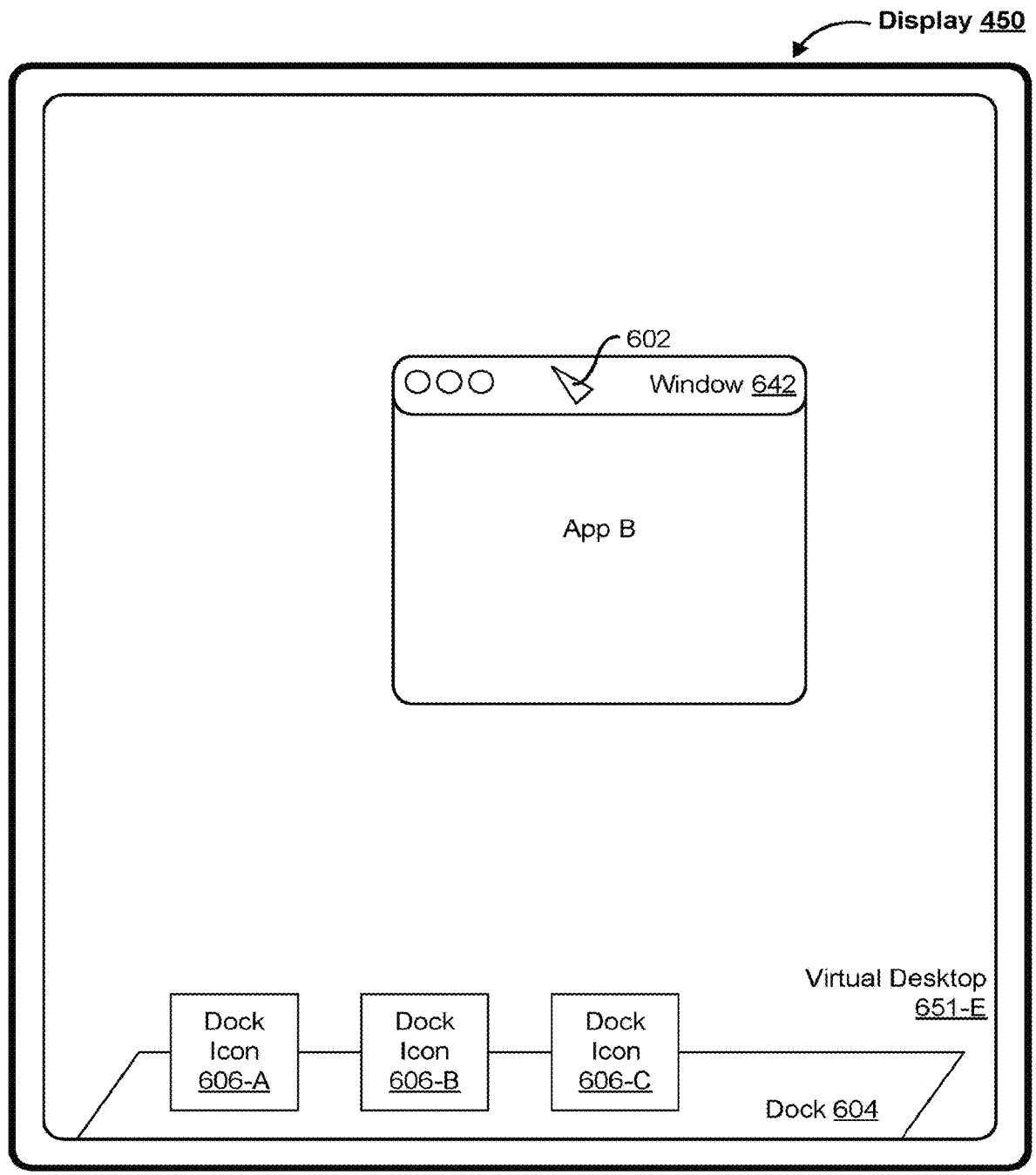

FIGS. 6U-6V illustrate a sequence in which the non-tiled virtual desktop created in FIGS. 6S-6T is displayed. FIG. 6U illustrates focus selector 602 at a location corresponding to the graphical representation 659-E corresponding to virtual desktop 651-E within second representation 614-B of the virtual desktop configuration region. For example, a user of the device (e.g., device 300, FIG. 3) selects the graphical representation 659-E by performing a single or double click while focus selector 602 is located over graphical representation 659-E. In some embodiments, in response to selection of graphical representation 659-E (e.g., with a single or double click) in FIG. 6U, non-tiled virtual desktop 651-E is displayed as shown in FIG. 6V, which includes window 642.

Figure 6W:
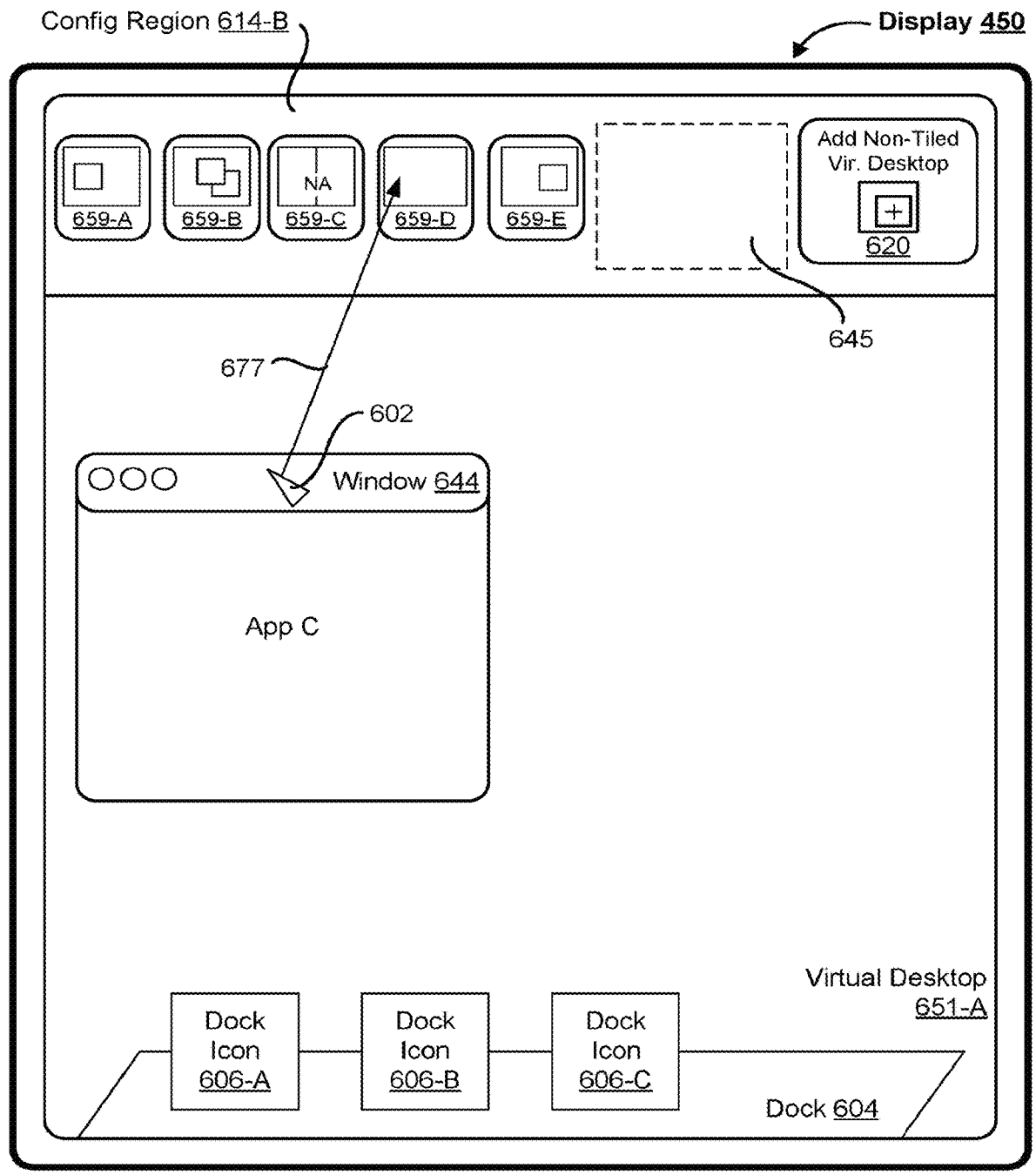
Figure 6X:
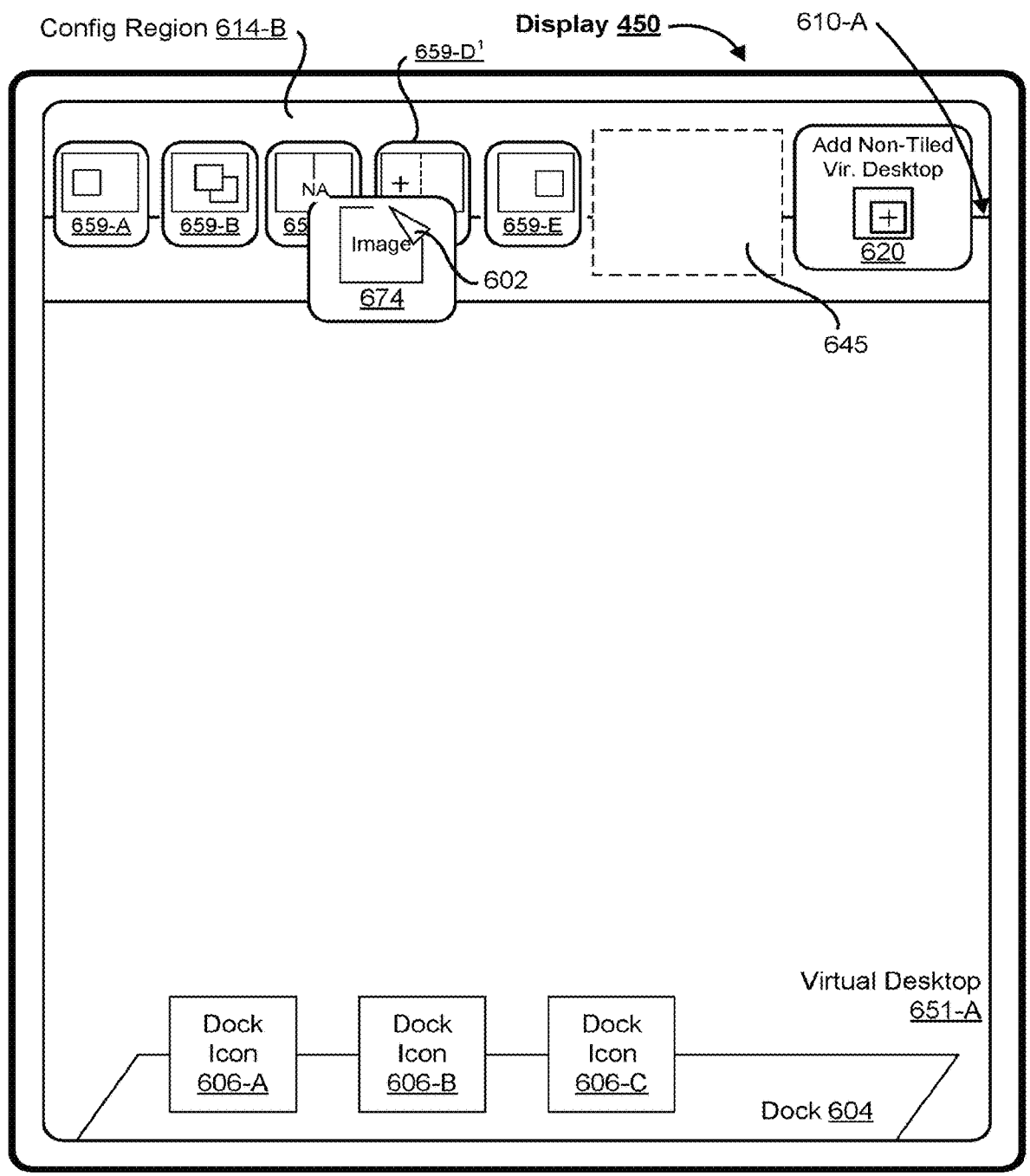
Figure 6Y:
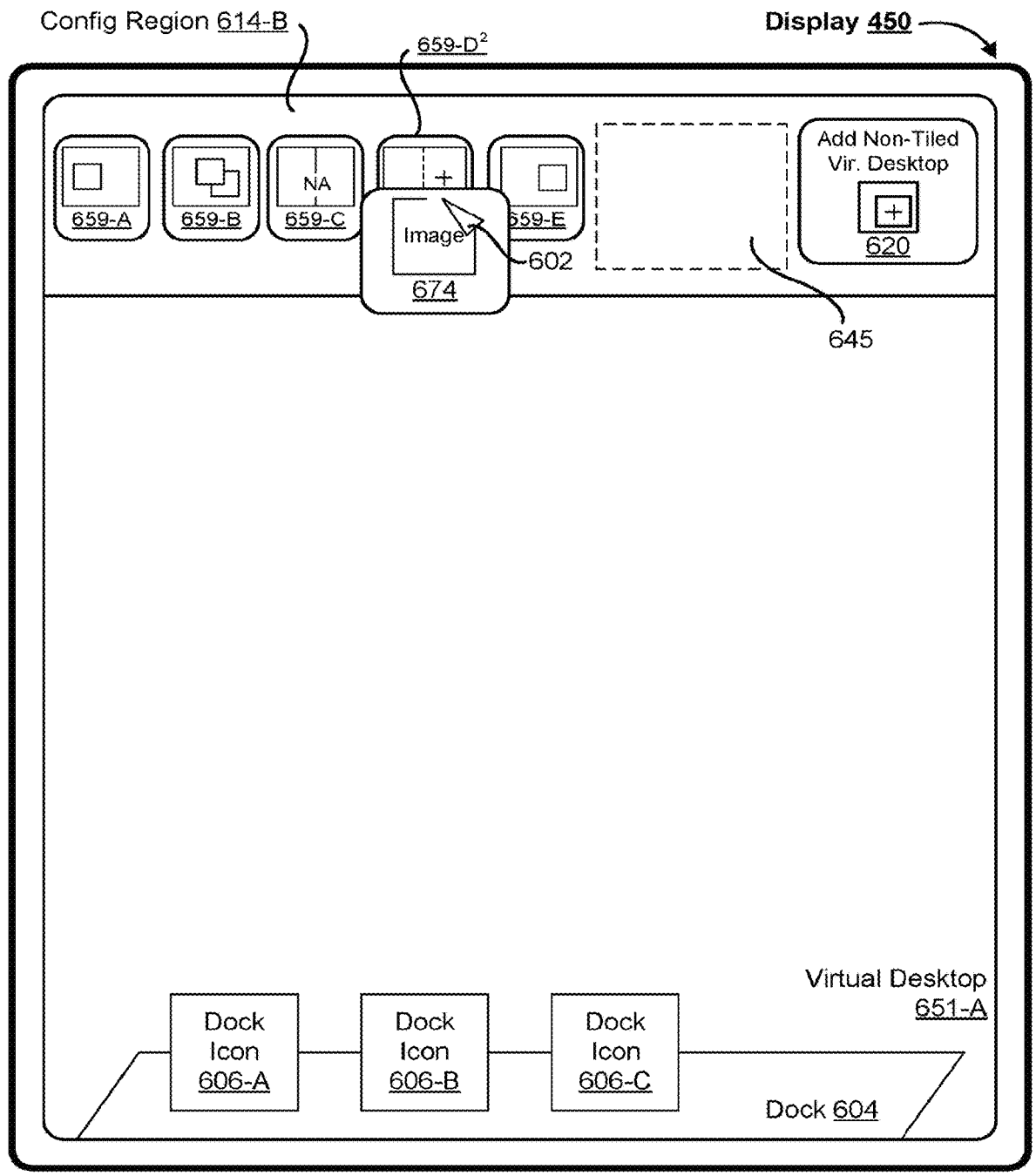

FIGS. 6W-6Y illustrate a sequence in which window 644 is added to existing tiled virtual desktop 651-D after the creation of virtual desktop 651-E in FIGS. 6S-6T. As shown in FIGS. 6W-6X, window 644 is dragged toward graphical representation 659-D with focus selector 602 according to movement vector 677. As shown in FIG. 6X, window 644 is converted to a thumbnail representation 674 (e.g., an image of window 644) in response to window 644 breaching first interaction threshold 610-A. In FIG. 6X, due to the positioning of focus selector 602 (and consequently thumbnail representation 674) over the left-side of graphical representation 659-D, graphical representation 659-D$^1$ indicates that the addition of window 644 to existing virtual desktop 651-D will cause the existing full-screen tile to be converted to a half-screen tile adjacent to the right-side of the display space and window 644 to be added as a half-screen tile adjacent to the left-side of the display space (e.g., in the position of the "+" sign).

FIGS. 6X-6Y illustrate a sequence in which thumbnail representation 674 is dragged from the left-side of graphical representation 659-D to the right-side of graphical representation 659-D. In FIG. 6Y, due to the positioning of focus selector 602 (and consequently thumbnail representation 674) over the right-side of graphical representation 659-D, graphical representation 659-D$^2$ indicates that the addition of window 644 to existing virtual desktop 651-D will cause the existing full-screen tile to be converted to a half-screen tile adjacent to the left-side of the display space and window 644 to be added as a half-screen tile adjacent to the right-side of the display space (e.g., in the position of the "+" sign).

Figure 6Z:
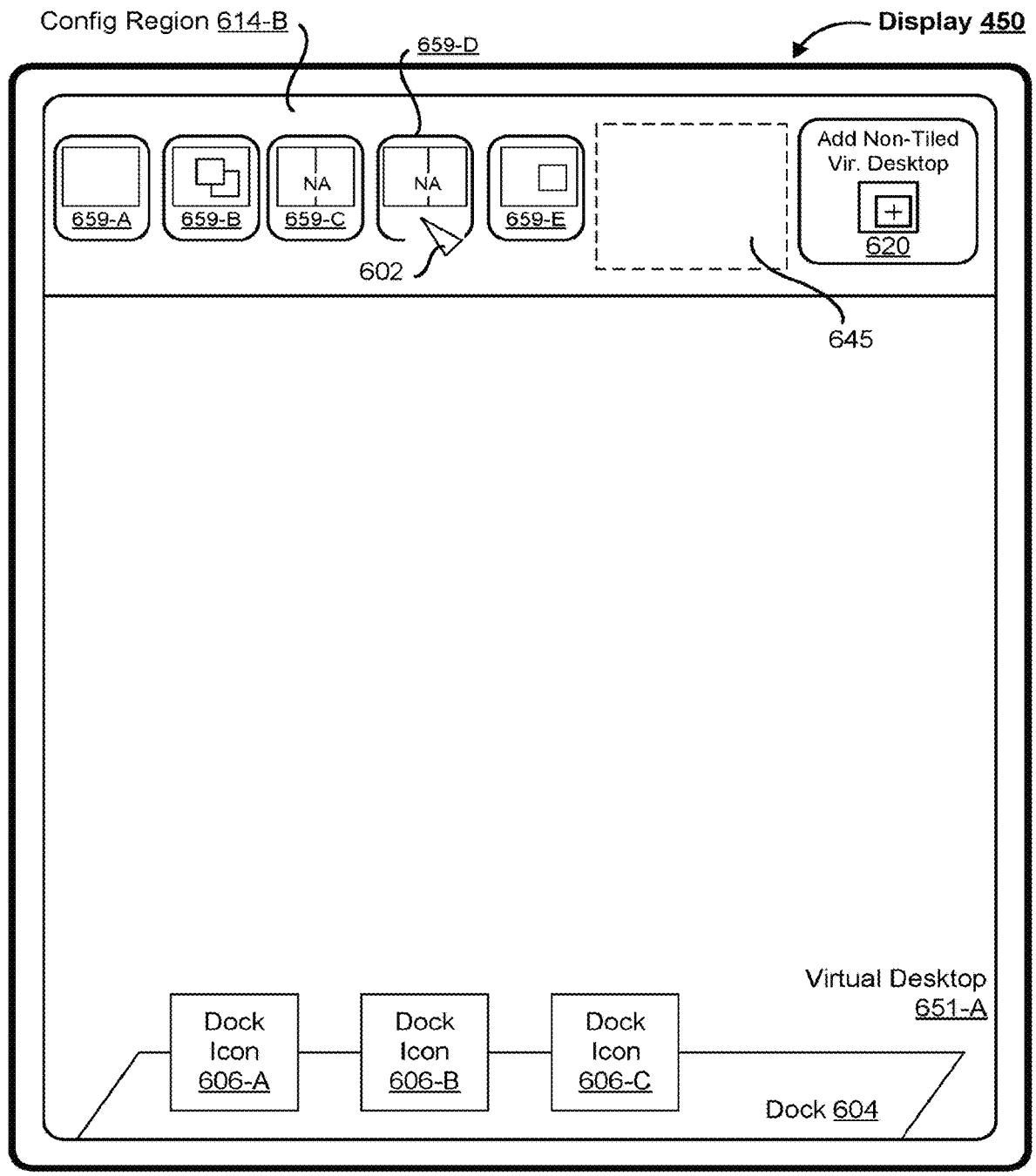
Figure 6A:
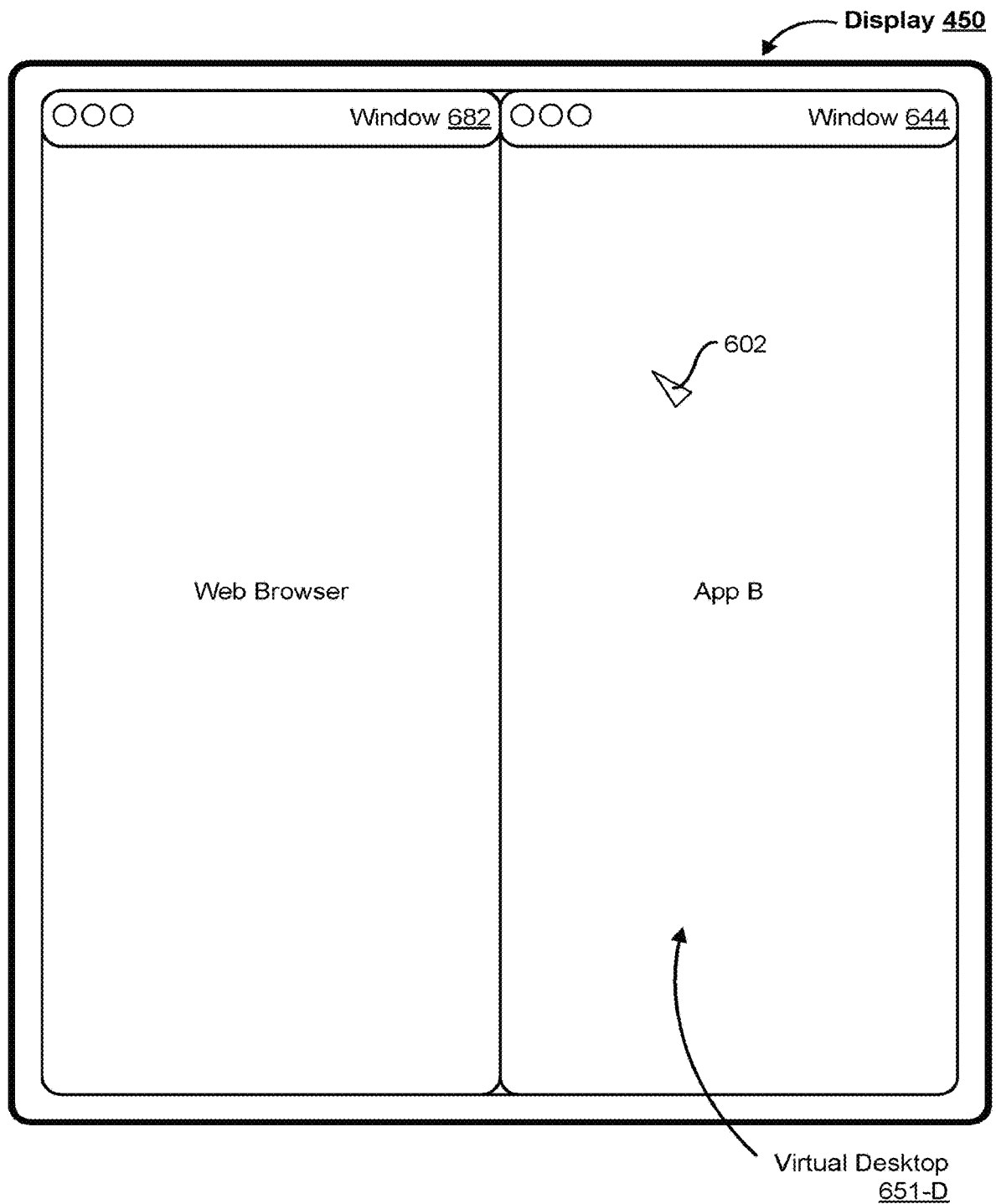

In response to completion of the dragging gesture (e.g., up-click or release of thumbnail representation 674) while thumbnail representation 674 is over graphical representation 659-D$^2$ in FIG. 6Y, window 644 is added to existing virtual desktop 651-D. As shown in FIG. 6Z, virtual desktop 651-D has reached the tile limit (e.g., 2 tiles) due to the addition of window 644) as indicated by the letters "NA" (e.g., not available) overlaid on graphical representation 659-D.

FIGS. 6Z-6AA illustrate a sequence in which existing tiled virtual desktop 651-D to which window 644 was added in FIGS. 6W-6Y is displayed. FIG. 6Z illustrates focus selector 602 at a location corresponding to graphical representation 659-D for virtual desktop 651-D within second representation 614-B of the virtual desktop configuration region. For example, a user of the device (e.g., device 300, FIG. 3) selects graphical representation 659-D for virtual desktop 651-D by performing a single or double click while focus selector 602 is located over graphical representation 659-D for virtual desktop 651-D. In some embodiments, in response to selection of graphical representation 659-D$^2$ for virtual desktop 651-D (e.g., with a single or double click) in FIG. 6Z, window 644 is shown as a half-screen tile adjacent to the right-side of the display space and previously added window 682 is shown as a half-screen tile adjacent to the left-side of the display space within tiled virtual desktop 651-D as shown in FIG. 6AA.

FIGS. 7A-7M illustrate exemplary user interfaces for tiling and manipulating tiled windows in accordance with some embodiments. The user interfaces in these figures are used to illustrate the processes described below, including the method in FIGS. 10A-10F.

As shown in FIG. 7A-7M, a device (e.g., device 300, FIG. 3) displays a user interface with a plurality of user-interface elements and a focus selector 702 on display 450. In some embodiments, focus selector 702 (sometimes also referred to as a "cursor") is controlled by a separate input device such as a mouse, stylus, motion sensing input device, speech command processing device, touchpad, or the like. In some embodiments, the user interface includes a dock 704 with a plurality of dock icons 706-A, 706-B, and 706-C.

Figure 7A:
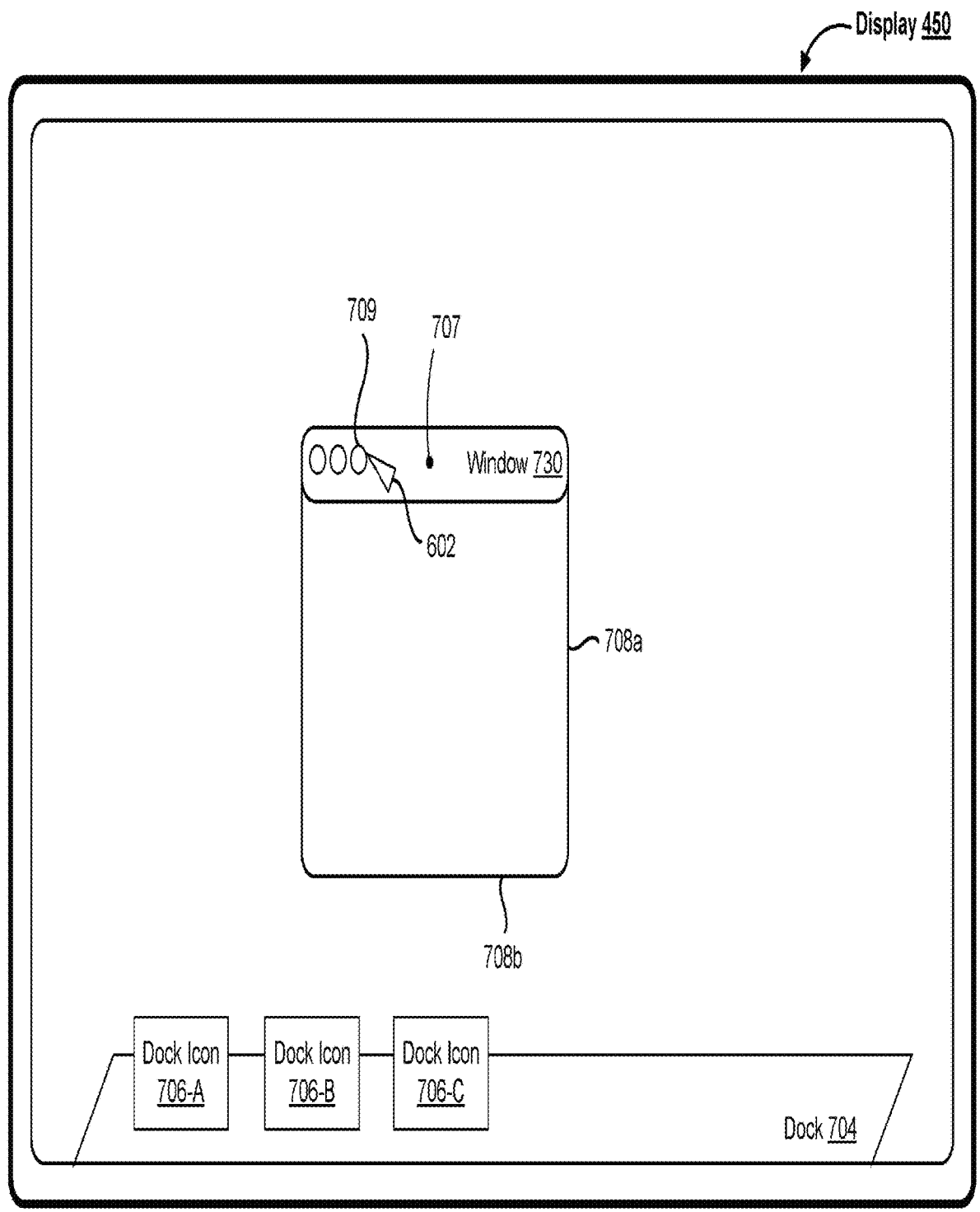
FIGS. 7A-7M illustrate exemplary user interfaces for tiling and manipulating tiled windows in accordance with some embodiments.
Figure 7B:
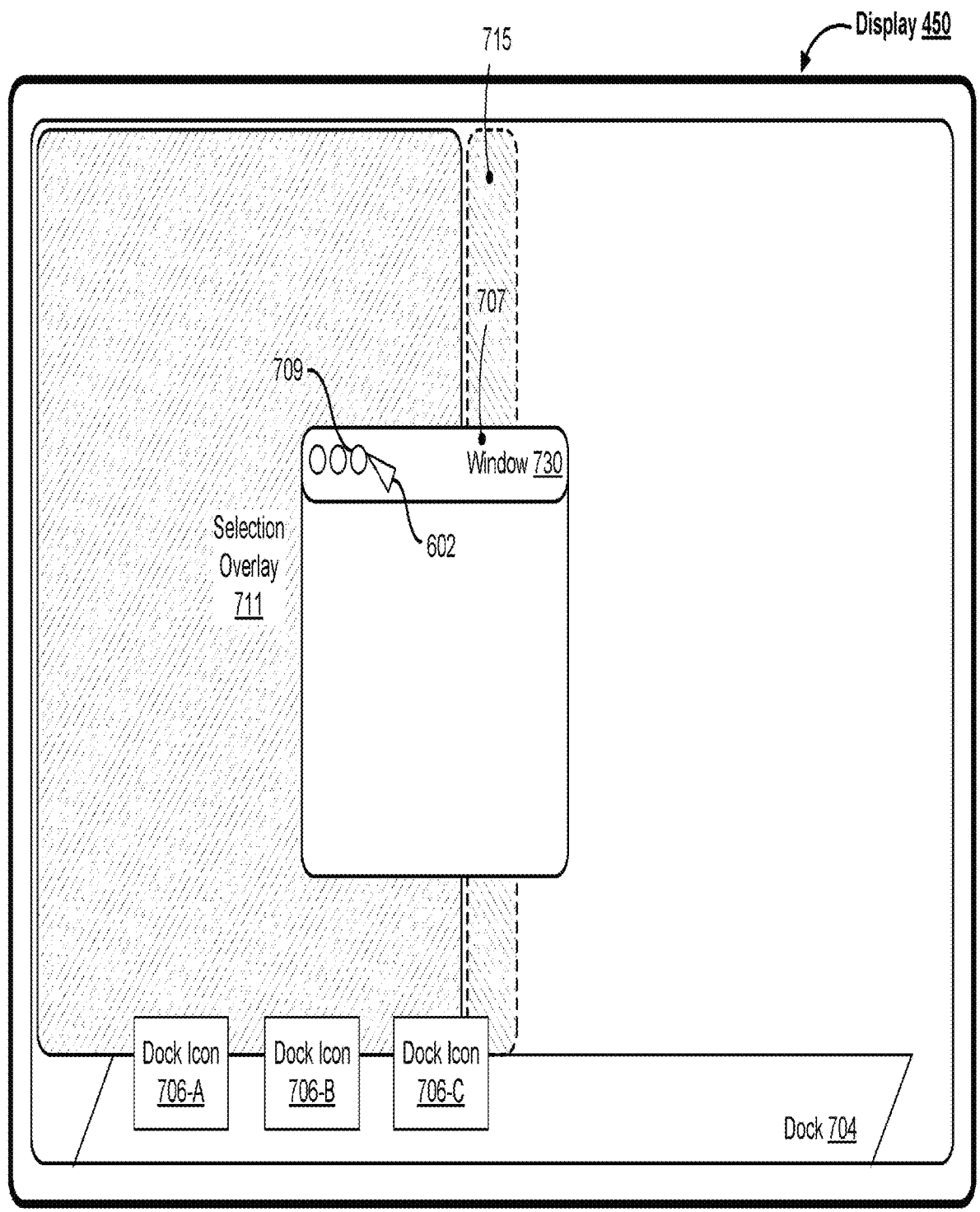

FIGS. 7A-7D illustrate a sequence in which a window is changed to a partial-screen tiled window in response to receiving a window movement input that includes a particular type of selection of a window tiling affordance (e.g., window tiling affordance 709). In FIGS. 7A-7B, the user interface includes a window 730. For example, window 730 is associated with a media application or a word processing application. In some embodiments, window 730 includes a chrome area and a window tiling affordance 709. For example, in some embodiments, as shown in FIGS. 7A-7B, chrome area includes a top chrome portion 707, a side chrome portion 708a, and a bottom chrome portion 708b. In some embodiments, window 730 can be dragged by top chrome portion 707. In some embodiments, top chrome portion 707 includes a set of controls, toggles, and/or affordances. In some embodiments, window 730 can be resized by selecting and dragging at least one of side chrome portion 708a and bottom chrome portion 708b.

Figure 7C:
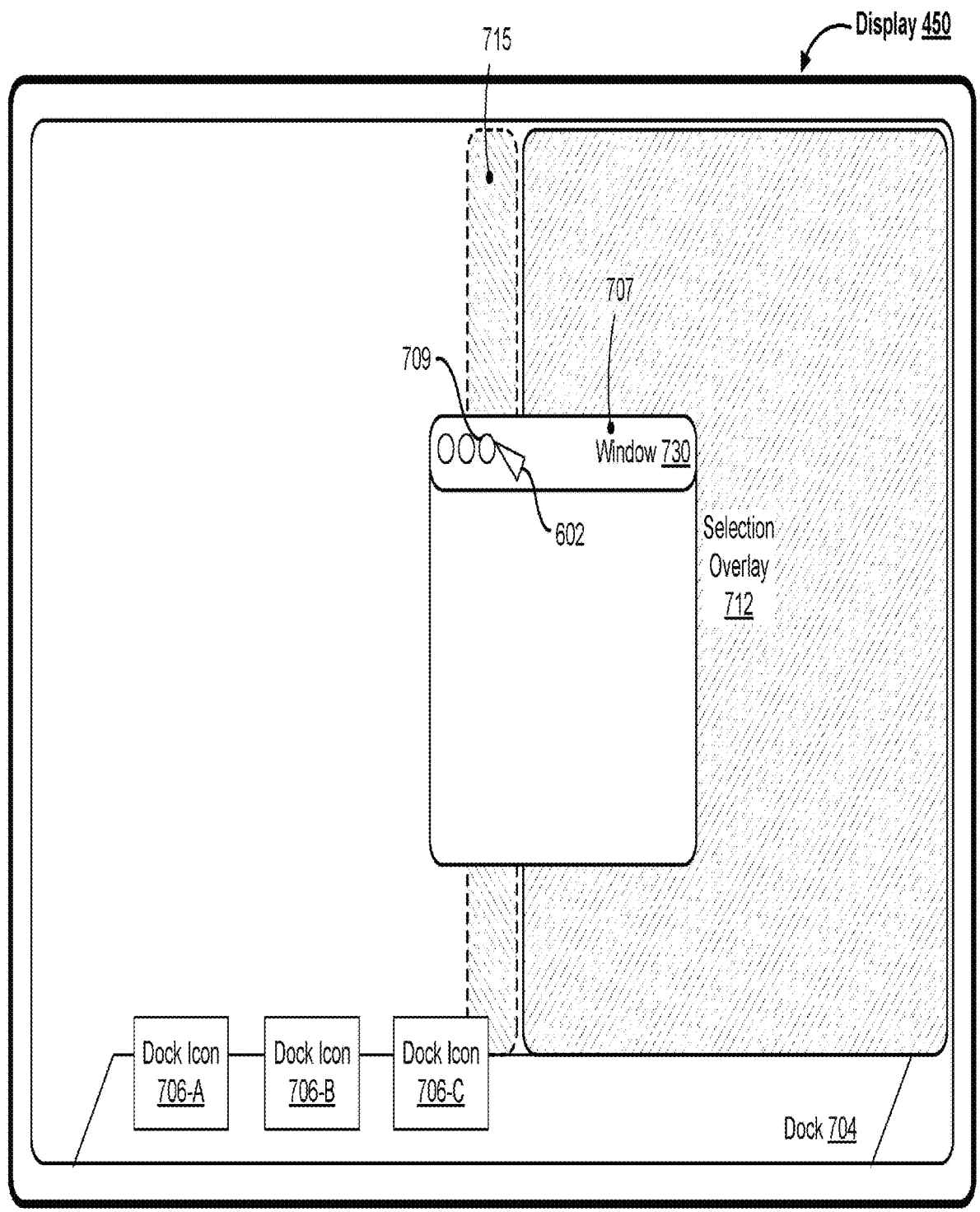

As shown in FIGS. 7A-7C, window tiling affordance 709 is included within top chrome portion 707. However, in various other embodiments, those of ordinary skill in the art will appreciate from the present disclosure that window tiling affordance 709 is included in various other locations of the chrome. In some embodiments, window tiling affordance 709 can be activated in accordance with a window movement input being either a first type of selection or a second type of selection.

Figure 7D:
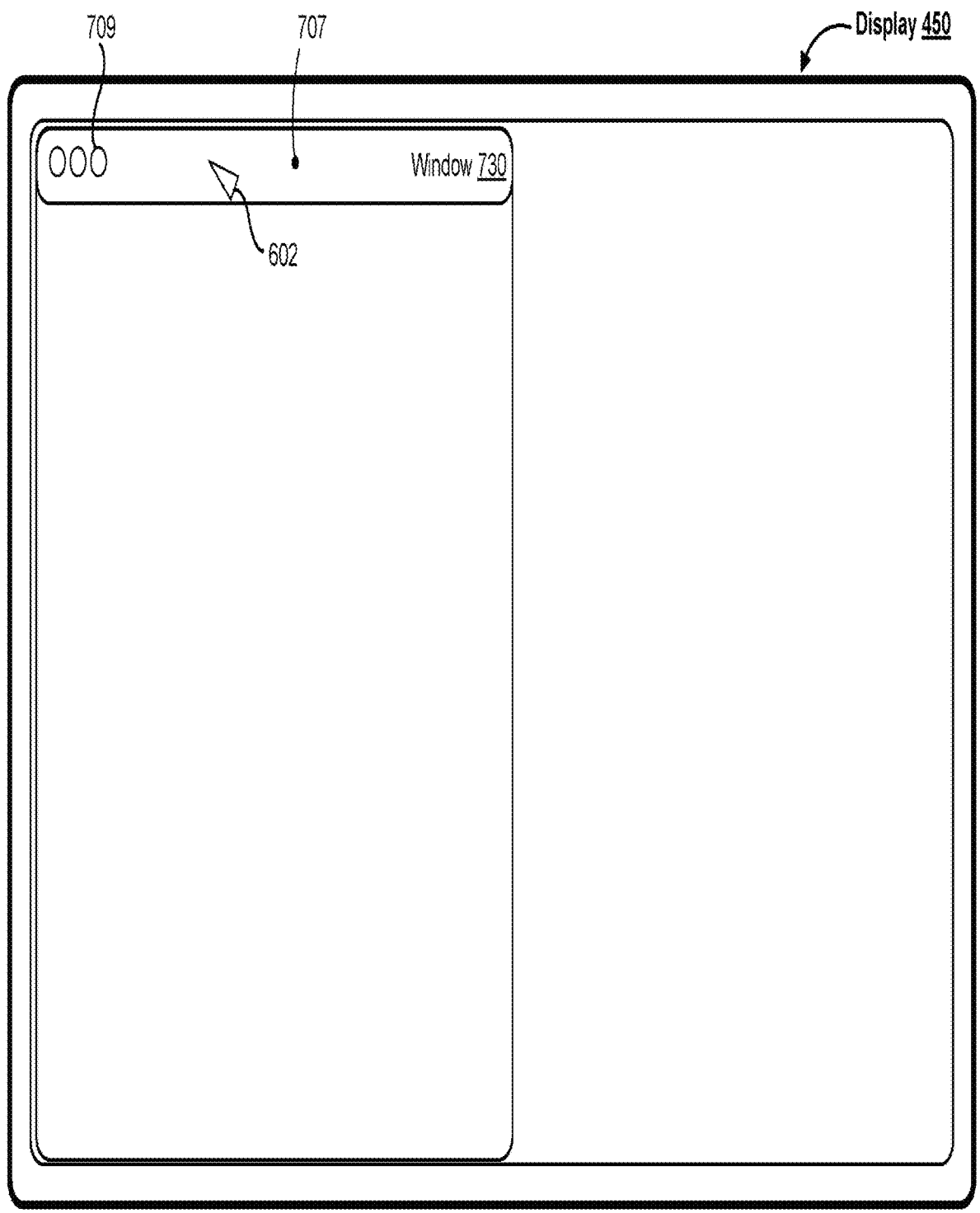
Figure 7E:
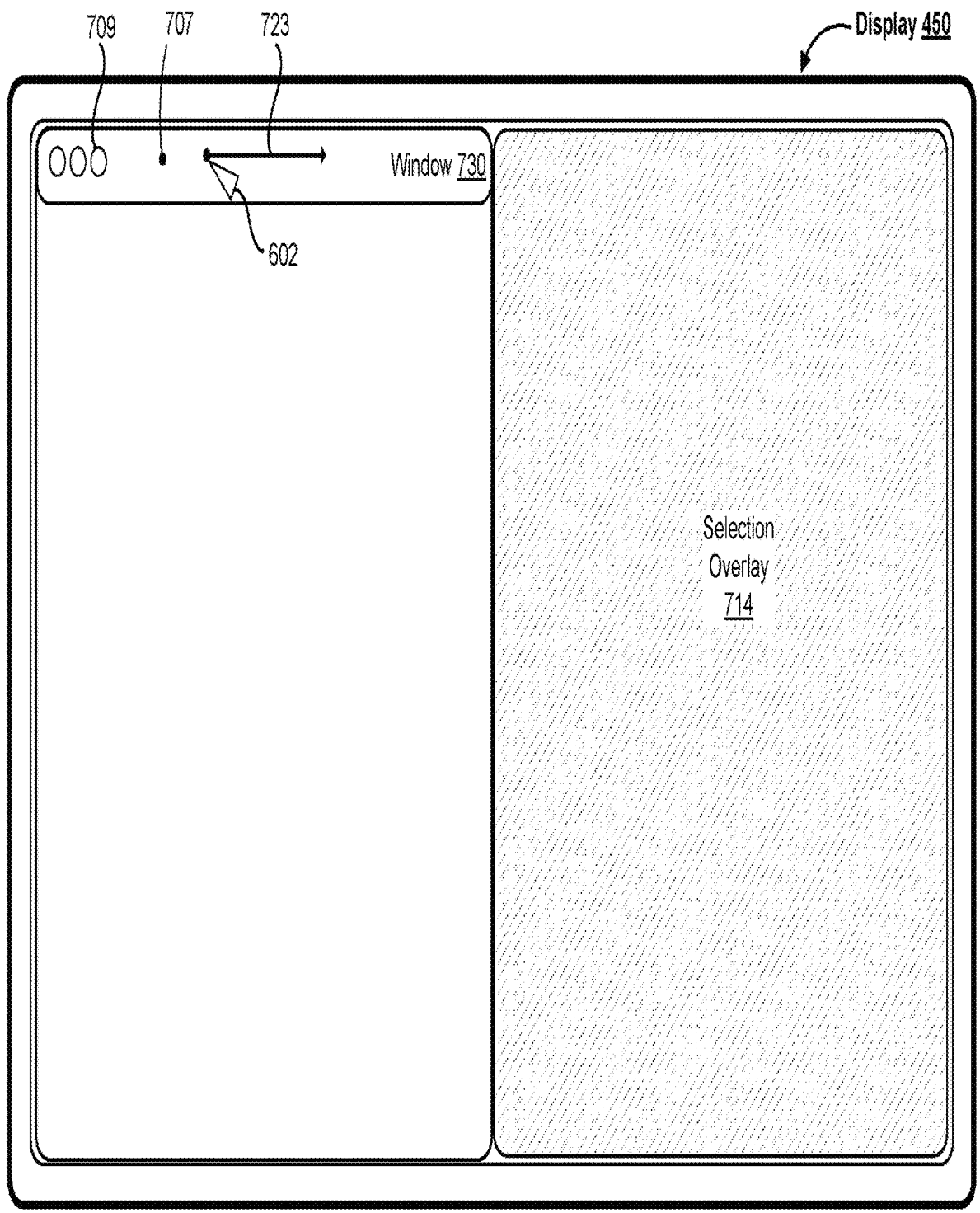
Figure 7F:
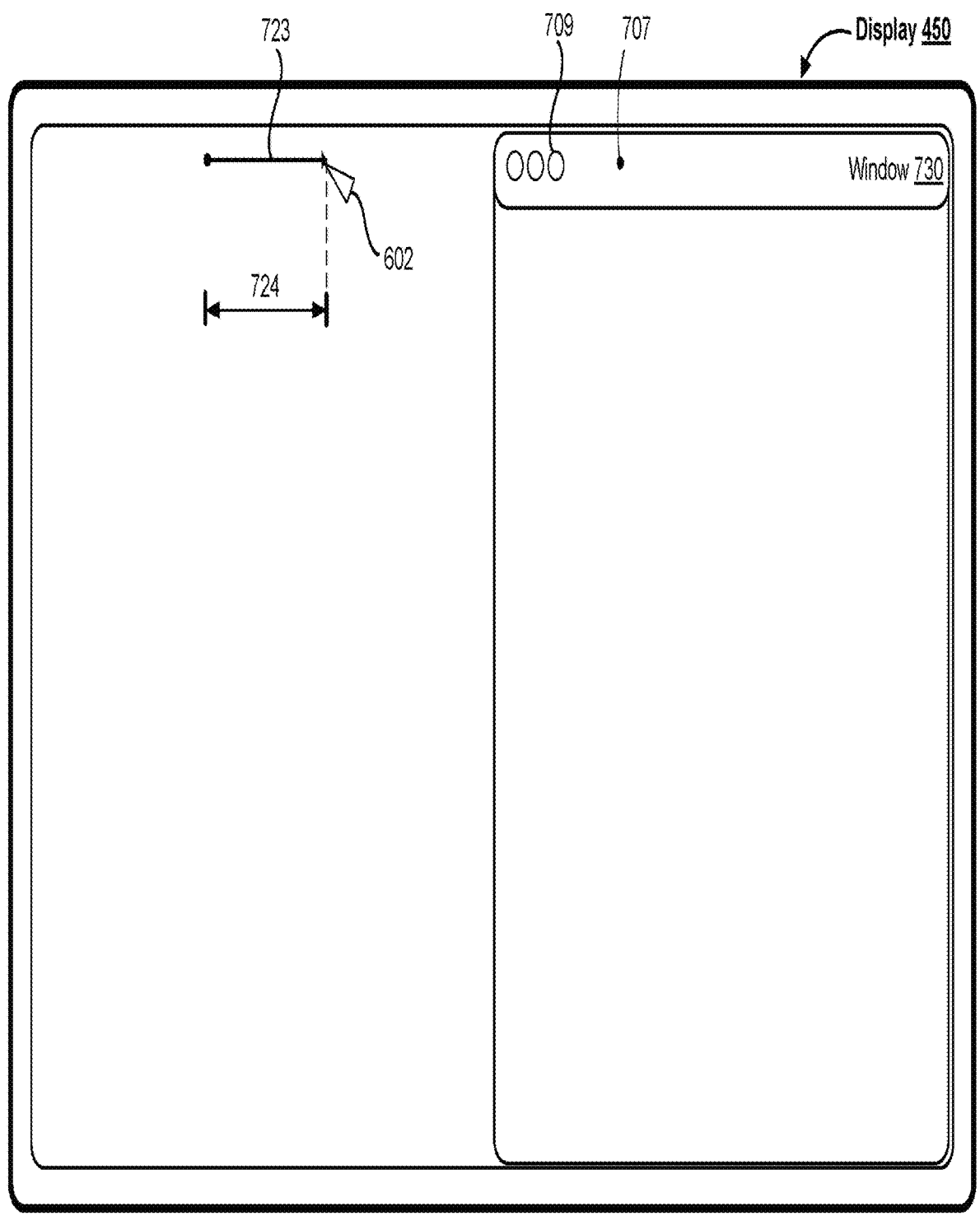
Figure 7G:
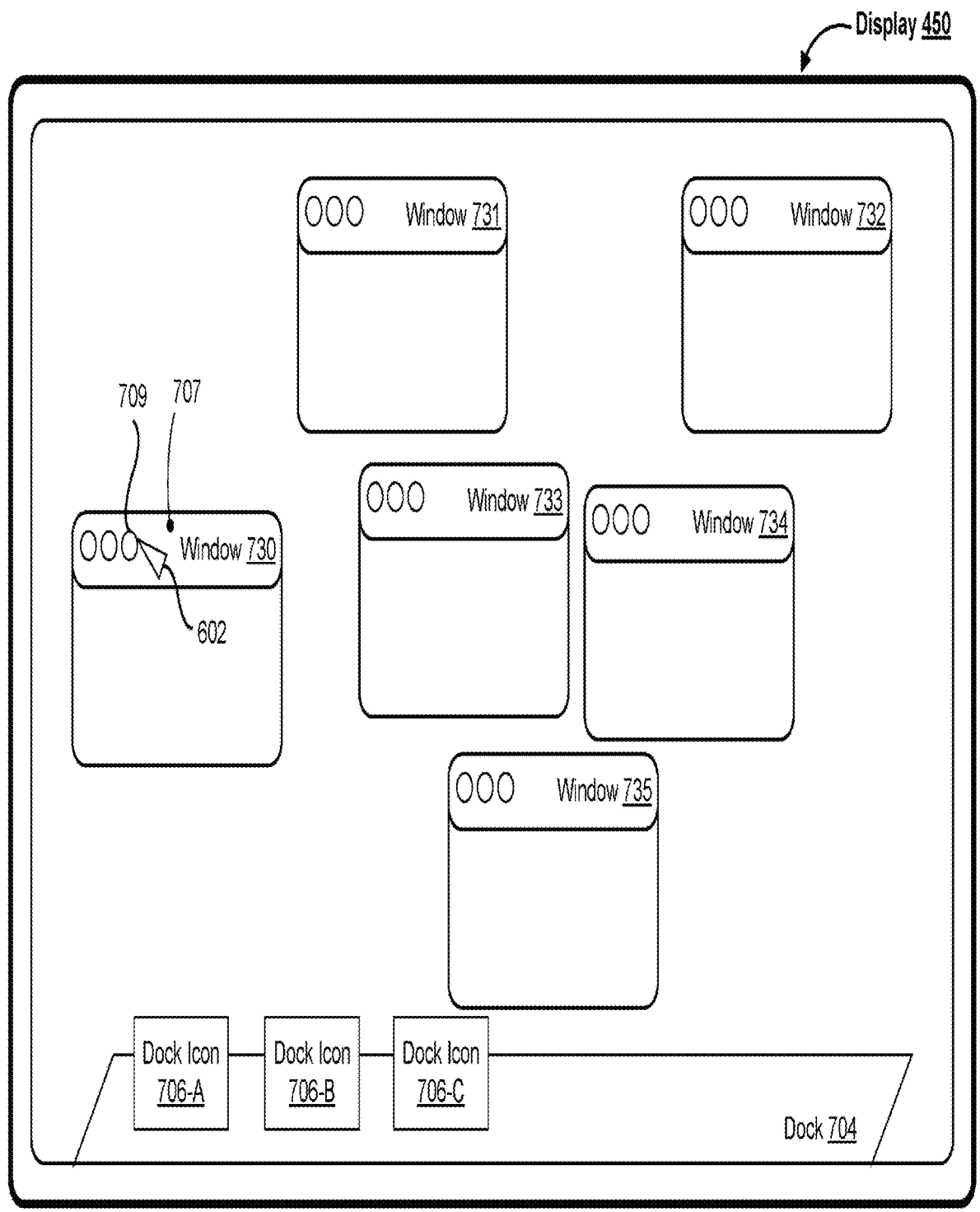
Figure 7H:
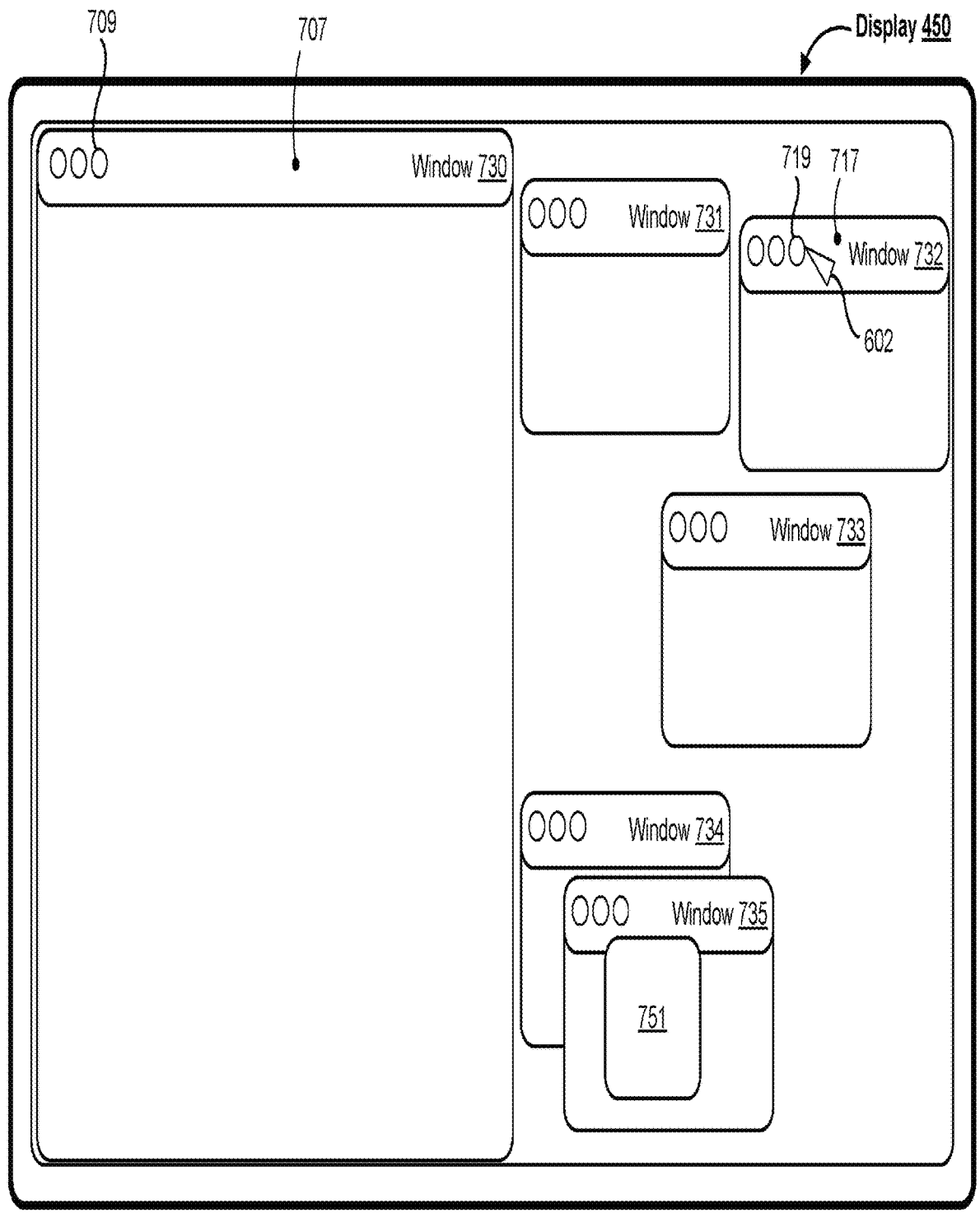
Figure 7I:
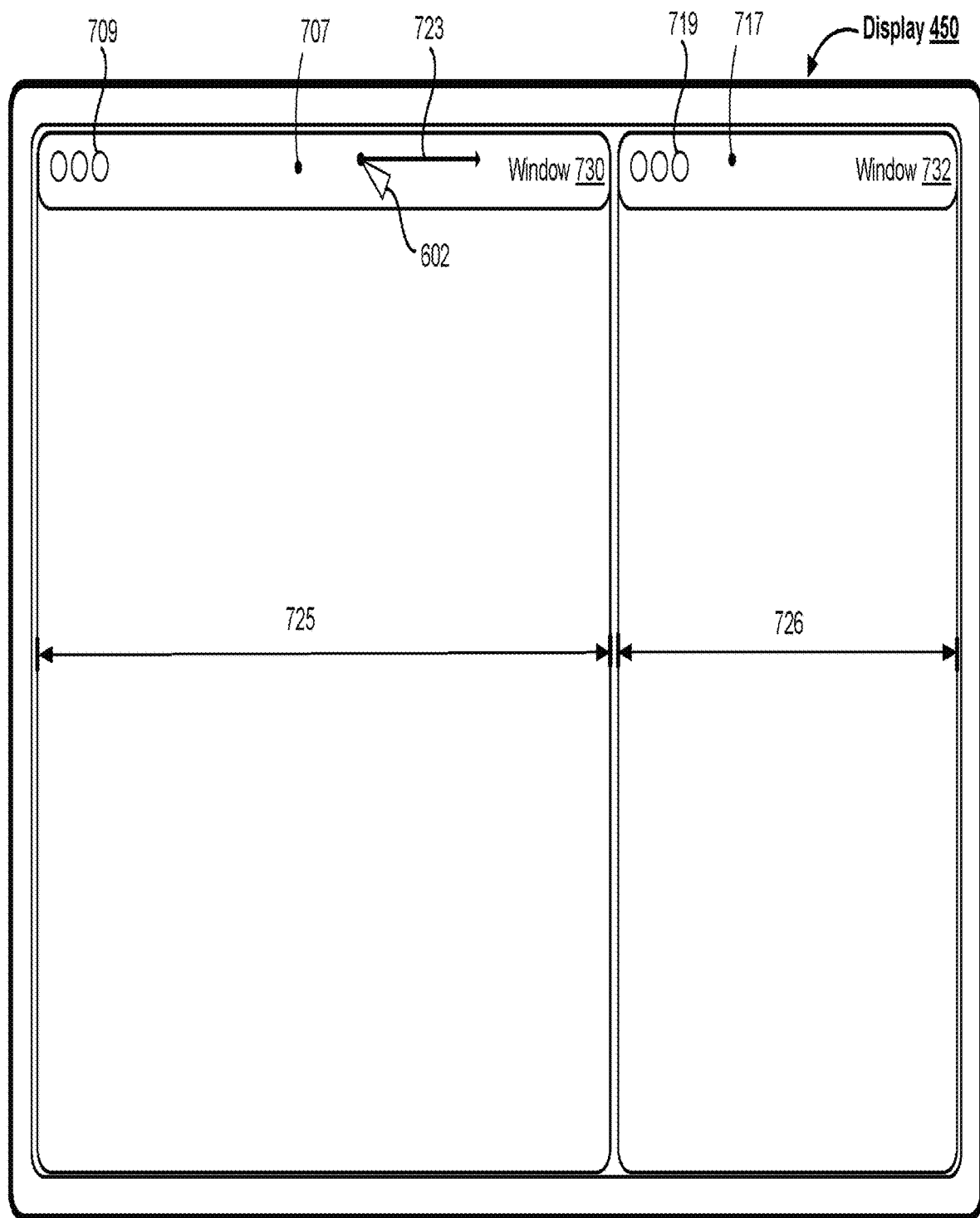
Figure 7J:
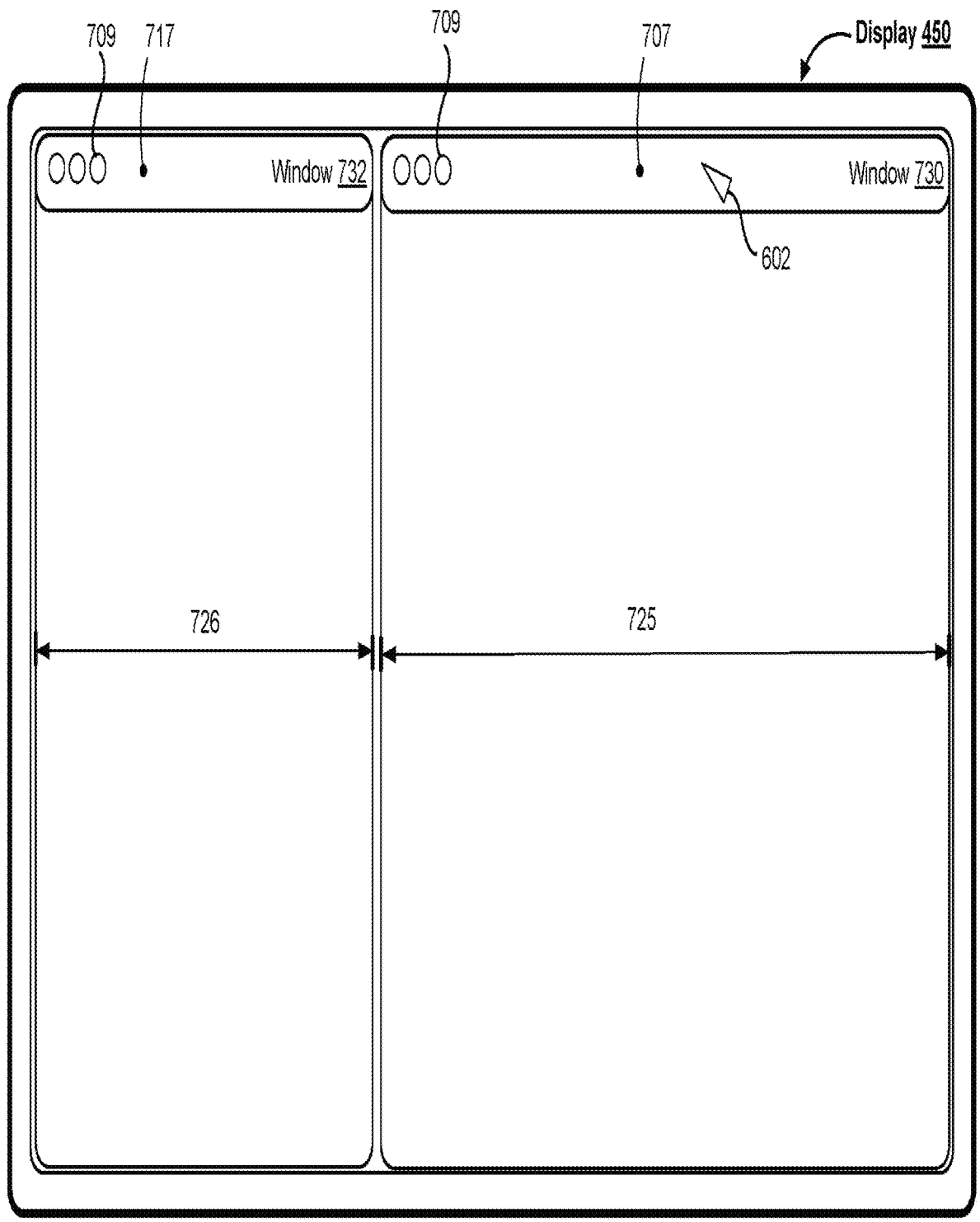
Figure 7K:
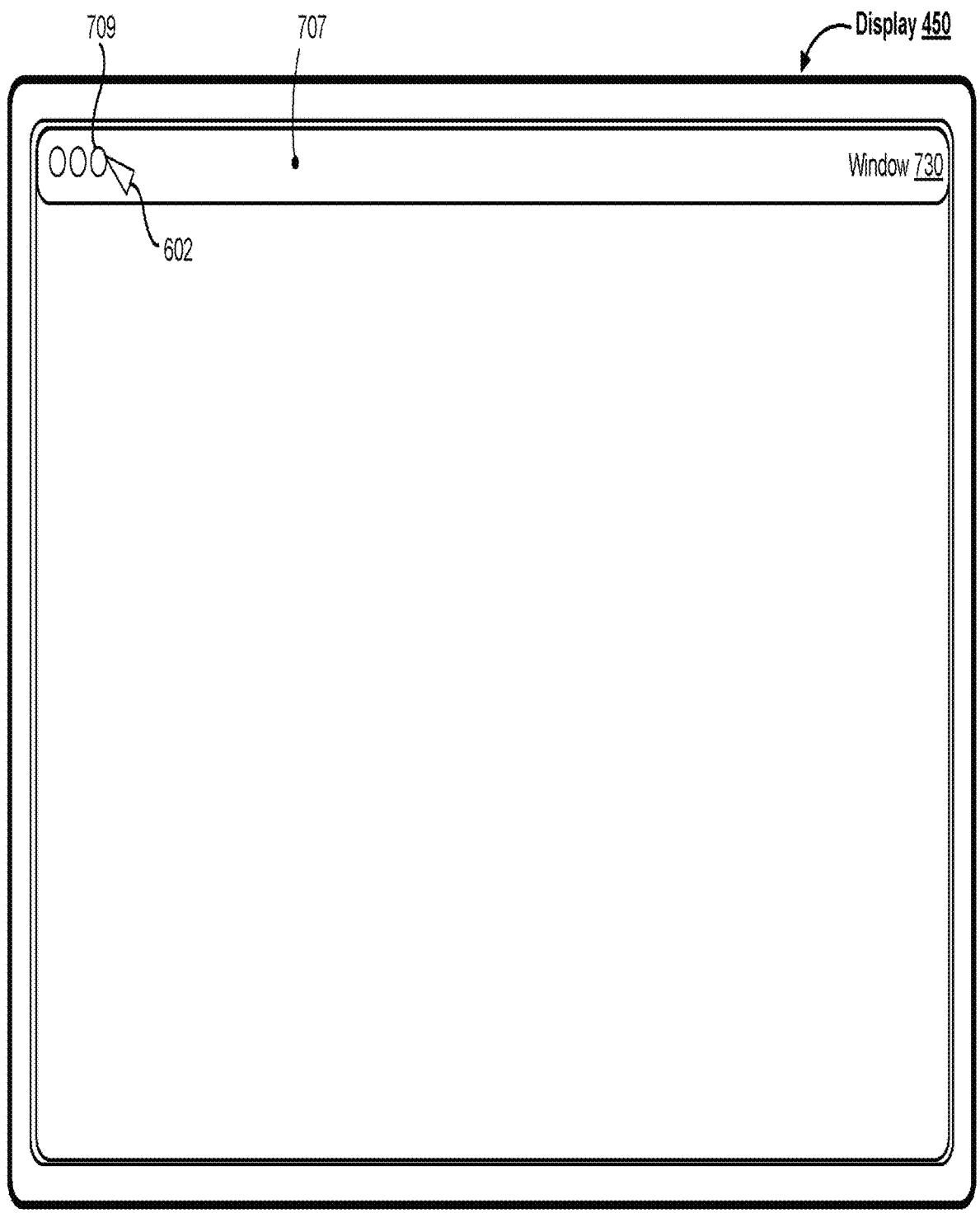

Window tiling affordance 709, when activated in accordance with the first type of selection input (e.g., a quick click and release), causes the display of window 730 to change to a full-screen tiled window (e.g., as shown in FIG. 7K) that occupies all of a window display area on display 450. For example, a full-screen tiled window occupies an area of the display that is designated for displaying application windows, which typically includes a majority of the area of the display but, in some embodiments, excludes one or more regions that are designated for displaying system information such as a status bar, a task bar, or a menu bar.

Window tiling affordance 709, when activated in accordance with the second type of selection input (e.g., click and hold for a duration threshold such as 0.05, 0.1, 0.2, 0.5, 1 second or any reasonable time threshold), causes the display of at least one selection overlay (e.g., selection overlay 711, and selection overlay 712) on a respective portion of display 450. In some embodiments, a selection overlay is at least partially transparent or translucent. For example, as shown in FIG. 7B, a first selection overlay 711 is displayed over the left portion of display 450 when the majority of window 730 occupies the portion of display 450 indicted by first selection overlay 711. Similarly, as shown in FIG. 7C, a second selection overlay 712 is displayed over the right portion of display 450 when the majority of window 730 occupies the portion of display 450 indicted by second selection overlay 712. Alternatively, in some embodiments, the second selection overlay 712 is displayed over the right portion of display 450 when focus selector 602 breaches the portion of display 450 indicted by second selection overlay 712. For example, when the tip of the focus selector 602 breaches the portion of display 450 indicted by second selection overlay 712. In another example, when a majority of the focus selector 602 breaches the portion of display 450 indicted by second selection overlay 712. In yet another example, when a leading edge of focus selector 602 relative to the direction of its movement breaches the portion of display 450 indicted by second selection overlay 712.

Each selection overlay provides a visible indication of where the tiled window will be displayed when the window movement input is completed. In other words, a respective portion of the screen display area is highlighted in order to indicate that the respective portion will be occupied by a corresponding partial-screen tiled window if the window movement input ends while the selection overlay is display. With reference to FIGS. 7B and 7D, and in continuation of the example, window 730 is changed to a partial-screen tiled window 730 that occupies the left portion of display 450 when the window movement input ends while the majority of window 730 is over first selection overlay 711.

With reference to FIG. 7D, in some embodiments, partial-screen tiled window 730 can be converted back to window 730 by dragging partial-screen tiled window 730 by the top chrome portion 707 towards the bottom portion of display 450. While the bottom portion of display is used as an example, those of ordinary skill in the art will appreciate from the present disclosure that a tiled-window can be dragged towards any portion of a display.

Referring again to FIGS. 7B and 7C, while the window movement input is not yet complete (e.g., with continuous holding of a mouse button or the like), window 730 can be dragged around display 450. In some embodiments, when the majority of window 730 is over a respective one of the first and second selection overlays 711, 712, window 730 is changed to a partial-screen tiled window that occupies a corresponding portion of display 450. As in FIG. 7B, display of first selection overlay 711 begins and display of second selection overlay 712 ceases when the majority of window 730 occupies the portion of display 450 indicted by first selection overlay 711. Similarly, as in FIG. 7C, display of first selection overlay 711 ceases and display of second selection overlay 712 begins when the majority of window 730 occupies the portion of display 450 indicted by second selection overlay 712. Alternatively, in some embodiments, the second selection overlay 712 is displayed over the right portion of display 450 when focus selector 602 breaches the portion of display 450 indicted by second selection overlay 712. For example, when the tip of the focus selector 602 breaches the portion of display 450 indicted by second selection overlay 712. In another example, when a majority of the focus selector 602 breaches the portion of display 450 indicted by second selection overlay 712. In yet another example, when a leading edge of focus selector 602 relative to the direction of its movement breaches the portion of display 450 indicted by second selection overlay 712.

In some embodiments, as shown in FIG. 7B, a dead-zone 715 is also included in response to the first type of selection input. Dead-zone 715 when selected by placing and resting window 730 in the approximate middle of display 450, during the window movement input, causes the window tiling process to be cancelled. As a result, responsiveness to the current window input movement is terminated and window 730 remains where it is until a subsequent window movement input is received. In some embodiments, dead-zone 715 is not visibly displayed. In some embodiments, dead-zone 715 is indicated as an overlay that is at least partially transparent or translucent.

FIGS. 7E-7F illustrate a sequence in which partial-screen tiled window 730 is repositioned from the left side of display 450 to the right side of display 450. In some embodiments, partial-screen tiled window 730 is repositioned when focus selector 602 is used to select top chrome portion 707 and drag partial-screen tiled window 730 to the right along direction indicator line 723. In various embodiments, direction indicator line 723 is not visible on display 450, and is provided in FIGS. 7E-7F primarily for the sake of illustration. In some embodiments, a selection overlay 714 is provided over the right portion (e.g., a particular destination) of display 450 in order to provide a visible indication of where the partial-screen tiled window 730 will be displayed when the drag is completed. As shown in FIG. 7F, in some embodiments, partial-screen tiled window 730 is moved to a final position on the right of display 450 once focus selector 602 has been used to drag partial-screen tiled window 730 a threshold distance 724 (less than the complete distance to the final position) along direction indicator line 723. Once partial-screen tiled window 730 has been dragged the threshold distance 724, partial-screen tiled window 730 is then automatically repositioned over the portion of the display indicated by selection overlay 714 without further window movement input. In other words, partial-screen tiled window 730 snaps to the final position once dragged the threshold distance 724, without further window movement input needed to manually position partial-screen tiled window 730 into the final position.

Moreover, while the example described with reference to FIGS. 7E-7F focuses on a left to right repositioning of a partial-screen tiled window, those of ordinary skill in the art will appreciate from the present disclosure that the aspects discussed are not limited to left to right repositioning. And that repositioning a partial-screen tiled window from first position to a second position is contemplated along one or more axis and in one or more directions.

FIGS. 7G-7J illustrate a sequence in which a window, displayed with a number of windows, is changed to a partial-screen tiled window in response to receiving a window movement input that includes a particular type of selection of a window tiling affordance (e.g., window tiling affordance 709). FIG. 7G is similar to and adapted from FIG. 7A. Elements common to FIGS. 7A and 7G include common reference numbers, and only the differences between FIGS. 7A and 7G are described herein for the sake of brevity. To that end, as a new example shown in FIG. 7G, display 450 includes five windows 731, 732, 733, 734, 735 in addition to window 730 shown in FIG. 7A. Moreover, while an additional five windows 731, 732, 733, 734, 735 are shown as an example, those of ordinary skill in the art will appreciate that any number of windows (less or more) may be included on display 450.

As described above, window tiling affordance 709, when activated in accordance with the second type of selection input, causes the display of at least one selection overlay, and ultimately results in converting display of window 730 to partial-screen tiled window 730 as shown in FIG. 7H (if the operation is not aborted by, for example, pressing an "Esc" key on a keyboard or the like). As shown in FIG. 7H, for example, partial-screen tiled window 730 is displayed on the left side of display 450. In some embodiments, representations at least some of the additional five windows are displayed on the remaining space or a different predefined portion of display 450. For example, windows 731, 732, 733 are displayed as reduced-scale representations, as compared to the corresponding display sizes of windows 731, 732, 733 prior to tiling window 730 in order to produce partial-screen tiled window 730. The reduced-scale representations of windows 731, 732, 733 are displayed on the right side of 450, and partial-screen tiled window 730 is displayed on the left side of 450. In some embodiments, at least some of the additional five windows 731, 732, 733, 734, 735 are overlapping. In some embodiments, at least some of the additional five windows 731, 732, 733, 734, 735 are non-overlapping. In some embodiments, windows that were previously overlapping are replaced with reduced-scale representations of the windows and are shifted to positions on the display that are selected so that the reduced-scale representations are non-overlapping. In some embodiments, at least some of the additional five windows 731, 732, 733, 734, 735 are displayed in one or more groups based on one or more application types associated with the additional five windows 731, 732, 733, 734, 735. In some embodiments, application windows are displayed in two or more groups, including a first group with two or more windows and a second group with two or more windows, wherein the windows are organized into groups based on common characteristics (e.g., windows that share a common application or application type are grouped together and are separated from windows that do not share the common application or application type).

Additionally, in some embodiments, some of the additional five windows 731, 732, 733, 734, 735 cannot be both converted to a corresponding partial-screen tile window and arranged in a structured arrangement with partial-screen tiled window 730. As such, in accordance with a determination that a window cannot be both converted to a corresponding partial-screen tile window and arranged in a structured arrangement with partial-screen tiled window 730, the window is displayed as non-selectable. For example, with reference to FIG. 7H, windows 734, 735 are non-selectable.

In turn, windows 734, 735 are displayed separately from windows 731, 732, 733 (which are selectable, as described below). In some embodiments, a graphical indicator 751 (e.g., a glyph or symbol) is displayed over and/or in association with windows 734, 735. Graphical indicator 751 signals to the viewer that windows 734, 735 are not available for selection so as to be both tiled and arranged in a structured arrangement with partial-screen tiled window 730.

In some embodiments, some of the additional five windows 731, 732, 733, 734, 735 are selectable so as to be tiled and arranged in a structured arrangement with partial-screen tiled window 730. For example, FIGS. 7H and 7I, illustrate the portion of the sequence in which window 732 is selected and converted to a partial-screen tiled window 732 that is arranged in a structured arrangement with partial-screen tiled window 730. To that end, similar to window 730, window 732 includes a top chrome portion 717 and a window tiling affordance 719 included in the top chrome portion 717. Window tiling affordance 719, when activated in accordance with the second type of selection input causes converting window 732 to partial-screen tiled window 732, which is displayed in a structured arrangement with partial-screen tiled window 730, as shown in FIG. 7I (if the operation is not aborted by, for example, pressing an "Esc" key on a keyboard). In some embodiments, tiling the selected window (e.g., window 732) includes displaying an animated transition where the reduced scale representation of the selected window enlarges to fill the portion of the display that is then occupied by the second partial-screen tiled window.

With reference to FIG. 7I, in some embodiments, partial-screen tiled windows 730, 732 have respective dimensions (e.g., widths or heights) that are different from one another. For example, partial-screen tiled window 730 has a width 725 that is great than a corresponding width 726 of partial-screen tiled window 732. In some embodiments, the different dimensions of two or more partial-screen tiled windows in a structured arrangement are determined by at least one of the application type of each, a display size of one or more of the corresponding windows prior to tiling, and one or more display setting preferences.

With reference to FIGS. 7I and 7J, in some embodiments, the relative positions of partial-screen tiled windows 730, 732 can be exchanged when one partial-screen tiled window is dragged towards the other. For example, partial-screen tiled windows 730, 732 exchange positions with one another when focus selector 602 is used to select top chrome portion 707 and drag partial-screen tiled window 730 toward the partial-screen tiled window 732. Similarly, partial-screen tiled windows 730, 732 exchange positions with one another when focus selector 602 is used to select top chrome portion 717 and drag partial-screen tiled window 732 toward the partial-screen tiled window 730.

Figure 7L:
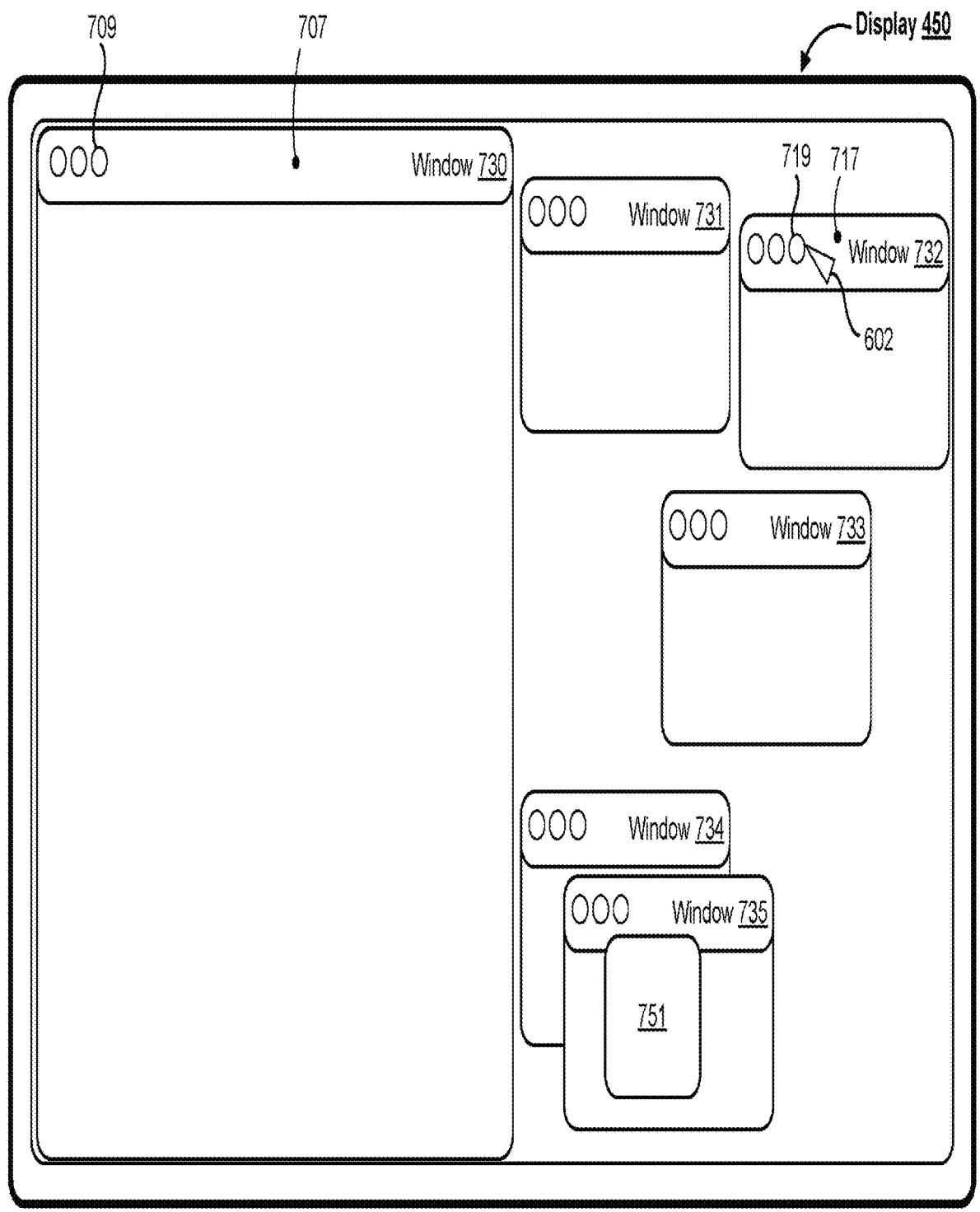
Figure 7M:
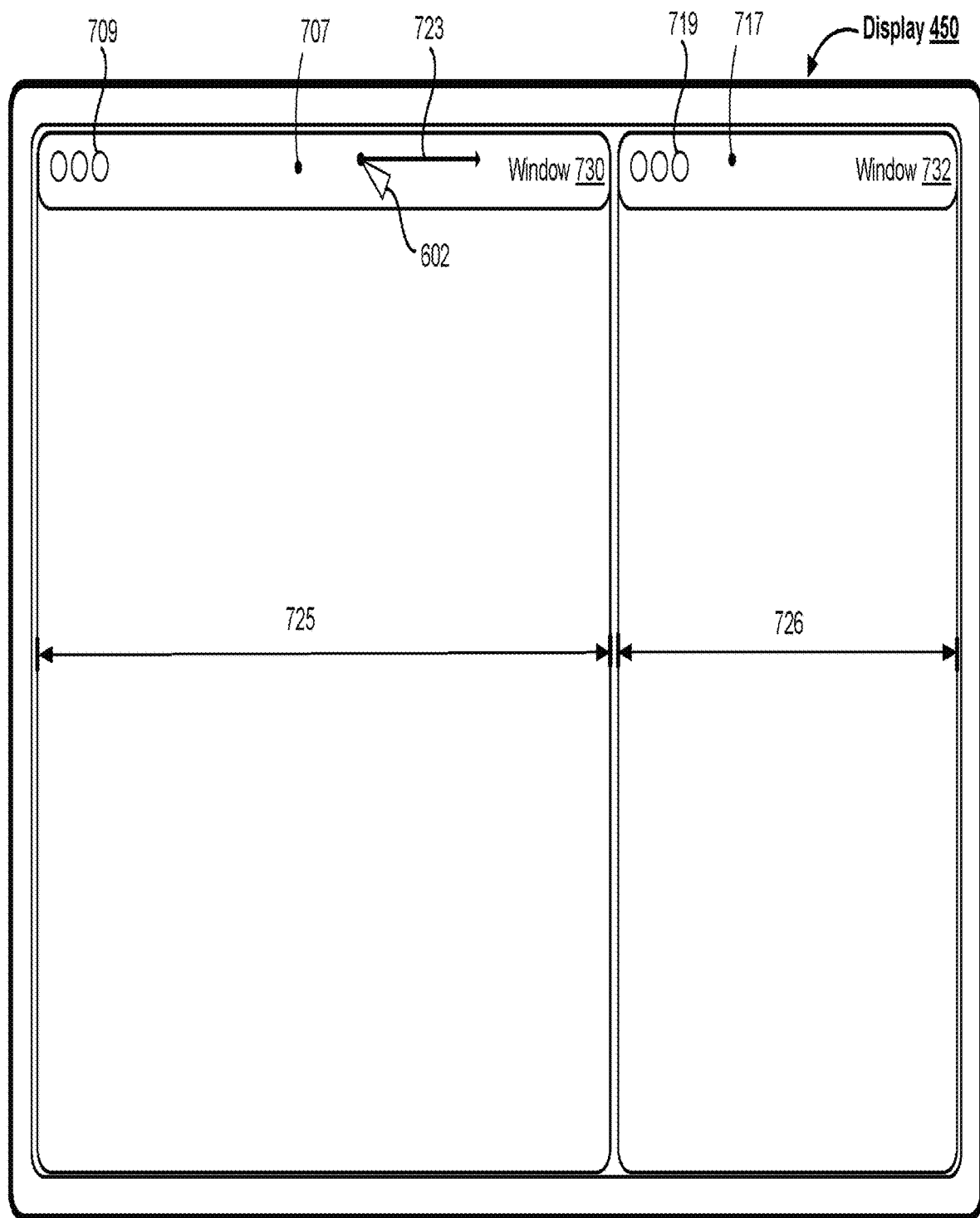
Figure 8B:
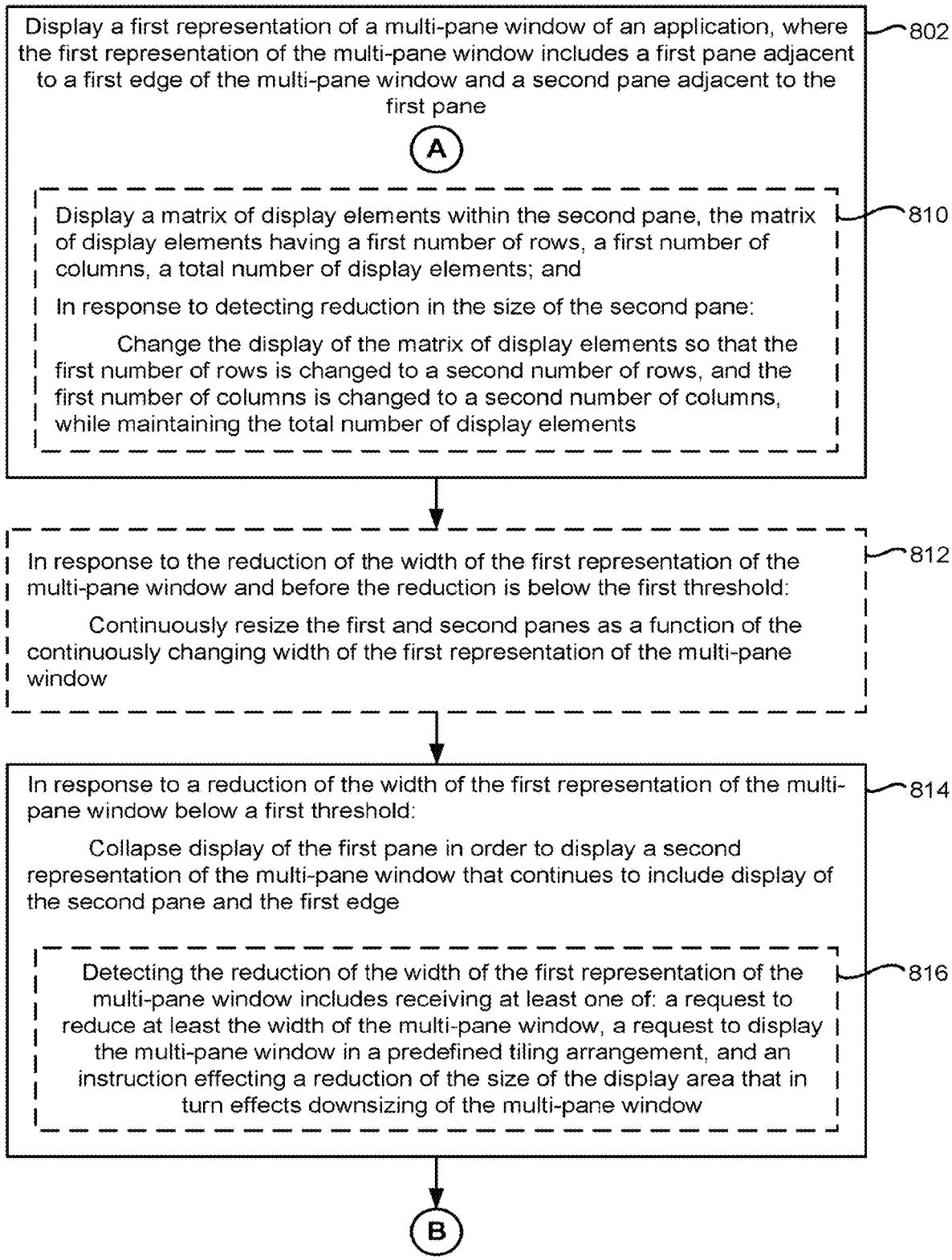
Figure 8D:
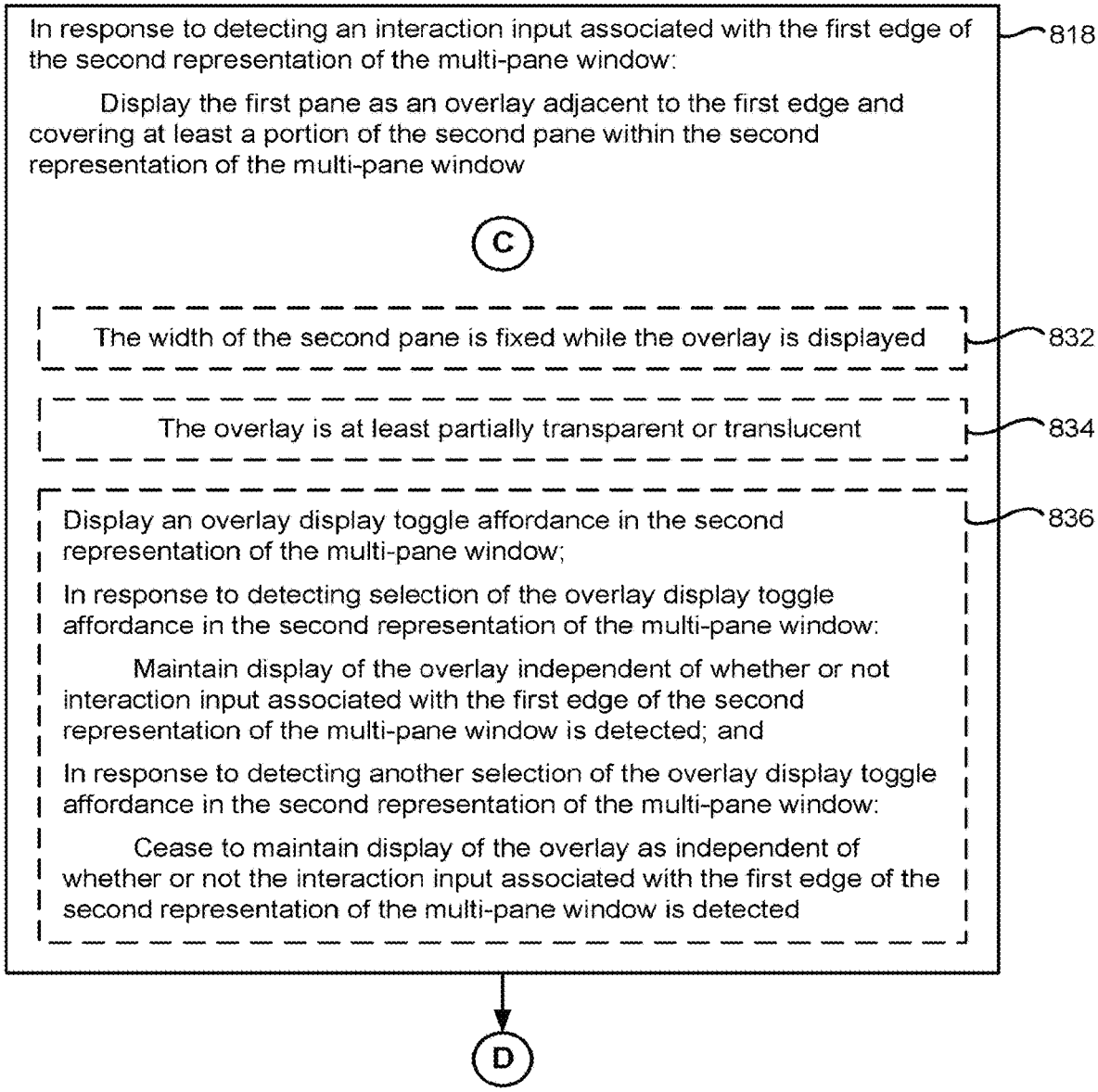
Figure 9A:
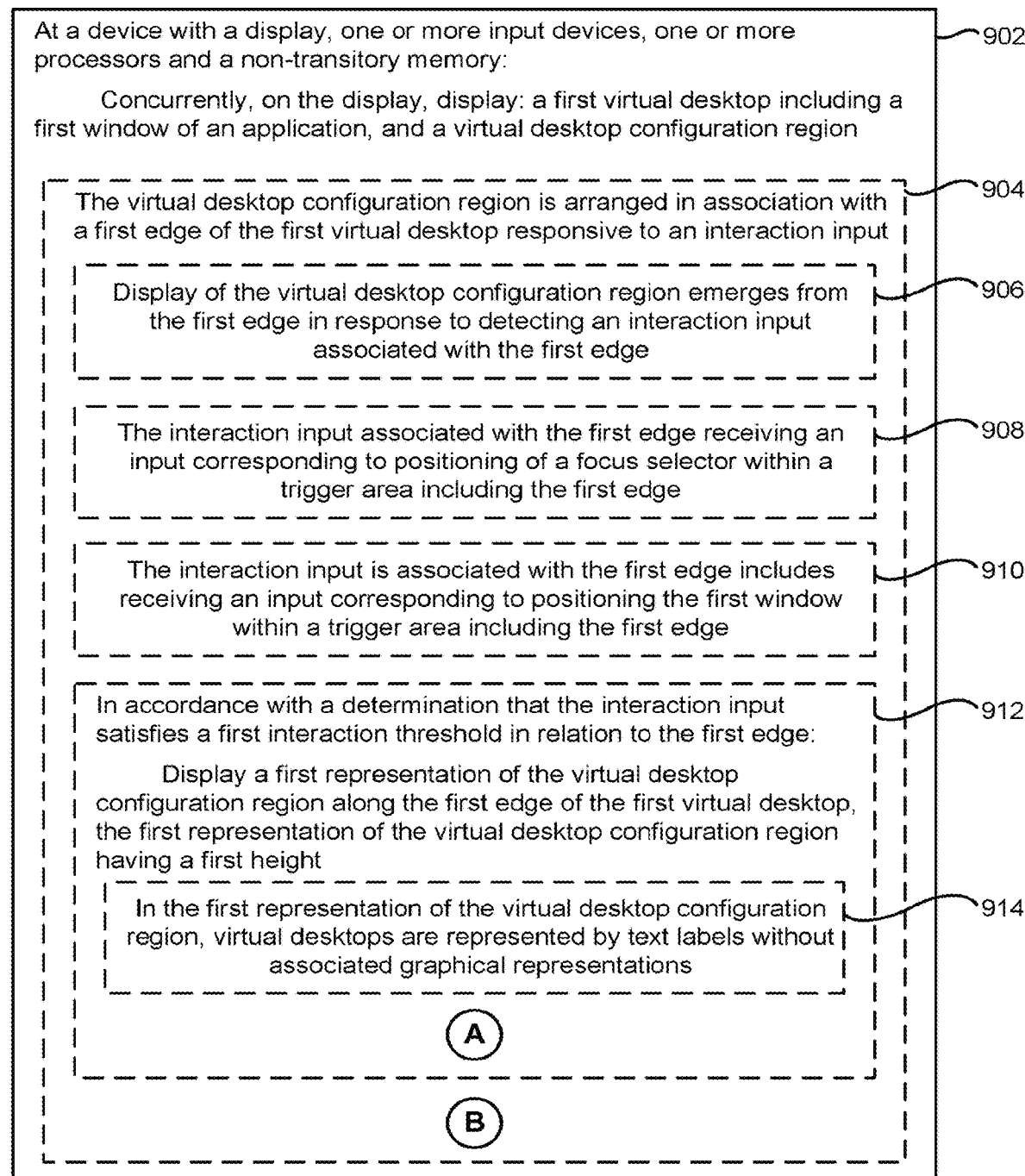
Figure 9D:
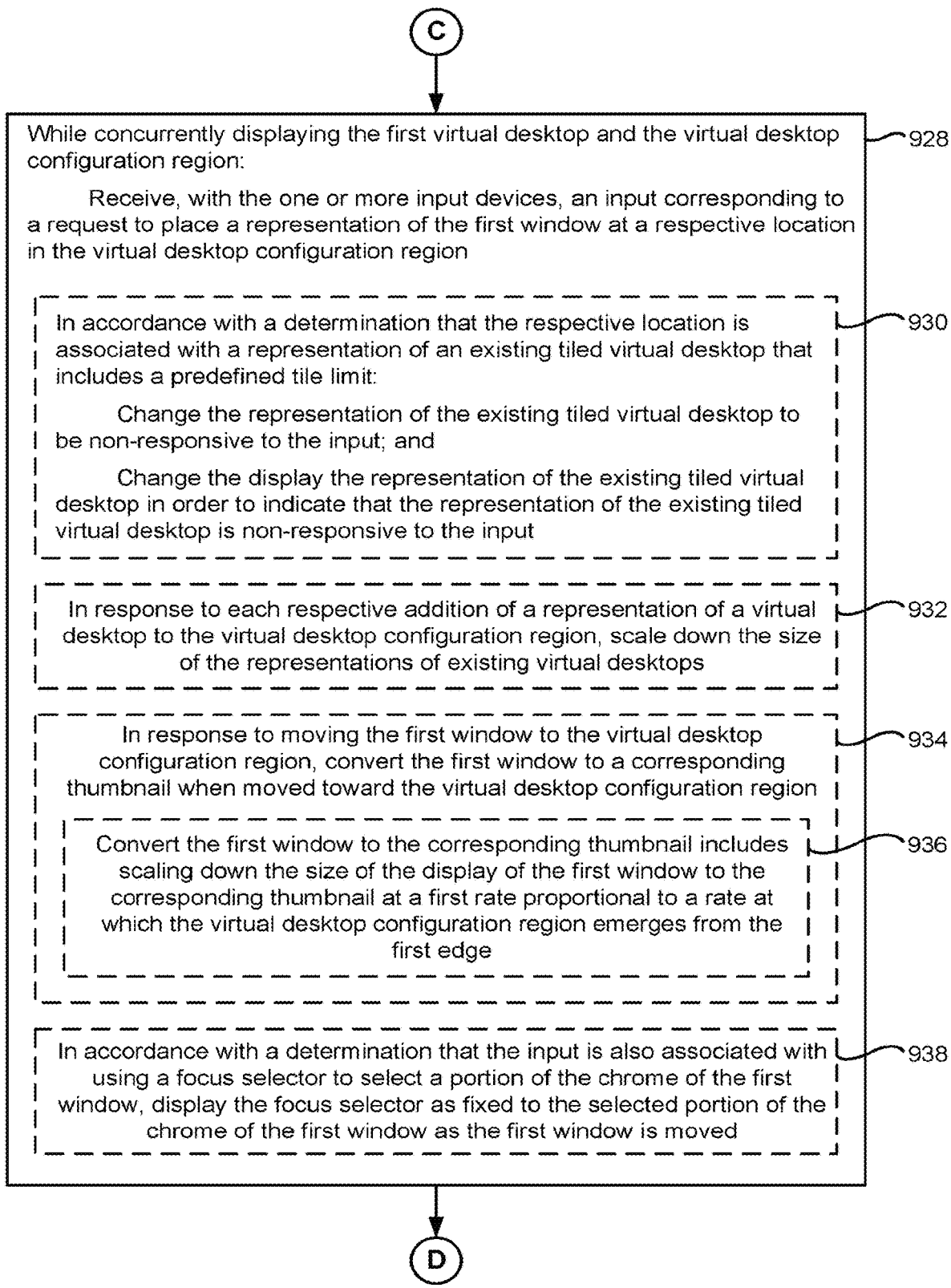
Figure 9E:
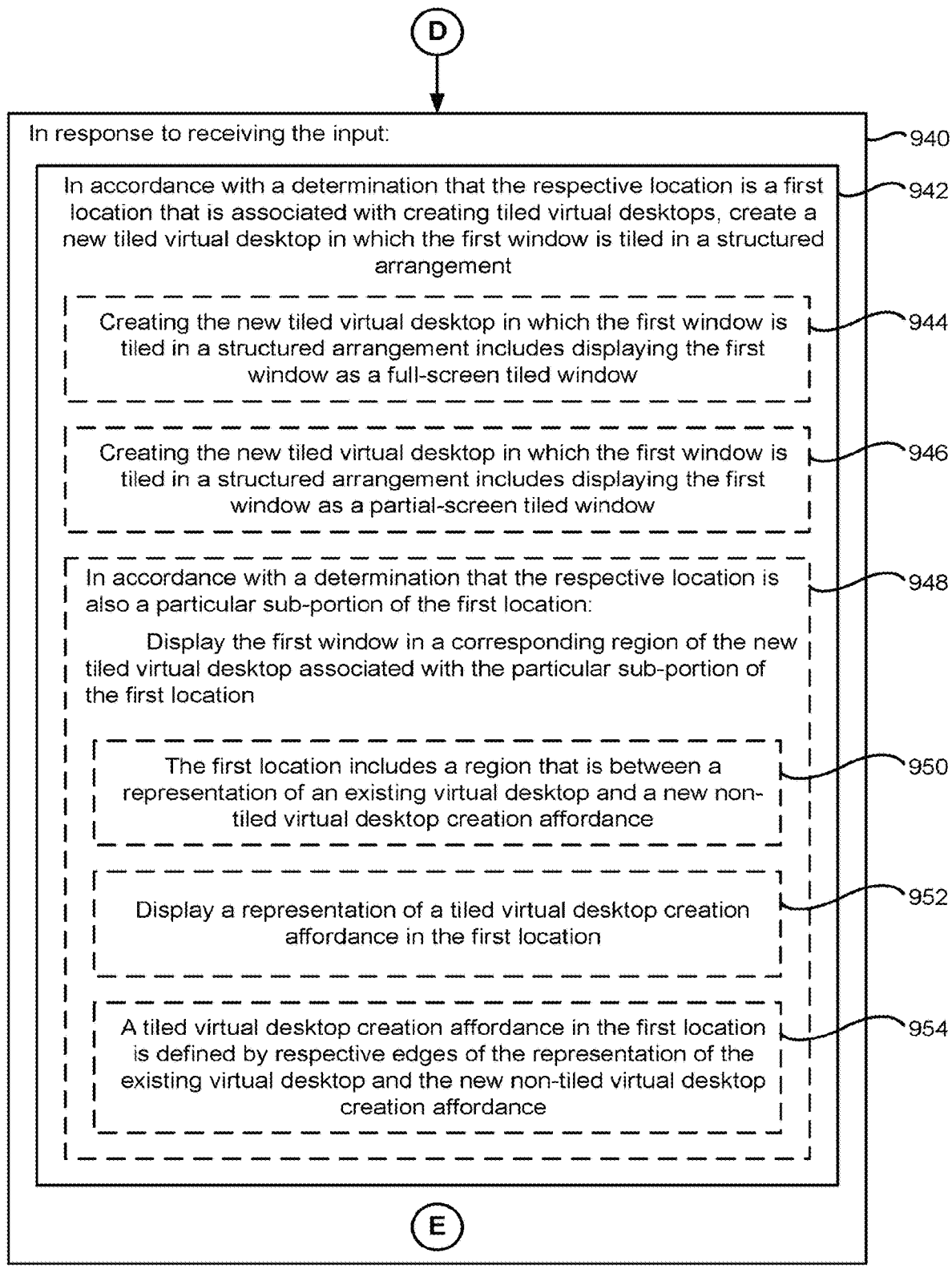
Figure 9F:
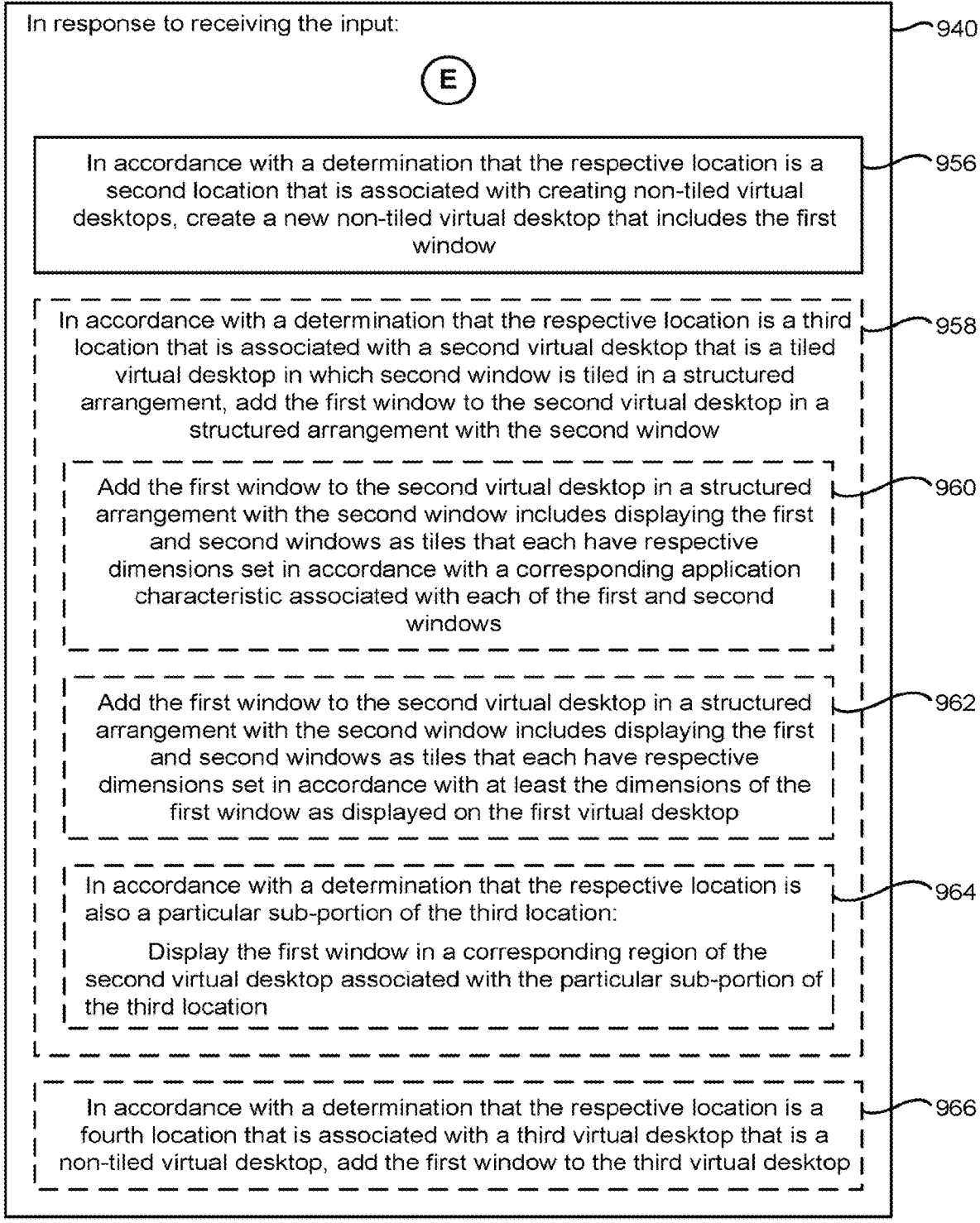
Figure 10A:
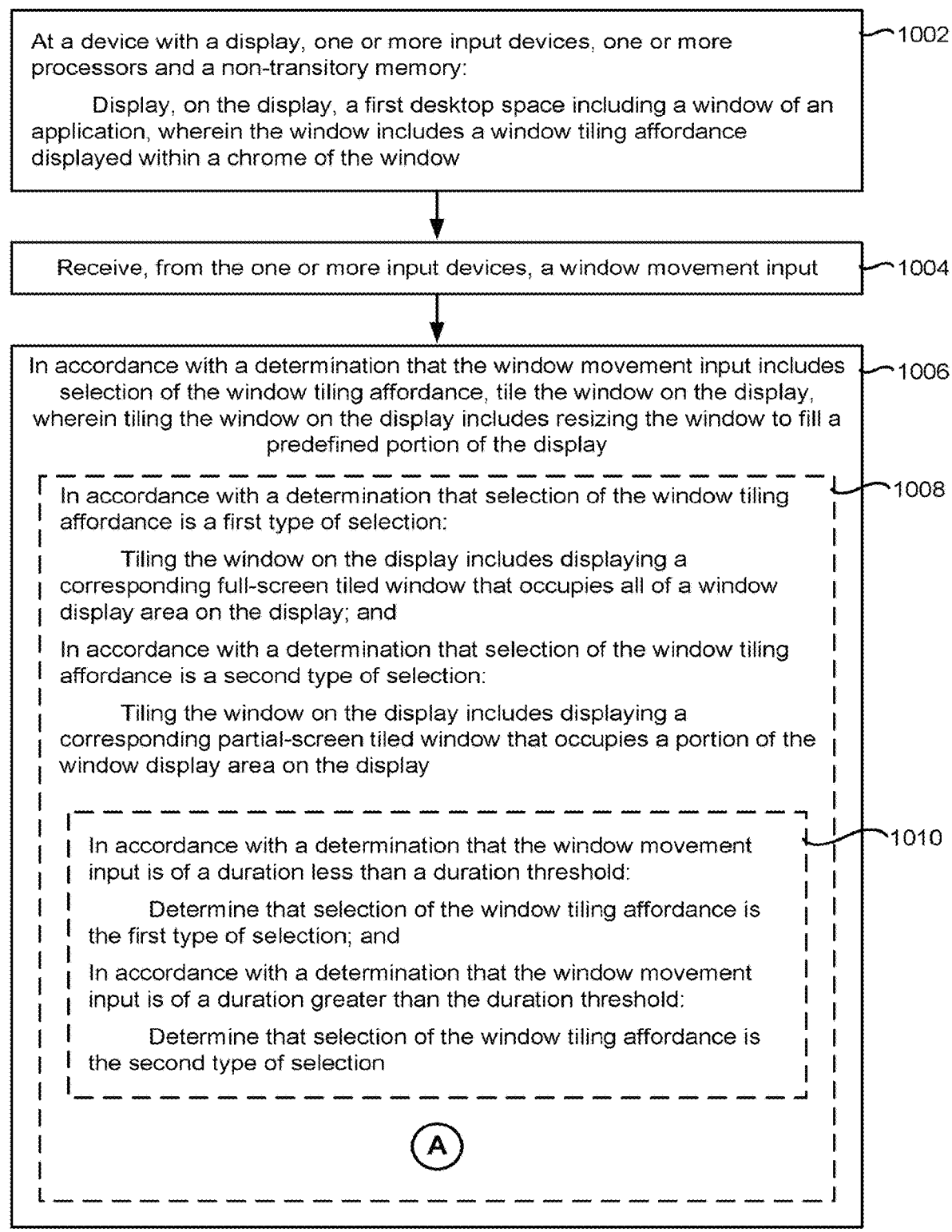
Figure 10D:
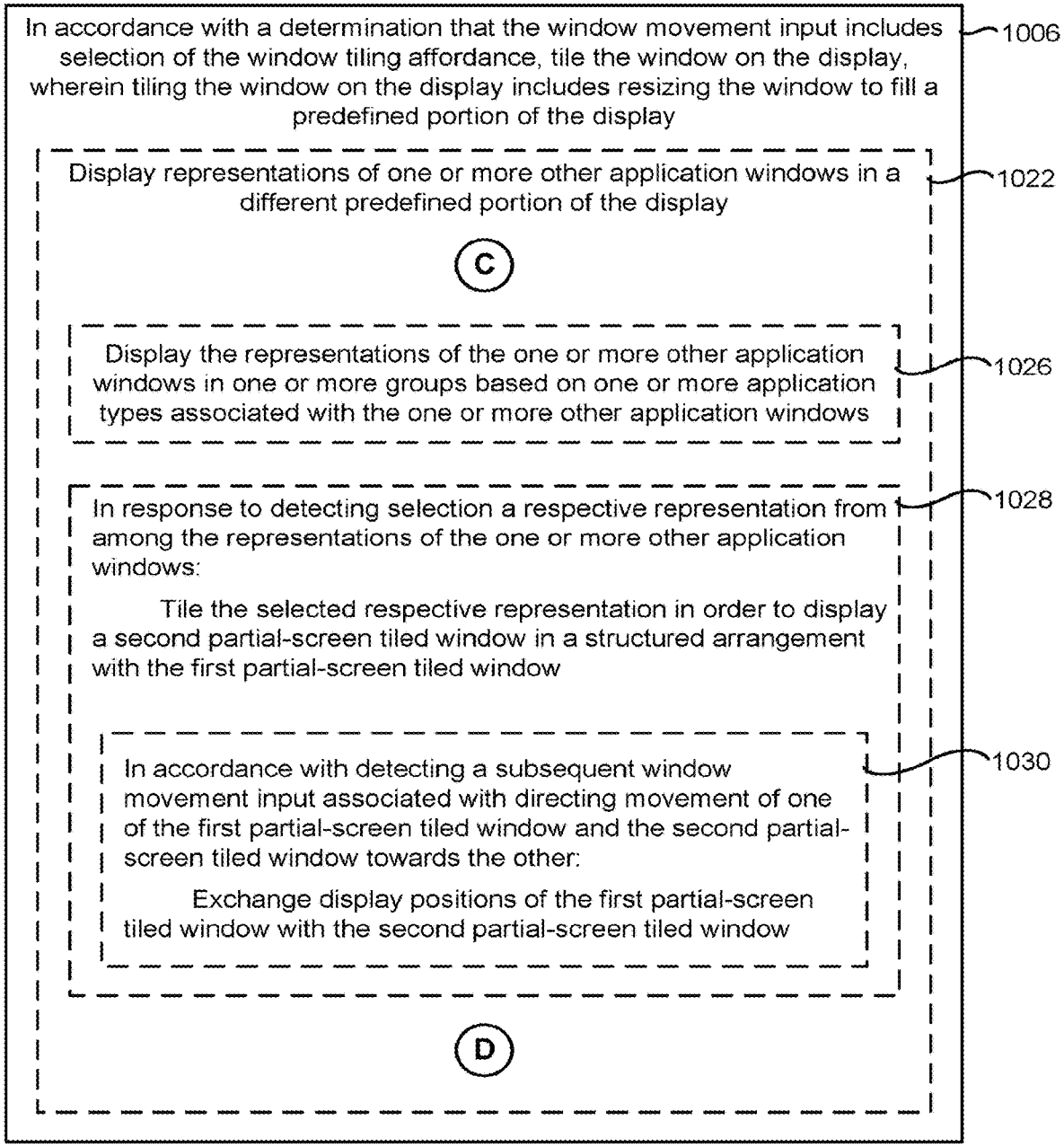

FIGS. 7K-7M illustrate a sequence in which full-screen tiled window 730 is converted to a partial-screen tiled window 730, and subsequently displayed in a structured arrangement with partial-screen tiled window 732. FIG. 7K is similar to and adapted from FIG. 7A. Elements common to FIGS. 7A and 7K include common reference numbers, and only the differences between FIGS. 7A and 7K are described herein for the sake of brevity. To that end, FIG. 7K includes full-screen tiled window 730 (corresponding to window 730 of FIG. 7A), which has top chrome portion 707 and window tiling affordance 709.

As described above, window tiling affordance 709, when activated in accordance with the second type of selection input, results in converting display of full-screen tiled window 730 to partial-screen tiled window 730 as shown in FIG. 7L (if the operation is not aborted by, for example, pressing an "esc" key on a keyboard). As shown in FIG. 7L, for example, partial-screen tiled window 730 is displayed on the left side of display 450. FIG. 7L is identical to FIG. 7H, and as such, a more detailed description of FIG. 7L can be had with reference to the description provide above with reference to FIG. 7H.

Continuing the example, FIGS. 7L and 7M, illustrate the portion of the sequence in which window 732 is selected and converted to a partial-screen tiled window 732 that is arranged in a structured arrangement with partial-screen tiled window 730. Window tiling affordance 719 of window 732, when activated in accordance with the second type of selection input causes converting window 732 to partial-screen tiled window 732, which is displayed in a structured arrangement with partial-screen tiled window 730, as shown in FIG. 7M (if the operation is not aborted by, for example, pressing an "Esc" key on a keyboard). FIG. 7M is identical to FIG. 7I, and as such, a more detailed description of FIG. 7M can be had with reference to the description provide above with reference to FIG. 7I.

FIGS. 8A-8E are flow diagrams illustrating a method 800 of manipulating windows in accordance with some embodiments. The method 800 is performed at an electronic device (e.g., device 300, FIG. 3, or portable multifunction device 100, FIG. 1A) with a display, one or more input devices, one or more processors, and a non-transitory memory. Some operations in method 800 are, optionally, combined and/or the order of some operations is, optionally, changed.

As described below, the method 800 provides an intuitive way to manipulate windows. The method reduces the cognitive burden on a user when manipulating windows, thereby creating a more efficient human-machine interface. For battery-operated electronic devices, enabling a user to manipulate windows faster and more efficiently conserves power and increases the time between battery charges.

The device displays (802) a first representation of a multi-pane window of an application, where the first representation of the multi-pane window includes a first pane (e.g., a sidebar) adjacent to a first edge of the multi-pane window and a second pane adjacent to the first pane. For example, a window 510 associated with a file management application is displayed in FIG. 5A. In accordance with some embodiments, the first representation of window 510, in FIG. 5A, includes a first pane 512-A, a second pane 512-B, and a third pane 512-C. In other embodiments, the first representation of window 510, in FIG. 5A, includes first pane 512-A and second pane 512-B.

In some embodiments, the device (804): displays a first pane display toggle affordance in the first and third representations of the multi-pane window; in response to detecting selection of the first pane display toggle affordance while displaying either the first or the third representations of the multi-pane window, includes display of the first pane in the first and third representations of the multi-pane window; and, in response to detecting another selection of the first pane display toggle affordance while displaying either the first or the third representations of the multi-pane window, removes display of the first pane in the first and third representations of the multi-pane window. For example, in FIGS. 5A-5B, chrome area 501 of window 510 includes a first pane display toggle affordance 507, which, when activated (e.g., with a single or double click), causes first pane 512-A to be removed if it is currently displayed or causes first pane 512-A to be displayed if it is not currently displayed. For example, FIGS. 5I-5J illustrate a sequence in which first pane display toggle affordance within a third representation of the window is activated. In FIG. 5I, a focus selector 502 is located over first pane display toggle affordance 507 within the third representation of window 510. In response to detecting activation of first pane display toggle affordance 507 (e.g., with a single or double click) while focus selector 502 is over first pane display toggle affordance 507, first pane 512-A is removed from window 510 as shown in FIG. 5J.

In some embodiments, the device (806): displays a sizing toggle affordance in the first and third representations of the multi-pane window; and, in response to detecting selection (e.g., double-click) of the sizing toggle affordance while displaying either the first or the third representations of the multi-pane window, resizes display of the first and second panes as a function of predefined proportions. For example, in FIGS. 5O-5Q, chrome area 501 of window 552 includes sizing toggle affordance 509, which, when activated (e.g., with a single or double click), causes first pane 512-A and second pane 512-B (and optionally third pane 512-C) to be resized according to predefined proportions. For example, FIGS. 5P-5Q illustrate a sequence in which a sizing toggle affordance within a second representation of a window is activated. In FIG. 5P, focus selector 502 is located over sizing toggle affordance 509 within the first representation of window 552. In response to detecting activation of sizing toggle affordance 509 (e.g., with a single or double click), first pane 512-A while focus selector 502 is over sizing toggle affordance 509, second pane 512-B, and third pane 512-C are resized as a function of predefined portions as shown in FIG. 5Q. For example, the panes 512 are changed from widths 556 in FIG. 5P to widths 554 from FIG. 5O. As a result of the activation of sizing toggle affordance 509, the width of second pane 512-B is increased from width 556-B in FIG. 5P to width 554-B in FIG. 5Q. Similarly, the width of third pane 512-C is decreased from width 556-C in FIG. 5P to width 554-C in FIG. 5Q.

In some embodiments, the predefined proportions include (808) at least one of percentage based relative widths of the first and second panes, respective lower bounds of pixels for the corresponding widths of the first and second panes, and respective lower bounds of display points for the corresponding widths of the first and second panes.

In some embodiments, the device (810): displays a matrix of display elements within the second pane, the matrix of display elements having a first number of rows, a first number of columns, a total number of display elements; and, in response to detecting reduction in the size of the second pane, changes the display of the matrix of display elements so that the first number of rows is changed to a second number of rows, and the first number of columns is changed to a second number of columns, while maintaining the total number of display elements. In some embodiments, the device changes row and column dimensions, tiles, or representations of months, within the second pane, in response to changing the size of the multi-pane window. In some embodiments, the change is based on changes to the number of pixels or points that define the width and height of the window or changes to the aspect ratio of the window. For example, FIGS. 5O-5P illustrate a sequence in which a matrix of display elements within a second pane is changed in response to reduction in the width of the second pane. In FIGS. 5O-5P, a shared edge 557 between second pane 512-B and third pane 512-C is dragged toward the first edge 508 with focus selector 502 according to movement vector 555. As a result, the width of second pane 512-B is decreased from width 554-B in FIG. 5O to width 556-B in FIG. 5P. Furthermore, as a result, the 2×3 matrix 571 of display elements within second pane 512-B in FIG. 5O is changed to a 3×2 matrix 573 of display elements within second pane 512-B in FIG. 5P.

In some embodiments, in response to the reduction of the width of the first representation of the multi-pane window and before the reduction is below the first threshold, the device continuously resizes (812) the first and second panes as a function of the continuously changing width of the first representation of the multi-pane window. For example, FIGS. 5A-5C illustrate a sequence in which the width of window 510 is decreased from total width 516 in FIG. 5A to total width 526 in FIG. 5C. In FIGS. 5A-5C, second edge 503 of window 510 is dragged toward first edge 508 with focus selector 502 according to movement vector 505. As shown in FIG. 5A, first pane 512-A, second pane 512-B, and third pane 512-C correspond to widths 514-A, 514-B, and 514-C, respectively. In accordance with some embodiments, as a result of the dragging gesture, the widths of first pane 512-A, second pane 512-B, and third pane 512-C are proportionally decreased to widths 520-A, 520-B, and 520-C, respectively, in FIG. 5B.

In response to a reduction of the width of the first representation of the multi-pane window below a first threshold, the device collapses (814) (e.g., removes) display of the first pane in order to display a second representation of the multi-pane window that continues to include display of the second pane and the first edge. In some embodiments, while displaying the multi-pane window, the device detects a reduction of a width of the first representation of the multi-pane window below a first threshold width. For example, FIGS. 5A-5C illustrate a sequence in which a first representation of a window 510 is changed to a second representation in response to a reduction of the width of the first representation below first threshold width 518. In FIGS. 5A-5C, second edge 503 of window 510 is dragged toward first edge 508 with focus selector 502 according to movement vector 505. FIG. 5A-5B show a first representation of the window 510 because the width of window 510 (e.g., total width 516 in FIG. 5A, and total width 522 in FIG. 5B) is greater than first threshold width 518. However, FIG. 5C shows a second representation of window 510 because the width of window 510 (e.g., total width 526 in FIG. 5C) is less than first threshold width 518. In accordance with some embodiments, the second representation of window 510, in FIG. 5C, includes second pane 512-B and third pane 512-C. In other embodiments, the second representation of window 510 includes second pane 512-B.

In some embodiments, detecting the reduction of the width of the first representation of the multi-pane window includes (816) receiving at least one of: a request to reduce at least the width of the multi-pane window, a request to display the multi-pane window in a predefined tiling arrangement (e.g., "half full screen" or "quarter full screen"), and an instruction effecting a reduction of the size of the display area that in turn effects downsizing of the multi-pane window. For example, the request to display the multi-pane window in a predefined tiling arrangement corresponds to a drag and drop gesture of a window into a respective location within a virtual desktop configuration region (e.g., the second representation 614-B of the virtual desktop configuration region in FIG. 6R) that is associated with creating a new tiled virtual desktop (e.g., drop target 518 in FIGS. 6D-6E) or an existing tiled virtual desktop.

In response to detecting an interaction input associated with the first edge of the second representation of the multi-pane window, the device displays (818) the first pane as an overlay adjacent to the first edge and covering at least a portion of the second pane within the second representation of the multi-pane window. For example, FIGS. 5D-5E illustrate a sequence in which overlay 830 is displayed within the second representation of window 510 in response to detecting the interaction input. In FIGS. 5D-5E, focus selector 502 moves from within third pane 512-C towards first edge 508 according to movement vector 527. For example, the interaction input corresponds to focus selector 502 breaching a trigger area bounded by interaction threshold 528 and first edge 508 of window 510.

In some embodiments, the interaction input associated with the first edge includes (820) detecting positioning of a focus selector (e.g., cursor, selected icon, touch, etc.) within a trigger area including the first edge. For example, FIGS. 5D-5E illustrate a sequence in which overlay 830 is displayed within the second representation of window 510 in response to focus selector 502 breaching a trigger area bounded by interaction threshold 528 and first edge 508 of window 510.

In some embodiments, the first pane includes (822) an arrangement of one or more display items (e.g., file names, folder names, images, etc.), and the overlay having sufficient width to display the arrangement of the one or more display items without display of any of the one or more display items being truncated by an edge of the overlay. For example, overlay 830 includes a plurality of folders or directories with un-truncated names In FIG. 5E, for example, overlay 530 corresponds to at least a portion of first pane 512-A shown in FIGS. 5A-5B. In FIG. 5E, for example, overlay 530 covers at least a portion of second pane 512-B.

In some embodiments, the device removes (824) display of the overlay from within the second representation of the multi-pane window in response to detecting that a focus selector (e.g., cursor or contact) moves away from the first edge. For example, FIGS. 5E-5F illustrate a sequence in which focus selector moves from within the trigger area to third pane 512-C according to movement vector 532. As shown in FIG. 5F, overlay 530 is removed from the second representation of window 510 in response to focus selector 502 moving out of the trigger area bounded by interaction threshold 528 and first edge 508 of window 510.

In some embodiments, the device removes (826) display of the overlay from within the second representation of the multi-pane window in response to detecting that an icon has been placed over a drop target included in the overlay. For example, FIGS. 5K-5N illustrate a sequence in which overlay 530 is removed from the second representation of window 510 in response to dragging icon 550 over drop target 553 in overlay 530. In FIGS. 5K-5M, icon 550 corresponding to "Electronic Document C" within third pane 512-C is dragged toward drop target 553 within overlay 530 with focus selector 502 according to movement vector 551. In response to completion of the dragging gesture (e.g., up-click or release of icon 550) while icon 550 is over the drop target 553 in overlay 530, overlay 530 is removed from the second representation of window 510 as shown in FIG. 5N.

In some embodiments, displaying the first pane as the overlay within the second representation of the multi-pane window comprises (828) introducing the overlay by displaying an animation of the second representation of the multi-pane window sliding out from the first edge. For example, with reference to FIGS. 5D-5E, overlay 530 slides out from first edge 508 of window 510 in response to focus selector 502 breaching the trigger area bounded by interaction threshold 528 and first edge 508 of window 510. In some embodiments, the sliding animation is displaying (830) in response to detecting directed movement of an icon towards the first edge.

In some embodiments, the width of the second pane is fixed (832) while the overlay is displayed.

In some embodiments, overlay is (834) at least partially transparent or translucent. In FIG. 5E, for example, overlay 530 is at least partially transparent or translucent.

In some embodiments, the device (836): displays an overlay display toggle affordance in the second representation of the multi-pane window; in response to detecting selection of the overlay display toggle affordance in the second representation of the multi-pane window, maintains display of the overlay independent of whether or not interaction input associated with the first edge of the second representation of the multi-pane window is detected; and, in response to detecting another selection of the overlay display toggle affordance in the second representation of the multi-pane window, ceases to maintain display of the overlay as independent of whether or not the interaction input associated with the first edge of the second representation of the multi-pane window is detected. In some embodiments, the overlay display toggle affordance and the first pane display toggle include identical display characteristics. For example, in FIG. 5C, chrome area 501 of window 510 includes an overlay toggle affordance 511, which, when activated (e.g., with a single or double click), causes overlay 530 to be displayed if it is not currently displayed. For example, FIGS. 5J-5K illustrate a sequence in which an overlay toggle affordance within a second representation of the window is activated. In FIG. 5J, focus selector 502 is located over overlay toggle affordance 511 within the second representation of window 510. In response to detecting activation of overlay toggle affordance 511 (e.g., with a single or double click) while focus selector 502 is over overlay toggle affordance 511, overlay 530 is displayed adjacent to first edge 508 within the second representation of window 510 as shown in FIG. 5K.

In some embodiments, in response to an increase of the width of the second representation of the multi-pane window above a second threshold width, the device reintroduces (838) display of the first pane in order to display a third representation of the multi-pane window, the third representation of the multi-pane window including the first pane between the first edge and the second pane. In some embodiments, the first and third representations have the same dimensions. In some embodiments, in response to receiving a request to increase the width of the window such as an input dragging an edge of the window, or an increase in the size of the display area that causes the window to be resized, the device reintroduces the first plane to display the third representation of the multi-pane window. For example, FIGS. 5G-5I illustrate a sequence in which the second representation of the window is changed to a third representation in response to an increase of the width of the second representation above second threshold width 536. In FIGS. 5G-5I, second edge 503 of window 510 is dragged away from first edge 508 with focus selector 502 according to movement vector 534. FIG. 5G shows a second representation of the window 510 because the width of window 510 (e.g., total width 526) is less than second threshold width 536. However, FIG. 5H shows a third representation of window 510 because the width of window 510 (e.g., total width 542) is greater than second threshold width 536. In accordance with some embodiments, the third representation of window 510, in FIG. 5G, includes first pane 512-A, second pane 512-B, and third pane 512-C. In other embodiments, the third representation of window 510 includes first pane 512-A and second pane 512-B.

In some embodiments, the first threshold width is the same as the second threshold width. For example, the first threshold width 518 in FIGS. 5A-5C is the same as the second threshold width 536 in FIGS. 5G-5I. In some embodiment, the first threshold width is different from the second threshold width. For example, the first threshold width 518 in FIGS. 5A-5C is different from the second threshold width 536 in FIGS. 5G-5H.

In some embodiments, the first and second threshold widths are (840) each a function of at least one of a number of pixels, a number of display points, a distance value, and a relative display area associated with a representation of the multi-pane window and a total available display area.

In some embodiments, in response to the increase of the width of the second representation of the multi-pane window above the second threshold width, the device sizes (842) the respective widths of the first and second panes in the third representation of the multi-pane window to match proportions of the corresponding widths of the first and second panes within the first representation of the multi-pane window. For example, widths 514 of panes 512 within the third representation of window 510 in FIG. 5I match widths 514 of panes 512 within the first representation of window 510 in FIG. 5A.

In some embodiments, reintroduction of display of the first pane occurs (844) when the increase of the width of the second representation of the multi-pane window above the second threshold width occurs within a threshold time duration, and reintroduction of display of the first pane does not occur when the increase of the width of the second representation of the multi-pane window above the second threshold width occurs after the threshold time duration. For example, the threshold time duration is 1, 3, 5, 8, 15 minutes or some other amount of time during which the user is likely to remember their earlier action and expect to see the pane redisplayed upon an expansion of the window.

It should be understood that the particular order in which the operations in FIGS. 8A-8E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1000) are also applicable in an analogous manner to method 800 described above with respect to FIGS. 8A-8E. For example, the inputs, gestures, user interface element, and focus selectors described above with reference to method 800 optionally have one or more of the characteristics of the inputs, gestures, user interface element, and focus selectors described herein with reference to other methods described herein (e.g., methods 900 and 1000). For brevity, these details are not repeated here.

FIGS. 9A-9F are flow diagrams illustrating a method 900 of interacting with a virtual desktop configuration region in accordance with some embodiments. The method 900 is performed at an electronic device (e.g., device 300, FIG. 3, or portable multifunction device 100, FIG. 1A) with a display, one or more input devices, one or more processors, and a non-transitory memory. Some operations in method 900 are, optionally, combined and/or the order of some operations is, optionally, changed.

As described below, the method 900 provides an intuitive way to interact with a virtual desktop configuration region. The method reduces the cognitive burden on a user when interacting with a virtual desktop configuration region, thereby creating a more efficient human-machine interface. For battery-operated electronic devices, enabling a user to interact with a virtual desktop configuration region faster and more efficiently conserves power and increases the time between battery charges.

The device concurrently displays (902), on the display: a first virtual desktop including a first window of an application; and a virtual desktop configuration region (sometimes referred to as a "spaces bar"). In one example, the user interface in FIG. 6Q includes a window 642 for an application and first representation 614-A of the virtual desktop configuration region adjacent to first edge 605 of the display 450. As shown in FIG. 6Q, first representation 614-A of the virtual desktop configuration region includes a plurality of text-based indicators corresponding to existing virtual desktops 651-A, 651-B, 651-C, and 651-D. In another example, the user interface in FIG. 6R includes a window 642 for an application and second representation 614-B of the virtual desktop configuration region adjacent to a first edge 605 of the display 450. As shown in FIG. 6R, second representation 614-B of the virtual desktop configuration region includes a plurality of text-based indicators corresponding to existing virtual desktops 651-A, 651-B, 651-C, and 651-D. According to some embodiments, as shown in FIG. 6R, second representation 614-B of the virtual desktop configuration region also includes a hidden first drop target 645 associated with creating a new tiled virtual desktop and a second drop target 620 associated with creating a new non-tiled virtual desktop. As shown in FIG. 6R, hidden first drop target 645 occupies the space between the text-based indicator 655-D corresponding to existing virtual desktop 651-D and second drop target 620.

In some embodiments, the virtual desktop configuration region is arranged (904) in association with a first edge of the first virtual desktop responsive to an interaction input. For example, FIGS. 6A-6D illustrate a sequence in which a virtual desktop configuration region is arranged adjacent to first edge 605 of display 450 in response to dragging a window 608 toward first edge 605 of display 450 (e.g., the top edge). In another example, FIGS. 6P-6Q, illustrate a sequence in which a virtual desktop configuration region is arranged adjacent to first edge 605 of display 450 (e.g., the top edge) in response to moving focus selector 602 toward first edge 605. Alternatively, in some embodiments, the virtual desktop configuration region is arranged adjacent to the bottom edge, one of the side edges, or one of the corners of display 450.

In some embodiments, display of the virtual desktop configuration region emerges (906) from the first edge in response to detecting an interaction input associated with the first edge. In some embodiments, the virtual desktop configuration region slides out from the first edge. For example, FIGS. 6A-6D illustrate a sequence in which a virtual desktop configuration region emerges from first edge 605 of display 450 in response to dragging a window 608 toward first edge 605 of display 450. Continuing with this example, in FIG. 6C, first representation 614-A of the virtual desktop configuration region emerges from first edge 605 in response to window 608 breaching first interaction threshold 610-A, which is a distance 603-B from first edge 605. Continuing with this example, in FIG. 6D, second representation 614-B of the virtual desktop configuration region emerges from first edge 605 in response to thumbnail representation 616, which corresponds to window 608, breaching second interaction threshold 610-B, which is a distance 603-C from first edge 605. Alternatively, in some embodiments, the interaction input is associated with the bottom edge, one of the side edges, or one of the corners of display 450.

In some embodiments, the interaction input associated with the first edge includes (908) receiving an input corresponding to positioning of a focus selector (e.g., cursor, selected icon, touch, etc.) within a trigger area including the first edge. For example, the trigger area is a region that is proximate to the first edge and extends out from the first edge. For example, FIGS. 6P-6R illustrate a sequence in which a virtual desktop configuration region emerges from first edge 605 of display 450 in response to moving focus selector 602 into a trigger area arranged relative to first edge 605 of display 450. Continuing with this example, in FIG. 6Q, first representation 614-A of the virtual desktop configuration region emerges from first edge 605 in response to focus selector 602 breaching first interaction threshold 610-A, which is a distance 653 from first edge 605. Continuing with this example, in FIG. 6R, second representation 614-B of the virtual desktop configuration region emerges from first edge 605 in response to focus selector 602 contacting second interaction threshold 610-B associated with first edge 605.

In some embodiments, the interaction input associated with the first edge includes (910) receiving an input corresponding to positioning the first window within a trigger area including the first edge. For example, FIGS. 6K-6M illustrate a sequence in which a virtual desktop configuration region emerges from first edge 605 of display 450 in response to dragging a window 628 into a trigger area arranged relative to first edge 605 of display 450. Continuing with this example, in FIG. 6L, first representation 614-A of the virtual desktop configuration region emerges from first edge 605 in response to window 628 breaching first interaction threshold 610-A, which is a distance 633-A from first edge 605. Continuing with this example, in FIG. 6M, second representation 614-B of the virtual desktop configuration region emerges from first edge 605 in response to thumbnail representation 638, which corresponds to window 628, breaching second interaction threshold 610-B, which is a distance 633-B from first edge 605.

In some embodiments, in accordance with a determination that the interaction input satisfies a first interaction threshold (e.g. a window is moved to the first edge) in relation to the first edge, the device displays (912) a first representation of the virtual desktop configuration region along the first edge of the first virtual desktop, the first representation of the virtual desktop configuration region having a first height. For example, FIGS. 6A-6C illustrate a sequence in which a first representation 614-A of the virtual desktop configuration region emerges from first edge 605 in response to window 608 breaching first interaction threshold 610-A, which is a distance 603-A from first edge 605. As shown in FIG. 6C, first representation 614-A of the virtual desktop configuration region has a first height 611 relative to first edge 605.

In some embodiments, in the first representation of the virtual desktop configuration region, virtual desktops are represented (914) by text labels without associated graphical representations. In some embodiments, the first height is sufficient to display text based indicators of one or more virtual desktops in the virtual desktop configuration region without displaying graphical representations of the virtual desktops. In some embodiments, the text based representations of virtual desktops provide an indication of the applications that occupy the virtual desktops (e.g., "Web Browser" for a full screen tiled desktop that includes a web browser, "Mail and Calendar" for a split screen tiled virtual desktop that includes mail and calendar, and "Desktop 1" for a non-tiled virtual desktop). As shown in FIG. 6C, for example, first representation 614-A of the virtual desktop configuration region includes text-based indicators 615-A and 615-B corresponding to existing virtual desktops 601-A and 601-B, respectively. As shown in FIG. 6C, text-based indicator 615-A is associated with the text label "Virtual Desktop A," which indicates that corresponding virtual desktop 601-A (e.g., shown in FIG. 6C) is a non-tiled virtual desktop. Similarly, text-based indicator 615-B is associated with the text label "Mail+App A," which indicates that corresponding virtual desktop 601-B is a tiled virtual desktop with two tiles. In some embodiments, the text label "Mail+App A" for text-based indicator 615-B indicates the order or positioning of the tiles in corresponding virtual desktop 601-B. For example, a first tile associated with a Mail application occupies the left portion of the display space and second tile associated with Application A occupies the right portion of the display space. As shown in Figure E, for example, second representation 614-B of virtual desktop configuration region includes text-based indicator 615-C in addition to aforementioned text-based indicators 615-A and 615-B. For example, text-based indicator 615-C is associated with the text label "Web Browser," which indicates that corresponding virtual desktop 601-C is a tiled virtual desktop with one tile.

In some embodiments, while displaying the text based representations of virtual desktops in the virtual desktop configuration region, where the number of virtual desktops does not exceed a text-representation display limit, the device (916): detects the addition of an additional virtual desktop to the virtual desktop configuration region; and, in response to detecting the addition of the additional virtual desktop to the virtual desktop configuration region, and in accordance with a determination that the total number of the one or more virtual desktops created exceeds a predefined limit, converts the display of the text based indicators of the one or more virtual desktops in the virtual desktop configuration region to graphical representations of each of the one or more virtual desktops in the virtual desktop configuration region (e.g., thumbnail representations that, optionally, do not include text descriptions). For example, the predefined limit is a number of text representations of virtual desktops that can be displayed in the virtual desktop configuration region, which optionally depends on a size of the virtual desktop configuration region and a length of the text based representations of the virtual desktops.

As shown in FIG. 6T, for example, second representation 614-B of the virtual desktop configuration region includes text-based indicators 655-A, 655-B, 655-C, and 655-D corresponding to existing virtual desktops 651-A, 651-B, 651-C, and 651-D. For example, in some embodiments, the text-representation display limit corresponds to a limit of up to four text-based indicators, which has been reached in FIG. 6T. For example, FIGS. 6T-6U illustrate a sequence in which a non-tiled virtual desktop 651-E is created in response to dragging and dropping thumbnail representation 652 into second drop target 620. In accordance with some embodiments, the creation of non-tiled virtual desktop 651-E causes the text-representation display limit to be exceeded. As a result, text-based indicators 655-A, 655-B, 655-C, and 655-D corresponding to existing virtual desktops 651-A, 651-B, 651-C, and 651-D are changed into graphical representations 659-A, 659-B, 659-C, and 659-D, respectively, as shown in FIG. 6U. Furthermore, a graphical representation 659-E corresponding to newly created non-tiled virtual desktop 651-E is shown within second representation 614-B of the virtual desktop configuration region in FIG. 6U.

In some embodiments, in response to detecting the addition of the additional virtual desktop to the virtual desktop configuration region and in accordance with a determination that the total number of the one or more virtual desktops created does not exceed the text-representation display limit, the device adds (918) a text based representation of the additional virtual desktop to the virtual desktop configuration region without converting the display of the text based indicators of the one or more virtual desktops in the virtual desktop configuration region to graphical representations of the one or more virtual desktops in the virtual desktop configuration region.

As shown in FIG. 6D, for example, second representation 614-B of the virtual desktop configuration region includes text-based indicators 615-A and 615-B corresponding to existing virtual desktops 601-A and 601-B. For example, in some embodiments, the text-representation display limit corresponds to a limit of up to four text-based indicators, which has not been reached in FIG. 6D. For example, FIGS. 6D-6E illustrate a sequence in which a tiled virtual desktop 601-C is created in response to dragging and dropping thumbnail representation 616 into first drop target 618. In accordance with some embodiments, the creation of tiled virtual desktop 601-C does not cause the text-representation display limit to be exceeded. As a result, as shown in FIG. 6E, text-based indicators 615-A, 615-B, and 615-C corresponding to existing virtual desktops 601-A, 601-B, and 601-C are shown within second representation 614-B of the virtual desktop configuration region.

In some embodiments, while displaying the first representation of the virtual desktop configuration region and in accordance with a determination that the interaction input satisfies a second interaction threshold (e.g., a window is moved to the first edge) in relation to the first edge, the device replaces (920) the first representation of the virtual desktop configuration region with a second representation of the virtual desktop configuration region along the first edge of the first virtual desktop, the second representation of the virtual desktop configuration region having a second height greater than the first height, and where the second representation of the virtual desktop configuration region includes one or more previously created virtual desktops. In some embodiments, the second representation includes graphical and text representations of the virtual desktops. For example, FIGS. 6A-6D illustrate a sequence in which a second representation 614-B of the virtual desktop configuration region emerges from first edge 605 in response to thumbnail representation 616 breaching second interaction threshold 610-B. As shown in FIG. 6D, second representation 614-B of the virtual desktop configuration region has a second height 613 relative to first edge 605. According to some embodiments, second height 613 of second representation 614-B of the virtual desktop configuration region in FIG. 6D is greater than first height 611 of first representation 614-A of the virtual desktop configuration region in FIG. 6C.

In some embodiments, in response to detecting the interaction input and in accordance with a determination that the interaction input satisfies a proximity threshold in relation to the first edge, the device displays (922) an indicator of the virtual desktop configuration region along the first edge of the first virtual desktop, where the indicator does not include representations of any of the previously created virtual desktops. For example, FIGS. 6A-6B illustrate a sequence in which an indicator 612 of the virtual desktop configuration region is displayed in response to window 608 breaching proximity threshold 609, which is a distance 603-A from first edge 605 of display 450.

In some embodiments, the display of the indicator of the virtual desktop configuration region includes (924) a symbol (e.g. a "tongue") provided to indicate that further interaction with the indicator of the virtual desktop configuration is available. As shown in FIG. 6B, for example, a virtual desktop configuration region indicator 612 is displayed adjacent to first edge 605 of display 450 in response to window 608 breaching proximity threshold 609. In some embodiments, virtual desktop configuration region indicator 612 indicates the existence of a virtual desktop configuration region to the user of the device.

In some embodiments, in response to detecting the interaction input and in accordance with a determination that the interaction input with the first edge is complete, the method further comprises, the device ceases to display (926) any representation or indicator of the virtual desktop configuration region. For example, FIGS. 6I-6J illustrate a sequence in which the virtual desktop configuration region is dismissed from the user interface. In some embodiments, the device ceases to display the virtual desktop configuration region by displaying an animation of the virtual desktop configuration region sliding behind the first edge. FIGS. 6I-6J illustrate focus selector 602 moving out of second representation 614-B of the virtual desktop configuration region according to movement vector 627. As a result, second representation 614-B of the virtual desktop configuration region is removed from display 450 as shown in FIG. 6J.

While concurrently displaying the first virtual desktop and the virtual desktop configuration region, the device receives (928), with the one or more input devices, an input corresponding to a request to place a representation of the first window at a respective location in the virtual desktop configuration region. For example, the input is a drag and drop gesture whereby the first window is dragged toward the virtual desktop configuration region. For example, FIGS. 6S-6U illustrate a sequence in which window 642 is dragged toward second drop target 620 within second representation 614-B of the virtual desktop configuration region according to movement vector 667. As shown in FIG. 6T, window 642 is converted to a thumbnail representation 652 in response to window 642 breaching first interaction threshold 610-A. In response to completion of the dragging gesture (e.g., up-click or release of thumbnail representation 652) while thumbnail representation 652 is over second drop target 620 in FIG. 6T, a non-tiled virtual desktop 651-E including window 642 is created.

In some embodiments, in accordance with a determination that the respective location is associated with a representation of an existing tiled virtual desktop that includes a predefined tile limit, the device (930): changes the representation of the existing tiled virtual desktop to be non-responsive to the input; and changes the display the representation of the existing tiled virtual desktop in order to indicate that the representation of the existing tiled virtual desktop is non-responsive to the input. For example, FIGS. 6K-6M illustrate a sequence in which window 628 is dragged to a respective location within the virtual desktop configuration region according to movement vector 637. As shown in FIG. 6L, window 628 is converted to a thumbnail representation 638 in response to window 628 breaching first interaction threshold 610-A. In response to completion of the dragging gesture (e.g., up-click or release of thumbnail representation 638) while thumbnail representation 638 is over graphical representation 636-B as shown in FIG. 6M, the device attempts to place window 628 into existing virtual desktop 631-B corresponding to graphical representation 636-B. However, in some embodiments, if a predefined tile limit are already present in existing virtual desktop 631-B, a full virtual desktop message 643 is displayed as shown in FIG. 6M. As shown in FIG. 6N, existing virtual desktop 631-B has reached the time limit as indicated by the letters "NA" (e.g., not available)" overlaid on graphical representation 636-B. Furthermore, graphical representation 636-B is non-responsive to the addition of additional windows/tiles. In some embodiments, another indicator, such as a word, an "X," or other mark/symbol, is overlaid on graphical representation 636-B to indicate that existing virtual desktop 631-B has reached the predefined tile limit.

In some embodiments, in response to each respective addition of a representation of a virtual desktop to the virtual desktop configuration region, the device scales down (932) the size of the representations of existing virtual desktops. For example, FIGS. 6A-6E illustrate a sequence in which a new virtual desktop 601-C including window 608 is created in response to dragging and dropping window 608 into first drop target 618. In response to completion of the dragging gesture (e.g., up-click or release of thumbnail representation 616) while thumbnail representation 616 is over first drop target 618 in FIG. 6D, a tiled virtual desktop 601-C including window 608 is created. As shown in FIG. 6E, second representation 614-B of the virtual desktop configuration region includes text-based indicator 615-C corresponding to newly created virtual desktop 601-C Furthermore, according to some embodiments, the size of text-based indicators 615-A and 615-B corresponding to existing virtual desktops 601-A and 601-B is scaled down from size 619 in FIG. 6D to size 621 in FIG. 6E in response to the addition of text-based indicator 615-C corresponding to existing virtual desktops 601-C to second representation 614-B of the virtual desktop configuration region.

In some embodiments, in response to moving the first window to the virtual desktop configuration region, the device converts (934) the first window to a corresponding thumbnail when moved toward the virtual desktop configuration region. For example, the thumbnail is an image of the first window. For example, FIGS. 6A-6D illustrate a sequence in which window 608 is dragged into the virtual desktop configuration region. As shown in FIG. 6C, window 608 is converted to a thumbnail representation 616 in response to window 608 breaching first interaction threshold 610-A. For example, thumbnail representation 616 is an image of window 608.

In some embodiments, converting the first window to the corresponding thumbnail includes (936) scaling down the size of the display of the first window to the corresponding thumbnail at a first rate proportional to a second rate at which the virtual desktop configuration region emerges from the first edge. In some embodiments, the thumbnail is optionally "live." As such, the thumbnail is not merely an image, but a smaller functional version of the original window. In some embodiments, the first and second rates are substantially the same. In some embodiments, the display size of the thumbnail scales up in size in a similar manner (possible third and fourth rates). In some embodiments, the time-dependent animation is a function of a rate associated with another user interface element.

In some embodiments, in accordance with a determination that the input is also associated with using a focus selector to select a portion of the chrome of the first window, the devices displays (938) the focus selector as fixed to the selected portion of the chrome of the first window as the first window is moved. For example, FIGS. 6A-6B illustrate a dragging gesture whereby, window 608 is dragged by chrome area 681 with focus selector 602 according to motion vector 617. As shown in FIGS. 6A-6B, focus selector 602 is shown as fixed to chrome area 681 of window 608.

In response to receiving the input (940) and in accordance with a determination that the respective location is a first location that is associated with creating tiled virtual desktops, the device creates (942) a new tiled virtual desktop in which the first window is tiled in a structured arrangement (e.g., full screen or half screen). For example, FIGS. 6A-6E illustrate a sequence in which a window 608 is dragged and dropped into first drop target 618, which is associated with creating a new tiled virtual desktop. In response to completion of the dragging gesture (e.g., up-click or release of thumbnail representation 616) while thumbnail representation 616 is over first drop target 618 in FIG. 6D, a tiled virtual desktop 601-C including window 608 is created. As shown in FIG. 6E, second representation 614-B of the virtual desktop configuration region includes text-based indicator 615-C corresponding to newly created tiled virtual desktop 601-C.

In some embodiments, creating the new tiled virtual desktop in which the first window is tiled in a structured arrangement includes (944) displaying the first window as a full-screen tiled window. For example, FIGS. 6F-6G illustrate a sequence in which the tiled virtual desktop created in FIGS. 6A-6E is displayed. FIG. 6F illustrates focus selector 602 at a location corresponding to text-based indicator 615-C for virtual desktop 601-C within second representation 614-B of the virtual desktop configuration region. For example, a user of the device (e.g., device 300, FIG. 3) selects text-based indicator 615-C for virtual desktop 601-C by performing a single or double click while focus selector 602 is located over text-based indicator 615-C for virtual desktop 601-C. In some embodiments, in response to selection of text-based indicator 615-C for virtual desktop 601-C (e.g., with a single or double click) in FIG. 6F, window 608 is shown as a partial-screen tile within tiled virtual desktop 601-C as shown in FIG. 6G.

In some embodiments, creating the new tiled virtual desktop in which the first window is tiled in a structured arrangement includes (946) displaying the first window as a partial-screen tiled window (e.g., half screen, extending the entire height of the display). For example, FIGS. 6F and 6H illustrate a sequence in which the tiled virtual desktop created in FIGS. 6A-6E is displayed. FIG. 6F illustrates focus selector 602 at a location corresponding to text-based indicator 615-C for virtual desktop 601-C within second representation 614-B of the virtual desktop configuration region. For example, a user of the device (e.g., device 300, FIG. 3) selects text-based indicator 615-C for virtual desktop 601-C by performing a single or double click while focus selector 602 is located over text-based indicator 615-C for virtual desktop 601-C. In some embodiments, in response to selection of text-based indicator 615-C for virtual desktop 601-C in FIG. 6F, window 608 is shown as a full-screen tile within tiled virtual desktop 601-C as shown in FIG. 6H.

In some embodiments, in accordance with a determination that the respective location is also a particular sub-portion of the first location, the device displays (948) the first window in a corresponding region of the new tiled virtual desktop associated with the particular sub-portion of the first location. For example, with reference to FIG. 6F, the position at which the window added to a newly virtual desktop 601-C is located depends on the position of focus selector 602 within first drop region 618 at the time of completion of the dragging gesture (e.g., up-click or release of thumbnail representation 616).

In some embodiments, the first location includes (950) a region that is between a representation of an existing virtual desktop and a new non-tiled virtual desktop creation affordance. As shown in FIGS. 6R-6U, hidden first drop target 645 occupies the space between text-based indicator 655-D corresponding to existing virtual desktop 651-D and second drop target 620. For example, the hidden first drop target 645 is associated with creating a new tiled virtual desktop In some embodiments, the device displays (952) a representation of a tiled virtual desktop creation affordance in the first location. For example, with reference to FIG. 6F, the first drop target 618 includes icon which shows a full-screen tile with a "+" sign.

In some embodiments, a tiled virtual desktop creation affordance in the first location is defined by (954) respective edges of the representation of the existing virtual desktop and the new non-tiled virtual desktop creation affordance. With reference to FIGS. 6R-6U, in some embodiments, the hidden first drop target 645 occupies all of the space between text-based indicator 655-D corresponding to existing virtual desktop 651-D and second drop target 620. With reference to FIGS. 6R-6U, in some embodiments, the hidden first drop target 645 occupies all of the blank space in second representation 614-B of the virtual desktop configuration region. As such, the user is able create a new tiled virtual desktop in between using any black space.

In response to receiving the input (940) and in accordance with a determination that the respective location is a second location that is associated with creating non-tiled virtual desktops, the device creates (956) a new non-tiled virtual desktop that includes the first window (e.g., at a size and/or location that corresponds to a size and/or location of the first window before the input was received). For example, FIGS. 6S-6V illustrate a sequence in which a window 642 is dragged and dropped into second drop target 620, which is associated with creating a new non-tiled virtual desktop. In response to completion of the dragging gesture (e.g., up-click or release of thumbnail representation 652) while thumbnail representation 652, which corresponds to window 642, is over second drop target 620 in FIG. 6T, a non-tiled virtual desktop 651-E including window 642 is created. As shown in FIG. 6U, second representation 614-B of the virtual desktop configuration region includes a text graphical representation 659-E corresponding to newly created non-tiled virtual desktop 651-E.

In some embodiments, in response to receiving the input (940) and in accordance with a determination that the respective location is a third location that is associated with a second virtual desktop that is a tiled virtual desktop in which second window is tiled in a structured arrangement (e.g., full or split screen), the device adds (958) the first window to the second virtual desktop in a structured arrangement with the second window. For example, FIGS. 6W-6Y illustrate a sequence in which window 644 is added to existing tiled virtual desktop 651-D. As shown in FIGS. 6W-6X, window 644 is dragged toward graphical representation 659-D with focus selector 602 according to movement vector 677. As shown in FIG. 6X, for example window 644 is converted to a thumbnail representation 674 (e.g., an image of window 644) in response to window 644 breaching first interaction threshold 610-A. In response to completion of the dragging gesture (e.g., up-click or release of thumbnail representation 674) while thumbnail representation 674 is over graphical representation 659-D² in FIG. 6Y, window 644 is added to existing virtual desktop 651-D.

For example, FIGS. 6Z-6AA illustrate a sequence in which existing tiled virtual desktop 651-D to which window 644 was added in FIGS. 6W-6Y is displayed. FIG. 6Z illustrates focus selector 602 at a location corresponding to graphical representation 659-D for virtual desktop 651-D within second representation 614-B of the virtual desktop configuration region. For example, a user of the device (e.g., device 300, FIG. 3) selects graphical representation 659-D for virtual desktop 651-D by performing a single or double click while focus selector 602 is located over graphical representation 659-D for virtual desktop 651-D. In some embodiments, in response to selection of graphical representation 659-D for virtual desktop 651-D (e.g., with a single or double click) in FIG. 6Z, window 644 is shown as a half-screen tile adjacent to the right-side of the display space and previously added window 682 is shown as a half-screen tile adjacent to the left-side of the display space within tiled virtual desktop 651-D as shown in FIG. 6AA.

In some embodiments, adding the first window to the second virtual desktop in a structured arrangement with the second window includes (960) displaying the first and second windows as tiles that each have respective dimensions set in accordance with a corresponding application characteristic associated with each of the first and second windows. For example, tiles are displayed so as to occupy as much of a portion of a full screen as they are allotted based on application-specific display attributes/preferences. In some embodiments, the tile proportions reflect the allowable sizes in a tiled display (e.g., min width in mail application).

In some embodiments, adding the first window to the second virtual desktop in a structured arrangement with the second window includes (962) displaying the first and second windows as tiles that each have respective dimensions set in accordance with at least the dimensions of the first window as displayed on the first virtual desktop (or, optionally in accordance with relative widths of the first window and the second window). For example, if the first window was more than 50% wider than the second window in the non-tiled arrangement, then the first window would occupy more of the tiled desktop (e.g., ⅔ of the tiled desktop) than the second window (which, for example, occupies ⅓ of the tiled desktop).

In some embodiments, in accordance with a determination that the respective location is also a particular sub-portion of the third location, the device displays (964) the first window in a corresponding region of the second virtual desktop associated with the particular sub-portion of the third location. For example, in FIG. 6X, due to the positioning of focus selector 602 (and consequently thumbnail representation 674) over the left-side of graphical representation 659-D, graphical representation 659-D¹ indicates that the addition of window 644 to existing virtual desktop 651-D will cause the existing full-screen tile to be converted to a half-screen tile adjacent to the right-side of the display space and window 644 to be added as a half-screen tile adjacent to the left-side of the display space (e.g., in the position of the "+" sign). FIGS. 6X-6Y, for example, illustrate a sequence in which thumbnail representation 674 is dragged from the left-side of graphical representation 659-D to the right-side of graphical representation 659-D. As a result, in FIG. 6Y, for example, due to the positioning of focus selector 602 (and consequently thumbnail representation 674) over the right-side of graphical representation 659-D, graphical representation 659-D² indicates that the addition of window 644 to existing virtual desktop 651-D will cause the existing full-screen tile to be converted to a half-screen tile adjacent to the left-side of the display space and window 644 to be added as a half-screen tile adjacent to the right-side of the display space (e.g., in the position of the "+" sign). In some embodiments, for example, in response to selection of graphical representation 659-D² for virtual desktop 651-D (e.g., with a single or double click) in FIG. 6Z, window 644 is shown as a half-screen tile adjacent to the right-side of the display space and previously added window 682 is shown as a half-screen tile adjacent to the left-side of the display space within tiled virtual desktop 651-D as shown in FIG. 6AA.

In some embodiments, in response to receiving the input (940) and in accordance with a determination that the respective location is a fourth location that is associated with a third virtual desktop that is a non-tiled virtual desktop, the device adds (966) the first window to the third virtual desktop (e.g., at a size and/or location that corresponds to a size and/or location of the first window before the input was received). For example, FIGS. 6M-6N illustrate a sequence in which thumbnail representation 638 of window 628 is dragged and dropped into graphical representation 636-D of existing virtual desktop 631-D (e.g., a non-tiled virtual desktop) within second representation 614-B of the virtual desktop configuration region. In response to completion of the dragging gesture (e.g., up-click or release of thumbnail representation 638, which corresponds to window 628, while thumbnail representation 638 is over graphical representation 636-D as shown in FIG. 6N, window 628 is added to existing virtual desktop 631-D. Furthermore, in accordance some embodiments, in response to completion of the dragging gesture, existing virtual desktop 631-D is displayed as shown in FIG. 6O. As shown in FIG. 6O, virtual desktop 631-D is a non-tiled virtual desktop including newly added window 628 and previously added window 640. As shown in FIG. 6O, virtual desktop 631-D.

It should be understood that the particular order in which the operations in FIGS. 9A-9F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 1000) are also applicable in an analogous manner to method 900 described above with respect to 9A-9F. For example, the inputs, gestures, user interface element, and focus selectors described above with reference to method 800 optionally have one or more of the characteristics of the inputs, gestures, user interface objects, and focus selectors described herein with reference to other methods described herein (e.g., methods 800 and 1000). For brevity, these details are not repeated here.

FIGS. 10A-10F are flow diagrams illustrating a method 1000 of tiling and manipulating tiled windows in accordance with some embodiments. The method 1000 is performed at an electronic device (e.g., device 300, FIG. 3, or portable multifunction device 100, FIG. 1A) with a display, one or more input devices, one or more processors, and a non-transitory memory. Some operations in method 1000 are, optionally, combined and/or the order of some operations is, optionally, changed. In another example, various portions of method 1000 may be practiced and/or performed in various sequences and/or combinations, including simultaneously.

As described below, the method 1000 provides an intuitive way to tile and manipulate tiled windows. The method reduces the cognitive burden on a user when tiling and manipulating tiled windows, thereby creating a more efficient human-machine interface. For battery-operated electronic devices, enabling a user to tile and manipulate tiled windows faster and more efficiently conserves power and increases the time between battery charges.

The device displays (1002), on the display, a first desktop space including a window of an application, wherein the window includes a window tiling affordance displayed within a chrome of the window. For example, a window 730 is displayed on display 450 in FIG. 7A. In accordance with some embodiments, window 730 includes a chrome area and a window tiling affordance 709. For example, in some embodiments, as shown in FIGS. 7A-7B, chrome area includes a top chrome portion 707, a side chrome portion 708a, and a bottom chrome portion 708b.

The device receives (1004), from the one or more input devices, a window movement input. For example, focus selector 702 in FIG. 7A is manipulated using a mouse, a touchpad, or a touchscreen device or the like. In response to receiving the window movement input, in accordance with a determination that the window movement input includes selection of the window tiling affordance, the device tiles (1006) the window on the display. For example, FIGS. 7A-7D illustrate a sequence in which window 730 is changed to partial-screen tiled window 730 in response to receiving a window movement input that includes a particular type of selection of a window tiling affordance (e.g., window tiling affordance 709).

In some embodiments, in accordance with a determination that selection of the window tiling affordance is a first type of selection, tiling (1008) the window on the display includes displaying a corresponding full-screen tiled window that occupies all of a window display area on the display. For example, full-screen tiled window 730 in FIG. 7K occupies substantially all of display 450. For example, an area of the display that is designated for displaying application windows, which typically includes a majority of the area of the display but, in some embodiments, excludes one or more regions that are designated for displaying system information such as a status bar, a task bar, or a menu bar. In some embodiments, in accordance with a determination that selection of the window tiling affordance is a second type of selection, tiling (1008) the window includes displaying a corresponding partial-screen tiled window that occupies a portion of the window display area on the display. For example, partial-screen tiled window 730 in FIG. 7D occupies the left side of display 450. In some embodiments, in accordance with a determination that the window movement input is of a duration less than a duration threshold, the device determines (1010) that selection of the window tiling affordance is the first type of selection. In accordance with a determination that the window movement input is of a duration greater than a duration threshold, the device determines (1010) that selection of the window tiling affordance is the second type of selection. For example, in some embodiments, determining whether the selection of the window tiling affordance is the first type or second type of selection is based on whether or not the window movement input has a duration greater than the duration threshold. In some embodiments, in accordance with a determination that the window movement input includes movement less than a movement threshold, the device determines (1012) that selection of the window tiling affordance is the first type of selection. In accordance with a determination that the window movement input includes movement greater than the movement threshold, the device determines (1012) that selection of the window tiling affordance is the second type of selection. For example, in some embodiments, determining whether the selection of the window tiling affordance is the first type or second type of selection is based on whether or not the window movement input includes movement greater than the movement threshold.

In some embodiments, tiling (1014) proceeds in response to a determination that the window movement input is complete. For example, release of a mouse button or liftoff from a touchpad or touchscreen causes a determination that the window movement is complete.

In some embodiments, in accordance with the determination that the window movement input includes selection of the window tiling affordance, the device displays (1016) a selection overlay within a first portion of the display that indicates where the corresponding tiled window will be displayed when the window movement input is completed. For example, as shown in FIG. 7B, a first selection overlay 711 is displayed over the left portion of display 450. In some embodiments, in accordance with determining that the window movement input effects movement of the window in a respective direction, the device moves (1018) display of the selection overlay to a second portion of the display, wherein the second portion of the display is located in a direction away from the first portion of the display corresponding to the respective direction of the movement of the window, as described above with reference to FIG. 7B. In some embodiments, in accordance with determining that the window movement input repositioned a majority area of the window within a second portion of the display, the device moves (1020) display of the selection overlay to the second portion of the display, as described above with reference to FIG. 7B.

In some embodiments, when displaying a first partial-screen tiled window in the predefined portion of the display, the device displays (1022) representations of one or more other application windows in a different predefined portion of the display. In some embodiments, the device displays (1024) the representations of the one or more other application windows at reduced scale as compared to respective display sizes of the one or more other applications prior to tiling of the window to produce the first partial-screen tiled window. For example, FIG. 7H partial-screen tiled window 730 is displayed on the left side of display 450, and reduced-scale representations of windows 731, 732, 733 are displayed on the right side of 450. In some embodiments, the device displays (1026) the one or more other application windows in one or more groups based on one or more application types associated with the one or more other application windows.

In some embodiments, in response to detecting selection of a respective representation among the representations of the one or more other application windows, the device tiles (1028) the selected respective representation in order to display a second partial-screen tiled window in a structured arrangement with the first partial-screen tiled window. For example, with reference to FIGS. 7H and 7I, window 732 converted to is selected and converted to a partial-screen tiled window 732 that is arranged in a structured arrangement with partial-screen tiled window 730. In some embodiments, in accordance with detecting a subsequent window movement input associated with directing movement of one of the first partial-screen tiled window and the second partial-screen tiled window towards the other, the device exchanges (1030) display positions of the first partial-screen tiled window with the second partial-screen tiled window.

For example, with reference to FIGS. 7I and 7J, partial-screen tiled window 732 and partial-screen tiled window 730 exchange positions with one another when focus selector 702 is used to select top chrome portion 707 and drag partial-screen tiled window 730 toward the partial-screen tiled window 732. Similarly, partial-screen tiled windows 730, 732 exchange positions with one another when focus selector 702 is used to select top chrome portion 717 and drag partial-screen tiled window 732 toward the partial-screen tiled window 730.

In some embodiments, in accordance with a determination that at least one of the one or more other application windows cannot be tiled in the first desktop space in combination with the window, the device displays (1032) the representation corresponding to the at least one of the one or more other application windows separately from any remaining representations of the one or more other application windows, and displays a graphical indication concurrently with the representation of the one or more other application windows, the graphical indication indicating that the one or more other application windows are not available for selection. In some embodiments, the device displays (1034) a glyph over or, optionally, proximate to the representation corresponding to the at least one of the one or more other application windows in order to indicate that the one or more affordances have been disabled. For example, with reference to FIG. 7H, windows 734, 735 are non-selectable. In turn, windows 734, 735 are displayed separately from windows 731, 732, 733 (which are selectable, as described below). In some embodiments, a graphical indicator 751 is displayed over and/or in association with windows 734, 735.

In some embodiments, the device tiles (1036) the selected one of the one or more other application windows so that at least one dimension of a tiled window is a function of a dimension of the display. For example, with reference to FIG. 7D, the height of partial-screen tiled window 730 is approximately the height of display 450.

In some embodiments, in accordance with a determination that the window input movement includes both selection of the window tiling affordance and movement of the window into a predefined portion of the display corresponding to an abort tiling affordance, the device repositions (1038) the window without tiling the window on the display, and terminates responsiveness to the window input movement. For example, with reference to FIG. 7B, dead-zone 715 when selected by placing and resting window 730 in the approximate middle of display 450, during the window movement input, causes the window tiling process to be cancelled.

In some embodiments, in accordance with a determination that the window input movement includes both selection of the window tiling affordance and a subsequent termination input, the device terminates (1040) responsiveness to the window input movement. For example, the subsequent termination input includes selection of an "Esc" key or the like.

In some embodiments, when displaying a full-screen tiled window in the predefined portion of the display, in accordance with a determination that a subsequent window input movement includes selection of the window tiling affordance, the device reduces (1042) the full-screen tiled window to a first partial-screen tiled window. For example, FIGS. 7K-7M illustrate a sequence in which full-screen tiled window 730 is converted to a partial-screen tiled window 730, and subsequently displayed in a structured arrangement with partial-screen tiled window 732.

In response to receiving the window movement input, in accordance with a determination that the window movement input includes selection of a portion of the window chrome that does not include the window tiling affordance, the device adjusts (1044) a position of at least a portion of the window without tiling the window on the display. In some embodiments, in accordance with a determination that the window movement input is associated with the top of the chrome, the device adjusts (1046) the position of at least a portion of the window without tiling the window on the display comprises moving the entire window on the display (e.g., shifting the entire window across the display). In some embodiments, in accordance with a determination that the window movement input is associated with a side or bottom portion of the chrome, the device adjusts (1048) the position of at least a portion of the window without tiling the window on the display comprises resizing the window.

It should be understood that the particular order in which the operations in FIGS. 10A-10F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 900) are also applicable in an analogous manner to method 1000 described above with respect to FIGS. 10A-10F. For example, the inputs, gestures, user interface element, and focus selectors described above with reference to method 1000 optionally have one or more of the characteristics of the inputs, gestures, user interface objects, and focus selectors described herein with reference to other methods described herein (e.g., methods 800 and 900). For brevity, these details are not repeated here.

Figure 11:
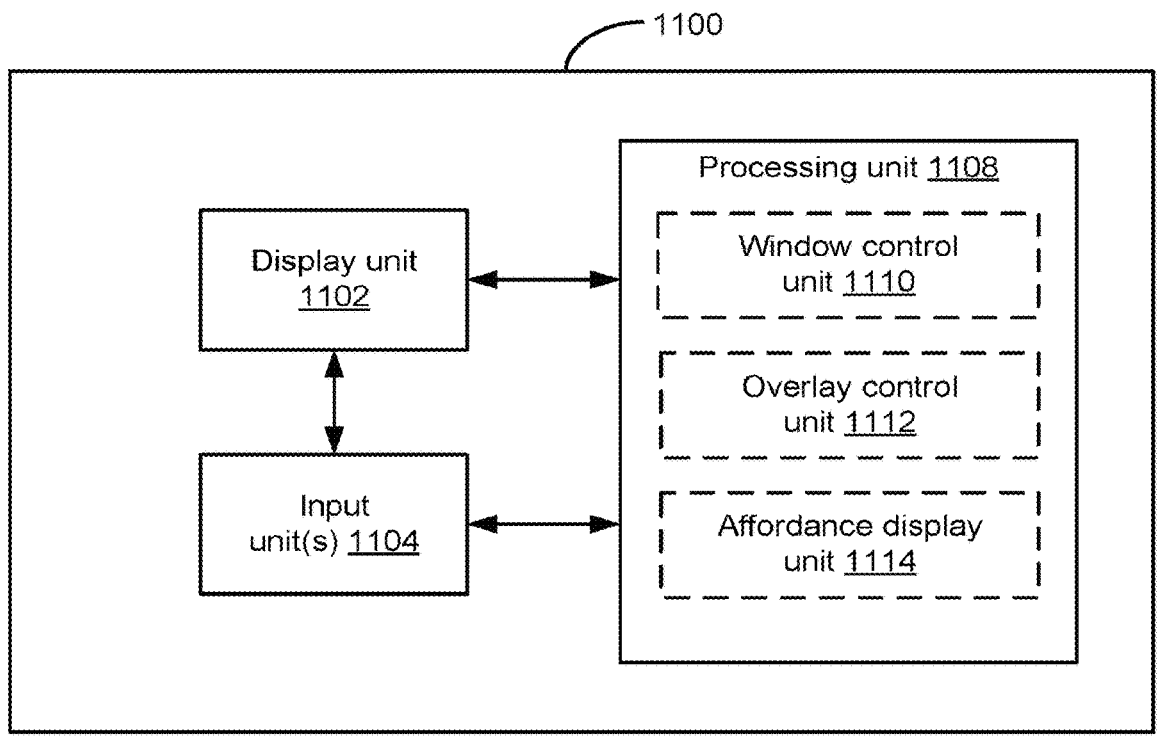
FIG. 11 is a functional block diagram of an electronic device in accordance with some embodiments.

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured to display a graphical user interface, a one or more input units 1104 configured to receive user inputs, and a processing unit 1108 coupled to the display unit 1102 and the one or more input units 1104. In some embodiments, the processing unit 1108 includes: a window control unit 1110, an overlay control unit 1112, and an affordance display unit 1114.

In some embodiments, the processing unit 1108 is configured to enable display of (e.g., with the window control unit 1110) a first representation of a multi-pane window of an application, where the first representation of the multi-pane window includes a first pane adjacent to a first edge of the multi-pane window and a second pane adjacent to the first pane. In response to a reduction of the width of the first representation of the multi-pane window below a first threshold, the processing unit 1108 is configured to collapse display of (e.g., with the window control unit 1110) the first pane in order to display a second representation of the multi-pane window that continues to include display of the second pane and the first edge. In response to detecting an interaction input associated with the first edge of the second representation of the multi-pane window, the processing unit 1108 is configured to enable display of (e.g., with the overlay control unit 1112) the first pane as an overlay adjacent to the first edge and covering at least a portion of the second pane within the second representation of the multi-pane window.

In some embodiments, in response to an increase of the width of the second representation of the multi-pane window above a second threshold width, the processing unit 1108 is configured to reintroduce display of (e.g., with the window control unit 1110) the first pane in order to display a third representation of the multi-pane window, the third representation of the multi-pane window including the first pane between the first edge and the second pane.

In some embodiments, the first and second threshold widths are each a function of at least one of a number of pixels, a number of display points, a distance value, and a relative display area associated with a representation of the multi-pane window and a total available display area.

In some embodiments, in response to the increase of the width of the second representation of the multi-pane window above the second threshold width, the processing unit 1108 is configured to size (e.g., with the window control unit 1110) the respective widths of the first and second panes in the third representation of the multi-pane window to match proportions of the corresponding widths of the first and second panes within the first representation of the multi-pane window.

In some embodiments, reintroduction of display of the first pane occurs when the increase of the width of the second representation of the multi-pane window above the second threshold width occurs within a threshold time duration, and reintroduction of display of the first pane does not occur when the increase of the width of the second representation of the multi-pane window above the second threshold width occurs after the threshold time duration.

In some embodiments, the interaction input associated with the first edge includes detecting positioning of a focus selector within a trigger area including the first edge.

In some embodiments, the first pane includes an arrangement of one or more display items, and the overlay having sufficient width to display the arrangement of the one or more display items without display of any of the one or more display items being truncated by an edge of the overlay.

In some embodiments, the processing unit 1108 is configured to remove display of (e.g., with the overlay control unit 1112) the overlay from within the second representation of the multi-pane window in response to detecting that a focus selector moves away from the first edge.

In some embodiments, the processing unit 1108 is configured to remove display of (e.g., with the overlay control unit 1112) the overlay from within the second representation of the multi-pane window in response to detecting that an icon has been placed over a drop target included in the overlay.

In some embodiments, the processing unit 1108 is configured to enable display of (e.g., with the affordance display unit 1114) an overlay display toggle affordance in the second representation of the multi-pane window. In response to detecting selection of the overlay display toggle affordance in the second representation of the multi-pane window, the processing unit 1108 is configured to maintain display of (e.g., with the overlay control unit 1112) the overlay independent of whether or not interaction input associated with the first edge of the second representation of the multi-pane window is detected. In response to detecting another selection of the overlay display toggle affordance in the second representation of the multi-pane window, the processing unit 1108 is configured to cease to maintain display of (e.g., with the overlay control unit 1112) the overlay as independent of whether or not the interaction input associated with the first edge of the second representation of the multi-pane window is detected.

In some embodiments, the processing unit 1108 is configured to enable display of (e.g., with the affordance display unit 1114) a first pane display toggle affordance in the first and third representations of the multi-pane window. In response to detecting selection of the first pane display toggle affordance while displaying either the first or the third representations of the multi-pane window, the processing unit 1108 is configured to include display of (e.g., with the window control unit 1110) the first pane in the first and third representations of the multi-pane window. In response to detecting another selection of the first pane display toggle affordance while displaying either the first or the third representations of the multi-pane window, the processing unit 1108 is configured to remove display of (e.g., with the window control unit 1110) the first pane in the first and third representations of the multi-pane window.

In some embodiments, in response to the reduction of the width of the first representation of the multi-pane window and before the reduction is below the first threshold, the processing unit 1108 is configured to continuously resize of (e.g., with the window control unit 1110) the first and second panes as a function of the continuously changing width of the first representation of the multi-pane window.

In some embodiments, displaying the first pane as the overlay within the second representation of the multi-pane window comprises introduces the overlay by displaying an animation of the second representation of the multi-pane window sliding out from the first edge.

In some embodiments, the sliding animation is displayed in response to detecting directed movement of an icon towards the first edge.

In some embodiments, the processing unit 1108 is configured to enable display of (e.g., with the affordance display unit 1114) a sizing toggle affordance in the first and third representations of the multi-pane window. In response to detecting selection of the sizing toggle affordance while displaying either the first or the third representations of the multi-pane window, the processing unit 1108 is configured to resize of (e.g., with the window control unit 1110) the first and second panes as a function of predefined proportions.

In some embodiments, the predefined proportions include at least one of percentage based relative widths of the first and second panes, respective lower bounds of pixels for the corresponding widths of the first and second panes, and respective lower bounds of display points for the corresponding widths of the first and second panes.

In some embodiments, the width of the second pane is fixed while the overlay is displayed.

In some embodiments, the processing unit 1108 is configured to enable display of (e.g., with the window control unit 1110) a matrix of display elements within the second pane, the matrix of display elements having a first number of rows, a first number of columns, a total number of display elements. In response to detecting reduction in the size of the second pane, the processing unit 1108 is configured to change display of (e.g., with the window control unit 1110) the matrix of display elements so that the first number of rows is changed to a second number of rows, and the first number of columns is changed to a second number of columns, while maintaining the total number of display elements.

In some embodiments, detecting the reduction of the width of the first representation of the multi-pane window includes receiving at least one of: a request to reduce at least the width of the multi-pane window, a request to display the multi-pane window in a predefined tiling arrangement, and an instruction effecting a reduction of the size of the display area that in turn effects downsizing of the multi-pane window.

In some embodiments, the overlay is at least partially transparent or translucent.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8E are, optionally, implemented by components depicted in FIGS. 1A-1B, FIG. 3, or FIG. 11. For example, displaying operation 802, collapsing operation 814, and displaying operation 818 are, optionally, implemented by event sorter 170, event recognizer 180, and event handler 190. For example, event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 12:
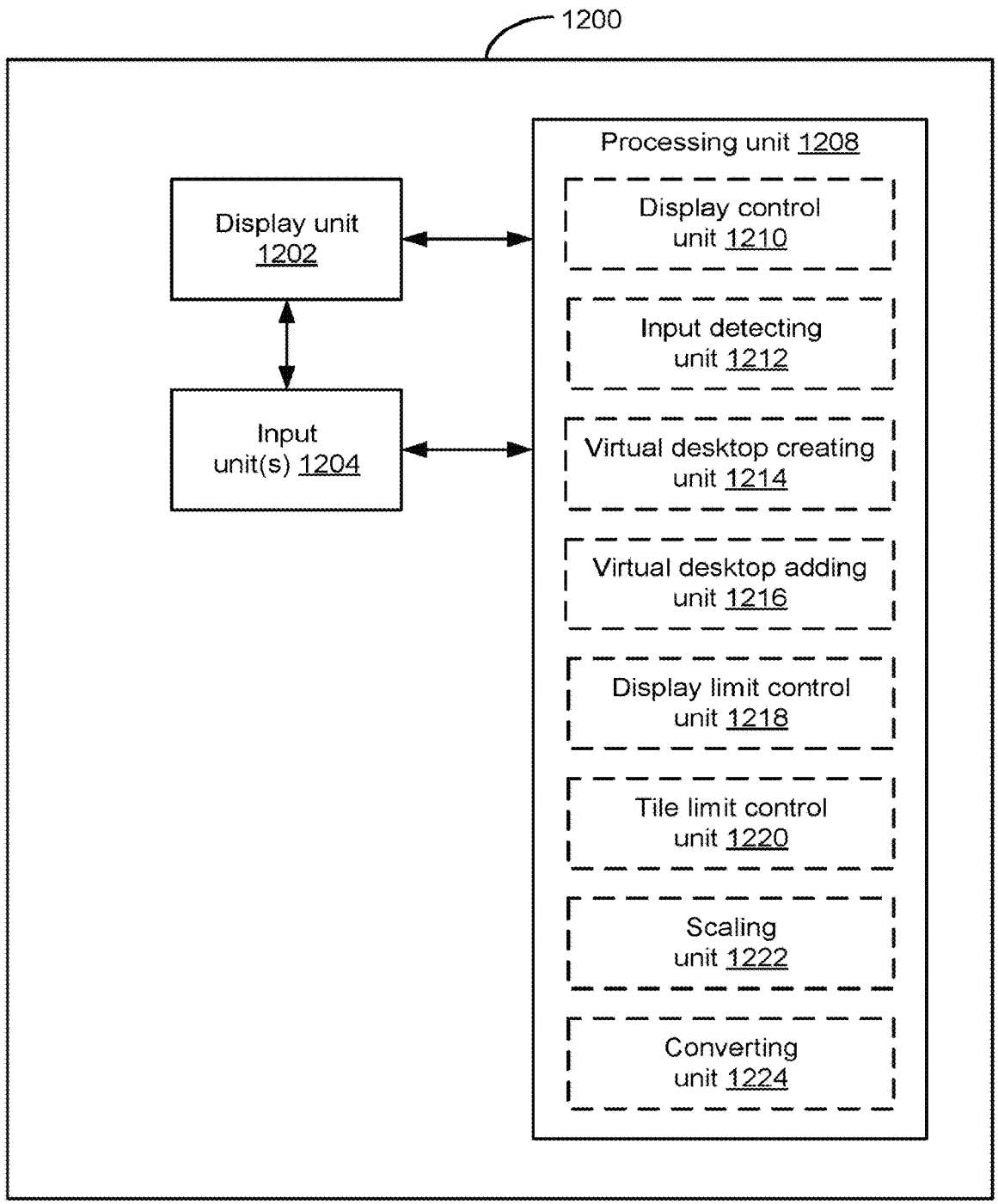
FIG. 12 is a functional block diagram of an electronic device in accordance with some embodiments.

In accordance with some embodiments, FIG. 12 shows a functional block diagram of an electronic device 1200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 configured to display a graphical user interface, a one or more input units 1204 configured to receive user inputs, and a processing unit 1208 coupled to the display unit 1202 and the one or more input units 1204. In some embodiments, the processing unit 1208 includes: a display control unit 1210, an input detecting unit 1212, a virtual desktop creating unit 1214, a virtual desktop adding unit 1216, a display limit control unit 1218, a tile limit control unit 1220, a scaling unit 1222, and a converting unit 1224.

In some embodiments, the processing unit 1208 is configured to enable concurrent display of (e.g., with the display control unit 1210): a first virtual desktop including a first window of an application; and a virtual desktop configuration region. While concurrently displaying the first virtual desktop and the virtual desktop configuration region, the processing unit 1208 is configured to receive (e.g., with the input detecting unit 1212) an input corresponding to a request to place a representation of the first window at a respective location in the virtual desktop configuration region. In response to receiving the input and in accordance with a determination that the respective location is a first location that is associated with creating tiled virtual desktops, the processing unit 1208 is configured to create (e.g., with the virtual desktop creating unit 1214) a new tiled virtual desktop in which the first window is tiled in a structured arrangement. In response to receiving the input and in accordance with a determination that the respective location is a second location that is associated with creating non-tiled virtual desktops, the processing unit 1208 is configured to create (e.g., with the virtual desktop creating unit 1214) a new non-tiled virtual desktop that includes the first window.

In some embodiments, in response to receiving the input and in accordance with a determination that the respective location is a third location that is associated with a second virtual desktop that is a tiled virtual desktop in which second window is tiled in a structured arrangement, the processing unit 1208 is configured to add (e.g., with the virtual desktop adding unit 1216) first window to the second virtual desktop in a structured arrangement with the second window.

In some embodiments, adding the first window to the second virtual desktop in a structured arrangement with the second window includes displaying the first and second windows as tiles that each have respective dimensions set in accordance with a corresponding application characteristic associated with each of the first and second windows.

In some embodiments, adding the first window to the second virtual desktop in a structured arrangement with the second window includes displaying the first and second windows as tiles that each have respective dimensions set in accordance with at least the dimensions of the first window as displayed on the first virtual desktop.

In some embodiments, in accordance with a determination that the respective location is also a particular sub-portion of the third location, the processing unit 1208 is configured to enable display of (e.g., with the display control unit 1210) the first window in a corresponding region of the second virtual desktop associated with the particular sub-portion of the third location.

In some embodiments, in response to receiving the input and in accordance with a determination that the respective location is a fourth location that is associated with a third virtual desktop that is a non-tiled virtual desktop, the processing unit 1208 is configured to add (e.g., with the virtual desktop adding unit 1216) the first window to the third virtual desktop.

In some embodiments, the virtual desktop configuration region is arranged in association with a first edge of the first virtual desktop responsive to an interaction input.

In some embodiments, display of the virtual desktop configuration region emerges from the first edge in response to detecting an interaction input associated with the first edge.

In some embodiments, the interaction input associated with the first edge includes receiving an input corresponding to positioning of a focus selector within a trigger area including the first edge.

In some embodiments, interaction input associated with the first edge includes receiving an input corresponding to positioning the first window within a trigger area including the first edge.

In some embodiments, in accordance with a determination that the interaction input satisfies a first interaction threshold in relation to the first edge, the processing unit 1210 is configured to enable display of (e.g., with the display control unit 1210) a first representation of the virtual desktop configuration region along the first edge of the first virtual desktop, the first representation of the virtual desktop configuration region having a first height.

In some embodiments, the first representation of the virtual desktop configuration region, virtual desktops are represented by text labels without associated graphical representations.

In some embodiments, while displaying the text based representations of virtual desktops in the virtual desktop configuration region, where the number of virtual desktops does not exceed a text-representation display limit, the processing unit 1210 is configured to detect the addition of an additional virtual desktop to the virtual desktop configuration region. In response to detecting the addition of the additional virtual desktop to the virtual desktop configuration region and in accordance with a determination that the total number of the one or more virtual desktops created exceeds a predefined limit, the processing unit 1210 is configured to convert (e.g., with the display limit control unit 1218) display of the text based indicators of the one or more virtual desktops in the virtual desktop configuration region to graphical representations of each of the one or more virtual desktops in the virtual desktop configuration region.

In some embodiments, in response to detecting the addition of the additional virtual desktop to the virtual desktop configuration region and in accordance with a determination that the total number of the one or more virtual desktops created does not exceed the text-representation display limit, the processing unit 1210 is configured to add (e.g., with the display limit control unit 1218) a text based representation of the additional virtual desktop to the virtual desktop configuration region without converting the display of the text based indicators of the one or more virtual desktops in the virtual desktop configuration region to graphical representations of the one or more virtual desktops in the virtual desktop configuration region.

In some embodiments, while displaying the first representation of the virtual desktop configuration region, in accordance with a determination that the interaction input satisfies a second interaction threshold in relation to the first edge, the processing unit 1210 is configured to replace display of (e.g., with the display control unit 1210) with the first representation of the virtual desktop configuration region with a second representation of the virtual desktop configuration region along the first edge of the first virtual desktop, the second representation of the virtual desktop configuration region having a second height greater than the first height, and where the second representation of the virtual desktop configuration region includes one or more previously created virtual desktops.

In some embodiments, in response to detecting the interaction input and in accordance with a determination that the interaction input satisfies a proximity threshold in relation to the first edge, the processing unit 1210 is configured to enable display of (e.g., with the display control unit 1210) an indicator of the virtual desktop configuration region along the first edge of the first virtual desktop, where the indicator does not include representations of any of the previously created virtual desktops.

In some embodiments, the display of the indicator of the virtual desktop configuration region includes a symbol provided to indicate that further interaction with the indicator of the virtual desktop configuration is available.

In some embodiments, in response to detecting the interaction input and in accordance with a determination that the interaction input with the first edge is complete, the processing unit 1210 is configured to cease display of (e.g., with the display control unit 1210) any representation or indicator of the virtual desktop configuration region.

In some embodiments, creating the new tiled virtual desktop in which the first window is tiled in a structured arrangement includes displaying the first window as a full-screen tiled window.

In some embodiments, where creating the new tiled virtual desktop in which the first window is tiled in a structured arrangement includes displaying the first window as a partial-screen tiled window.

In some embodiments, in accordance with a determination that the respective location is also a particular sub-portion of the first location, the processing unit 1210 is configured to enable display of (e.g., with the display control unit 1210) the first window in a corresponding region of the new tiled virtual desktop associated with the particular sub-portion of the first location.

In some embodiments, the first location includes a region that is between a representation of an existing virtual desktop and a new non-tiled virtual desktop creation affordance.

In some embodiments, the processing unit 1210 is configured to enable display of (e.g., with the display control unit 1210) a representation of a tiled virtual desktop creation affordance in the first location.

In some embodiments, a tiled virtual desktop creation affordance in the first location is defined by respective edges of the representation of the existing virtual desktop and the new non-tiled virtual desktop creation affordance.

In some embodiments, in accordance with a determination that the respective location is associated with a representation of an existing tiled virtual desktop that includes a predefined tile limit, the processing unit 1210 is configured to: change (e.g., with the tile limit control unit 1220) the representation of the existing tiled virtual desktop to be non-responsive to the input; and change (e.g., with the tile limit control unit 1220) the display the representation of the existing tiled virtual desktop in order to indicate that the representation of the existing tiled virtual desktop is non-responsive to the input.

In some embodiments, in response to each respective addition of a representation of a virtual desktop to the virtual desktop configuration region, the processing unit 1210 is configured to scale down (e.g., with the scaling unit 1222) the size of the representations of existing virtual desktops.

In some embodiments, in response to moving the first window to the virtual desktop configuration region, the processing unit 1210 is configured to convert (e.g., with the converting unit 1224) the first window to a corresponding thumbnail when moved toward the virtual desktop configuration region In some embodiments, converting the first window to the corresponding thumbnail includes scaling down the size of the display of the first window to the corresponding thumbnail at a first rate proportional to a rate at which the virtual desktop configuration region emerges from the first edge.

In some embodiments, in accordance with a determination that the input is also associated with using a focus selector to select a portion of the chrome of the first window, the processing unit 1210 is configured to enable display of (e.g., with the display control unit 1210) the focus selector as fixed to the selected portion of the chrome of the first window as the first window is moved.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9F are, optionally, implemented by components depicted in FIGS. 1A-1B, FIG. 3, or FIG. 12. For example, converting operation 934, creating operation 944, and adding operation 958 are, optionally, implemented by event sorter 170, event recognizer 180, and event handler 190. For example, event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 13:
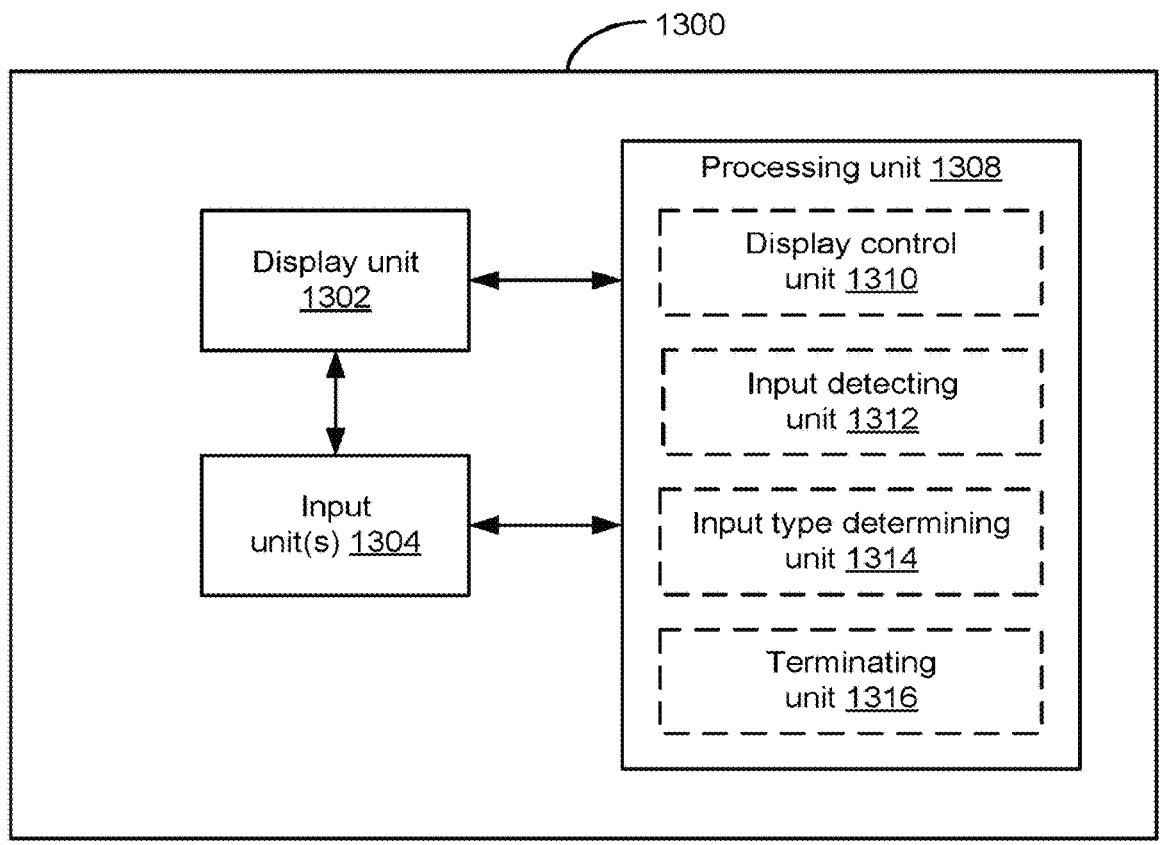
FIG. 13 is a functional block diagram of an electronic device in accordance with some embodiments.

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a graphical user interface, a one or more input units 1304 configured to receive user inputs, and a processing unit 1308 coupled to the display unit 1302 and the one or more input units 1304. In some embodiments, the processing unit 1308 includes: a display control unit 1310, an input detecting unit 1312, an input type determining unit 1314, and a terminating unit 1316.

In some embodiments, the processing unit 1308 is configured to enable display of (e.g., with the display control unit 1310), on the display unit 1302, a first desktop space including a window of an application, where the window includes a window tiling affordance displayed within a chrome of the window. The processing unit 1308 is configured to receive (e.g., with the input detecting unit 1312), via the one or more input units 1304, a window movement input. In response to receiving the window movement input and in accordance with a determination that the window movement input includes selection of the window tiling affordance, the processing unit 1308 is configured to tile (e.g., with the display control unit 1310) the window on the display unit 1302, where tiling the window on the display unit 1302 includes resizing the window to fill a predefined portion of the display unit 1302. In response to receiving the window movement input and in accordance with a determination that the window movement input includes selection of a portion of the window chrome that does not include the window tiling affordance, the processing unit 1308 is configured to adjust (e.g., with the display control unit 1310) a position of at least a portion of the window without tiling the window on the display unit 1302.

In some embodiments, in accordance with a determination that the window movement input is associated with the top of the chrome, adjusting the position of at least a portion of the window without tiling the window on the display unit 1302 comprises moving the entire window on the display unit 1302.

In some embodiments, in accordance with a determination that the window movement input is associated with a side or bottom portion of the chrome, adjusting the position of at least a portion of the window without tiling the window on the display unit 1302 comprises resizing the window.

In some embodiments, in accordance with a determination that selection of the window tiling affordance is a first type of selection, tiling the window on the display unit 1302 comprises displaying a corresponding full-screen tiled window that occupies all of a window display area on the. In some embodiments, in accordance with a determination that selection of the window tiling affordance is a second type of selection, tiling the window on the display unit 1302 comprises displaying a corresponding partial-screen tiled window that occupies a portion of the window display area on the display unit 1302.

In some embodiments, in accordance with a determination that the window movement input is of a duration less than a duration threshold, the processing unit 1308 is configured to determine (e.g., with the input type determining unit 1314) that selection of the window tiling affordance is the first type of selection. In some embodiments, in accordance with a determination that the window movement input is of a duration greater than the duration threshold, the processing unit 1308 is configured to determine (e.g., with the input type determining unit 1314) that selection of the window tiling affordance is the second type of selection.

In some embodiments, in accordance with a determination that the window movement input includes movement less than a movement threshold, the processing unit 1308 is configured to determine (e.g., with the input type determining unit 1314) that selection of the window tiling affordance is the first type of selection. In some embodiments, in accordance with a determination that the window movement input includes movement greater than the movement threshold, the processing unit 1308 is configured to determine (e.g., with the input type determining unit 1314) that selection of the window tiling affordance is the second type of selection.

In some embodiments, tiling the window proceeds in response to a determination that the window movement input is complete.

In some embodiments, in accordance with the determination that the window movement input includes selection of the window tiling affordance, the processing unit 1308 is configured to enable display of (e.g., with the display control unit 1310) a selection overlay within a first portion of the display unit 1302 that indicates where the corresponding tiled window will be displayed when the window movement input is completed.

In some embodiments, while displaying the selection overlay within the first portion of the display unit 1302 and in accordance with determining that the window movement input effects movement of the window in a respective direction, the processing unit is configured to move display of (e.g., with the display control unit 1310) the selection overlay to a second portion of the display unit 1302, where the second portion of the display unit 1302 is located in a direction away from the first portion of the display unit 1302 corresponding to the respective direction of the movement of the window.

In some embodiments, while displaying the selection overlay within the first portion of the display unit 1302 and in accordance with determining that the window movement input repositioned at least a majority of the area of the window within a second portion of the display unit 1302, the processing unit 1308 is configured to move display of (e.g., with the display control unit 1310) the selection overlay to the second portion of the display unit 1302.

In some embodiments, when displaying a first partial-screen tiled window in the predefined portion of the display unit 1302, the processing unit 1308 is configured to enable display of (e.g., with the display control unit 1310) representations of one or more other application windows in a different predefined portion of the display unit 1302.

In some embodiments, the processing unit 1308 is configured to enable display of (e.g., with the display control unit 1310) the representations of the one or more other application windows at reduced scale as compared to respective display sizes of the one or more other applications prior to tiling of the window to produce the first partial-screen tiled window.

In some embodiments, the processing unit 1308 is configured to enable display of (e.g., with the display control unit 1310) the representations of the one or more other application windows in one or more groups based on one or more application types associated with the one or more other application windows.

In some embodiments, in response to detecting selection of a respective representation from among the representations of the one or more other application windows, the processing unit 1308 is configured to tile (e.g., with the display control unit 1310) the selected respective representation in order to display a second partial-screen tiled window in a structured arrangement with the first partial-screen tiled window.

In some embodiments, in accordance with detecting a subsequent window movement input associated with directing movement of one of the first partial-screen tiled window and the second partial-screen tiled window towards the other, the processing unit 1308 is configured to exchange (e.g., with the display control unit 1310) display positions of the first partial-screen tiled window with the second partial-screen tiled window.

In some embodiments, in accordance with a determination that at least one of the one or more other application windows cannot be tiled in the first desktop space in combination with the window, the processing unit 1308 is configured to: enable display of (e.g., with the display control unit 1310) the representation corresponding to the at least one of the one or more other application windows separately from any remaining representations of the one or more other application windows; and enable display of (e.g., with the display control unit 1310) a graphical indication concurrently with the representations of the one or more other application windows, the graphical indication indicating that the one or more other application windows are not available for selection.

In some embodiments, the processing unit 1308 is configured to enable display of (e.g., with the display control unit 1310) a glyph over the representation corresponding to the at least one of the one or more other application windows in order to indicate that the one or more affordances have been disabled.

In some embodiments, at least one dimension of a tiled window is a function of a dimension of the display unit 1302.

In some embodiments, in accordance with a determination that the window input movement includes both selection of the window tiling affordance and movement of the window into a predefined portion of the display unit 1302 corresponding to an abort tiling, the processing unit 1308 is configured to: reposition (e.g., with the display control unit 1310) the window without tiling the window on the display unit 1302; and terminate (e.g., with the terminating unit 1316) responsiveness to the window input movement.

In some embodiments, in accordance with a determination that the window input movement includes both selection of the window tiling affordance and a subsequent termination input, the processing unit 1308 is configured to terminate (e.g., with the terminating unit 1316) responsiveness to the window input movement.

In some embodiments, when displaying a full-screen tiled window in the predefined portion of the display unit 1302 and in accordance with a determination that a subsequent window input movement includes selection of the window tiling affordance, the processing unit 1308 is configured to reduce (e.g., with the display control unit 1310) the full-screen tiled window to a first partial-screen tiled window.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 10A-10F are, optionally, implemented by components depicted in FIGS. 1A-1B, FIG. 3, or FIG. 13. For example, display operation 1002, tiling operation 1006, determining operation 1010, and terminating operation 1040 are, optionally, implemented by event sorter 170, event recognizer 180, and event handler 190. For example, event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a device with a display, one or more input devices, one or more processors and a non-transitory memory:
   concurrently displaying, on the display:
      a first virtual desktop including a first window of an application that has a first size; and
      a virtual desktop configuration region;
   while concurrently displaying the first virtual desktop and the virtual desktop configuration region, receiving, with the one or more input devices, an input corresponding to a request to place a representation of the first window at a respective location in the virtual desktop configuration region; and
   in response to receiving the input:
      in accordance with a determination that the respective location is a first location that is associated with creating tiled virtual desktops, creating a new tiled virtual desktop that includes one or more tiles arranged in a structured arrangement by changing a size of the first window from the first size to a second size that corresponds to a partial-screen tile that extends less than an entire width of the new tiled virtual desktop and extends an entire height of the new tiled virtual desktop in order to allow the first window to fit into the structured arrangement, wherein the new tiled virtual desktop is a virtual desktop in which the first window extends less than the entire width of the new tiled virtual desktop and the first window extends the entire height of the new tiled virtual desktop;
      in accordance with a determination that the respective location is a second location that is associated with creating non-tiled virtual desktops, creating a new non-tiled virtual desktop that includes the first window by maintaining the first window at the first size in the new non-tiled virtual desktop, wherein the second location is different from the first location, wherein the new non-tiled virtual desktop is a virtual desktop in which the first window extends less than an entire height of the new non-tiled virtual desktop; and
      in accordance with a determination that the respective location is a third location that is associated with a representation of an existing tiled virtual desktop including a number of tiles that has reached a predefined tile limit, displaying an indication that the existing tiled virtual desktop is full and the first window cannot be added to the existing tiled virtual desktop.

2. The method of claim 1, further comprising:
   in response to receiving the input and in accordance with a determination that the respective location is a third location that is associated with a second virtual desktop that is a tiled virtual desktop in which a second window is tiled in a structured arrangement:
      adding the first window to the second virtual desktop in a structured arrangement with the second window.

3. The method of claim 2, wherein adding the first window to the second virtual desktop in a structured arrangement with the second window includes displaying the first and second windows as tiles that each have respective dimensions set in accordance with a corresponding application characteristic associated with each of the first and second windows.

4. The method of claim 2, wherein adding the first window to the second virtual desktop in a structured arrangement with the second window includes displaying the first and second windows as tiles that each have respective dimensions set in accordance with at least the dimensions of the first window as displayed on the first virtual desktop.

5. The method of claim 2, further comprising:
   in accordance with a determination that the respective location is also a particular sub-portion of the third location:
      displaying the first window in a corresponding region of the second virtual desktop associated with the particular sub-portion of the third location.

6. The method of claim 2, wherein adding the first window to the second virtual desktop in a structured arrangement with the second window includes displaying the first and second windows as tiles that are adjacent and non-overlapping.

7. The method of claim 1, further comprising:
   in response to receiving the input and in accordance with a determination that the respective location is a fourth location that is associated with a third virtual desktop that is a non-tiled virtual desktop:
      adding the first window to the third virtual desktop.

8. The method of claim 1, wherein the virtual desktop configuration region is arranged in association with a first edge of the first virtual desktop responsive to an interaction input associated with the first edge.

9. The method of claim 8, wherein display of the virtual desktop configuration region emerges from the first edge in response to detecting the interaction input associated with the first edge.

10. The method of claim 8, wherein the interaction input associated with the first edge includes an input corresponding to positioning of a focus selector within a trigger area including the first edge.

11. The method of claim 8, wherein the interaction input associated with the first edge includes an input corresponding to positioning the first window within a trigger area including the first edge.

12. The method of claim 8, further comprising:
in accordance with a determination that the interaction input associated with the first edge satisfies a first interaction threshold in relation to the first edge:
displaying a first representation of the virtual desktop configuration region along the first edge of the first virtual desktop, the first representation of the virtual desktop configuration region having a first height.

13. The method of claim 12, wherein, in the first representation of the virtual desktop configuration region, virtual desktops are represented by text labels without associated graphical representations.

14. The method of claim 13, further comprising:
while displaying the text based representations of virtual desktops in the virtual desktop configuration region, wherein a number of virtual desktops does not exceed a text-representation display limit, detecting the addition of an additional virtual desktop to the virtual desktop configuration region; and
in response to detecting the addition of the additional virtual desktop to the virtual desktop configuration region, and in accordance with a determination that the total number of the one or more virtual desktops created exceeds a predefined limit:
converting the display of the text based indicators of the one or more virtual desktops in the virtual desktop configuration region to graphical representations of each of the one or more virtual desktops in the virtual desktop configuration region.

15. The method of claim 14, further comprising:
in response to detecting the addition of the additional virtual desktop to the virtual desktop configuration region, and in accordance with a determination that the total number of the one or more virtual desktops created does not exceed the text-representation display limit:
adding a text based representation of the additional virtual desktop to the virtual desktop configuration region without converting the display of the text based indicators of the one or more virtual desktops in the virtual desktop configuration region to graphical representations of the one or more virtual desktops in the virtual desktop configuration region.

16. The method of claim 12, further comprising:
while displaying the first representation of the virtual desktop configuration region, in accordance with a determination that the interaction input associated with the first edge satisfies a second interaction threshold in relation to the first edge:
replacing the first representation of the virtual desktop configuration region with a second representation of the virtual desktop configuration region along the first edge of the first virtual desktop, the second representation of the virtual desktop configuration region having a second height greater than the first height, and wherein the second representation of the virtual desktop configuration region includes one or more previously created virtual desktops.

17. The method of claim 8, further comprising:
in response to detecting the interaction input associated with the first edge and in accordance with a determination that the interaction input associated with the first edge satisfies a proximity threshold in relation to the first edge:
displaying an indicator of the virtual desktop configuration region along the first edge of the first virtual desktop, wherein the indicator does not include representations of any of the previously created virtual desktops.

18. The method of claim 17, wherein the display of the indicator of the virtual desktop configuration region includes a symbol provided to indicate that further interaction with the indicator of the virtual desktop configuration is available.

19. The method of claim 8, wherein, in response to detecting the interaction input associated with the first edge and in accordance with a determination that the interaction input associated with the first edge is complete, the method further comprises:
ceasing to display any representation or indicator of the virtual desktop configuration region.

20. The method of claim 1, further comprising:
in accordance with a determination that the respective location is associated with a representation of an existing tiled virtual desktop including a number of tiles that has reached a predefined tile limit:
changing the representation of the existing tiled virtual desktop to be non-responsive to the input; and
changing the display the representation of the existing tiled virtual desktop in order to indicate that the representation of the existing tiled virtual desktop is non-responsive to the input.

21. The method of claim 1, further comprising:
in response to each respective addition of a representation of a virtual desktop to the virtual desktop configuration region:
scaling down a number of the representations of existing virtual desktops.

22. The method of claim 1, further comprising:
in response to moving the first window to the virtual desktop configuration region:
converting the first window to a corresponding thumbnail when moved toward the virtual desktop configuration region.

23. The method of claim 22, wherein converting the first window to the corresponding thumbnail includes scaling down the size of the display of the first window to the corresponding thumbnail at a first rate proportional to a second rate at which the virtual desktop configuration region emerges from the first edge.

24. The method of claim 1, further comprising:
in accordance with a determination that the input is also associated with using a focus selector to select a portion of a chrome area of the first window that allows the first window to be moved:
displaying the focus selector as fixed to the selected portion of the chrome area of the first window as the first window is moved.

25. The method of claim 1, wherein creating the new tiled virtual desktop in which the first window is tiled in a structured arrangement includes positioning the first window adjacent to a side of the new tiled virtual desktop.

26. The method of claim 1, wherein the partial-screen tile is a half-screen tile that extends half of the entire width of the new tiled virtual desktop and the partial-screen tile extends the entire height of the new tiled virtual desktop.

27. The method of claim 26, wherein the partial-screen tile extends from an edge of the new tiled virtual desktop to a center of the new tiled virtual desktop.

28. The method of claim 1, wherein the virtual desktop configuration region comprises:

a first drop target at the first location for creating tiled virtual desktops, wherein the first drop target is initially hidden; and a second drop target at the second location for creating non-tiled virtual desktops, wherein the second drop target is visible.

29. The method of claim 28, wherein creating the new tiled virtual desktop comprises:

displaying, at the first location, the first drop target that was hidden prior to receiving the input; and creating the new tiled virtual desktop in response to the representation of the first window being dropped in the first drop target.

30. The method of claim 1, wherein receiving the input comprises:

detecting, via the one or more input devices, a dragging gesture that includes dragging the first window from the first virtual desktop to the virtual desktop configuration region;

converting the first window to a thumbnail representation in response to the window breaching an interaction threshold; and detecting a release of the thumbnail representation at the first location that is associated with creating tiled virtual desktops or the second location that is associated with creating non-tiled virtual desktops.

31. An electronic device comprising:

a display;

one or more input devices;

one or more processors; and a non-transitory memory storing one or more programs which, when executed by the one or more processors, cause the electronic device to perform operations comprising:

concurrently displaying, on the display:

a first virtual desktop including a first window of an application that has a first size; and a virtual desktop configuration region;

while concurrently displaying the first virtual desktop and the virtual desktop configuration region, receiving, with the one or more input devices, an input corresponding to a request to place a representation of the first window at a respective location in the virtual desktop configuration region; and in response to receiving the input:

in accordance with a determination that the respective location is a first location that is associated with creating tiled virtual desktops, creating a new tiled virtual desktop that includes one or more tiles arranged in a structured arrangement by changing a size of the first window from the first size to a second size that corresponds to a partial-screen tile that extends less than an entire width of the new tiled virtual desktop and extends an entire height of the new tiled virtual desktop in order to allow the first window to fit into the structured arrangement, wherein the new tiled virtual desktop is a virtual desktop in which the first window extends less than the entire width of the new tiled virtual desktop and the first window extends the entire height of the new tiled virtual desktop;

in accordance with a determination that the respective location is a second location that is associated with creating non-tiled virtual desktops, creating a new non-tiled virtual desktop that includes the first window by maintaining the first window at the first size in the new non-tiled virtual desktop, wherein the second location is different from the first location, wherein the new non-tiled virtual desktop is a virtual desktop in which the first window extends less than an entire height of the new non-tiled virtual desktop; and in accordance with a determination that the respective location is a third location that is associated with a representation of an existing tiled virtual desktop including a number of tiles that has reached a predefined tile limit, displaying an indication that the existing tiled virtual desktop is full and the first window cannot be added to the existing tiled virtual desktop.

32. A non-transitory computer readable storage medium storing one or more programs, the one or more programs comprising instructions, which when executed by an electronic device with a display and one or more input devices, cause the electronic device to:

concurrently display, on the display:

a first virtual desktop including a first window of an application that has a first size; and a virtual desktop configuration region;

while concurrently displaying the first virtual desktop and the virtual desktop configuration region, receive, with the one or more input devices, an input corresponding to a request to place a representation of the first window at a respective location in the virtual desktop configuration region; and in response to receiving the input:

in accordance with a determination that the respective location is a first location that is associated with creating tiled virtual desktops, create a new tiled virtual desktop that includes one or more tiles arranged in a structured arrangement by changing a size of the first window from the first size to a second size that corresponds to a partial-screen tile that extends less than an entire width of the new tiled virtual desktop and extends an entire height of the new tiled virtual desktop in order to allow the first window to fit into the structured arrangement, wherein the new tiled virtual desktop is a virtual desktop in which the first window extends less than the entire width of the new tiled virtual desktop and the first window extends the entire height of the new tiled virtual desktop;

in accordance with a determination that the respective location is a second location that is associated with creating non-tiled virtual desktops, create a new non-tiled virtual desktop that includes the first window by maintaining the first window at the first size in the new non-tiled virtual desktop, wherein the second location is different from the first location, wherein the new non-tiled virtual desktop is a virtual desktop in which the first window extends less than an entire height of the new non-tiled virtual desktop; and in accordance with a determination that the respective location is a third location that is associated with a representation of an existing tiled virtual desktop including a number of tiles that has reached a predefined tile limit, display an indication that the existing tiled virtual desktop is full and the first window cannot be added to the existing tiled virtual desktop.

33. The non-transitory computer readable storage medium of claim 32, wherein the virtual desktop configuration region comprises:

a first drop target at the first location for creating tiled virtual desktops, wherein the first drop target is initially hidden; and a second drop target at the second location for creating non-tiled virtual desktops, wherein the second drop target is visible; and wherein creating the new tiled virtual desktop comprises:
displaying, at the first location, the first drop target that was hidden prior to receiving the input; and
creating the new tiled virtual desktop in response to the representation of the first window being dropped in the first drop target.

34. An electronic device comprising:
a display;
one or more input devices;
means for concurrently displaying, on the display:
a first virtual desktop including a first window of an application that has a first size; and
a virtual desktop configuration region;
means for receiving, with the one or more input devices, an input corresponding to a request to place a representation of the first window at a respective location in the virtual desktop configuration region while concurrently displaying the first virtual desktop and the virtual desktop configuration region;
means, responsive to receiving the input, for creating a new tiled virtual desktop that includes one or more tiles arranged in a structured arrangement in accordance with a determination that the respective location is a first location that is associated with creating tiled virtual desktops, wherein creating the new tiled virtual desktop includes changing a size of the first window from the first size to a second size that corresponds to a partial-screen tile that extends less than an entire width of the new tiled virtual desktop and extends an entire height of the new tiled virtual desktop in order to allow the first window to fit into the structured arrangement, wherein the new tiled virtual desktop is a virtual desktop in which the first window extends less than the entire width of the new tiled virtual desktop and the first window extends the entire height of the new tiled virtual desktop;
means, responsive to receiving the input, for creating a new non-tiled virtual desktop that includes the first window in accordance with a determination that the respective location is a second location that is associated with creating non-tiled virtual desktops, wherein the first window is maintained at the first size in the new non-tiled virtual desktop, wherein the second location is different from the first location, wherein the new non-tiled virtual desktop is a virtual desktop in which the first window extends less than an entire height of the new non-tiled virtual desktop; and
means, responsive to receiving the input, for displaying an indication that an existing tiled virtual desktop is full and the first window cannot be added to the existing tiled virtual desktop in accordance with a determination that the respective location is a third location that is associated with a representation of the existing tiled virtual desktop including a number of tiles that has reached a predefined tile limit.

35. An electronic device comprising:
a display unit configured to display a graphical user interface;
one or more input units configured to receive user inputs; and
a processing unit coupled to the display unit and the one or more input units, wherein the processing unit is configured to:
concurrently display, on the display unit:
a first virtual desktop including a first window of an application that has a first size, and
a virtual desktop configuration region;
while concurrently displaying the first virtual desktop and the virtual desktop configuration region, receive, via the one or more input units, an input corresponding to a request to place a representation of the first window at a respective location in the virtual desktop configuration region; and
in response to receiving the input:
in accordance with a determination that the respective location is a first location that is associated with creating tiled virtual desktops, create a new tiled virtual desktop that includes one or more tiles arranged in a structured arrangement by changing a size of the first window from the first size to a second size that corresponds to a partial-screen tile that extends less than an entire width of the new tiled virtual desktop and extends an entire height of the new tiled virtual desktop in order to allow the first window to fit into the structured arrangement, wherein the new tiled virtual desktop is a virtual desktop in which the first window extends less than the entire width of the new tiled virtual desktop and the first window extends the entire height of the new tiled virtual desktop;
in accordance with a determination that the respective location is a second location that is associated with creating non-tiled virtual desktops, create a new non-tiled virtual desktop that includes the first window by maintaining the first window at the first size in the new non-tiled virtual desktop, wherein the second location is different from the first location, wherein the new non-tiled virtual desktop is a virtual desktop in which the first window extends less than an entire height of the new non-tiled virtual desktop; and
in accordance with a determination that the respective location is a third location that is associated with a representation of an existing tiled virtual desktop including a number of tiles that has reached a predefined tile limit, display an indication that the existing tiled virtual desktop is full and the first window cannot be added to the existing tiled virtual desktop.

36. The electronic device of claim 35, wherein the processing unit is configured to:
in response to receiving the input and in accordance with a determination that the respective location is a third location that is associated with a second virtual desktop that is a tiled virtual desktop in which a second window is tiled in a structured arrangement:
add the first window to the second virtual desktop in a structured arrangement with the second window.

37. The electronic device of claim 36, wherein adding the first window to the second virtual desktop in a structured arrangement with the second window includes displaying the first and second windows as tiles that each have respective dimensions set in accordance with a corresponding application characteristic associated with each of the first and second windows.

38. The electronic device of claim 36, wherein adding the first window to the second virtual desktop in a structured arrangement with the second window includes displaying the first and second windows as tiles that each have respective dimensions set in accordance with at least the dimensions of the first window as displayed on the first virtual desktop.

39. The electronic device of claim 36, wherein the processing unit is configured to:
in accordance with a determination that the respective location is also a particular sub-portion of the third location:
display, on the display unit, the first window in a corresponding region of the second virtual desktop associated with the particular sub-portion of the third location.

40. The electronic device of claim 36, wherein adding the first window to the second virtual desktop in a structured arrangement with the second window includes displaying the first and second windows as tiles that are adjacent and non-overlapping.

41. The electronic device of claim 35, wherein the processing unit is configured to:
in response to receiving the input and in accordance with a determination that the respective location is a fourth location that is associated with a third virtual desktop that is a non-tiled virtual desktop:
add the first window to the third virtual desktop.

42. The electronic device of claim 35, wherein the virtual desktop configuration region is arranged in association with a first edge of the first virtual desktop responsive to an interaction input associated with the first edge.

43. The electronic device of claim 42, wherein display of the virtual desktop configuration region emerges from the first edge in response to detecting the interaction input associated with the first edge.

44. The electronic device of claim 42, wherein the interaction input associated with the first edge includes an input corresponding to positioning of a focus selector within a trigger area including the first edge.

45. The electronic device of claim 42, wherein the interaction input associated with the first edge includes an input corresponding to positioning the first window within a trigger area including the first edge.

46. The electronic device of claim 42, wherein the processing unit is configured to:
in accordance with a determination that the interaction input associated with the first edge satisfies a first interaction threshold in relation to the first edge:
display, on the display unit, a first representation of the virtual desktop configuration region along the first edge of the first virtual desktop, the first representation of the virtual desktop configuration region having a first height.

47. The electronic device of claim 46, wherein, in the first representation of the virtual desktop configuration region, virtual desktops are represented by text labels without associated graphical representations.

48. The electronic device of claim 47, wherein the processing unit is configured to:
while displaying the text based representations of virtual desktops in the virtual desktop configuration region, wherein the number of virtual desktops does not exceed a text-representation display limit, detect the addition of an additional virtual desktop to the virtual desktop configuration region; and
in response to detecting the addition of the additional virtual desktop to the virtual desktop configuration region, and in accordance with a determination that the total number of the one or more virtual desktops created exceeds a predefined limit:
convert the display of the text based indicators of the one or more virtual desktops in the virtual desktop configuration region to graphical representations of each of the one or more virtual desktops in the virtual desktop configuration region.

49. The electronic device of claim 48, wherein the processing unit is configured to:
in response to detecting the addition of the additional virtual desktop to the virtual desktop configuration region, and in accordance with a determination that the total number of the one or more virtual desktops created does not exceed the text-representation display limit:
add a text based representation of the additional virtual desktop to the virtual desktop configuration region without converting the display of the text based indicators of the one or more virtual desktops in the virtual desktop configuration region to graphical representations of the one or more virtual desktops in the virtual desktop configuration region.

50. The electronic device of claim 46, wherein the processing unit is configured to:
while displaying the first representation of the virtual desktop configuration region, in accordance with a determination that the interaction input associated with the first edge satisfies a second interaction threshold in relation to the first edge:
replace the first representation of the virtual desktop configuration region with a second representation of the virtual desktop configuration region along the first edge of the first virtual desktop, the second representation of the virtual desktop configuration region having a second height greater than the first height, and wherein the second representation of the virtual desktop configuration region includes one or more previously created virtual desktops.

51. The electronic device of claim 42, wherein the processing unit is configured to:
in response to detecting the interaction input associated with the first edge and in accordance with a determination that the interaction input associated with the first edge satisfies a proximity threshold in relation to the first edge:
display, on the display unit, an indicator of the virtual desktop configuration region along the first edge of the first virtual desktop, wherein the indicator does not include representations of any of the previously created virtual desktops.

52. The electronic device of claim 51, wherein the display of the indicator of the virtual desktop configuration region includes a symbol provided to indicate that further interaction with the indicator of the virtual desktop configuration is available.

53. The electronic device of claim 52, wherein, in response to detecting the interaction input associated with the first edge and in accordance with a determination that the interaction input associated with the first edge is complete, the processing unit is configured to:
cease to display any representation or indicator of the virtual desktop configuration region.

54. The electronic device of claim 35, wherein the processing unit is configured to:
in accordance with a determination that the respective location is associated with a representation of an existing tiled virtual desktop including a number of tiles that has reached a predefined tile limit:
change the representation of the existing tiled virtual desktop to be non-responsive to the input; and
change the display the representation of the existing tiled virtual desktop in order to indicate that the representation of the existing tiled virtual desktop is non-responsive to the input.

55. The electronic device of claim 35, wherein the processing unit is configured to:
in response to each respective addition of a representation of a virtual desktop to the virtual desktop configuration region:
scale down the size of the representations of existing virtual desktops.

56. The electronic device of claim 35, wherein the processing unit is configured to:
in response to moving the first window to the virtual desktop configuration region:
convert the first window to a corresponding thumbnail when moved toward the virtual desktop configuration region.

57. The electronic device of claim 56, wherein converting the first window to the corresponding thumbnail includes scaling down the size of the display of the first window to the corresponding thumbnail at a first rate proportional to a second rate at which the virtual desktop configuration region emerges from the first edge.

58. The electronic device of claim 35, wherein the processing unit is configured to:
in accordance with a determination that the input is also associated with using a focus selector to select a portion of a chrome area of the first window that allows the first window to be moved:
display, on the display unit, the focus selector as fixed to the selected portion of the chrome area of the first window as the first window is moved.

59. The electronic device of claim 35, wherein the partial-screen tile is a half-screen tile that extends half of the entire width of the new tiled virtual desktop and the partial-screen tile extends the entire height of the new tiled virtual desktop.

60. The electronic device of claim 59, wherein the partial-screen tile extends from an edge of the new tiled virtual desktop to a center of the new tiled virtual desktop.

61. The electronic device of claim 35, wherein the virtual desktop configuration region comprises:
a first drop target at the first location for creating tiled virtual desktops, wherein the first drop target is initially hidden; and
a second drop target at the second location for creating non-tiled virtual desktops, wherein the second drop target is visible; and
wherein creating the new tiled virtual desktop comprises:
displaying, at the first location, the first drop target that was hidden prior to receiving the input; and
creating the new tiled virtual desktop in response to the representation of the first window being dropped in the first drop target.

* * * * *